INVENTORS
WARREN C. FOIN
RALPH A. GREGORY
FRANK B. HARTMAN
RICHARD A. TRACHY

BY Gunt A. Hauptman

ATTORNEY

Feb. 2, 1965 W. C. FOIN ETAL 3,168,723

DATA COMPRESSION APPARATUS

Filed June 21, 1960 93 Sheets-Sheet 2

MEM. 6X8 DECODER

4 X 10 DECODER OUTPUT INVERTERS

MEM Y SWITCH CORE WRITE DRIVERS

MEM Y SWITCH CORE WRITE DRIVERS

MEMORY READ BIAS GATE & MEM./P.C.T. SAMPLE CONTROL

MEMORY READ GATES & P.W.D CONTROL

Feb. 2, 1965 W. C. FOIN ETAL 3,168,723

DATA COMPRESSION APPARATUS

Filed June 21, 1960 93 Sheets-Sheet 13

MEMORY GATE POWERING & M.B.R. RESET

MEMORY CLAMPS & SENSE AMP. BIAS VOLTAGE

STORAGE SAMPLE PULSE GENERATOR

Feb. 2, 1965 W. C. FOIN ETAL 3,168,723

DATA COMPRESSION APPARATUS

Filed June 21, 1960 93 Sheets-Sheet 16

6 X 8 DECODER OUTPUT INVERTERS

Feb. 2, 1965 W. C. FOIN ETAL 3,168,723

DATA COMPRESSION APPARATUS

Filed June 21, 1960 93 Sheets-Sheet 17

Feb. 2, 1965 W. C. FOIN ETAL 3,168,723

DATA COMPRESSION APPARATUS

Filed June 21, 1960 93 Sheets-Sheet 18

STOR. READ BIAS GT, READ GT., INHIBIT GT., WRITE GT. & BUFF REG. RESET

STORAGE R/W MODE CTRL.

Y SWITCH CORE MATRIX

Feb. 2, 1965 W. C. FOIN ETAL 3,168,723
DATA COMPRESSION APPARATUS
Filed June 21, 1960
93 Sheets-Sheet 22
FIG.9 "X" SWITCH CORE MATRIX
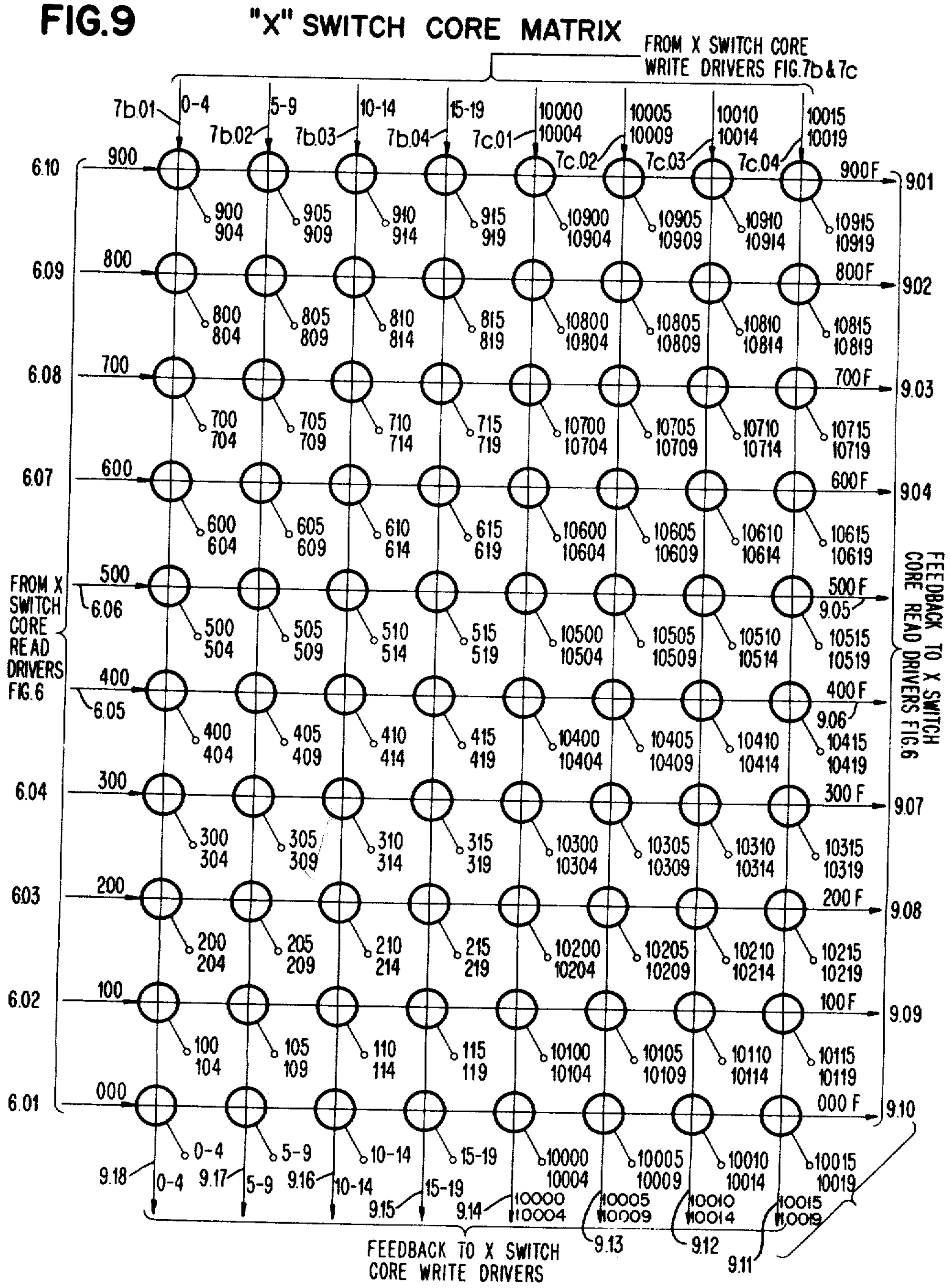

Feb. 2, 1965 W. C. FOIN ETAL 3,168,723

DATA COMPRESSION APPARATUS

Filed June 21, 1960 93 Sheets-Sheet 25

OPERATION ZONE DECODER

Feb. 2, 1965 W. C. FOIN ETAL 3,168,723

DATA COMPRESSION APPARATUS

Filed June 21, 1960 93 Sheets-Sheet 26

OPERATION DECODER NO OP, STOP, TR, SEND

OPERATION DECODER SET L, TR HI, RWW SEL

OPERATION DECODER SHOR, TR EQ, SIGN CTRL.

OPERATION DECODER ULA, AAM, SB

FIG.23e OPERATION DECODER LENG,TR PLS,RCV,COMP
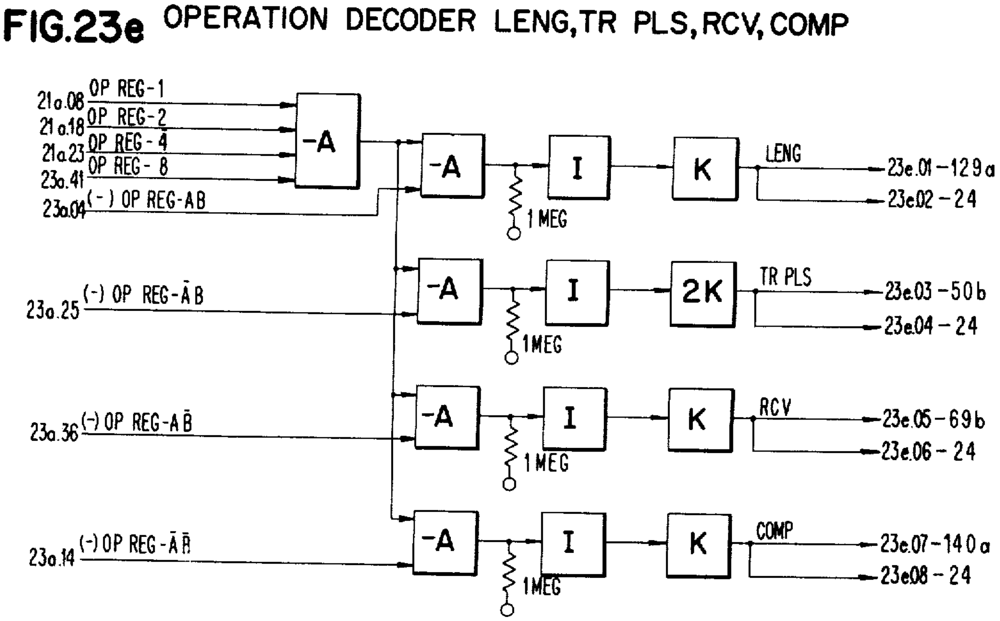

OPERATION DECODER-ROUND, TR ZRO, MPY, ST PR

OPERATION DECODER STORE, TR SIG, DIV, ADD MEM

Feb. 2, 1965 W. C. FOIN ET AL 3,168,723

DATA COMPRESSION APPARATUS

Filed June 21, 1960 93 Sheets-Sheet 31

Feb. 2, 1965 W. C. FOIN ETAL 3,168,723
DATA COMPRESSION APPARATUS
Filed June 21, 1960 93 Sheets-Sheet 33
FIG. 23k OPERATION DECODER LDA, BLM, TZB
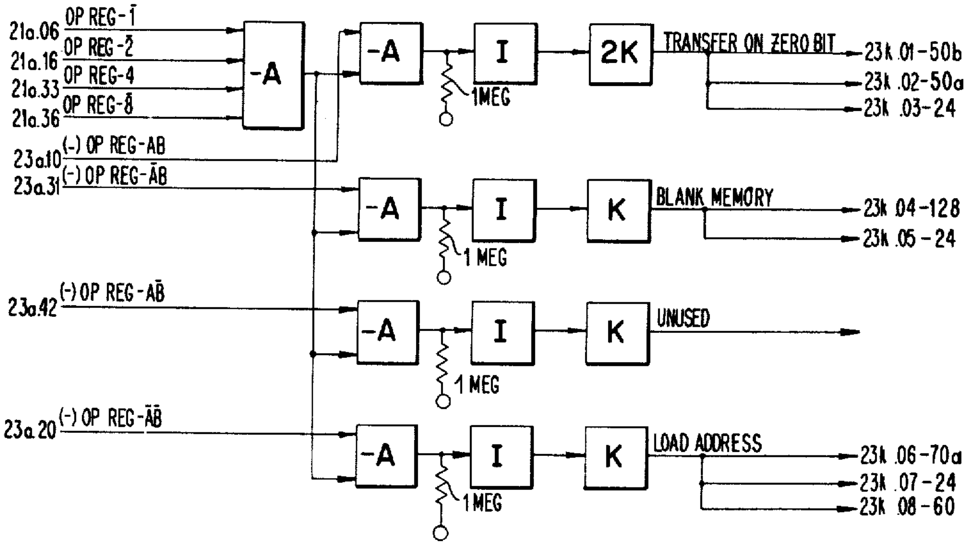

FIG. 32a INSTRUCTION COUNTER CONTROLS & 4,9, OF IC
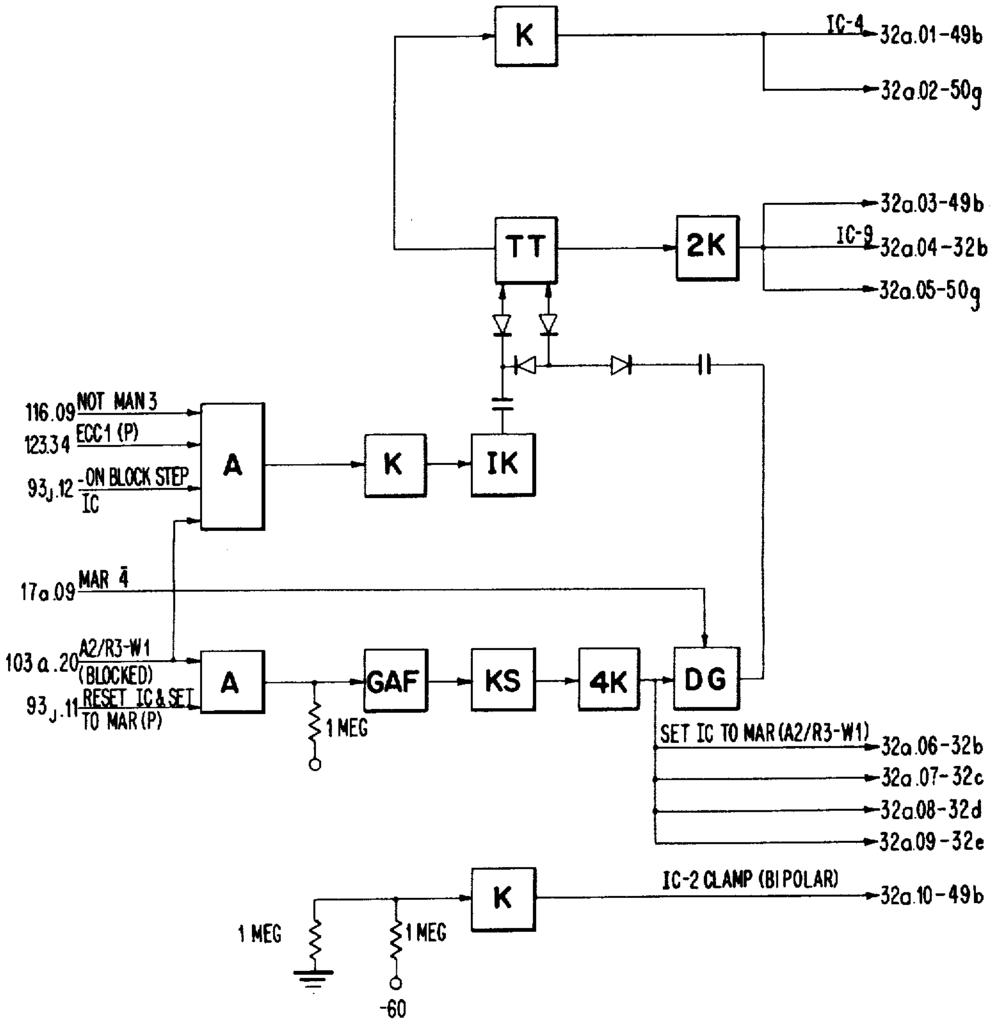
INST CTR RESET (T) 139c.08
-12 CLAMP 139d.46

INST CTR RESET(T) 139c.10
-12 CLAMP 139d.48

Feb. 2, 1965 W. C. FOIN ETAL 3,168,723

DATA COMPRESSION APPARATUS

Filed June 21, 1960 93 Sheets-Sheet 40

1st. ORDER OF MASR

Feb. 2, 1965 W. C. FOIN ETAL 3,168,723

DATA COMPRESSION APPARATUS

Filed June 21, 1960 93 Sheets-Sheet 44

3rd. ORDER OF MASR

-12 CLAMP 139d.33

4th. ORDER OF MASR

FIG.49h 4th.ORDER MASR SET CIRCUITS
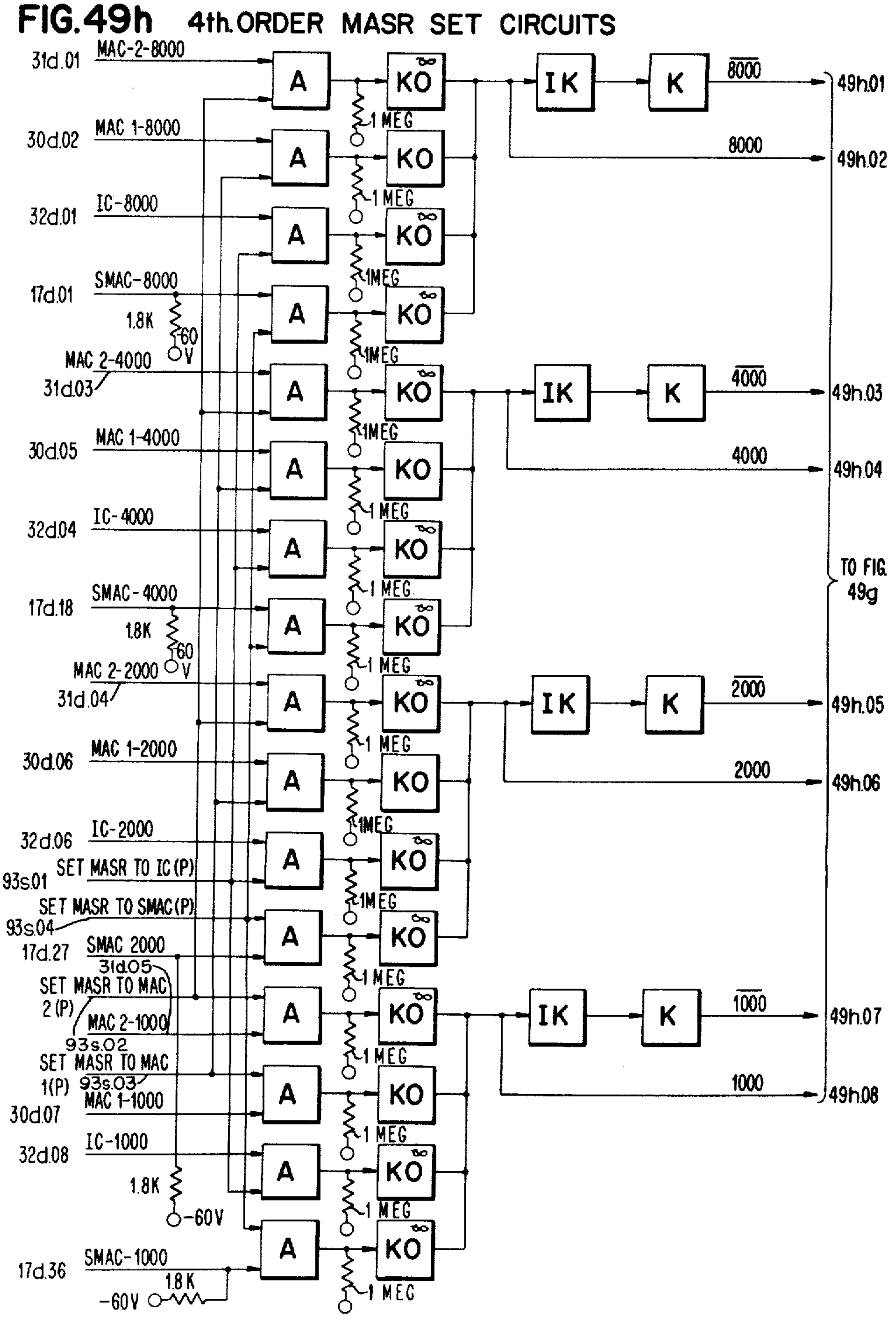

CHARACTER REGISTERS TO ADDER ROUTING

ADDER OUT ROUTING

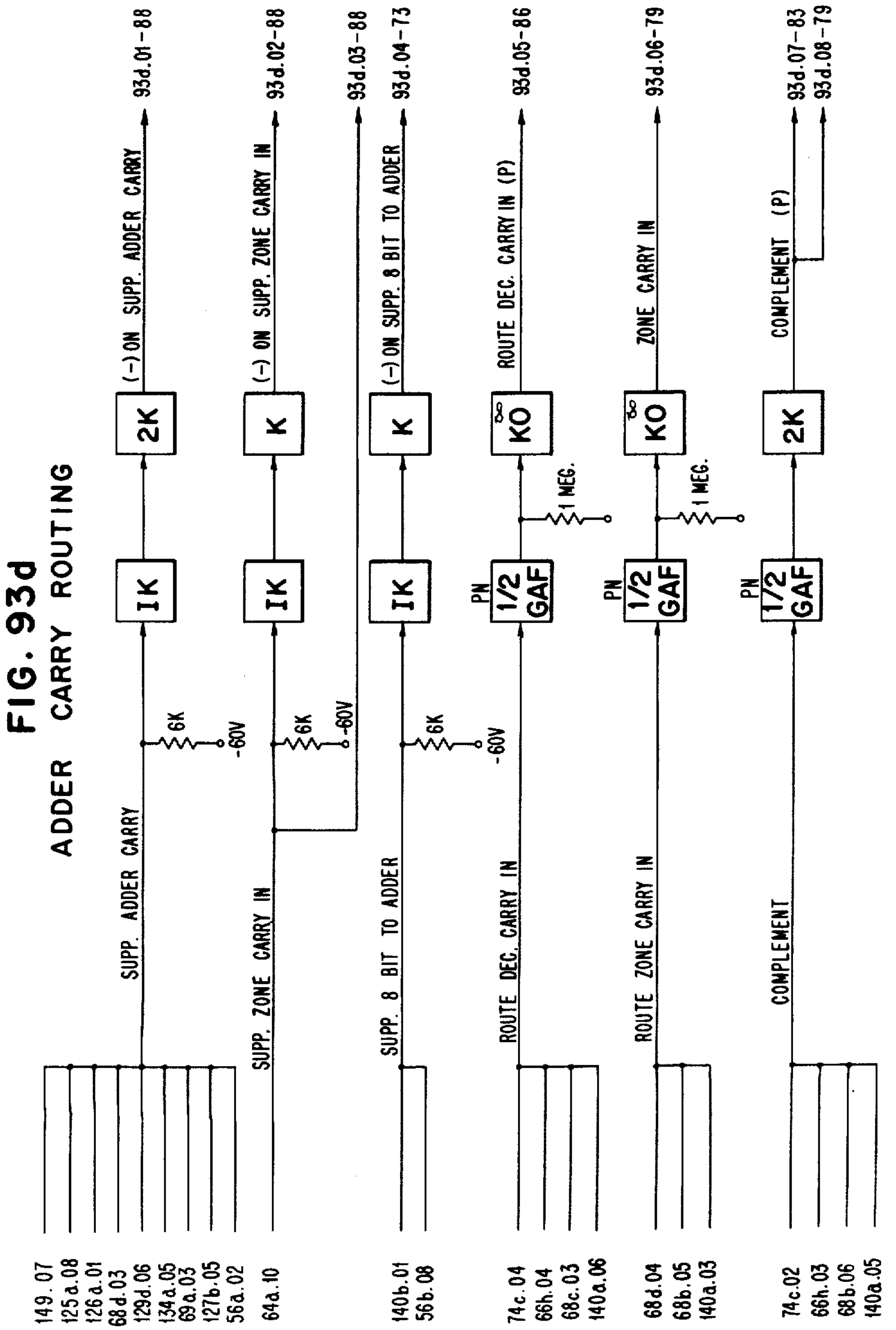
FIG. 93d ADDER CARRY ROUTING

ADDER EMITTER AND MPL REG. ROUTING

BIT TO ADDER ROUTING

STEP MAC. 1 ± 1 ROUTING

STEP SAC ROUTING

Feb. 2, 1965 | W. C. FOIN ETAL | 3,168,723

DATA COMPRESSION APPARATUS

Filed June 21, 1960 | 93 Sheets-Sheet 59

Feb. 2, 1965 W. C. FOIN ETAL 3,168,723

DATA COMPRESSION APPARATUS

Filed June 21, 1960 93 Sheets-Sheet 60

AUXILIARY TRIG.'S ROUTING

Feb. 2, 1965 W. C. FOIN ETAL 3,168,723

DATA COMPRESSION APPARATUS

Filed June 21, 1960 93 Sheets-Sheet 61

AUX. TRIG. STOR. HI. TRIG., AND RMDR. TRIG. ROUTING

Feb. 2, 1965 W. C. FOIN ETAL 3,168,723

DATA COMPRESSION APPARATUS

Filed June 21, 1960 93 Sheets-Sheet 62

SMT. DZT. AND TNSN TRIG. ROUTING

FIG.93n SIGN CHK TGR OVFL CHK TRIG AND STOR SIGN TRIG ROUTING
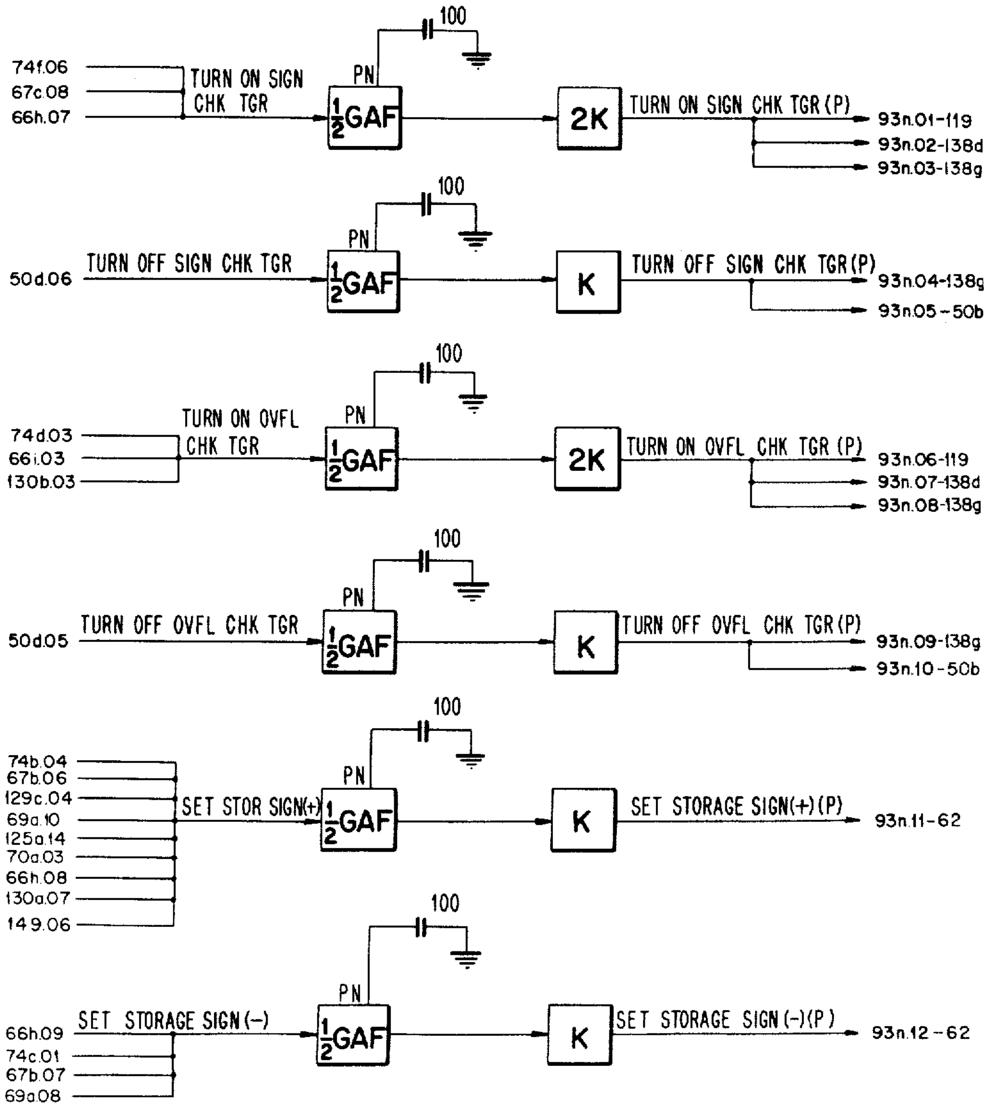

R/W CHK TGR, RECORD CHK TGR AND INSTR CHK TGR ROUTING

Feb. 2, 1965 W. C. FOIN ETAL 3,168,723

DATA COMPRESSION APPARATUS

Filed June 21, 1960 93 Sheets-Sheet 65

FIG. 93q MODE CONTROL ROUTING
FIG. 93r ROUTING: END E TIME
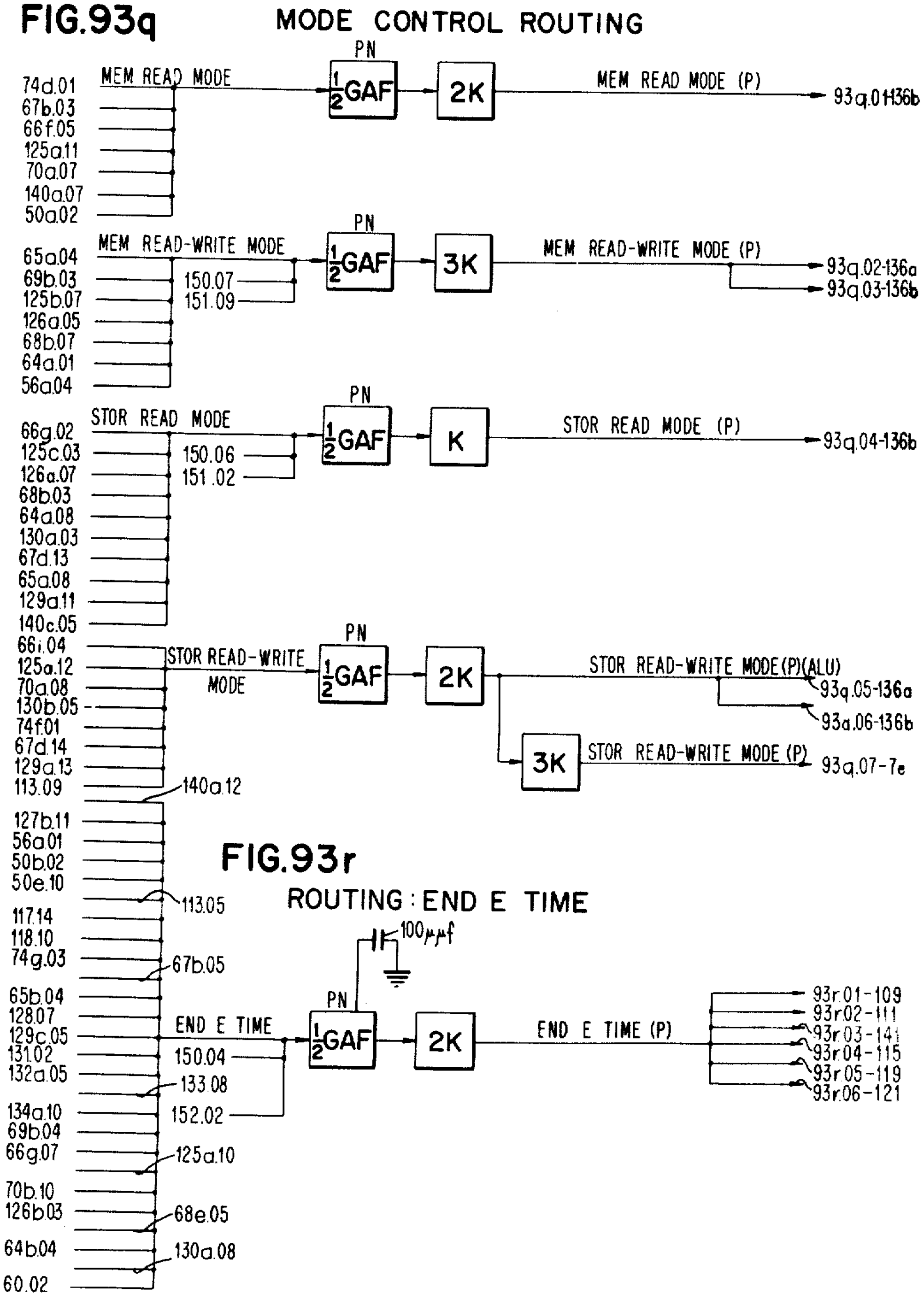

Feb. 2, 1965 W. C. FOIN ETAL 3,168,723

DATA COMPRESSION APPARATUS

Filed June 21, 1960 93 Sheets-Sheet 67

Feb. 2, 1965 W. C. FOIN ETAL 3,168,723

DATA COMPRESSION APPARATUS

Filed June 21, 1960 93 Sheets-Sheet 68

BLOCK ADD TGR,
SUPP CODE CHECKING

Feb. 2, 1965 W. C. FOIN ETAL 3,168,723

DATA COMPRESSION APPARATUS

Filed June 21, 1960 93 Sheets-Sheet 73

I/E TIMER OUTPUTS

I/E TIMER OUTPUTS

Feb. 2, 1965 W. C. FOIN ETAL 3,168,723

DATA COMPRESSION APPARATUS

Filed June 21, 1960 93 Sheets-Sheet 77

Feb. 2, 1965 W. C. FOIN ETAL 3,168,723
DATA COMPRESSION APPARATUS
Filed June 21, 1960 93 Sheets-Sheet 78
FIG.136c TRANSITION POWERING
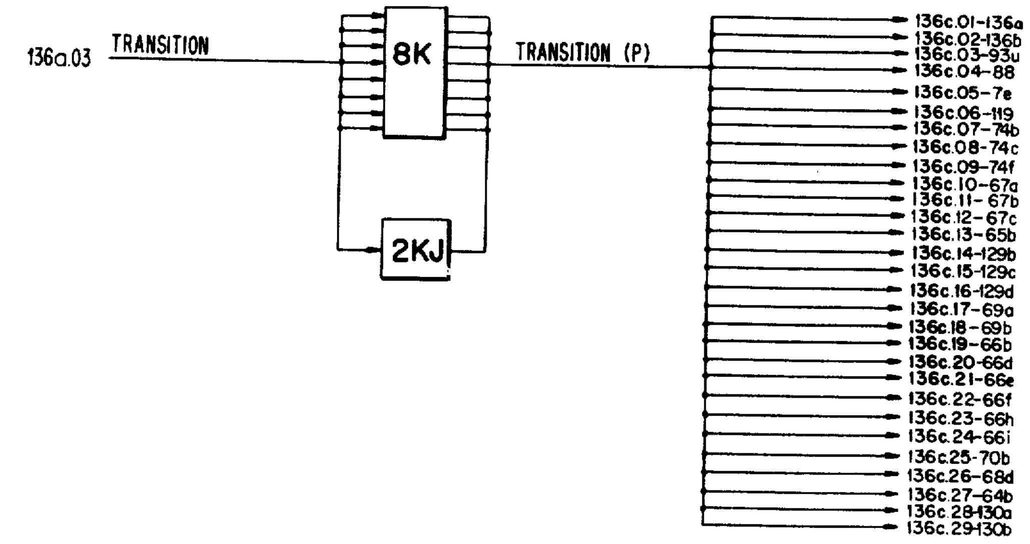
FIG.136d
NOT TRANSITION & ADD TGR POWERING
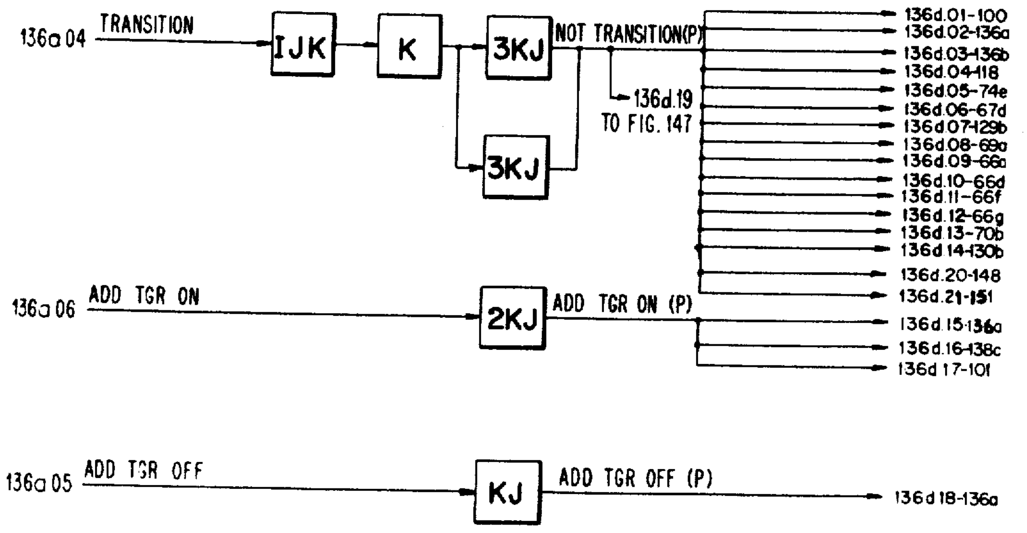

TNSN TGR, MODE CTRL TGR POWERING

OVERLAP MODE FLOW DIAGRAMS

OPERATION DECODER LDZ, UDZ

FIG.147 LOAD ZONES ROUTING CONTROLS

LOAD ZONES ROUTING CONTROLS

LOAD ZONES ROUTING CONTROLS FIG. 149

Feb. 2, 1965 W. C. FOIN ETAL 3,168,723

DATA COMPRESSION APPARATUS

Filed June 21, 1960 93 Sheets-Sheet 85

LOAD ZONES ROUTING CONTROLS

FIG. 151 UNLOAD DIGITS ROUTING CONTROLS

FIG. 152 UNLOAD DIGITS ROUTING CONTROLS

UNLOAD DIGITS FLOW DIAGRAM

LOAD ZONES AS DIGITS FLOW DIAGRAM (SHEET 1 OF 2)

Feb. 2, 1965 W. C. FOIN ETAL 3,168,723

DATA COMPRESSION APPARATUS

Filed June 21, 1960 93 Sheets-Sheet 90

LOAD ZONES AS DIGITS FLOW DIAGRAM (SHEET 2 OF 2)

UDZ INSTRUCTION TIMING CHART

LZD INSTRUCTION TIMING CHART (SHEET 1 OF 2)

(SHEET 2 OF 2)

LZD INSTRUCTION TIMING CHART

United States Patent Office 3,168,723

Patented Feb. 2, 1965

3,168,723

DATA COMPRESSION APPARATUS

Warren C. Foin, Buchanan, Ralph A. Gregory, Endwell, and Frank B. Hartman and Richard A. Trachy, Poughkeepsie, N.Y., assignors to International Business Machines Corporation, New York, N.Y., a corporation of New York Filed June 21, 1960, Ser. No. 37,798
2 Claims. (Cl. 340—172.5)

This invention relates to electronic apparatus and more particularly to circuits for handling information in a manner to more efficiently utilize the space normally allotted for information storage in electronic data processing systems.

INDEX

| | Column |
|---|---|
| Data Compression—Unload Digits as Zones | 3 |
| Data Expansion—Load Zones as Digits | 4 |
| Example I.—Reset and Add | 8 |
| Example II.—Add | 8 |
| Example III.—Store | 9 |
| Chart I.—Bit Configuration of Character and Symbol | 10 |
| Cycles | 10 |
| Overlap Mode Flow Diagrams | 11 |
| General Discussion of UDZ and LZD Instructions | 11 |
| (1) Unload Digits as Zones | 12 |
| (2) Load Zones as Digits | 13 |
| Examples of UDZ and LZE Instructions | 15 |
| (1) Unload Digits as Zones | 15 |
| (2) Load Zones as Digits | 24 |

The apparatus of the invention, as described herein, employs an array of magnetic cores as principal storage designated Core Memory. It also employs an array of magnetic cores as temporary storage designated Core Storage, the latter being divided into two sections, one section comprising Accumulator Storage and another comprising Auxiliary Storage.

Characters, each of seven bits (C, B, A, 8, 4, 2, 1) with the numeric bits being coded in the binary coded decimal (BCD) notation and each character in an addressable location, are combined to form words or fields whose address in Core Memory or Storage is usually designated by addressing the least significant character of the particular word or field. In Storage, the end of a field is identified by storing a Storage Mark (SM) character adjacent the most significant character in the field. Also, in this invention a Storage Mark may be placed in Memory to indicate the end of a field. In Core Memory, the sign of the field is indicated by special zoning in the A and B positions of the least significant digit. This special coding of a character in one field also serves to demarcate the length of an adjacent field or word stored at a higher address.

The Electronic Data Processing System provided herein is controlled by a program of instructions stored in Core Memory which prescribe the operations to be performed and the locations of data in Core Memory, which data is to be manipulated in accordance with these instructions. Instructions comprise five characters and are extracted from Core Memory and decoded to control circuits which carry out the execution of the instruction originally obtained from Core Memory before selecting another instruction. Programs may be entered into Core Memory in a number of ways. For example, the instructions may be punched in cards in the "IBM" code and read into Memory by means of a card reader or they may be recorded on tape and entered in Memory therefrom.

The Computer itself comprises storage, arithmetic circuits and various registers which, under control of the instructions, are employed to process data which may be words, fields or portions of instructions whereby characters are added, subtracted, multiplied, revised and so forth and act on portions of instructions as if they were data. The characters may be numeric, non-numeric or mixed. This invention is mainly concerned with characters that are numeric. Since the binary coded decimal (BCD) notation is employed for numerical information, the result of arithmetic operations on two characters may require correction, which is automatic when such correction is required. It is to be noted that many of the basic elements of the Data Processing System assume one or the other of two stable states as described later and are therefore particularly well suited for the binary system of notation where one specified state is indicative of a binary "one" and the other state is indicative of a binary "zero."

The basic cycle of the machine is an Execution Character Cycle (ECC) which includes a Read portion and a Write portion. The Read portion is the time required to read a character from Core Memory and/or Storage into Character Register. The Write portion is the time required to write or store a character or characters into Core Memory and/or Storage. The total duration of an Execution Character Cycle is nine microseconds of which the first five microseconds comprises the Read portion and the latter four microseconds comprises the Write portion.

An Instruction Cycle, which is the time required to obtain a word from Core Memory and prepare for the operation specified by the instruction, has a duration of thirteen microseconds. For the Instruction Cycle, the Read and Write portions of the basic cycle are used and an additional four microseconds are inserted to provide a total duration of thirteen microseconds.

The stored program mentioned above contains as many instructions as necessary to perform the intended data processing operation. The five characters of the Instruction consist of four characters designating the Address, called the Address portion, and one character designating the Operation, called the Operation portion. Whereas an Instruction consists of five characters, data fields may be of any length within the capacity of the Memory, the end of a Data field in this invention being indicated by a Storage Mark. In the stored program computer of the present invention, the computer has no way of distinguishing between instruction and Data except by the time of occurrence, either during Instruction (I) or Execute (E) time when it reads the information. If the computer is in Instruction time, then the information received from Core Memory is an Instruction; if it is Execute time, then the information is data to be operated upon. Upon completion of read-out of an Instruction, the apparatus proceeds to Execute time which consists of a number of Execution cycles, the number depending upon the length of the particular field being processed and the particular Instruction being executed.

The Memory capacity of Electronic Data Processing Systems has been enlarged to the extent that the machine of the present invention has a Memory capacity of 80,000 addressable characters—a large increase over previous devices of this type. With such increases, the address portion of the Instruction, which refers to distinct addresses of data to be operated upon in accordance with such instructions, have been expanded to specify the address of the highest order of Memory which is 79,999. How this is accomplished is set forth below.

Each character has a numeric, a zone and a check bit portion. The numeric portion comprises 4 bits, 8, 4, 2 and 1, which describe a digit by the combination of binary states of the 4 bits, well known as the Binary Coded Decimal notation. The 80,000 character capacity of the Memory does not necessarily limit the numeric capacity of the electronic data processing system of this invention to 80,000 decimal digits. As will be explained in detail, apparatus is provided so that an additional one-third of the normal character capacity of the Memory may be added to the Memory capacity when storing numeric information. The zone portion comprises two bits, B and A, which, in combination with the numeric portion, designate an alphabetic character, a special character or a symbol. When used alone, these bits of the zone portion may have attached thereto special meanings as will be explained in detail. The number of decimal digits that may be stored can be greatly increased by utilizing these zone bits. The check bit portion comprises a single bit, C, and this C bit is employed to furnish an even bit count for the total bits of the character so that erroneous dropping or acquiring of bits may not go undetected.

The instructions of the system are of the two-address type. One character (character 0) prescribes the operation to be performed. The numeric portions of characters 1 through 4, the B and A bits of character 1 and the B bit of character 4 specify the Memory address from 0 through 79,999. The A bit of character 1 is assigned the numeric value of 10,000; the B bit of character 1 the value 20,000; and the B bit of character 4 the value 40,000. Thus these bits correspond to a digit of ten-thousands order in which the 4, 2 and 1 bits have significance as a BCD number. The B and A bits of characters 2 and 3 are interpreted as a four-bit binary number to address Storage.

An object of this invention is to increase the information holding capacity of an electronic data processing system.

An additional object of this invention is to transfer information between the numeric portions of characters and the non-numeric portions of pairs of other characters.

Another object of this invention is to compress information by incorporating the numeric portions of individual characters into the non-numeric portions of pairs of characters in a storage.

A further object of this invention is to expand information by processing the zone portions of pairs of characters in a storage to form the numeric portions of individual characters.

A still further object of this invention is to compress information by generating the zone portions of pairs of characters in a first storage in accordance with the numeric portions of characters in a second storage.

Still another object of this invention is to expand information by placing numeric portions of characters into a storage in accordance with the non-numeric portions of pairs of characters in another storage.

The foregoing and other objects, features and advantages of the invention will be apparent from the following more particular description of preferred embodiments of the invention, as illustrated in the accompanying drawings.

This invention is directed to apparatus for treating the non-numeric portions of characters as numeric information for the purpose of increasing the amount of numeric information that may be stored, in Memory, and in associated types of storage, by carrying out the following instructions:

(1) The Unload Digits as Zones instruction, comprising an Operation Code, the Address of a Memory field and the Address of a Storage field, causes zones to be placed in the specified Memory field in accordance with the numeric portions of the characters in the specified Storage field. The four numeric bits of each one of the characters in the specified Storage field are placed into the specified Memory field as the A and B bits of a pair of characters. The 1 and 2 bits of a first character in Storage are placed as the A and B bits respectively in the first character of a pair of characters in Memory. The 4 and 8 bits of the first character in Storage are placed as the A and B bits respectively in the second character of the pair of characters in Memory. The numeric portions of subsequent characters in the Storage field specified by the Storage Field Address are stored as the zone portions of subsequent pairs of characters in the Memory field specified by the Memory Field Address, until a Storage Mark character is sensed indicating the end of a field. The Storage fields, and the numeric portions of the Memory fields remain unchanged, and new check bits are generated for the Memory characters where necessary.

The purpose of this instruction is to compress numeric data by a factor of one-third. For example by using standard instructions, one-third of the data in some auxiliary type of storage (such as magnetic tape) may be placed into Storage, and the remaining two-thirds may be placed into Memory. The instruction packs the numeric portions of the data in Storage into Memory as the Zone portions of the data in Memory. This Memory data may then be replaced in the same or another auxiliary type of Storage.

(2) The Load Zones as Digits instruction, comprising an Operation Code, the Address of a Memory field and the Address of a Storage field, causes numeric data to be placed in the specified Storage field in accordance with the Zones of the characters in the specified Memory field. The A and B bits of each pair of characters in the specified Memory field are placed into the specified Storage field as the numeric portion of one character. The A and B bits in the first character of a pair of characters in Memory are placed as the 1 and 2 bits of a character in Storage. The A and B bits in the second character of the pair of characters in Memory are placed as the 4 and 8 bits of the character in Storage. The Zones of subsequent pairs of characters in the Memory field specified by the Memory Field Address are stored as the numeric portions of subsequent characters in the Storage field specified by the Storage Field Address, until a Storage Mark character is sensed indicating the end of a field. The Memory Field Zones are removed leaving all numeric fields in both Memory and Storage, and check bits are provided where necessary.

The purpose of this instruction is to expand numeric data compressed by the Load Zones as Digits instruction. For example using standard instructions, compressed data in the auxiliary type of storage (such as Magnetic Tape) mentioned above may be placed into Memory for unpacking. The Unload Digits as Zones instruction removes the Zone portions of the data from Memory and forms the numeric portion of one character in Storage for each pair of characters in Memory. The expanded data now in Memory and Storage may then be replaced in the same or another auxiliary type of storage.

The figures herein correspond in general to the figures in copending application Serial Number 784,496, Overlap Mode Control, filed January 2, 1959, by Oliver D. Evans and Frank B. Hartman, issued March 27, 1962, as U.S. Patent Number 3,027,081. Said Evans et al. patent contains a complete description of a computer system within which the preferred embodiment of the invention may be employed. To avoid unnecessary duplication, portions of the embodiment which are completely shown in said patent are not included herein. Specifically, FIGURES 2*a* through 2*iii*, 10 through 20*e*, 22*a* through 22*d*, 24 through 31*f*, 33*a* through 48, 50*a* through 92, 94 through 120*b*, 125*a* through 135*b*, and 137 through 145 appear only in said patent. Corresponding description appears only in said patent between column 15, line 19, and column 74 thereof. Of the drawings herein, FIGURES 146 through 156 pertain to the invention itself, and the remaining figures illustrate how the invention is incorporated into the computer system embodiment of the invention.

In the figures:

FIGURE 1 is an overall block diagram illustrating generally the major components comprising the data processing system and their interconnections.

FIG. 3*a* illustrates the Mem. 4×10 Decoder 1000 Order.

FIG. 3*b* illustrates the Mem. 4×10 Decoder.

FIG. 3*c* illustrates the Mem. 4×10 Decoder 100 Order.

FIG. 3*d* illustrates the Mem. 6×8 Decoder.

FIG. 3*e* illustrates the Mem. 4×5 Decoder.

FIG. 4 illustrates the Mem. "Y" Switch Core Read Drivers.

FIG. 5*a* illustrates the 4×10 Decoder Output Inverters.

FIG. 5*b* illustrates the Mem. Switch Core Write Drivers.

FIG. 5*c* illustrates the Mem. Switch Core Write Drivers.

FIG. 5*d* illustrates the Memory Write Gate & Memory Inhibit Gate.

FIG. 5*e* illustrates the Memory Read Gates & P.W.D. Control.

FIG. 5*f* illustrates the Memory Read Bias Gate & Mem./P.C.T. Sample Control.

FIG. 5*g* illustrates the Memory Gate Powering & M.B.R. Reset.

FIG. 5*h* illustrates the Memory Clamps & Sense Amp. Bias Voltage.

FIG. 5*i* illustrates the Storage Sample Pulse Generator.

FIG. 6 illustrates the Mem. X Switch Core Read Drivers.

FIG. 7*a* illustrates the 6×8 Decoder Output Inverters.

FIG. 7*b* illustrates the Mem. X Switch Core Write Drivers.

FIG. 7*c* illustrates the Mem. X Switch Core Write Drivers.

FIG. 7*d* illustrates the Stor. Read Bias GT, Read GT, Inhibit GT, Write GT, & Buff Reg. Reset.

FIG. 7*e* illustrates the Storage R/W Mode Ctrl.

FIG. 9 illustrates the "X" Switch Core Matrix.

Figure 21A:
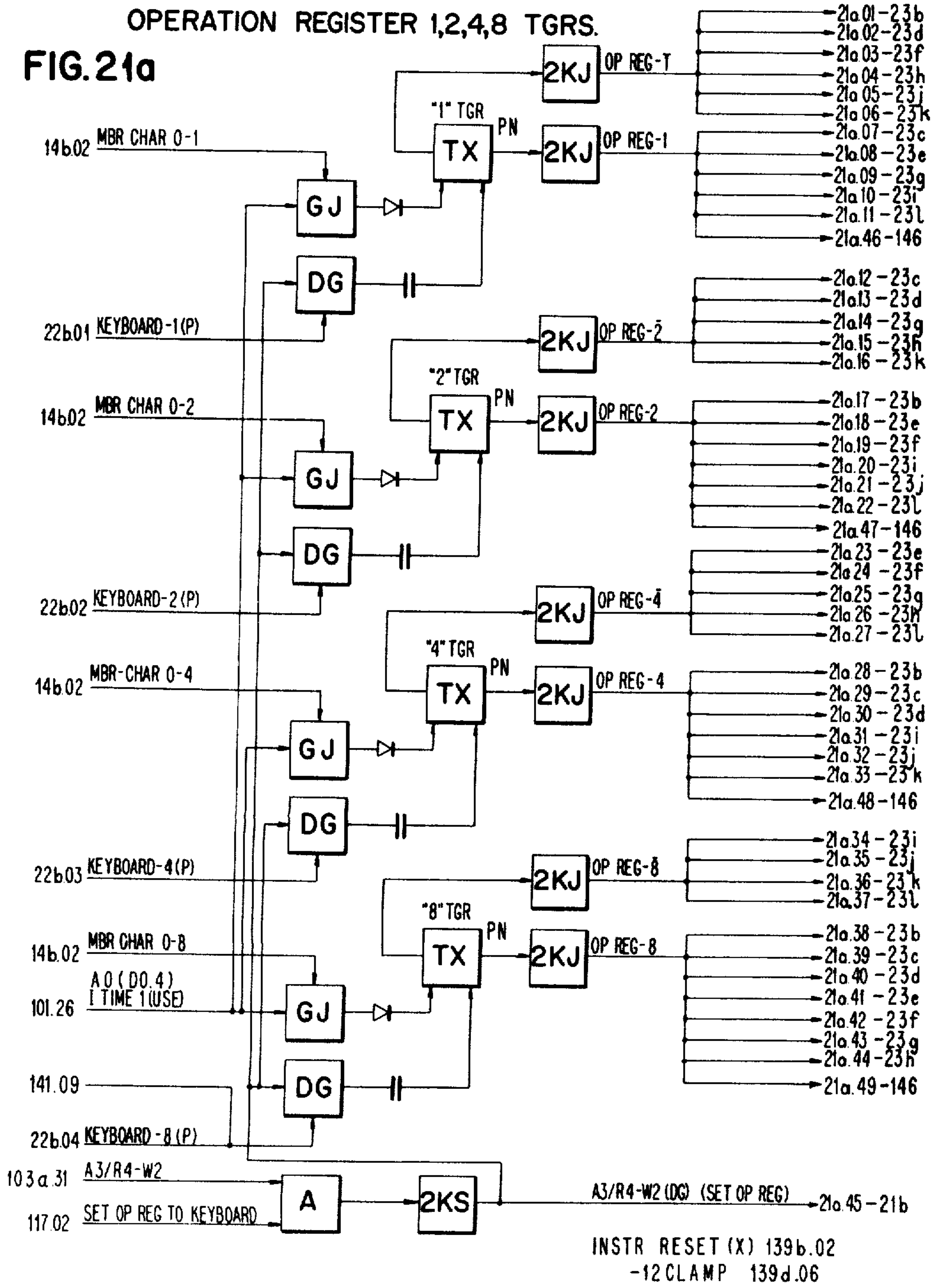

FIG. 21*a* illustrates the Operation Registers 1, 2, 4, 8 Tgrs.

Figure 21B:
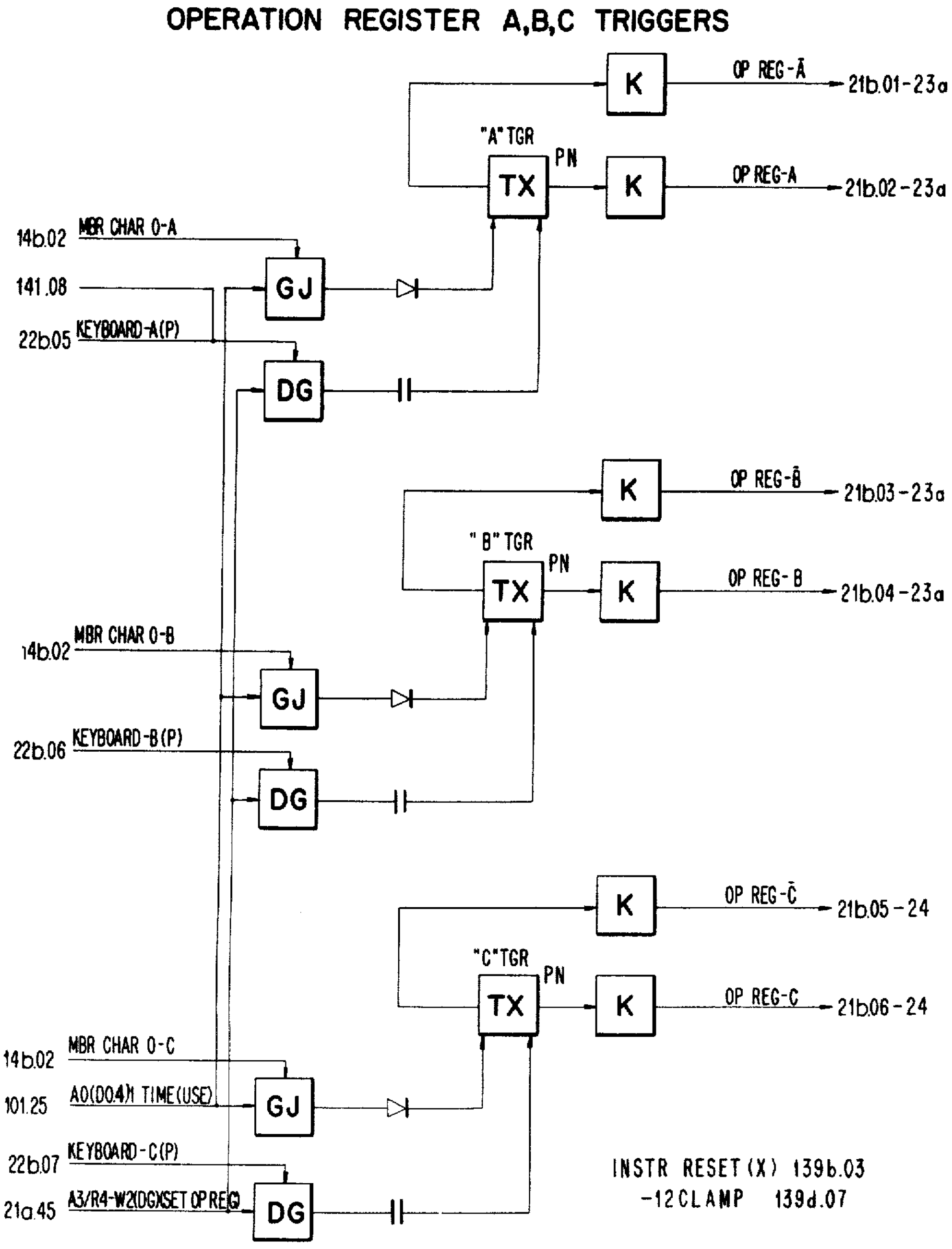

FIG. 21*b* illustrates the Operation Registers A, B, C Triggers.

Figure 23A:
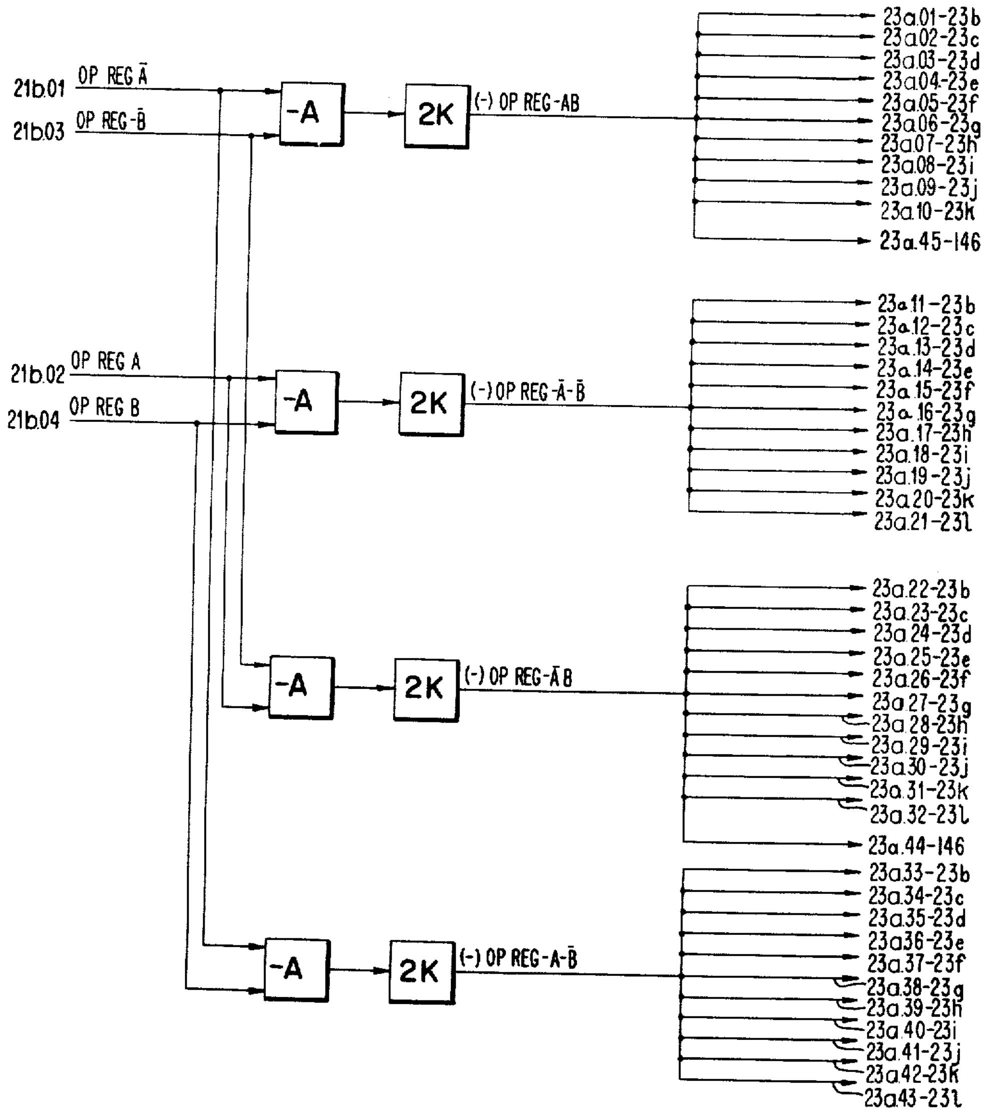

FIG. 23*a* illustrates the Operation Zone Decoder.

Figure 23B:
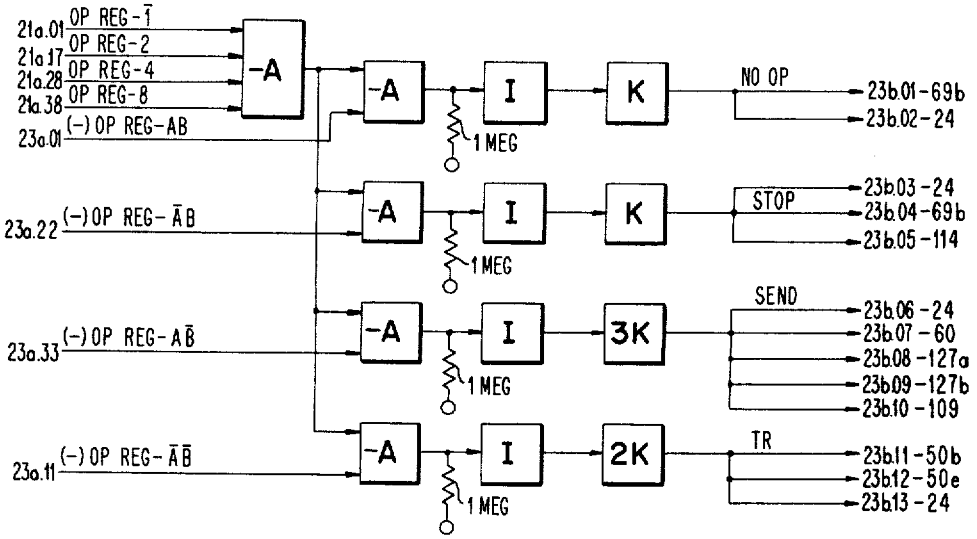

FIG. 23*b* illustrates the Operation Decoder No. Op., Stop, Tr., Send.

Figure 23C:
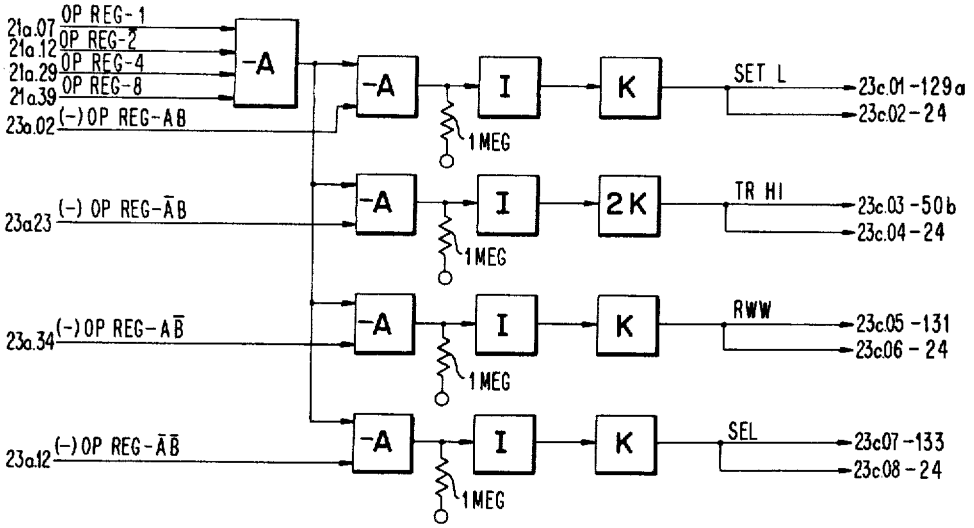

FIG. 23*c* illustrates the Operation Decoder Set L, TR, Hi, RWW, Sel.

Figure 23D:
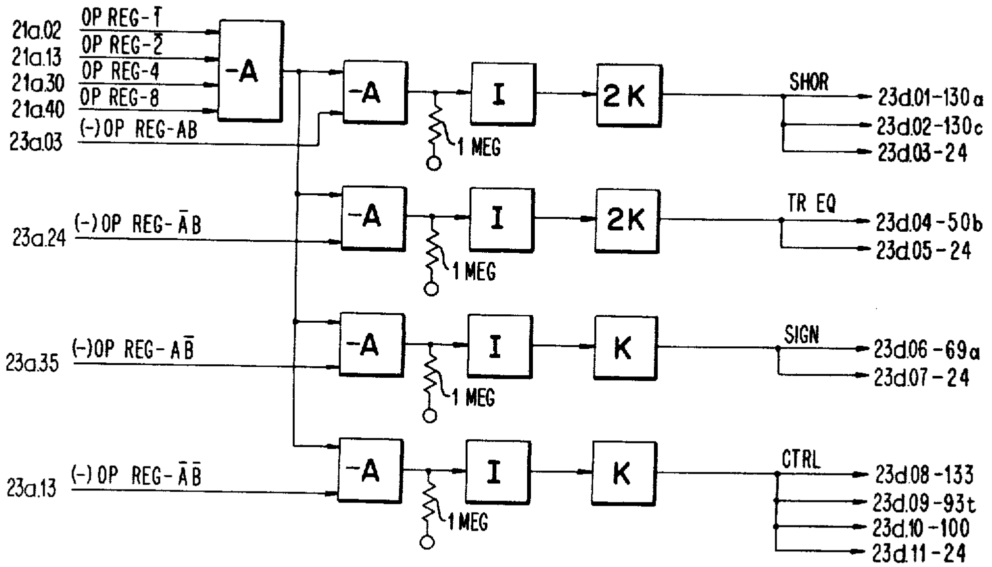

FIG. 23*d* illustrates the Operation Decoder Shor., Tr., Eq., Sign Ctrl.

FIG. 23*e* illustrates the Operation Decoder Leng., Tr., PLS, RCV, Comp.

Figure 23L:
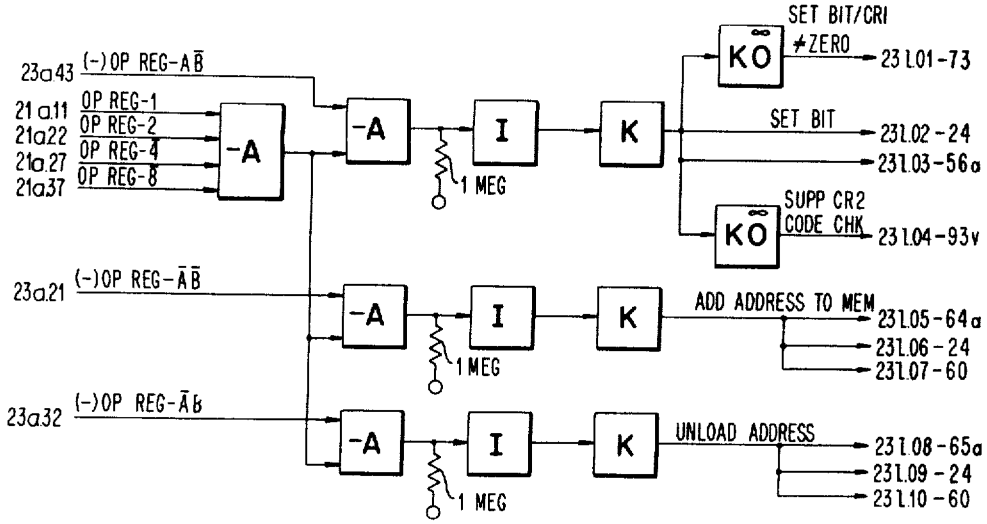
Figure 23F:
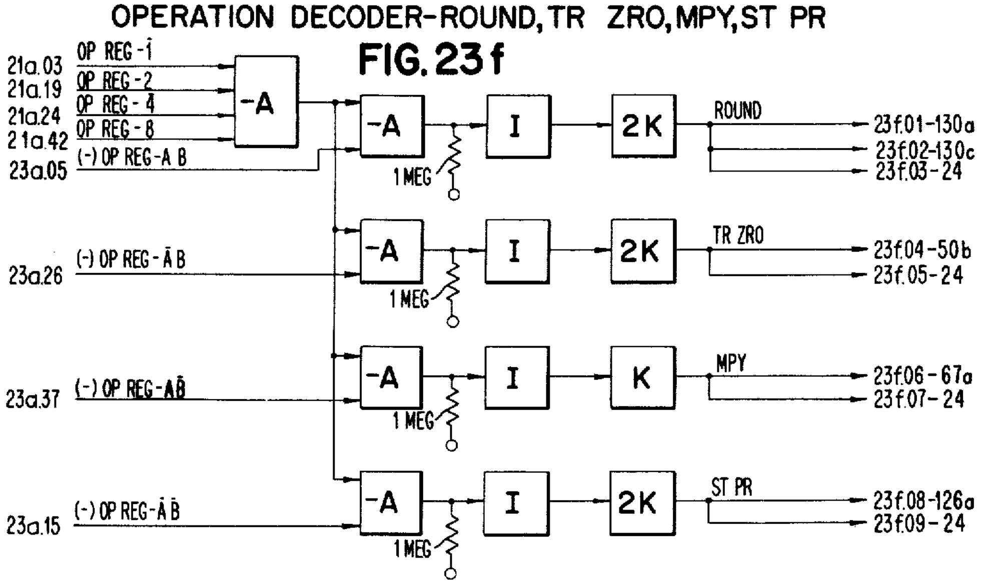

FIG. 23*f* illustrates the Operation Decoder—Round, Tr., ZRO, MPY, ST, PR.

Figure 23G:
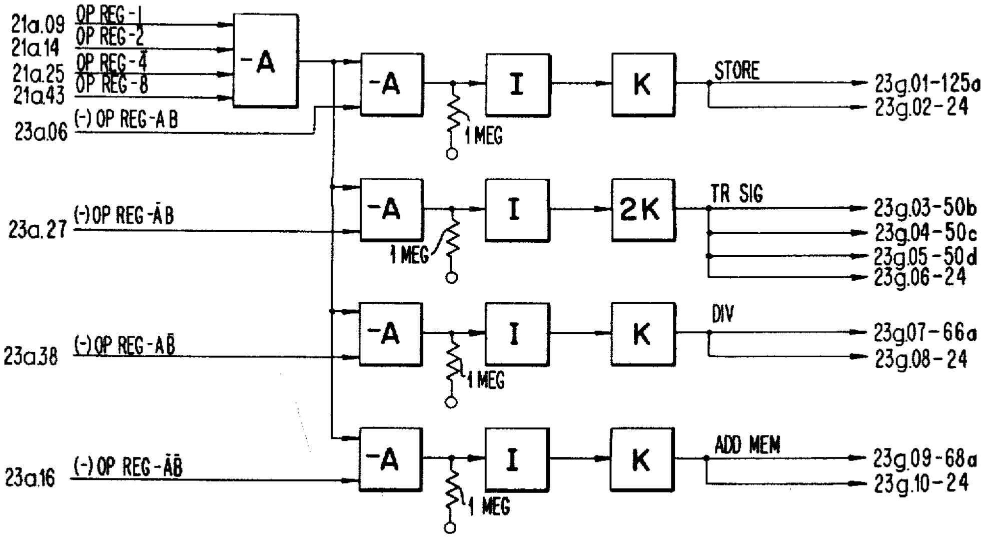

FIG. 23*g* illustrates the Operation Decoder Store, Tr., Sig., Div., Add Mem.

Figure 23H:
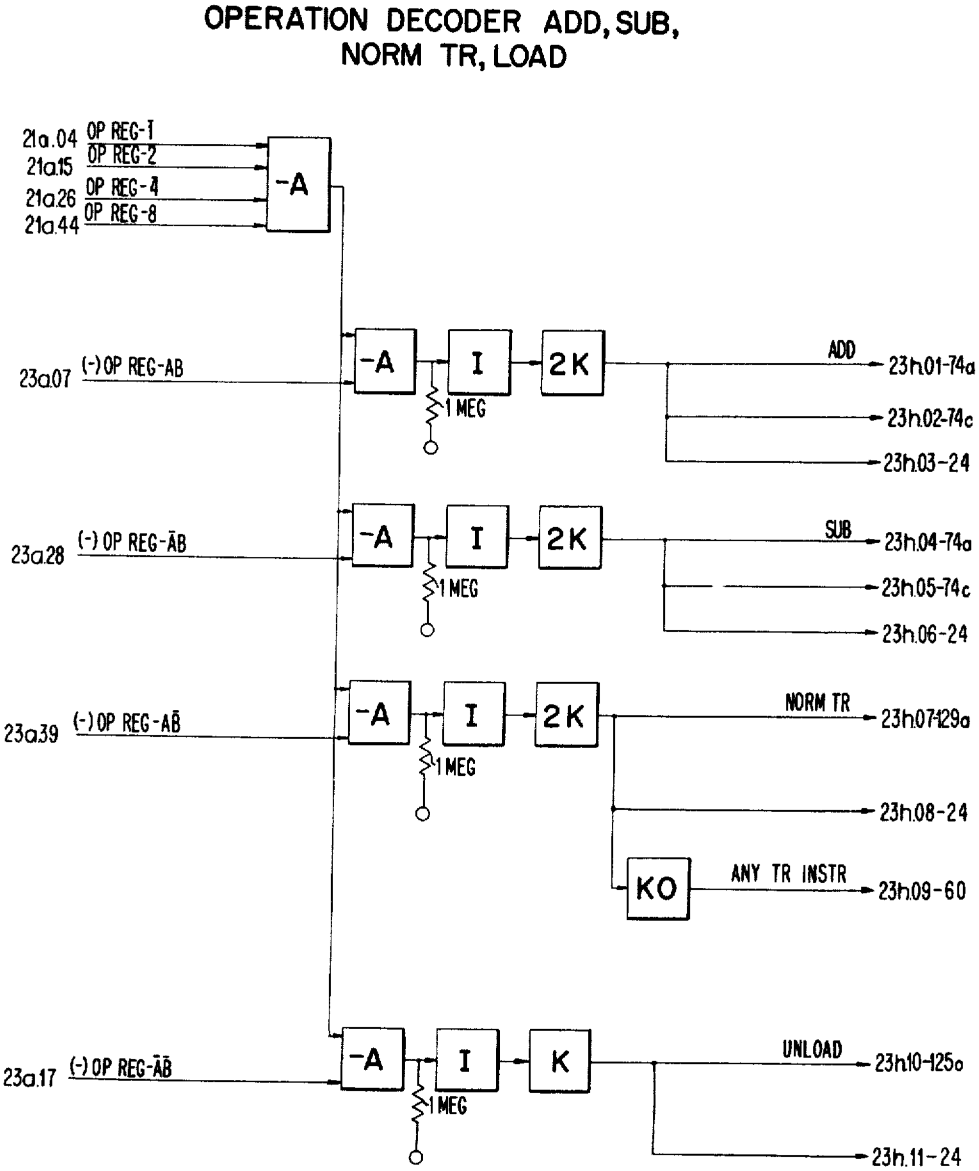

FIG. 23*h* illustrates the Operation Decoder, Add., Sub., Norm. Tr., Load.

Figure 23I:
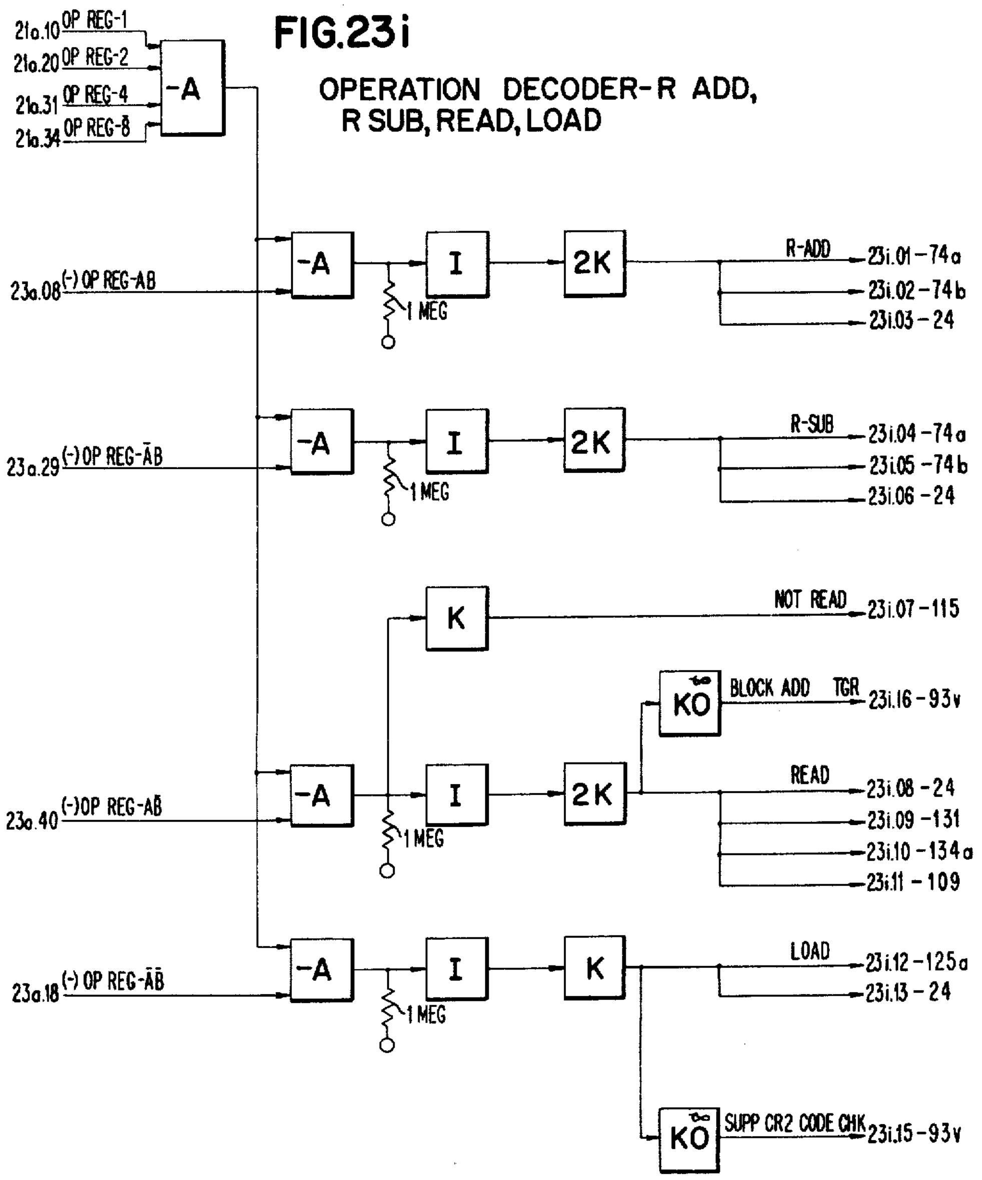

FIG. 23*i* illustrates the Operation Decoder—R, Add, R Sub., Read, Load.

Figure 23J:
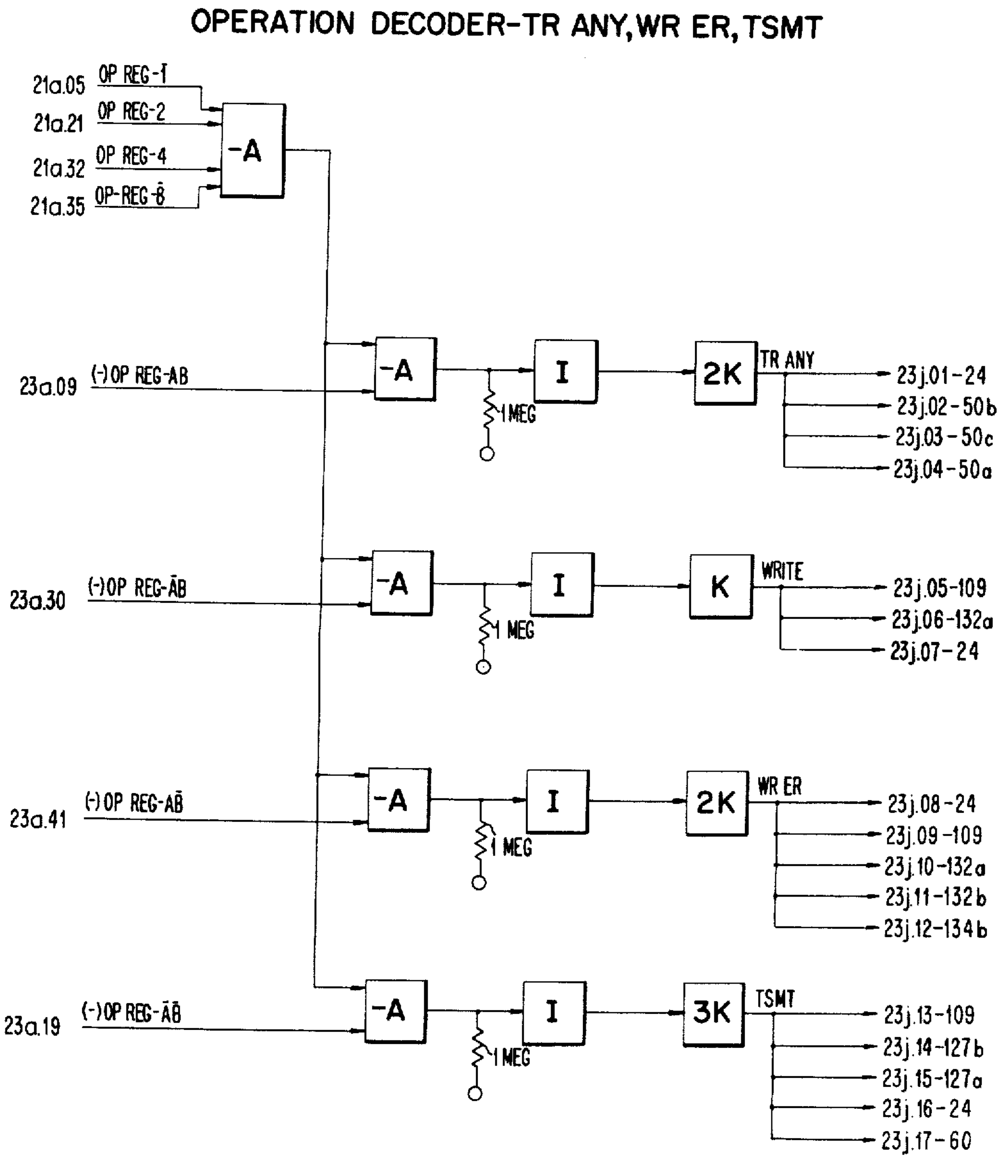
Figure 31E:
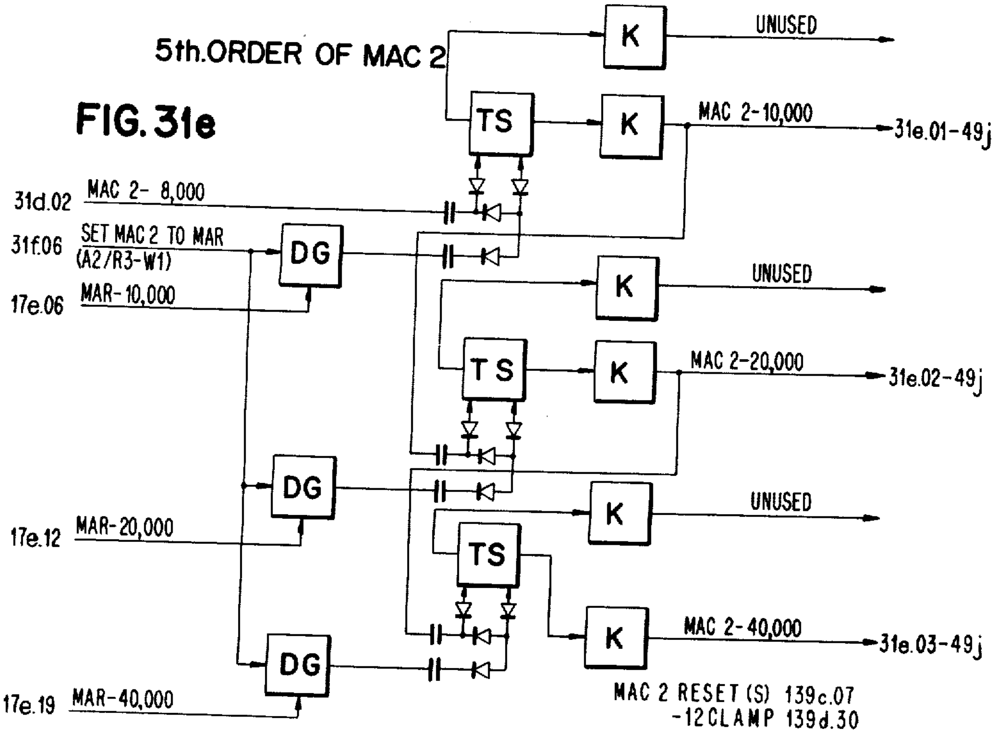

FIG. 23*j* illustrates the Operation Decoder—Tr, Any, Wr. Er., Tsmt.

FIG. 23*k* illustrates the Operation Decoder LDA, BLM, TZB.

FIG. 23*l* illustrates the Operation Decoder ULA, AAM, SB.

FIG. 32*a* illustrates the Instruction Counter Controls & 4, 9 of IC.

Figure 32B:
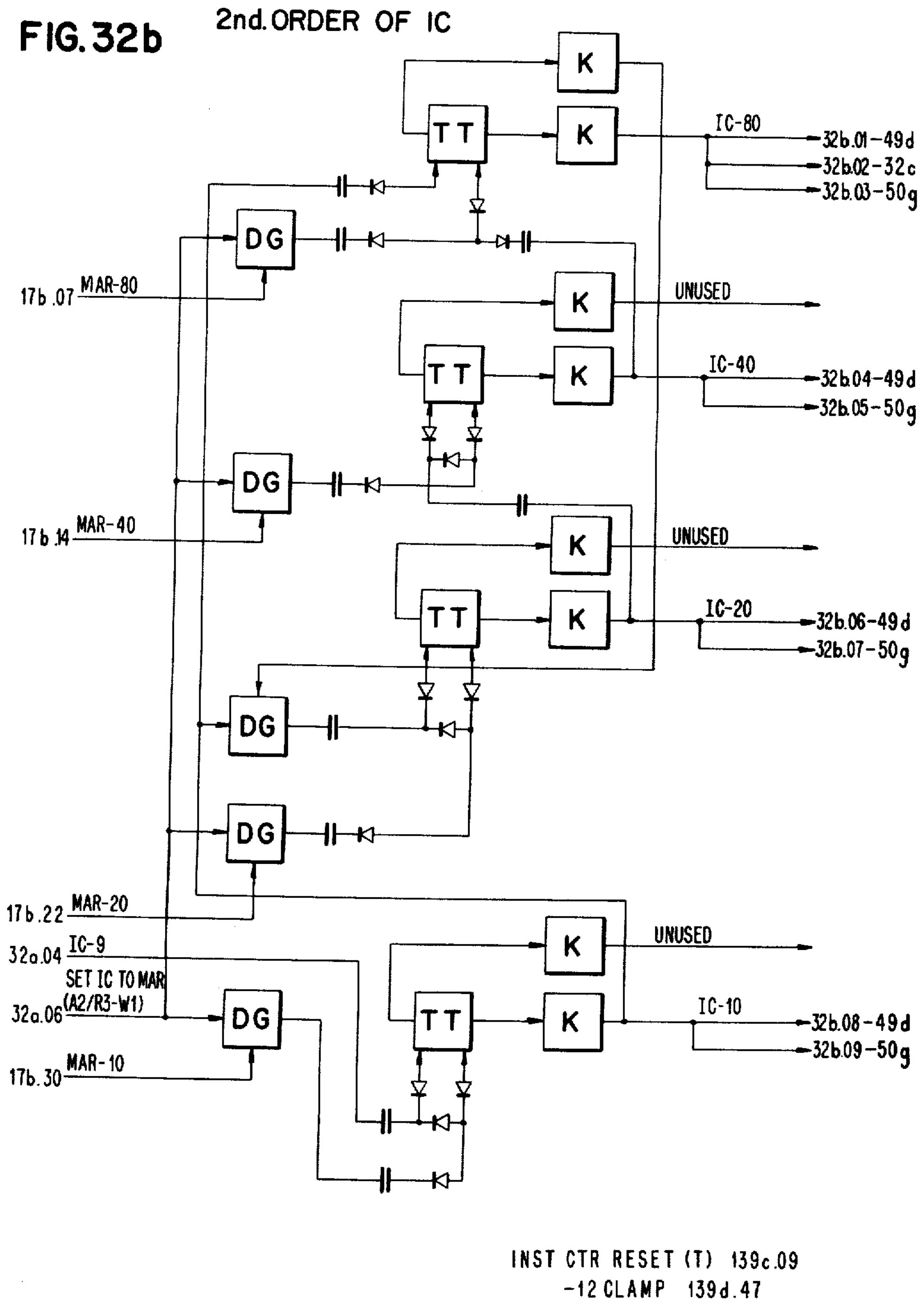

FIG. 32*b* illustrates the 2nd Order of IC.

Figure 32C:
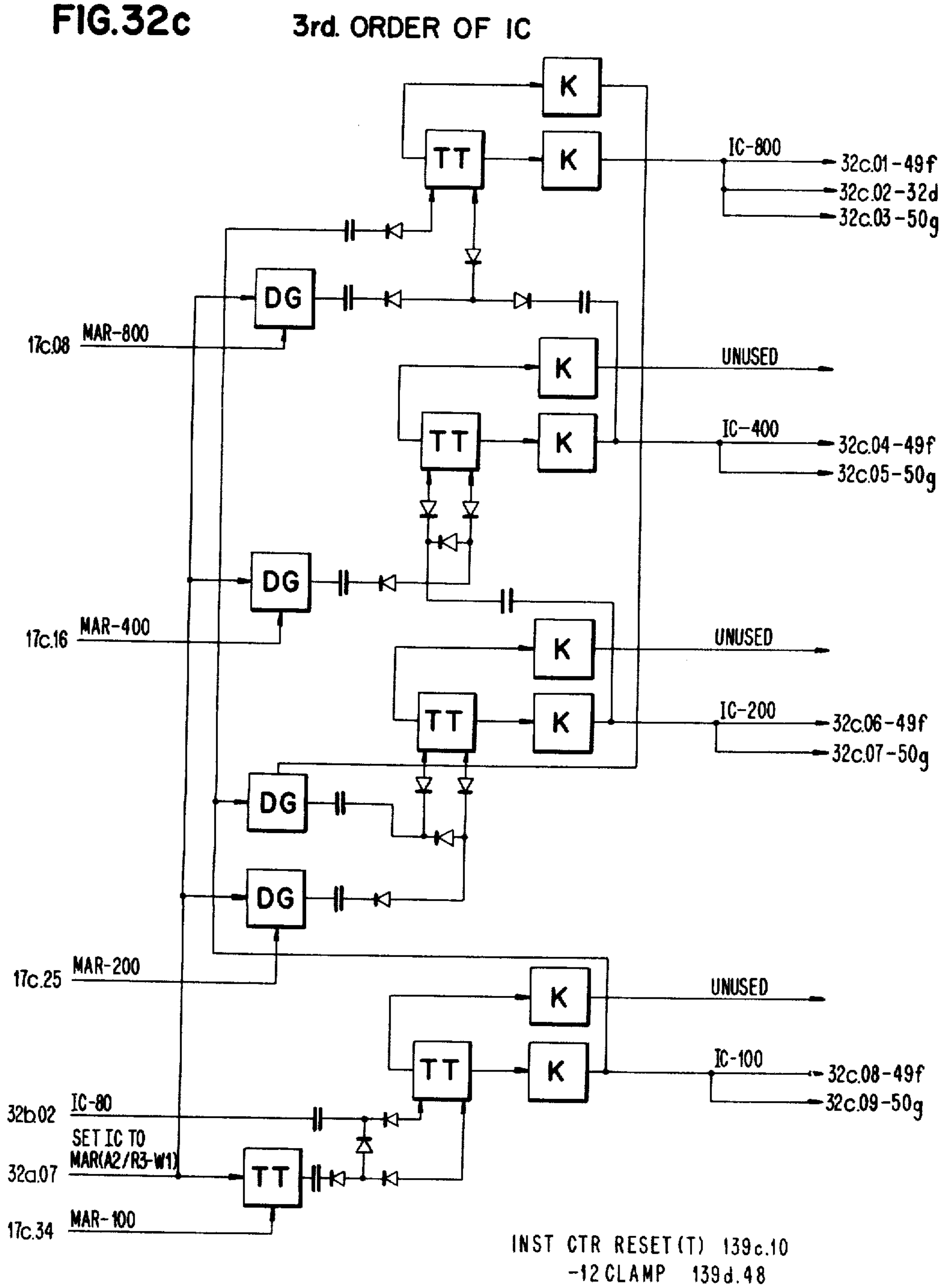

FIG. 32*c* illustrates the 3rd Order of IC.

Figure 32D:
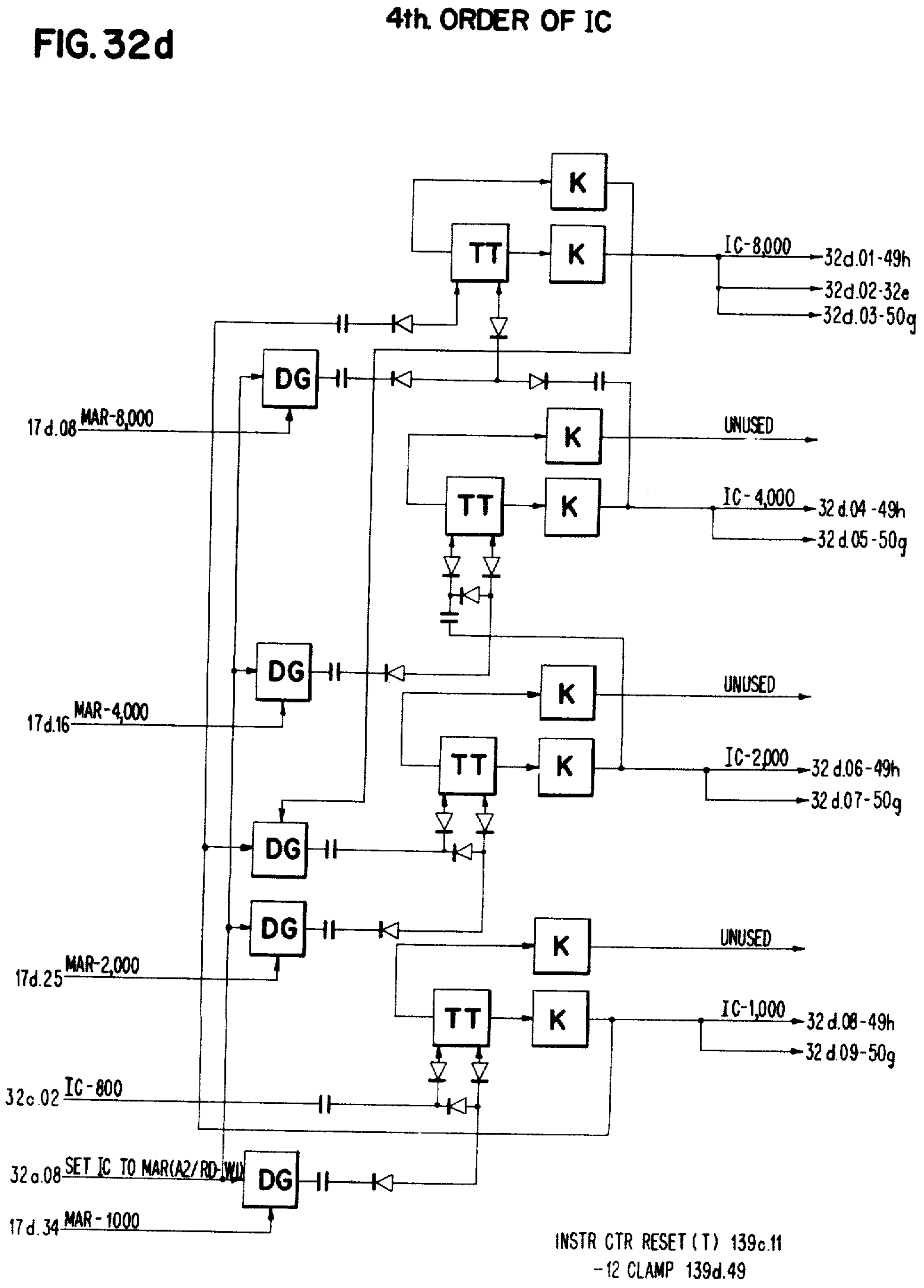

FIG. 32*d* illustrates the 4th Order of IC.

Figure 32E:
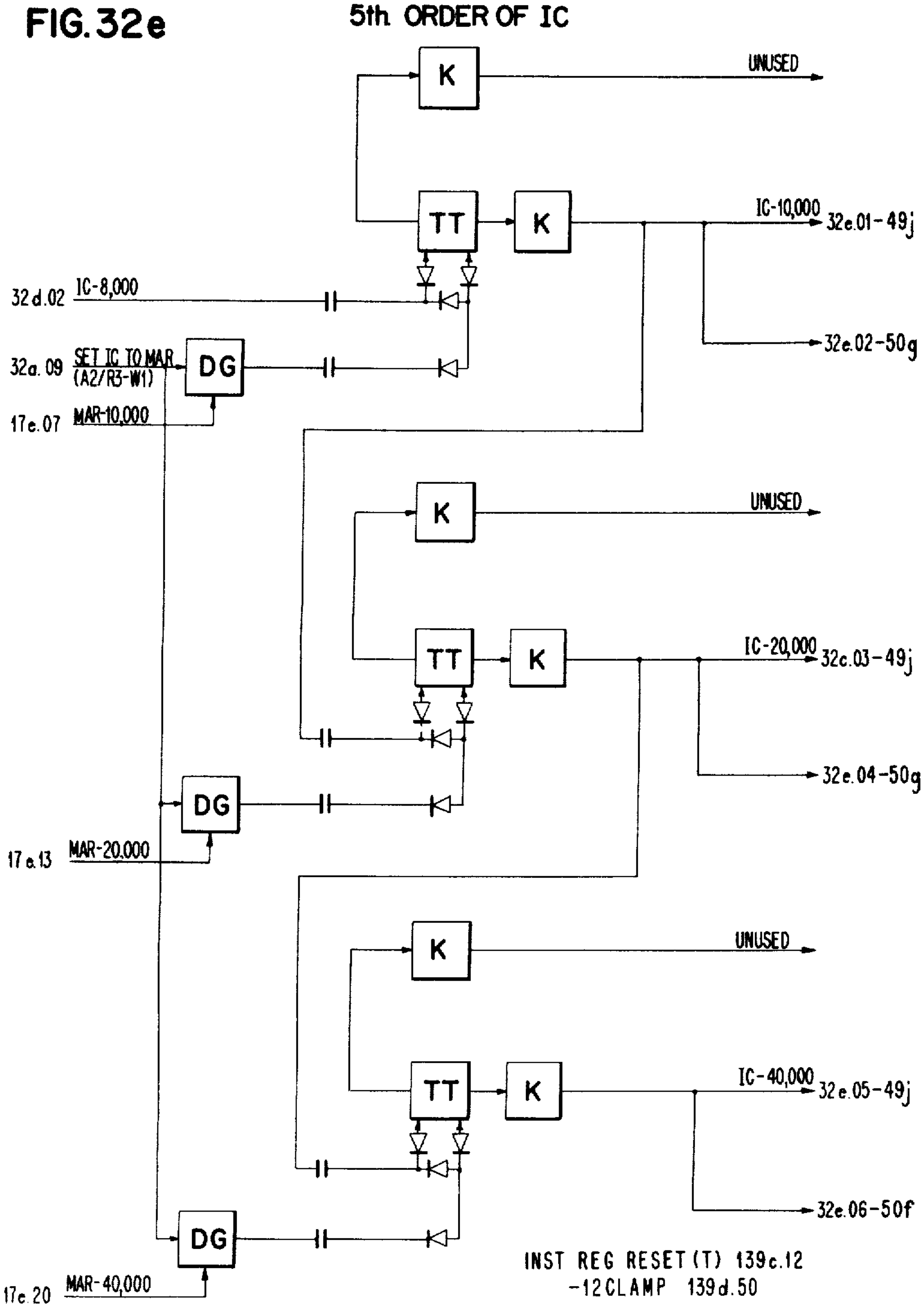

FIG. 32*e* illustrates the 5th Order of IC.

Figure 49A:
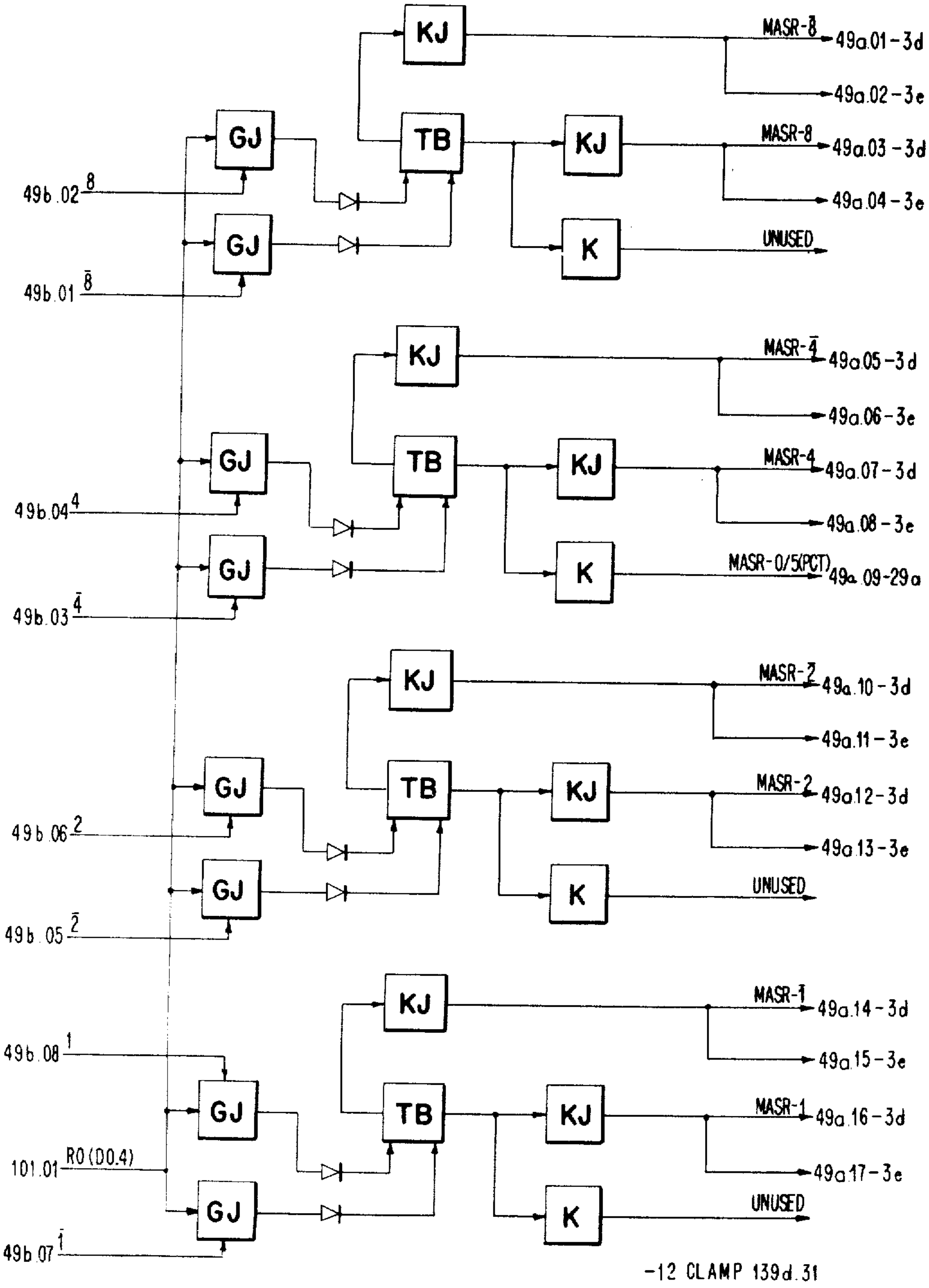

FIG. 49*a* illustrates the 1st Order of MASR.

Figure 49B:
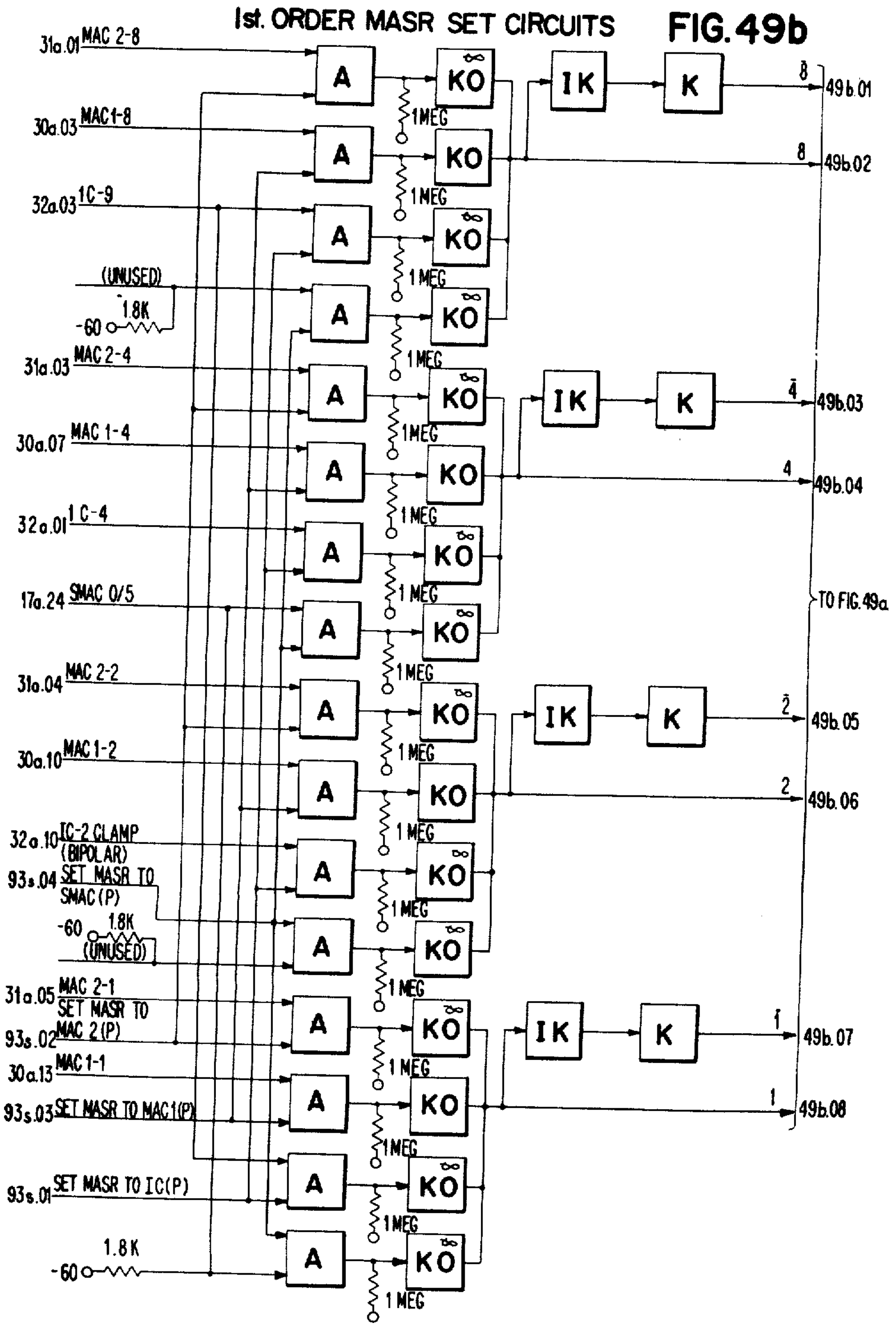

FIG. 49*b* illustrates the 1st Order of MASR Set Circuits.

Figure 49C:
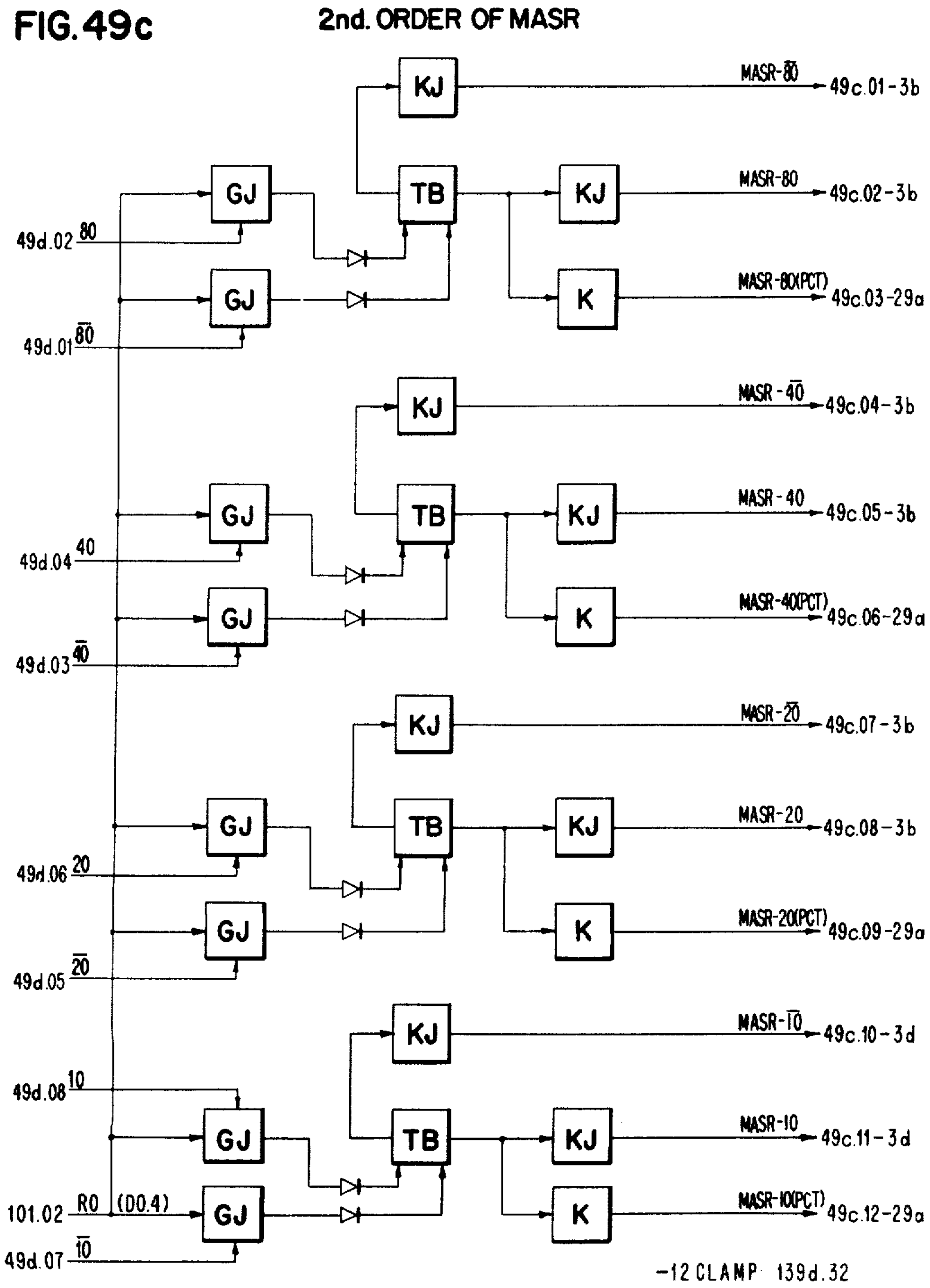

FIG. 49*c* illustrates the 2nd Order of MASR.

Figure 49D:
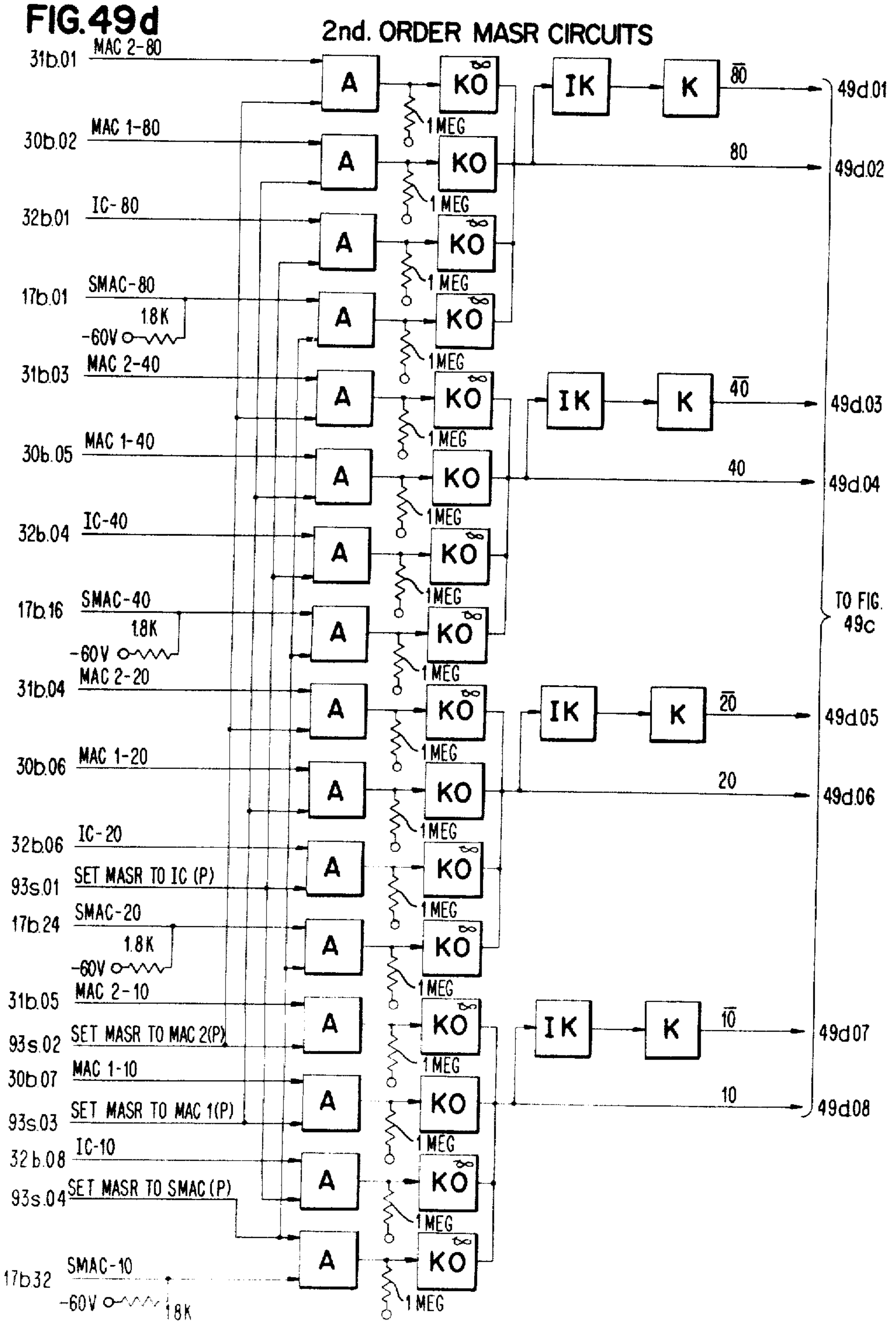

FIG. 49*d* illustrates the 2nd Order of MASR circuits.

Figure 49E:
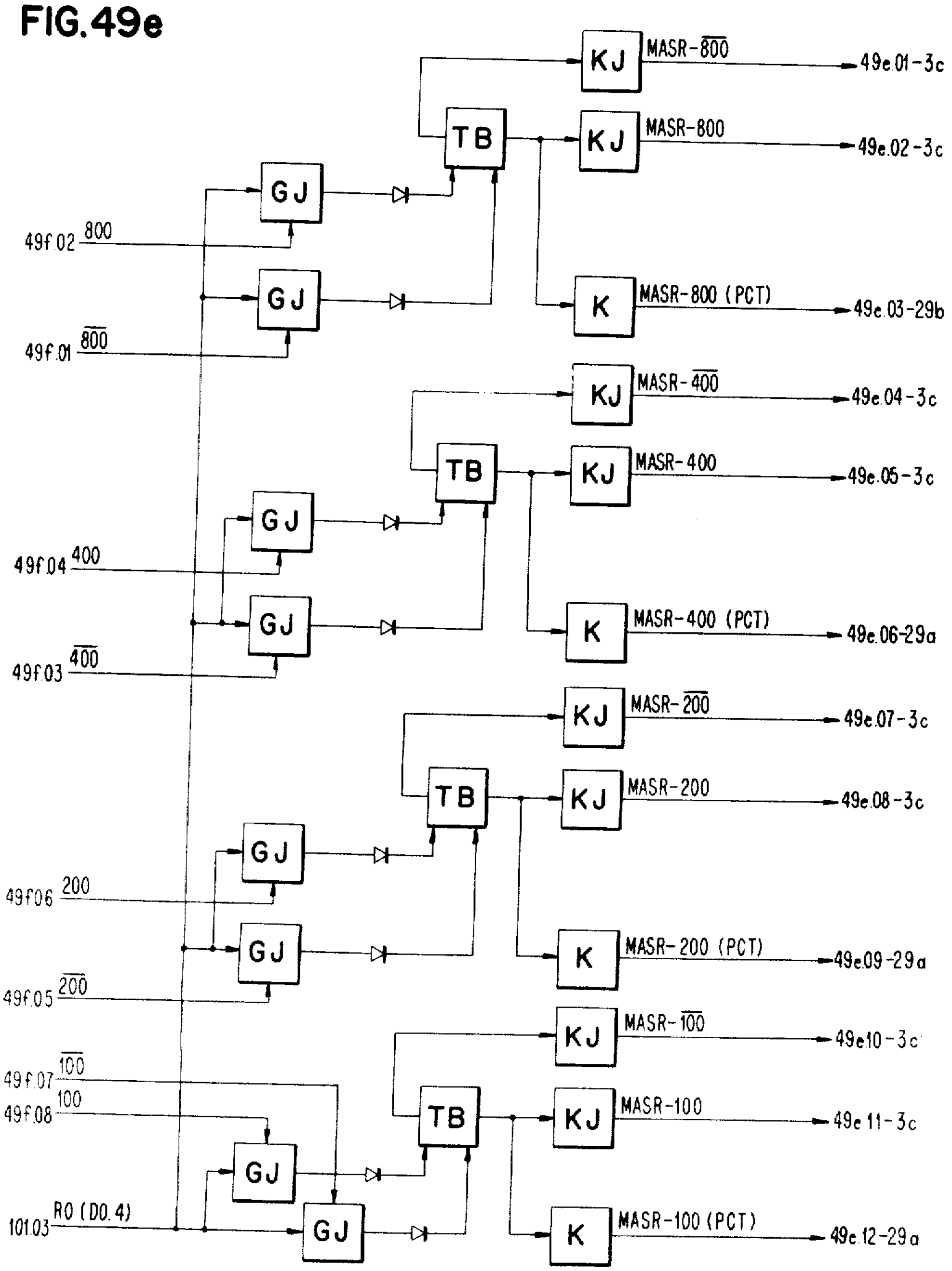

FIG. 49*e* illustrates the 3rd Order of MASR.

Figure 49F:
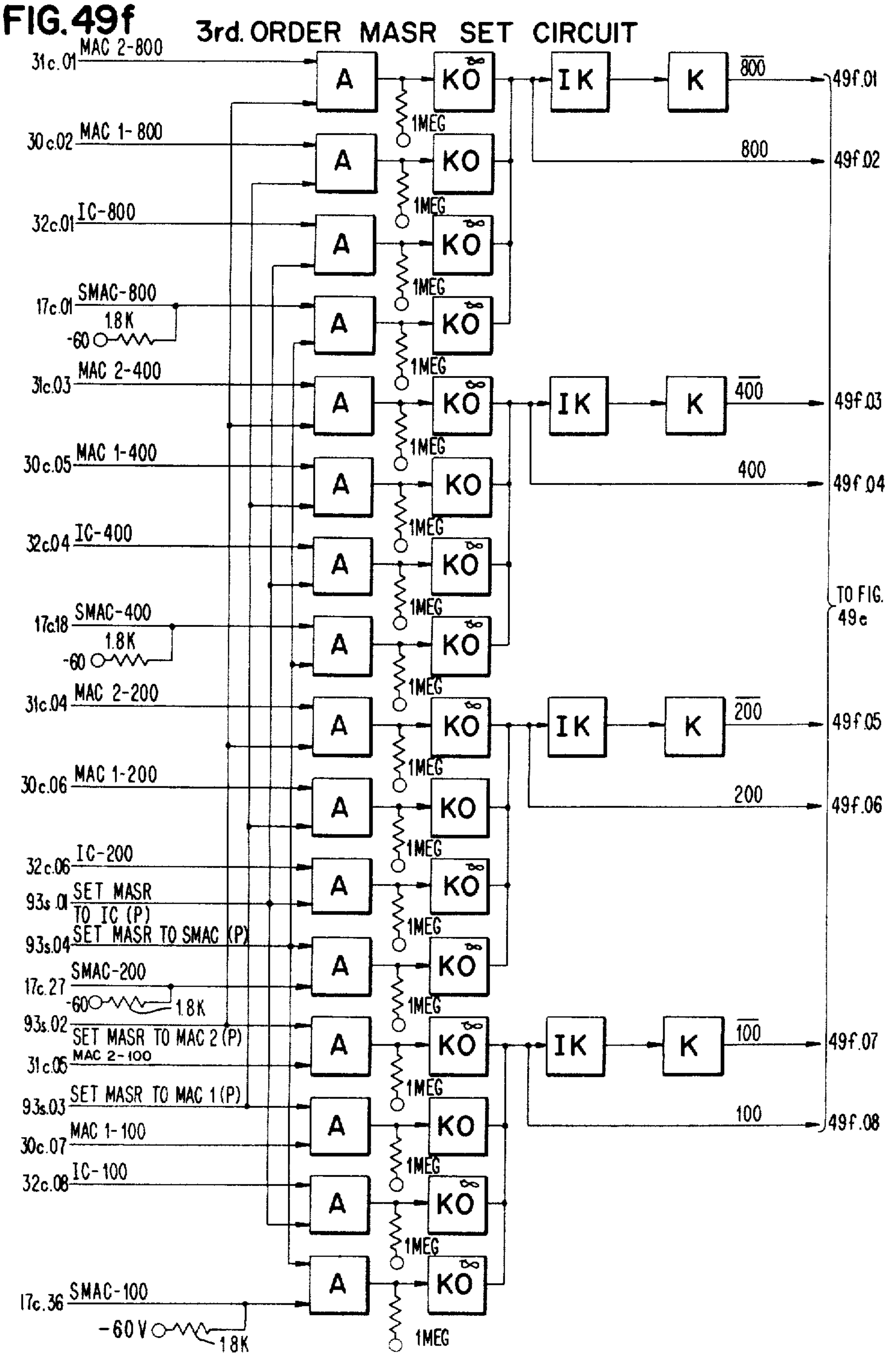

FIG. 49*f* illustrates the 3rd Order of MASR Set Circuits.

Figure 49G:
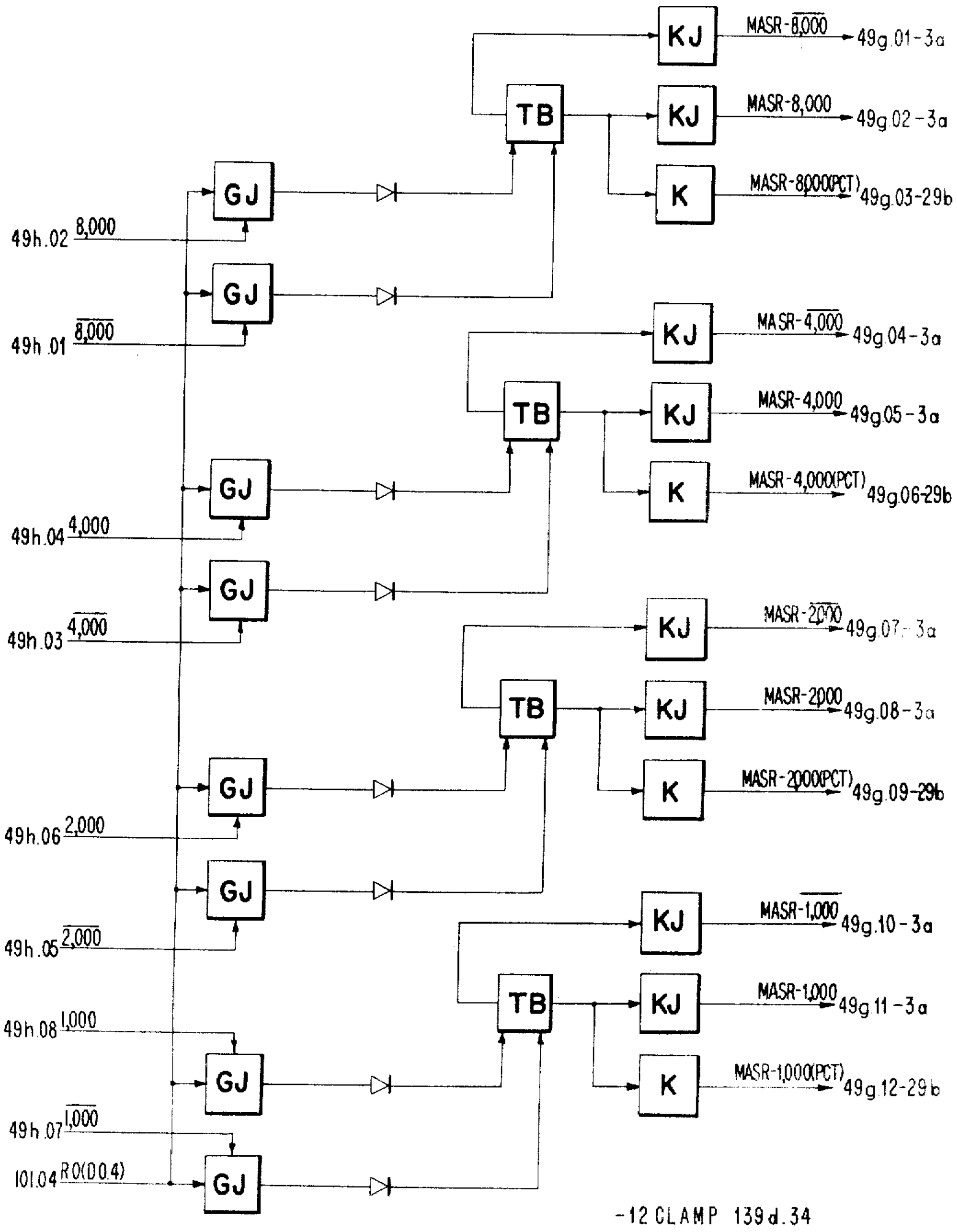

FIG. 49*g* illustrates the 4th Order of MASR.

FIG. 49*h* illustrates the 4th Order MASR Set Circuits.

Figure 49I:
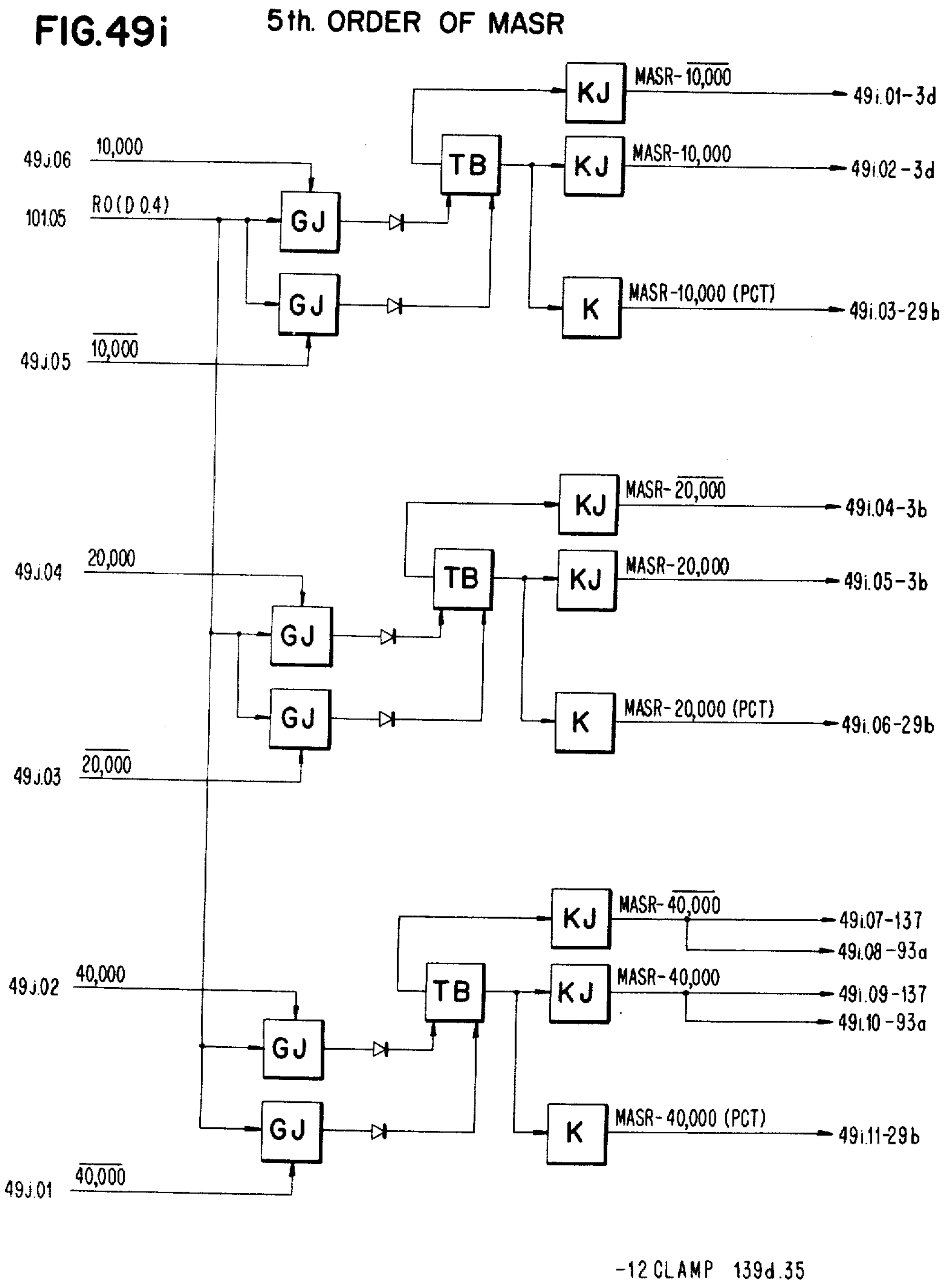

FIG. 49*i* illustrates the 5th Order of MASR.

Figure 49J:
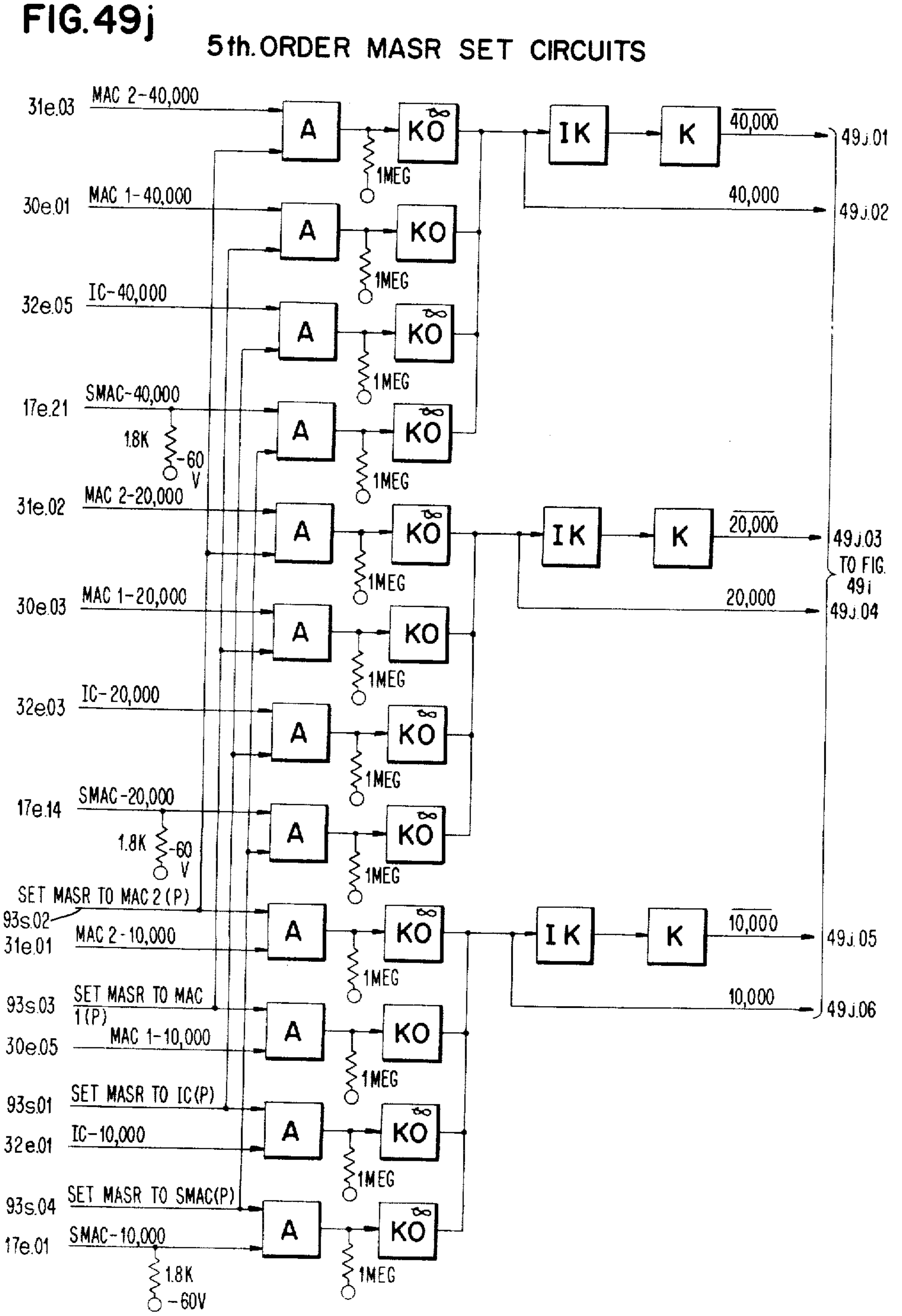

FIG. 49*j* illustrates the 5th Order MASR Set Circuits.

Figure 93A:
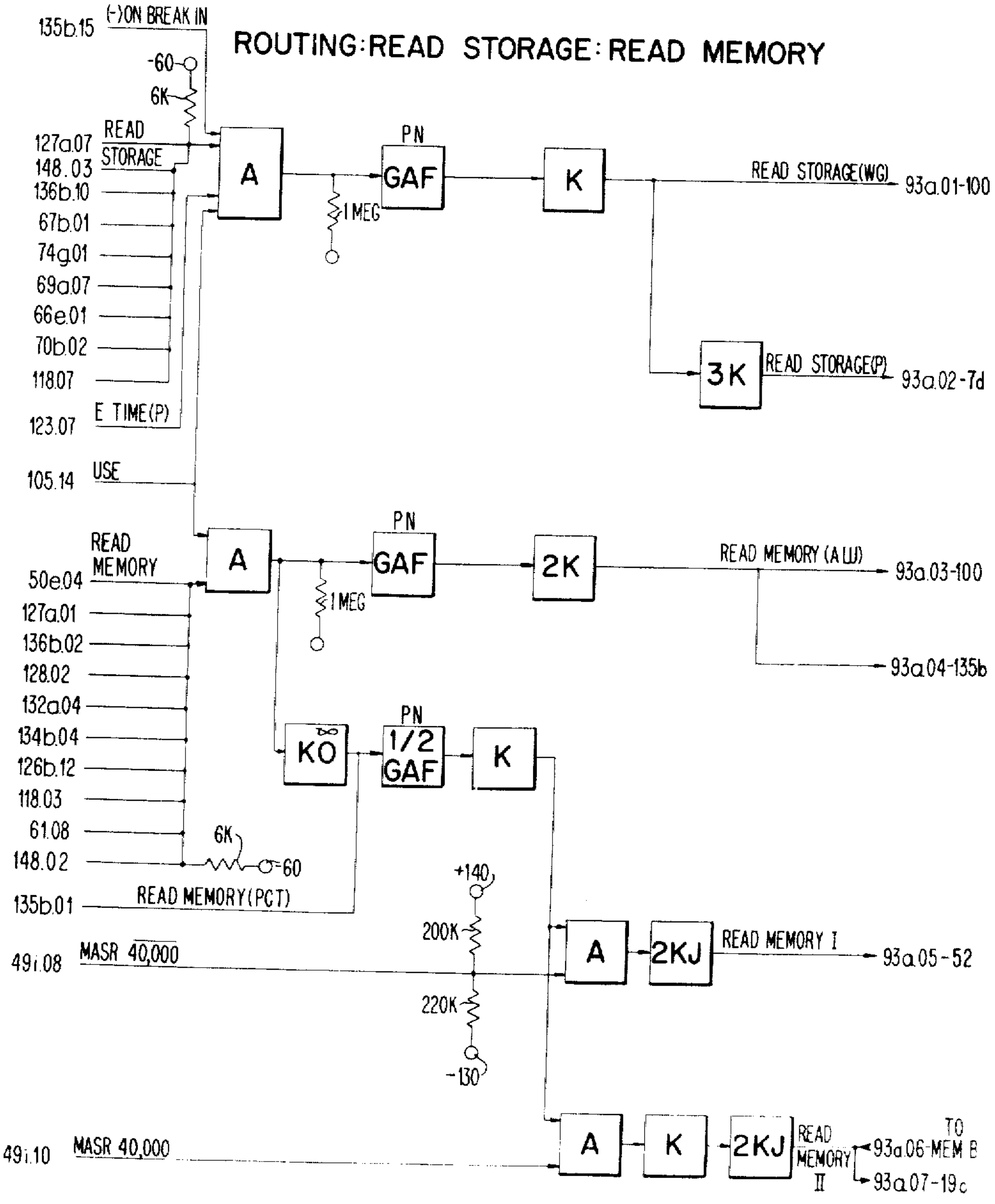

FIG. 93*a* illustrates the Routing:Read, Storage:Read Memory.

Figure 93B:
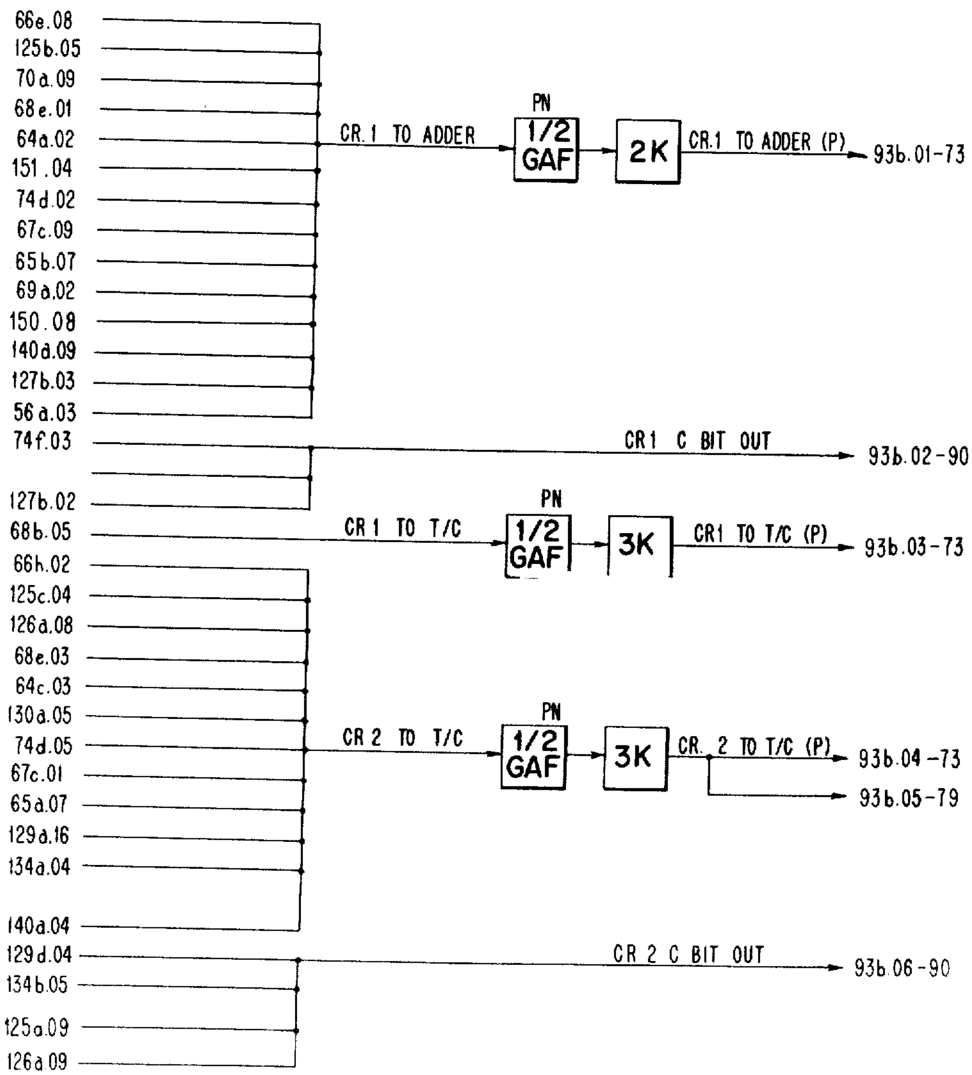

FIG. 93*b* illustrates the Character Registers To Adder Routing.

Figure 93C:
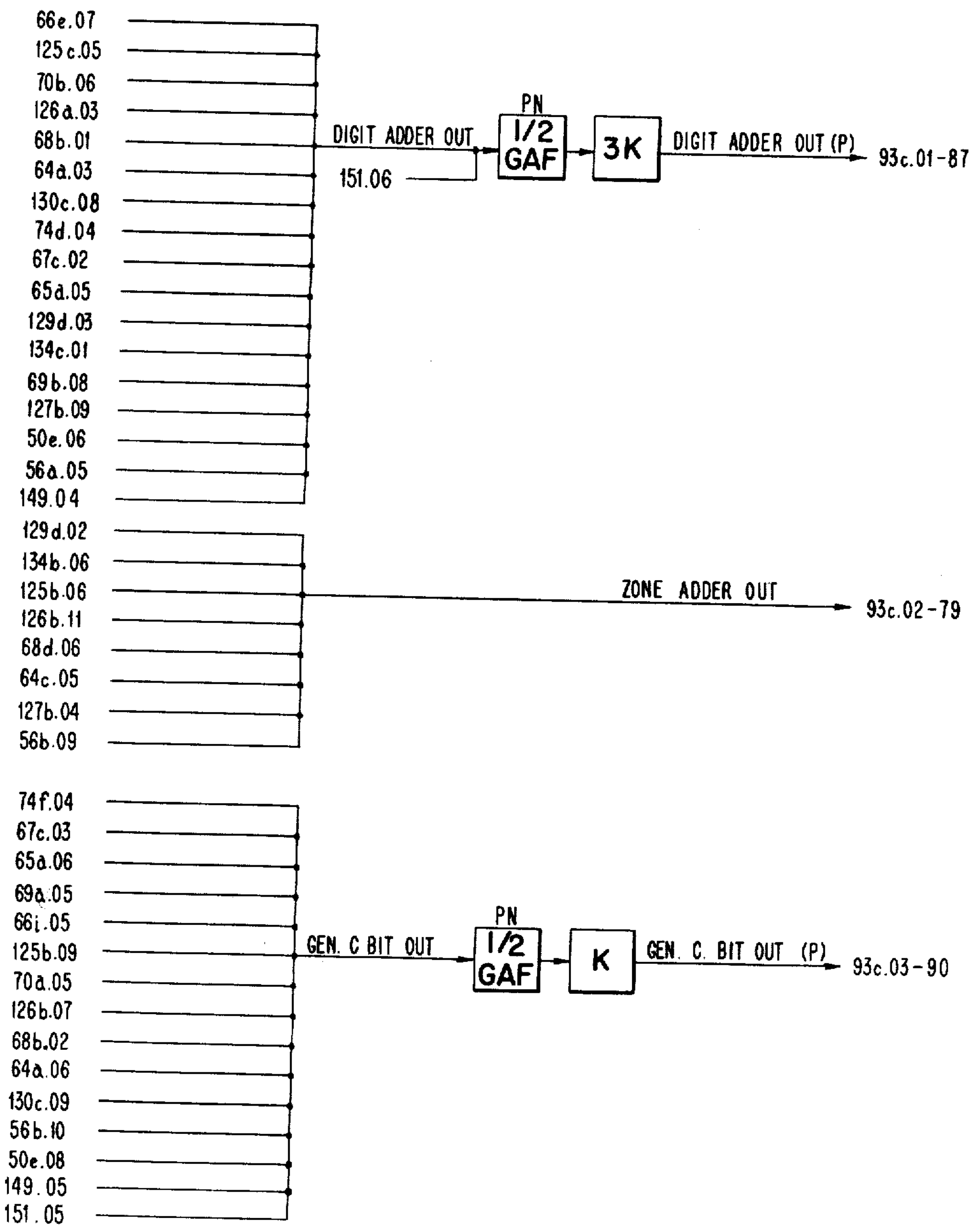

FIG. 93*c* illustrates the Adder Out Routing.

FIG. 93*d* illustrates the Adder Carry Routing.

Figure 93E:
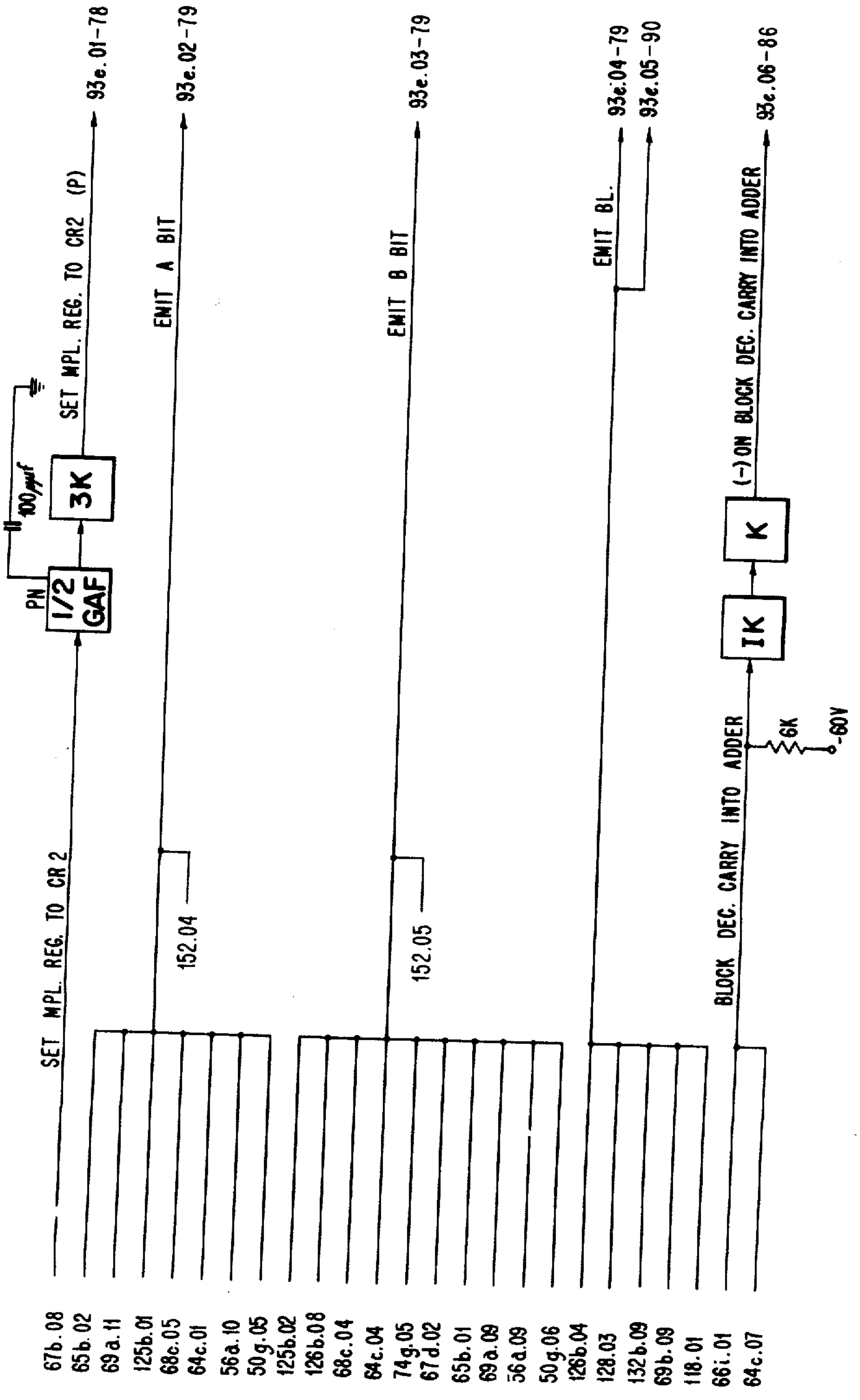

FIG. 93*e* illustrates the Adder Emitter and Mpl. Reg. Routing.

Figure 93F:
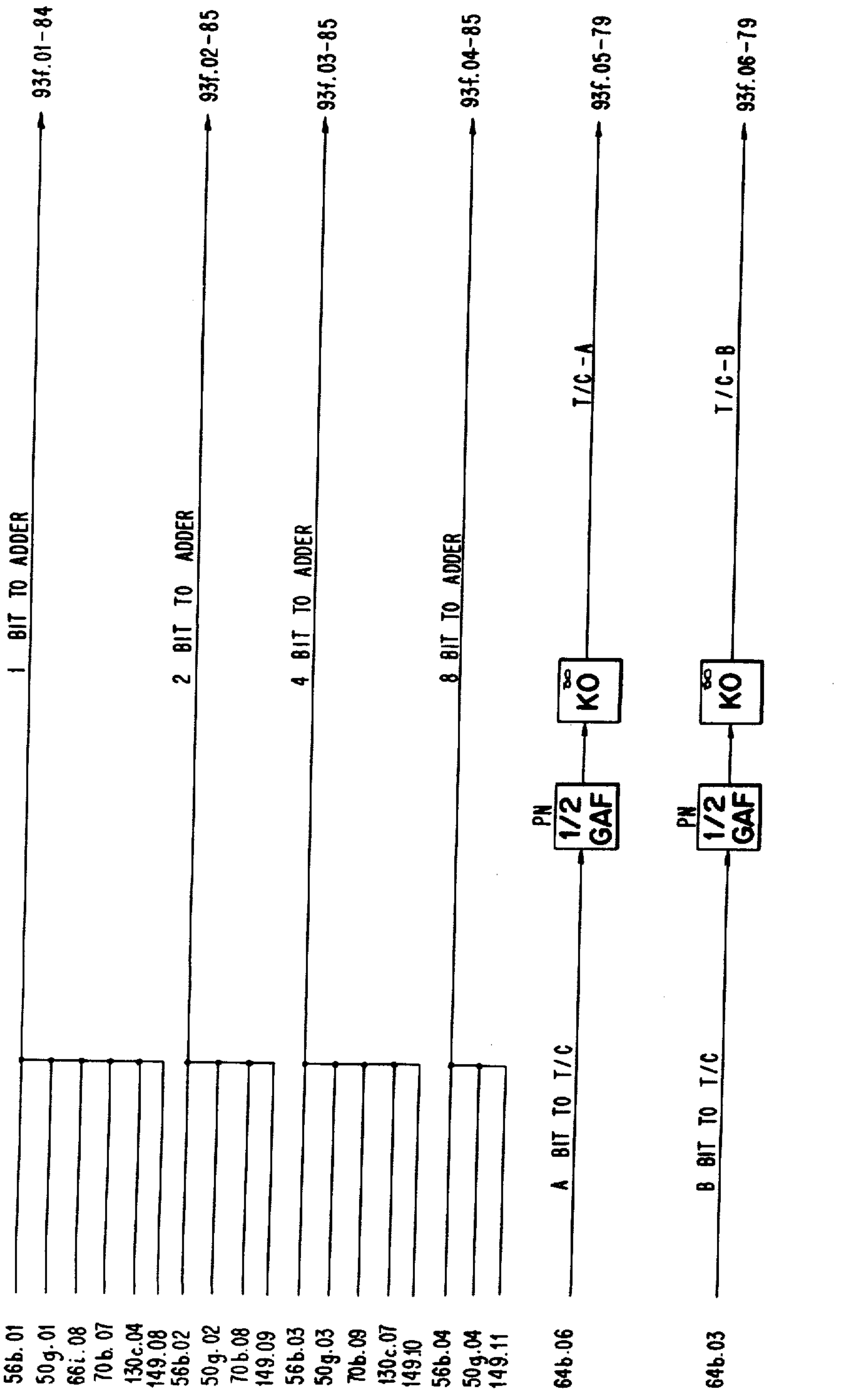

FIG. 93*f* illustrates the Bit To Adder Routing.

Figure 93G:
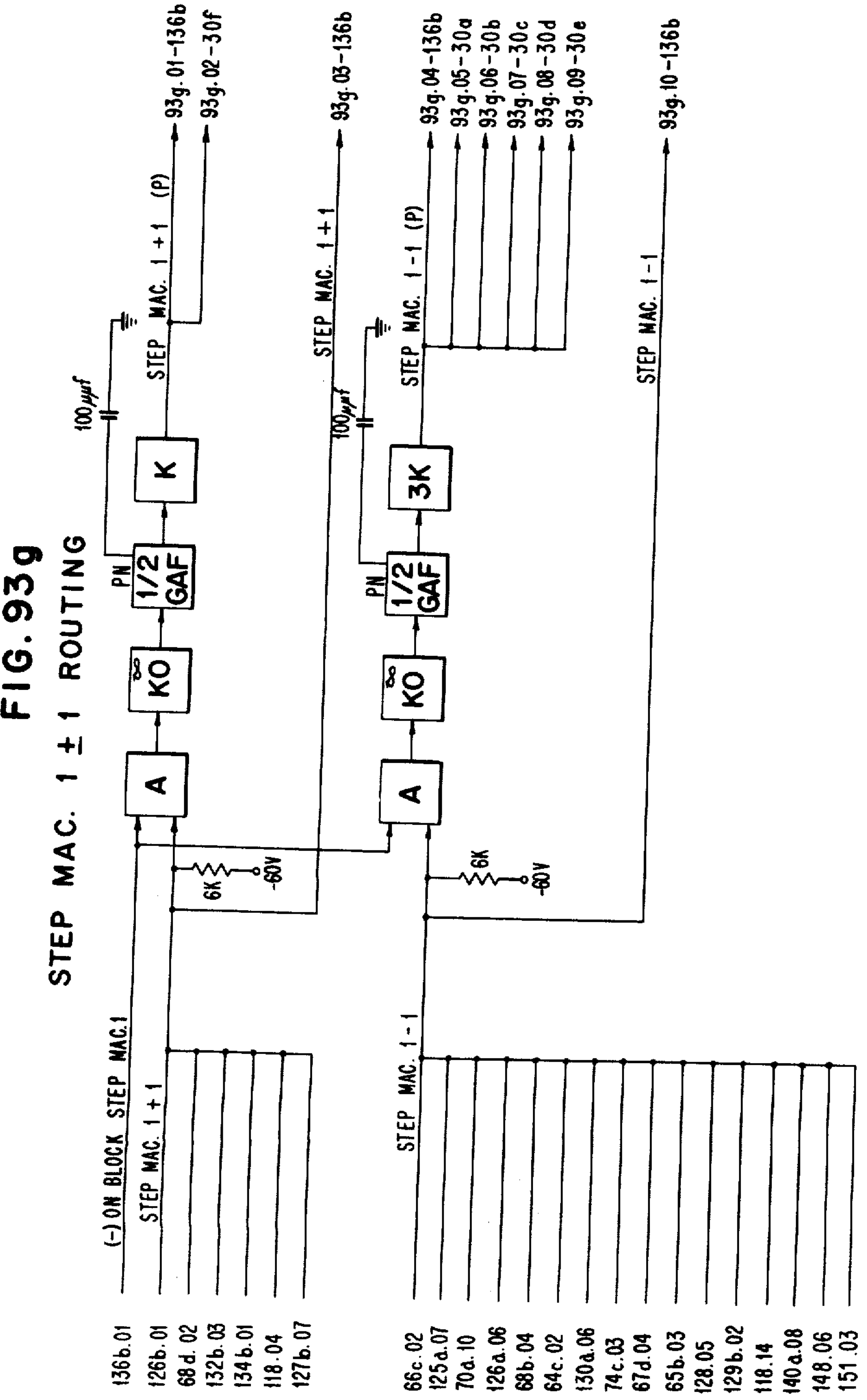

FIG. 93*g* illustrates the Step MAC 1±1 Routing.

Figure 93H:
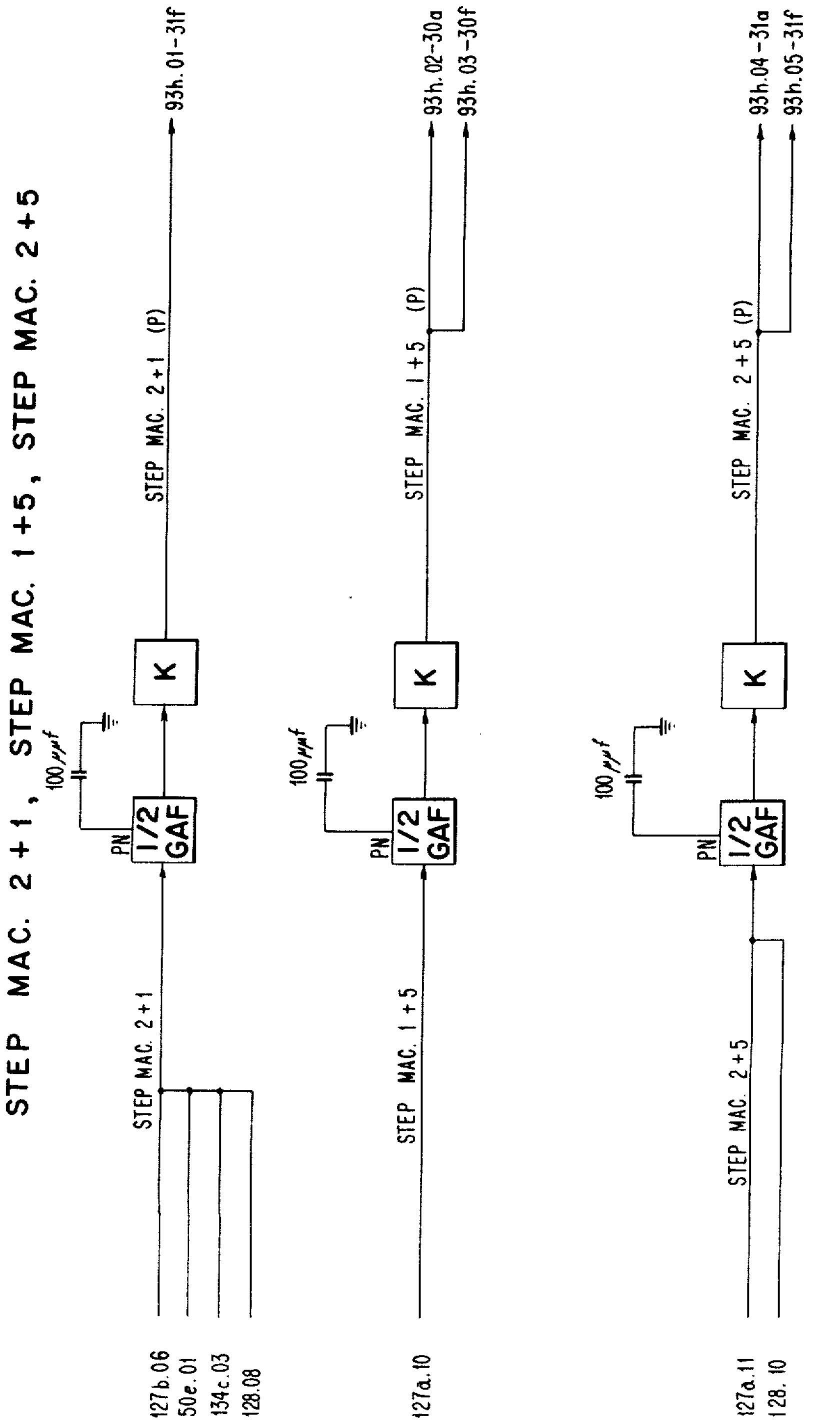

FIG. 93*h* illustrates the Step MAC 2+1, Step MAC 1+5, Step MAC 2+5.

Figure 93I:
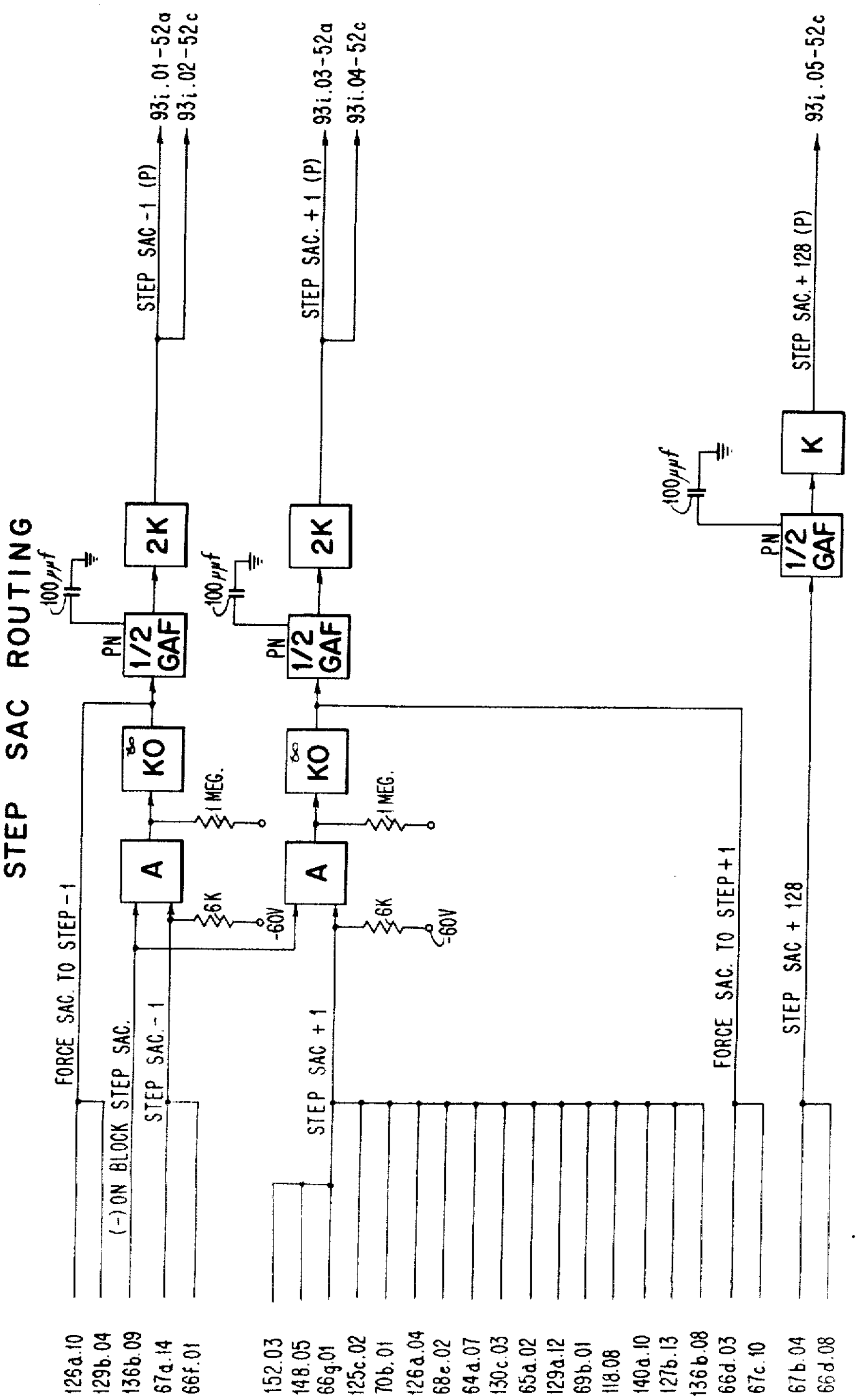

FIG. 93*i* illustrates the Step SAC Routing.

Figure 93J:
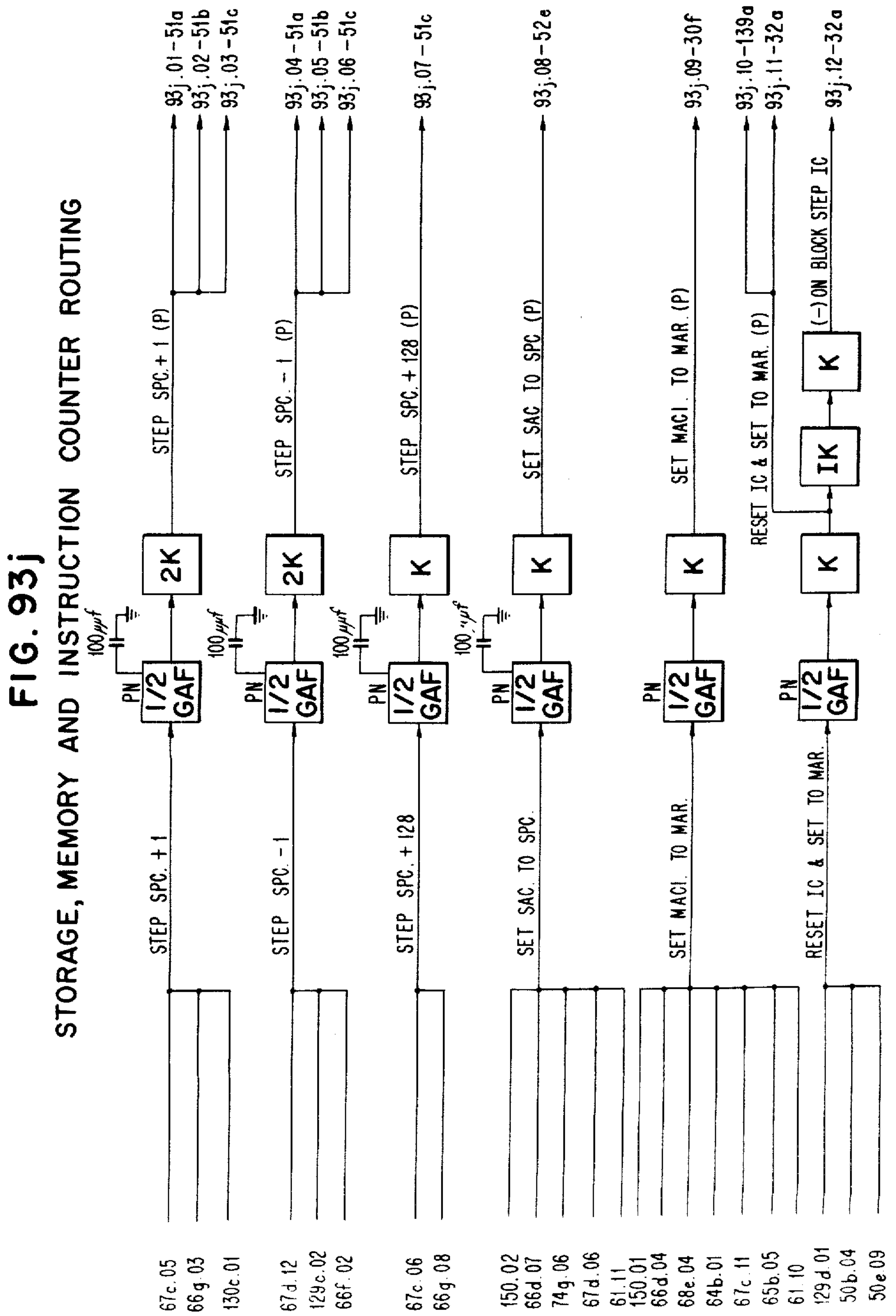

FIG. 93*j* illustrates the Storage, Memory and Instruction Counter Routing.

Figure 93K:
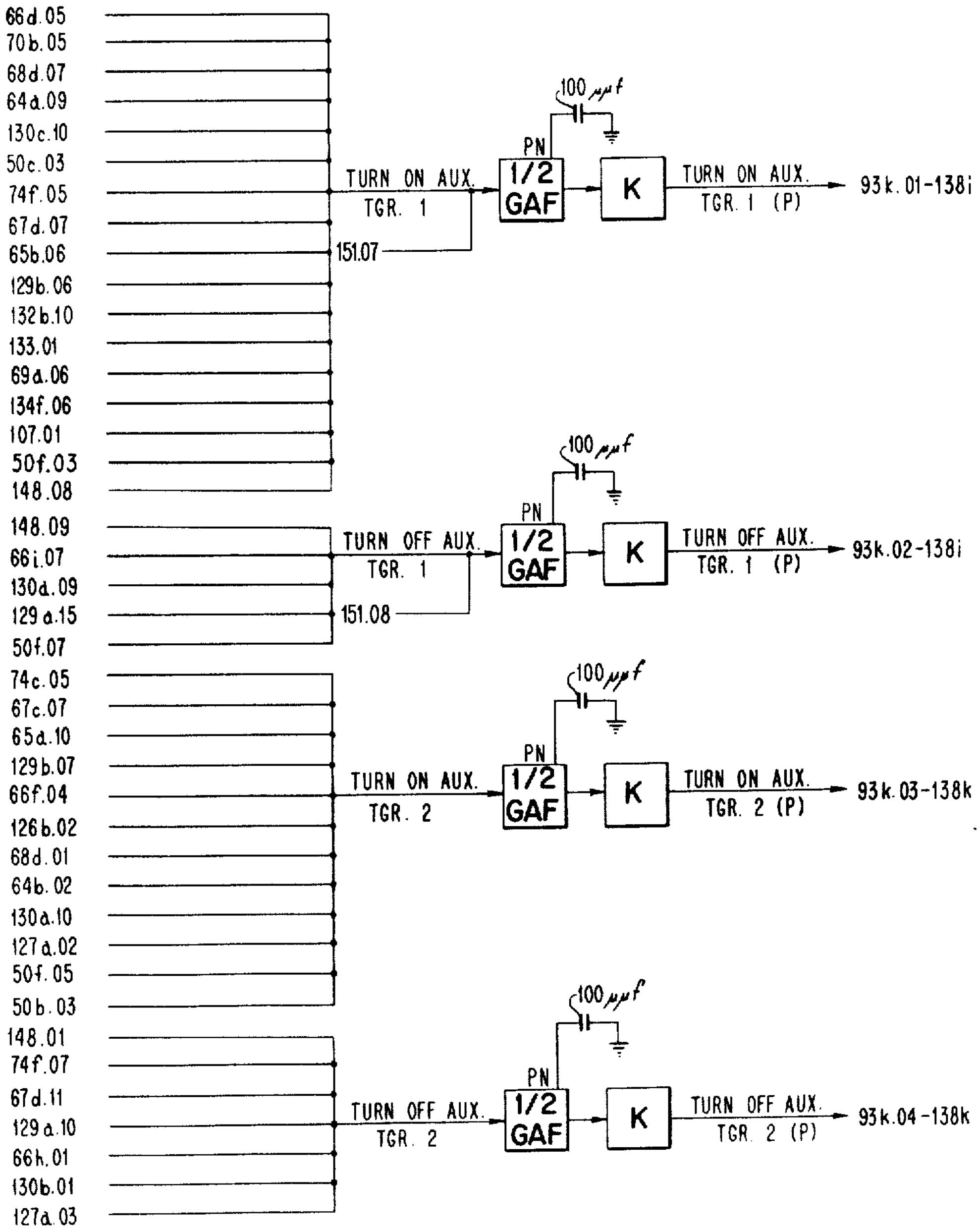
Figure 931:
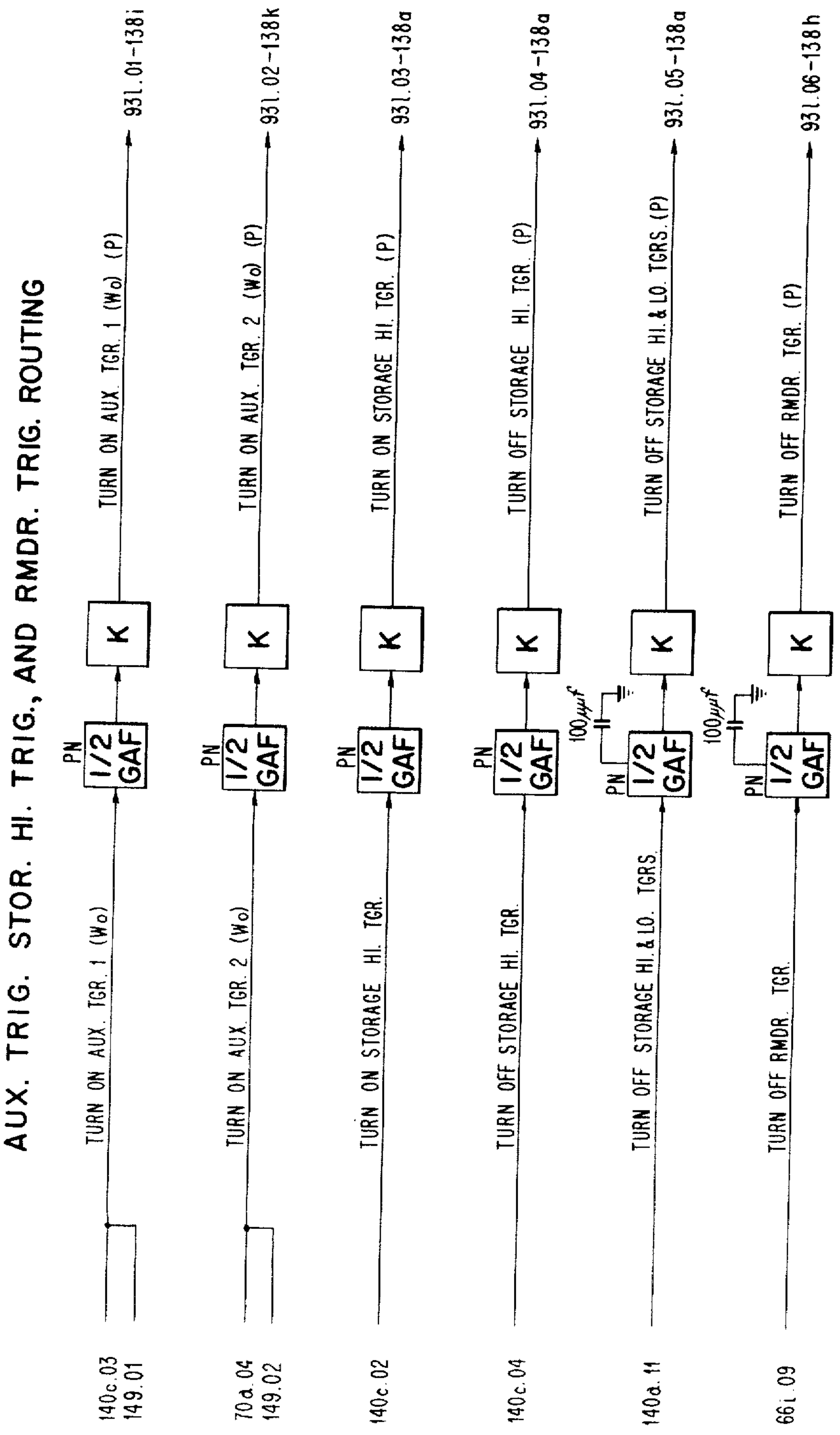

FIG. 93*k* illustrates the Auxiliary Trig's. Routing.

FIG. 93*l* illustrates the Aux. Trig. Stor. Hi. Trig., and Rmdr. Trig. Routing.

Figure 93M:
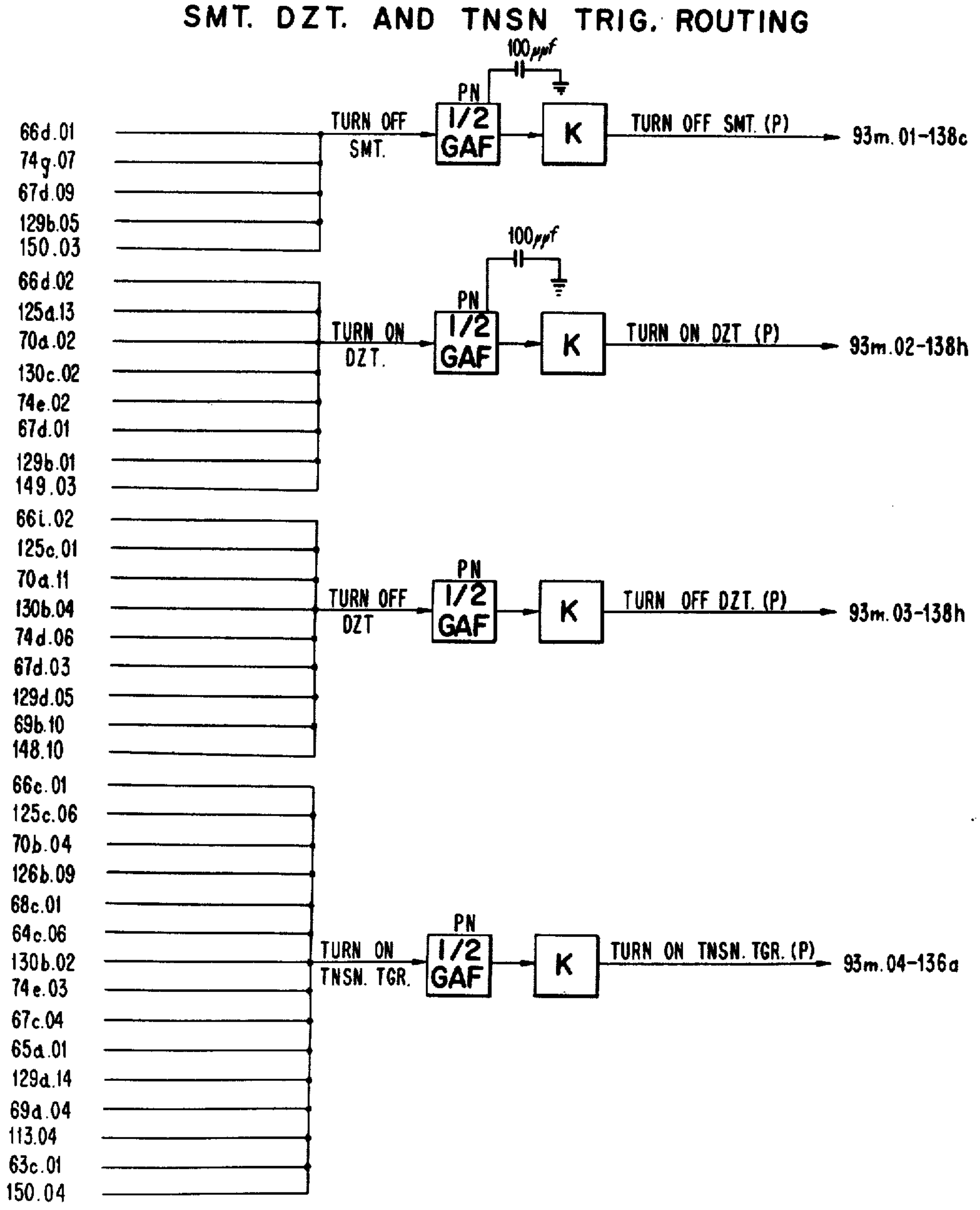

FIG. 93*m* illustrates the Smit. Dzt. and Tnsn. Trig. Routing.

FIG. 93*n* illustrates the Sign Chk. Tgr. Ovfl. Chk. Trig. and Stor. Sign Trig. Routing.

Figure 93O:
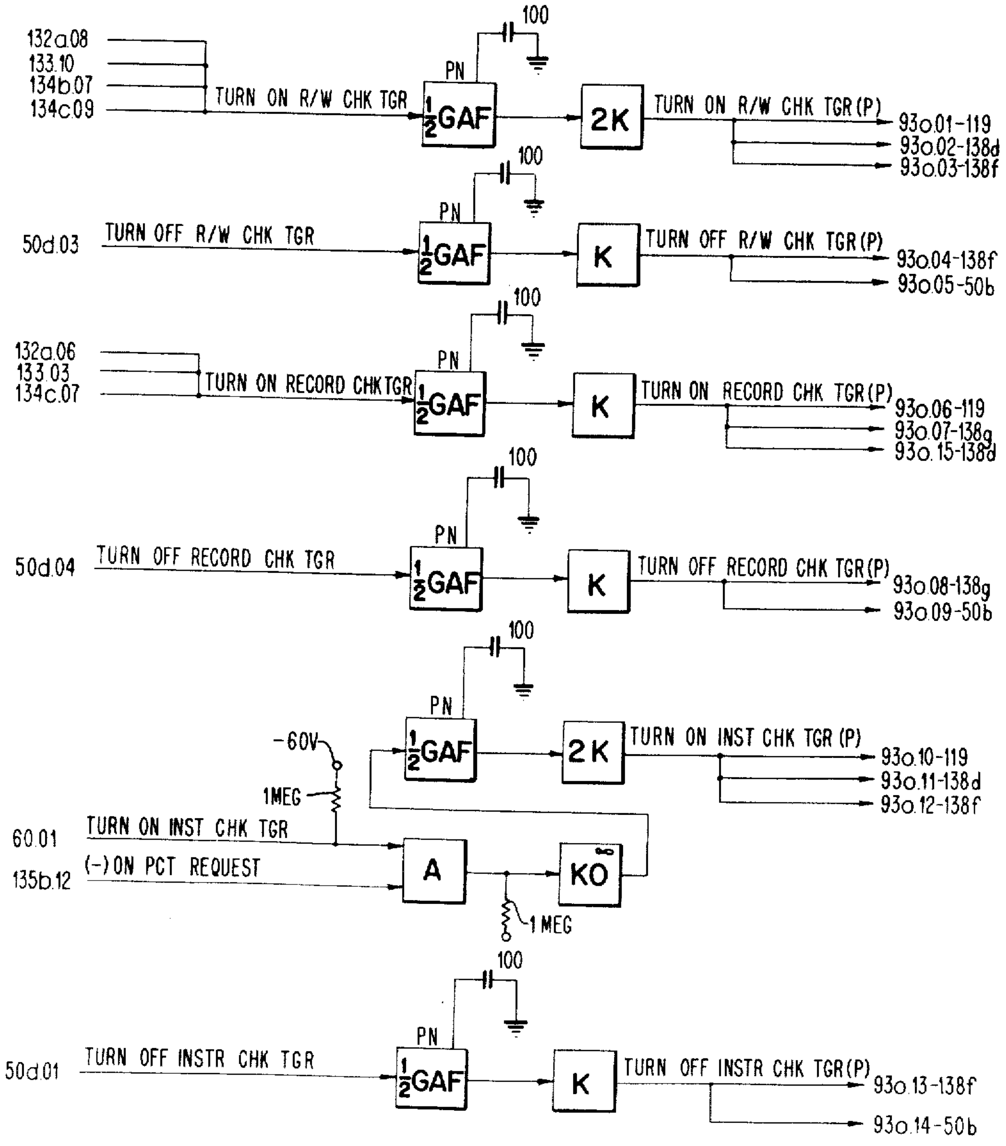

FIG. 93*o* illustrates the R/W Chk. Tgr. Record Chk. Tgr. and Instr. Chk. Tgr. Routing.

Figure 93P:
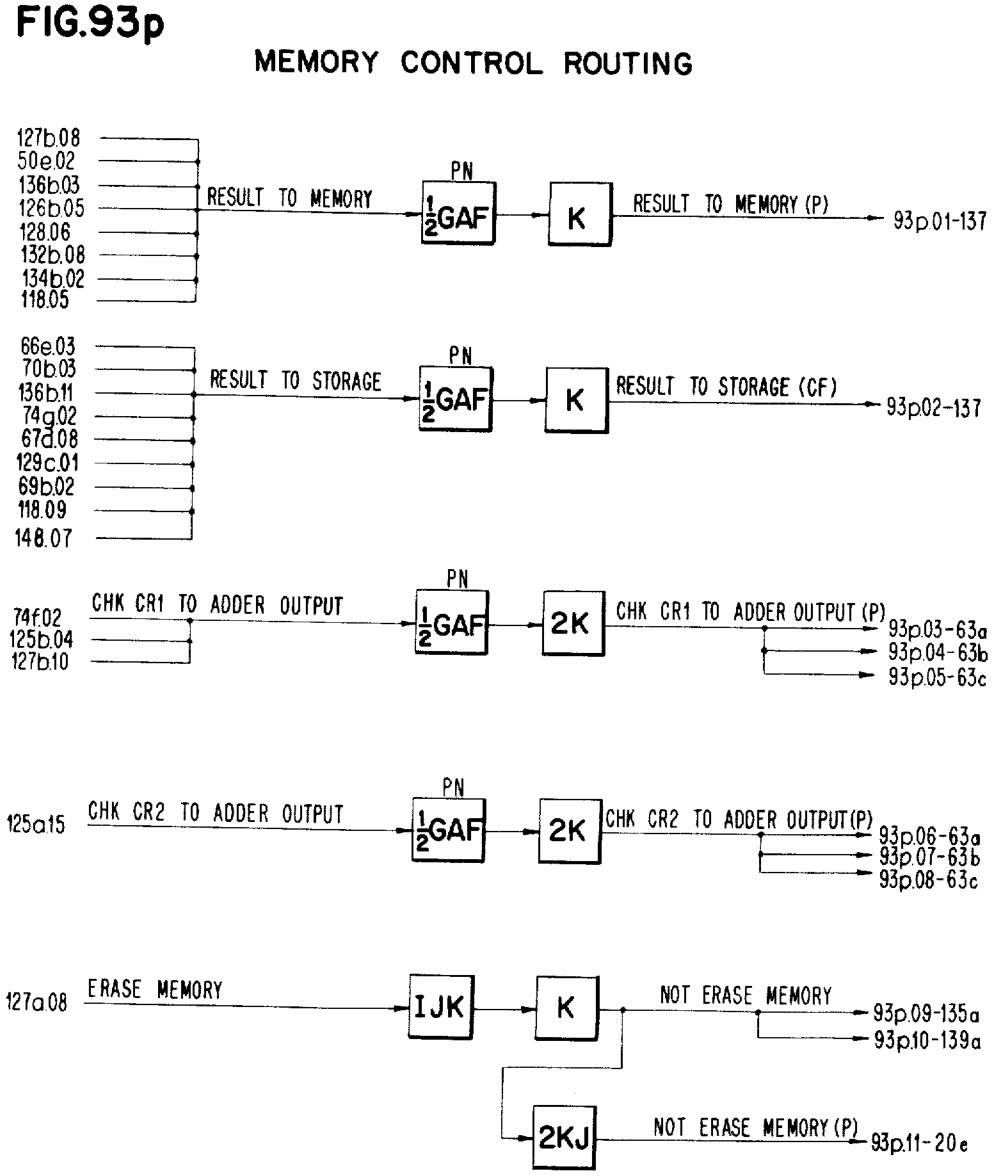

FIG. 93*p* illustrates the Memory Control Routing.

FIG. 93*q* illustrates the Mode Control Routing.

FIG. 93*r* illustrates the Routing: End E Time.

Figure 93S:
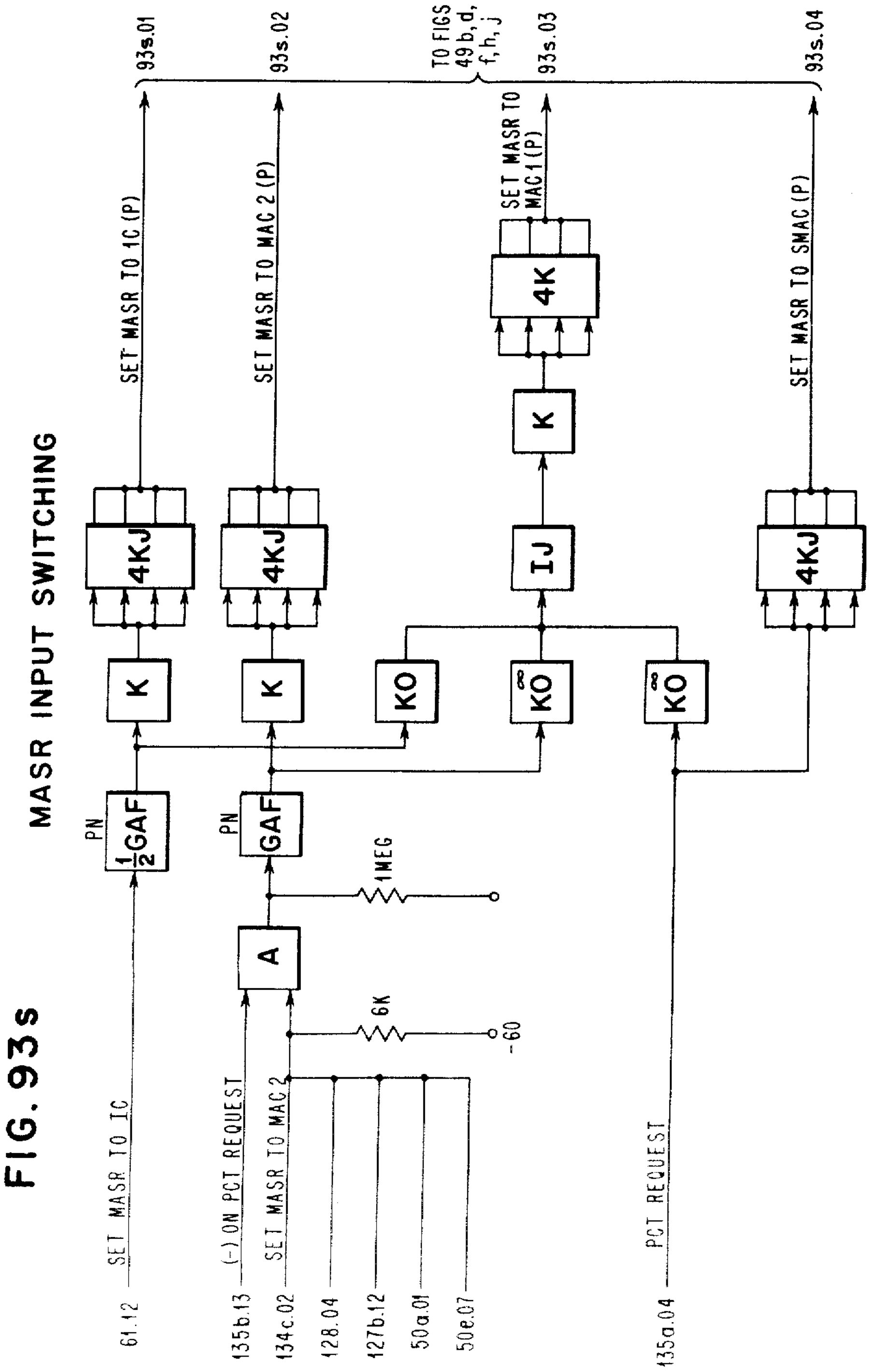

FIG. 93*s* illustrates the MASR Input Switching.

Figure 93T:
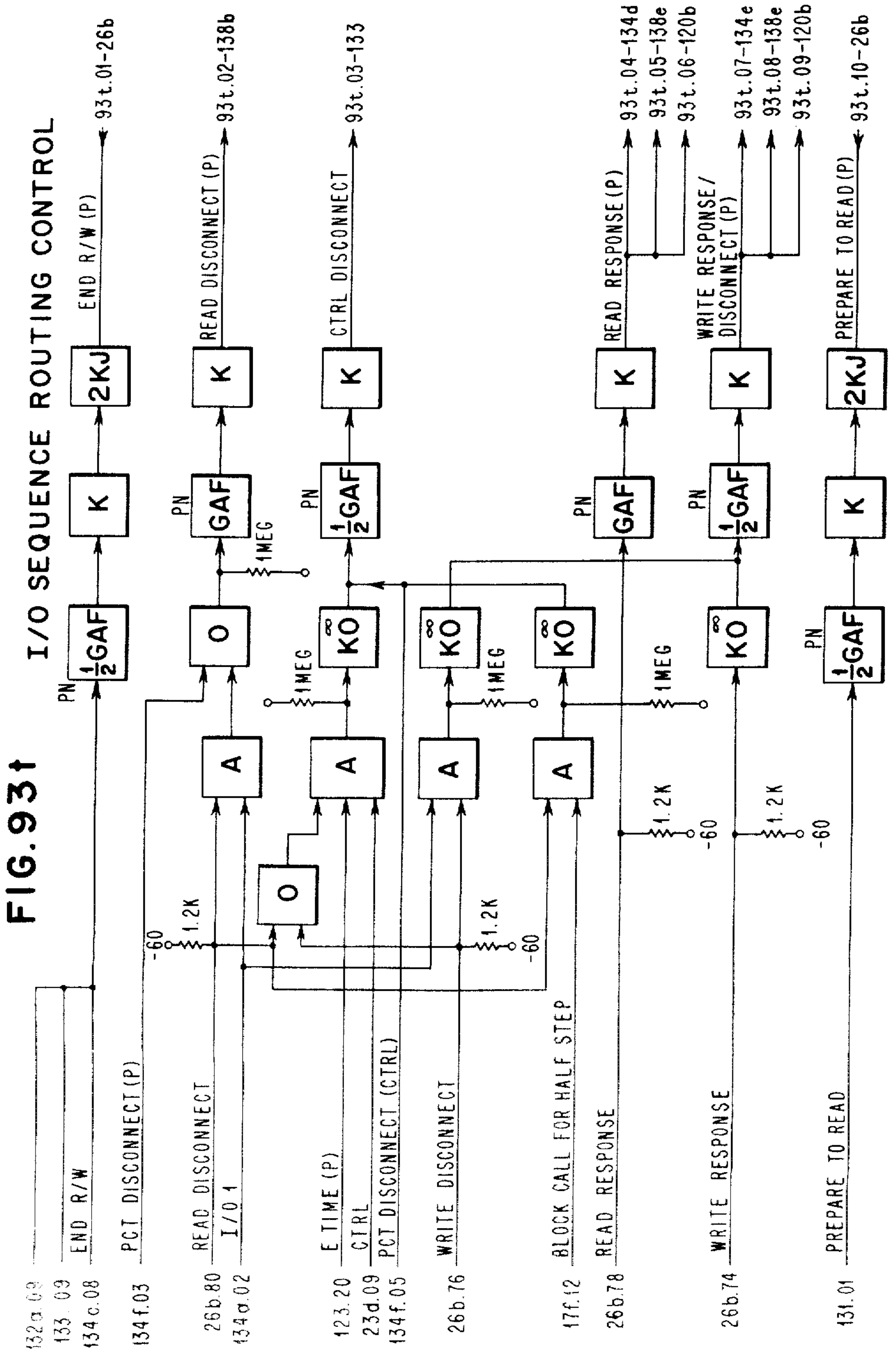

FIG. 93*t* illustrates the I%O Sequence Routing Control.

Figure 93U:
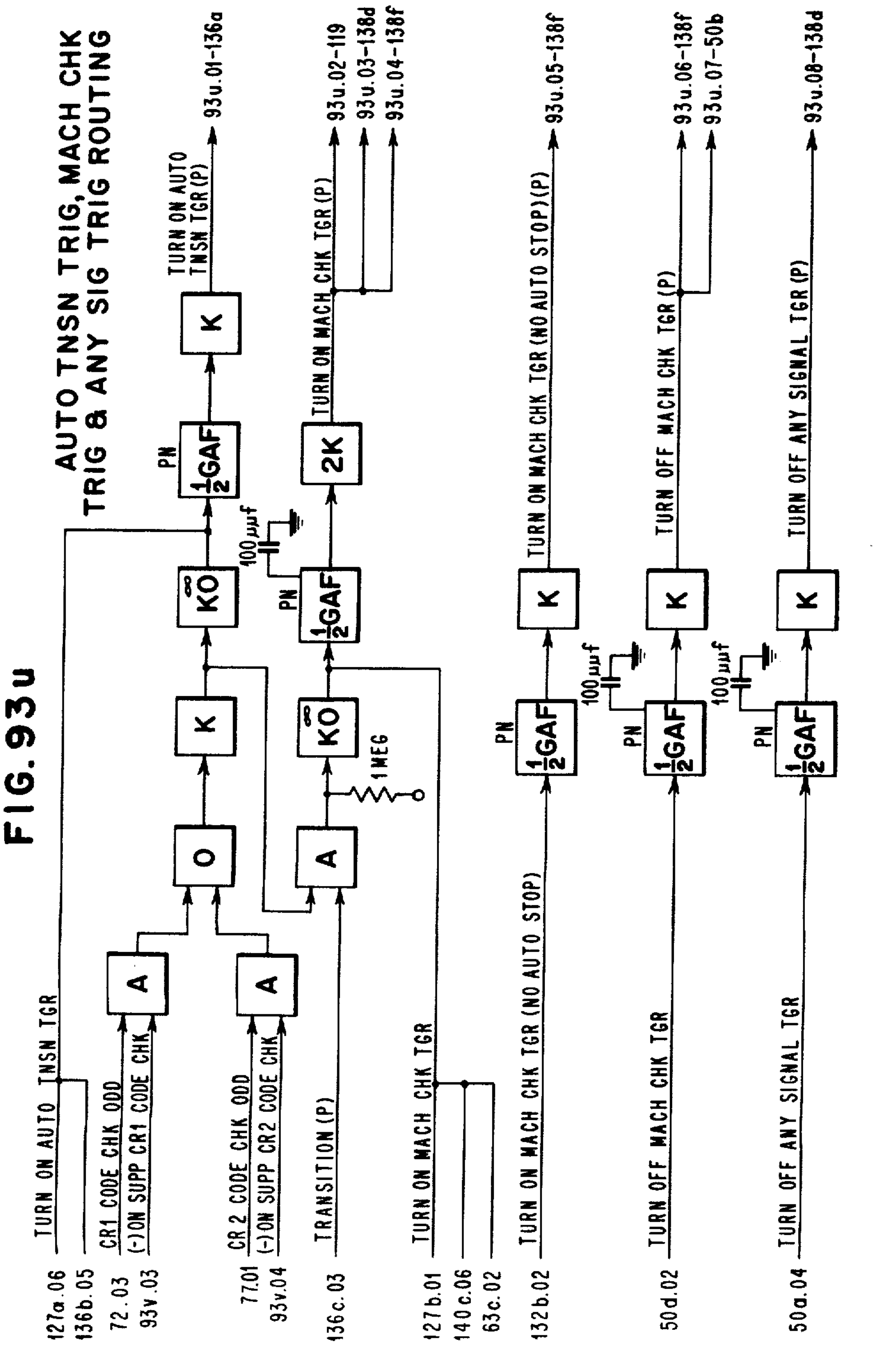

FIG. 93*u* illustrates the Auto Tnsn. Trig. Mach Chk. Trig. & Any Sig. Trig. Routing.

Figure 93V:
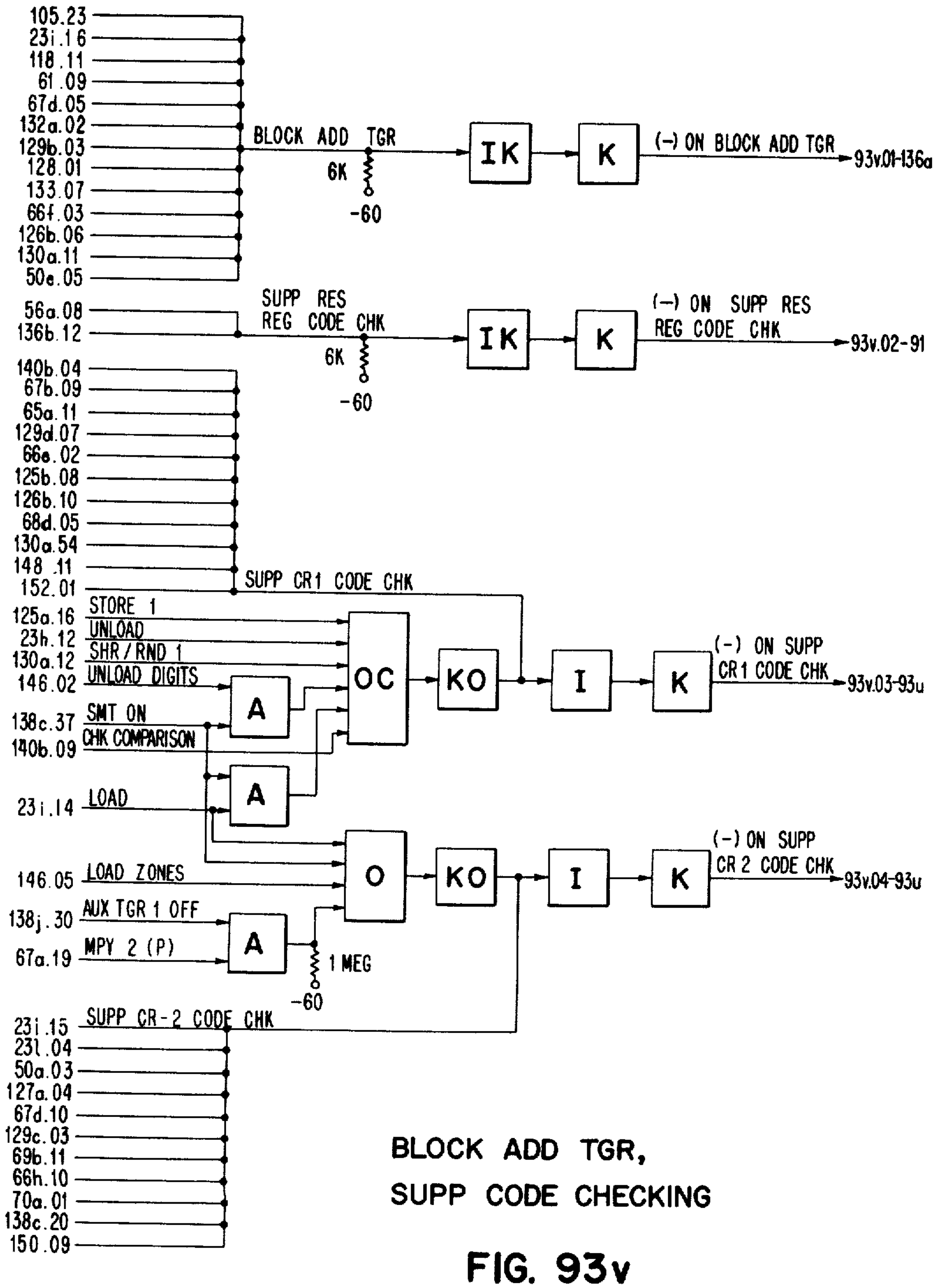

FIG. 93*v* illustrates the Block Add Tgr., Supp. Code Checking.

Figure 93W:
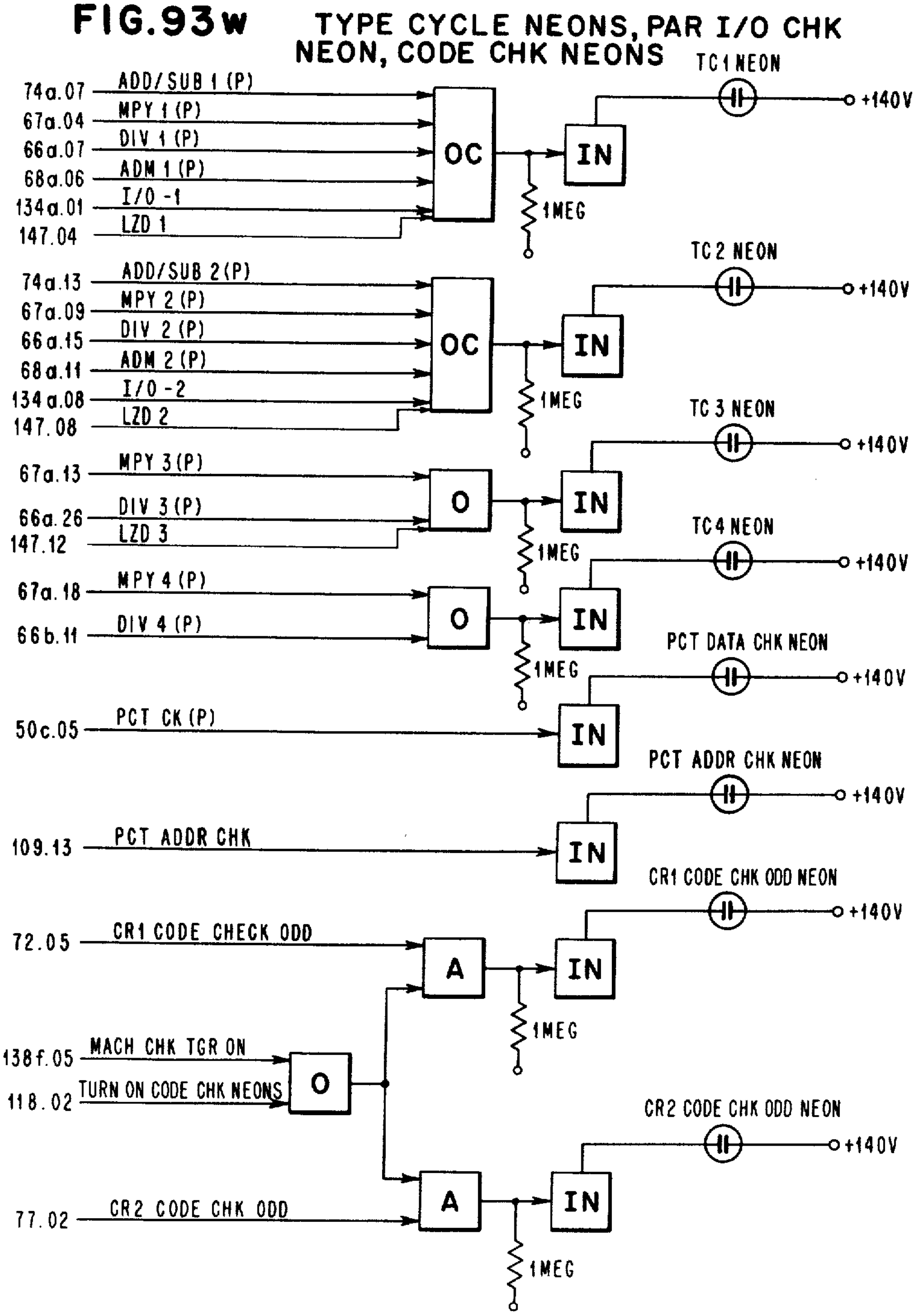

FIG. 93*w* illustrates the Type Cycle Neons, Par. I/O Chk. Neon, Code Chk. Neons.

Figure 121:
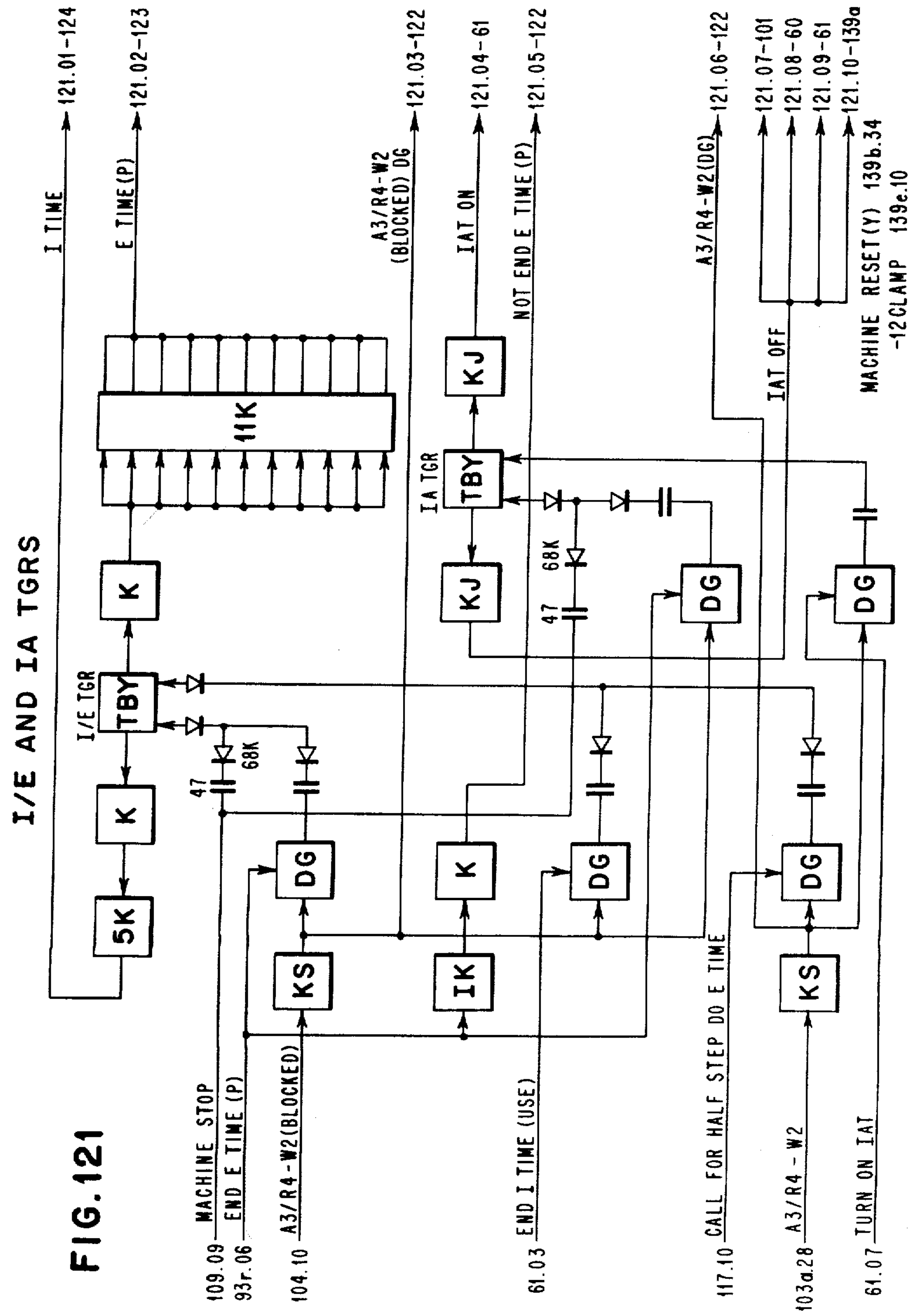

FIG. 121 illustrates the I/E And IA Tgrs.

Figure 122:
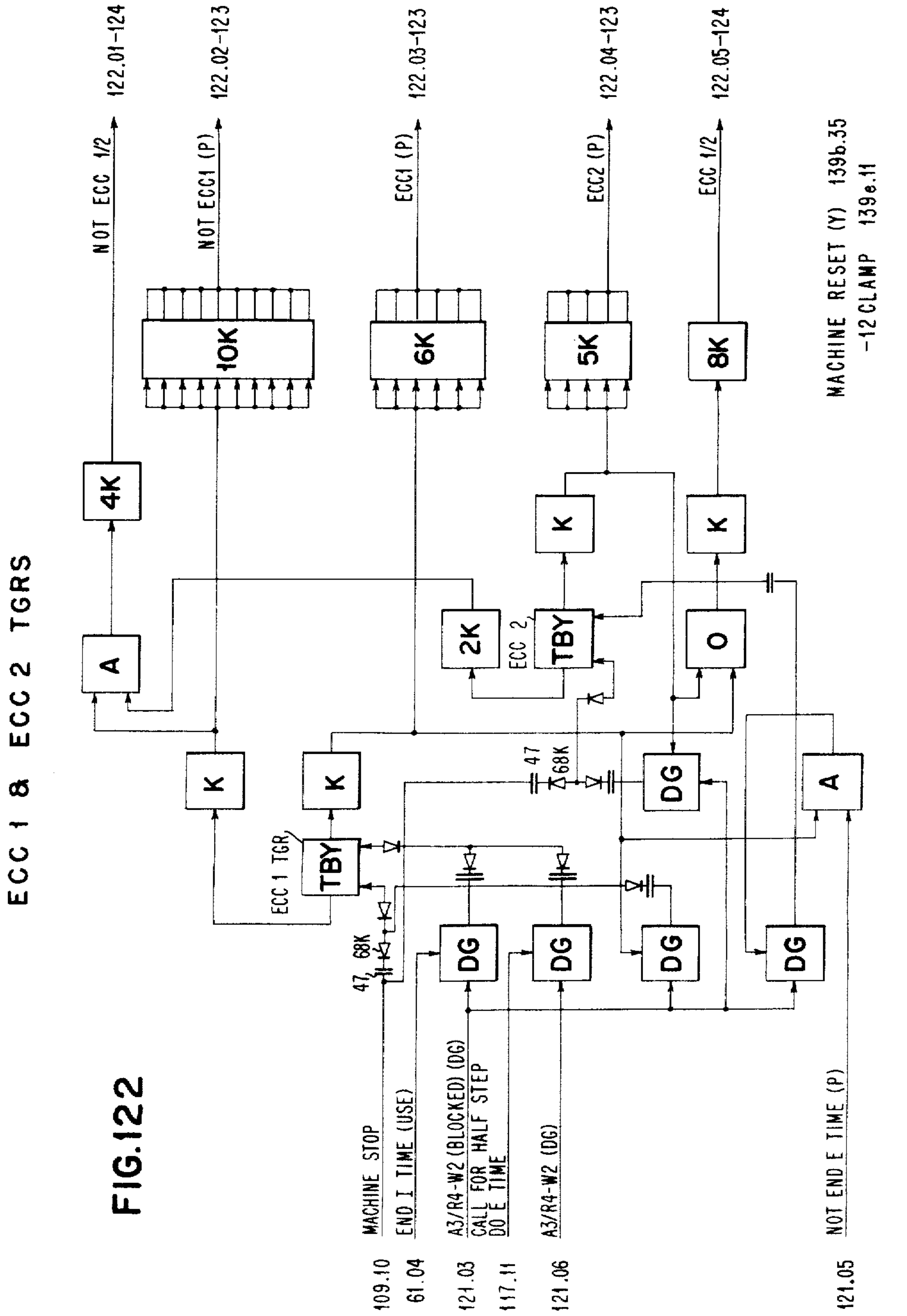

FIG. 122 illustrates the ECC 1 & ECC 2 Tgrs.

Figure 123:
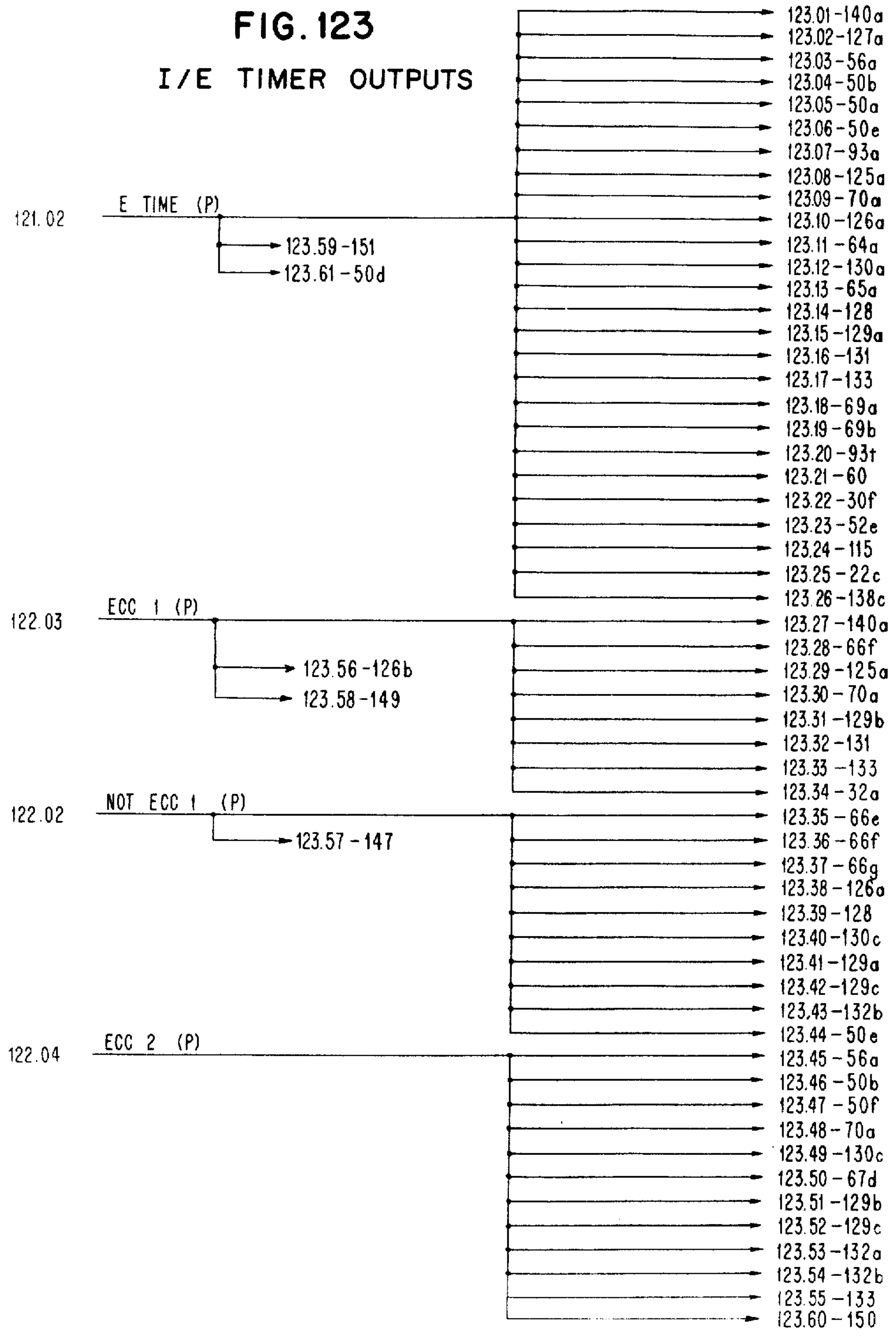

FIG. 123 illustrates the I/E Timer Outputs.

Figure 124:
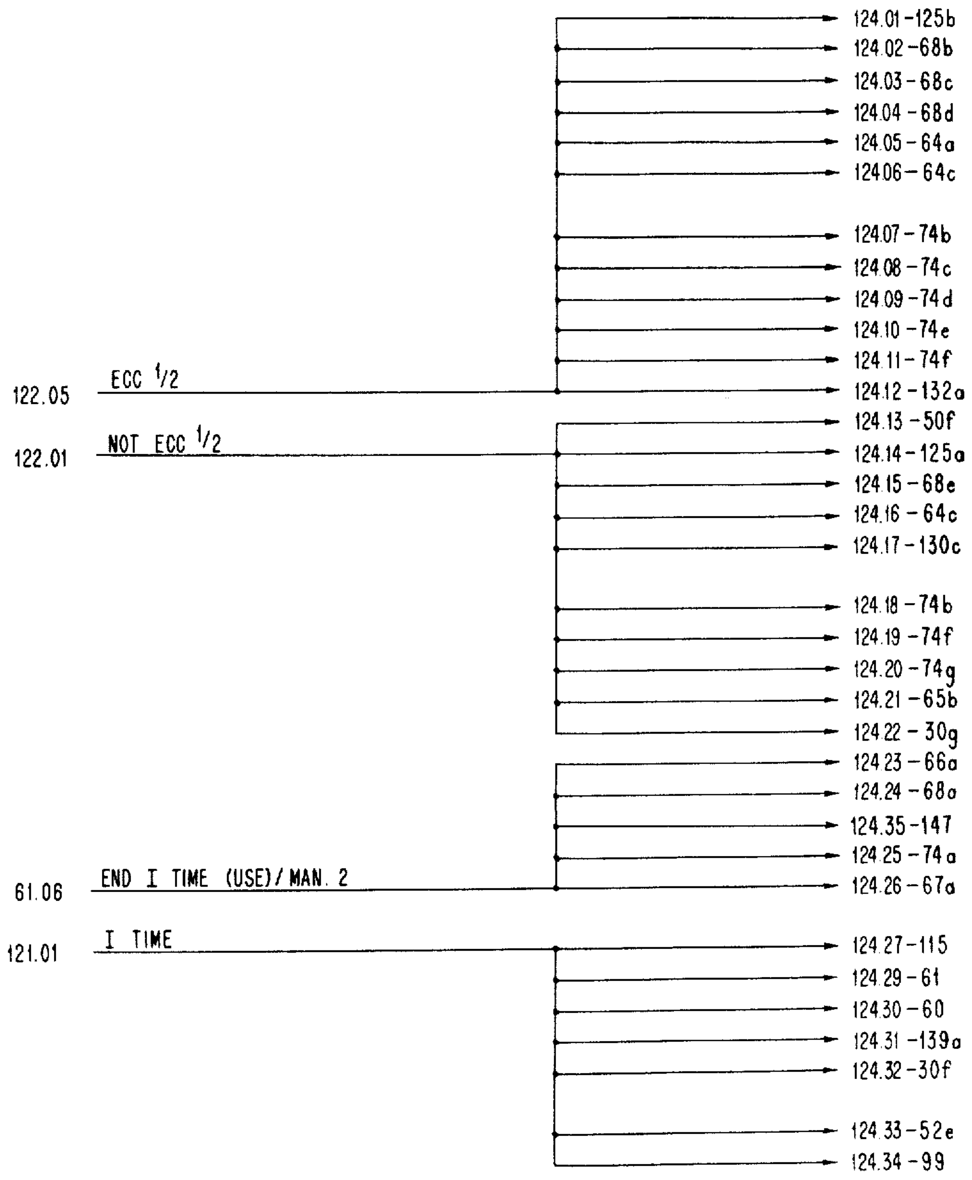

FIG. 124 illustrates the I/E Timer Outputs.

Figure 136A:
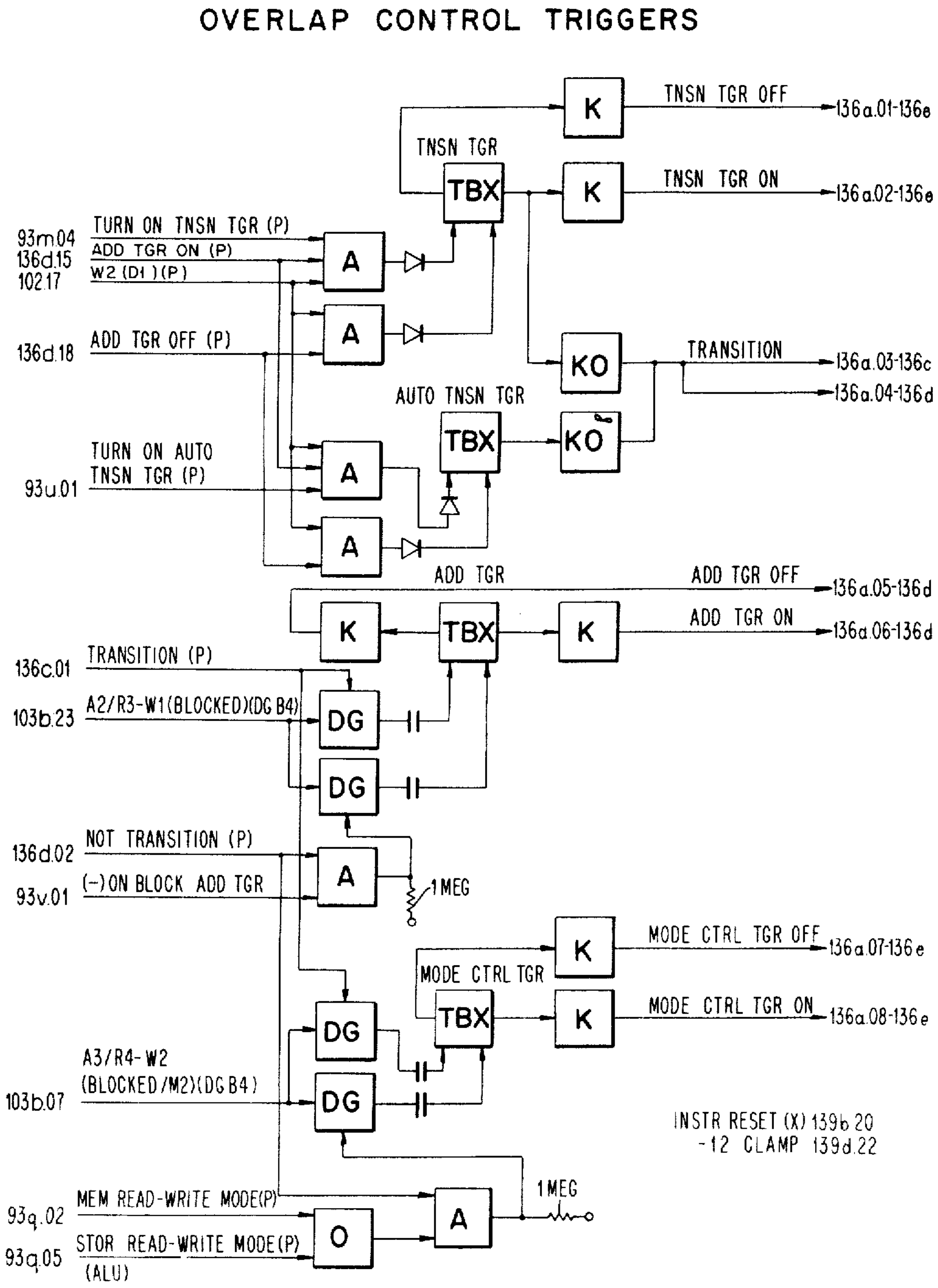

FIG. 136*a* illustrates the Overlap Control Triggers.

Figure 136B:
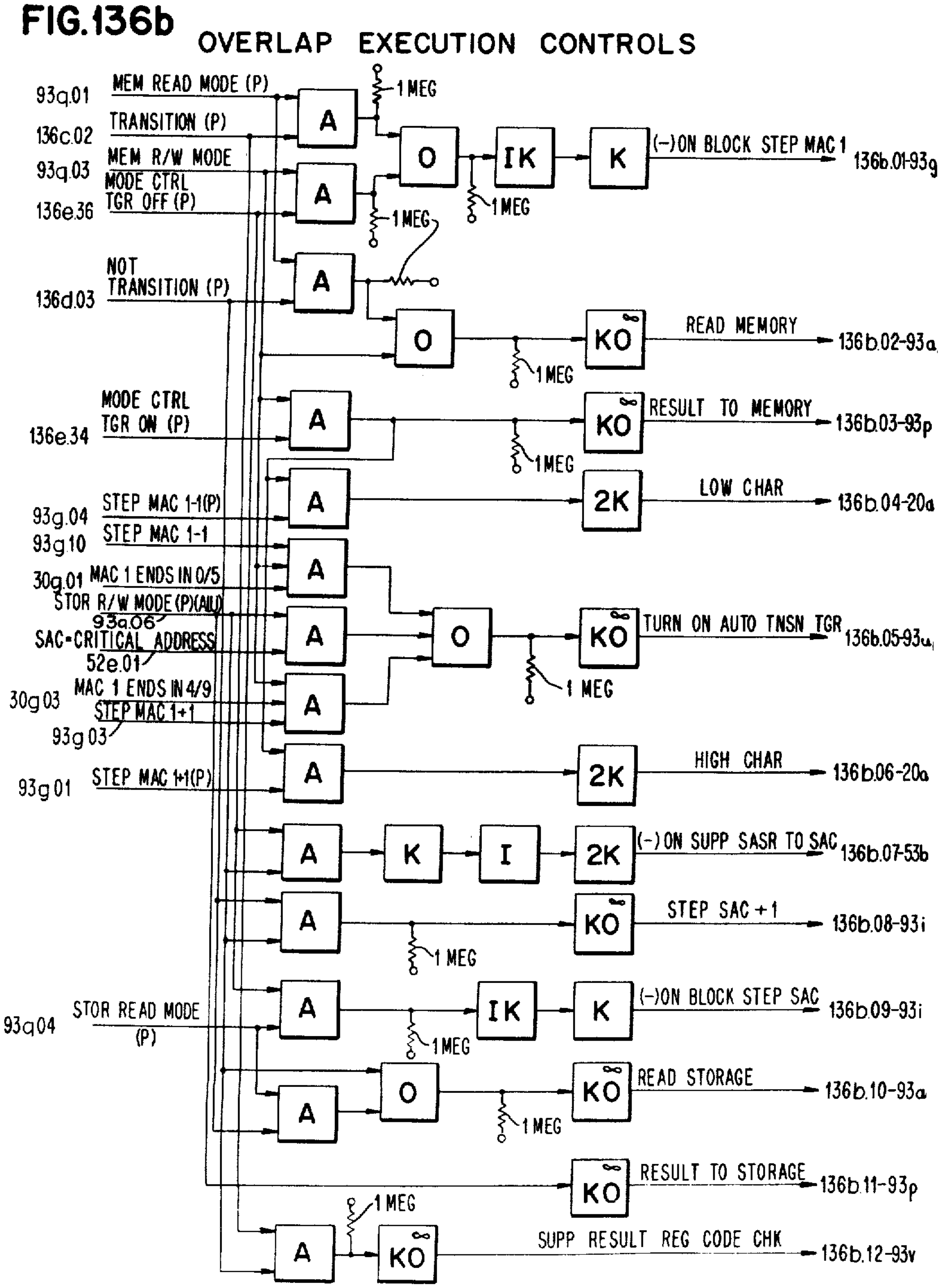

FIG. 136*b* illustrates the Overlap Execution Controls.

FIG. 136*c* illustrates the Transition Powering.

FIG. 136*d* illustrates the Not Transition & Add Tgr. Powering.

Figure 136E:
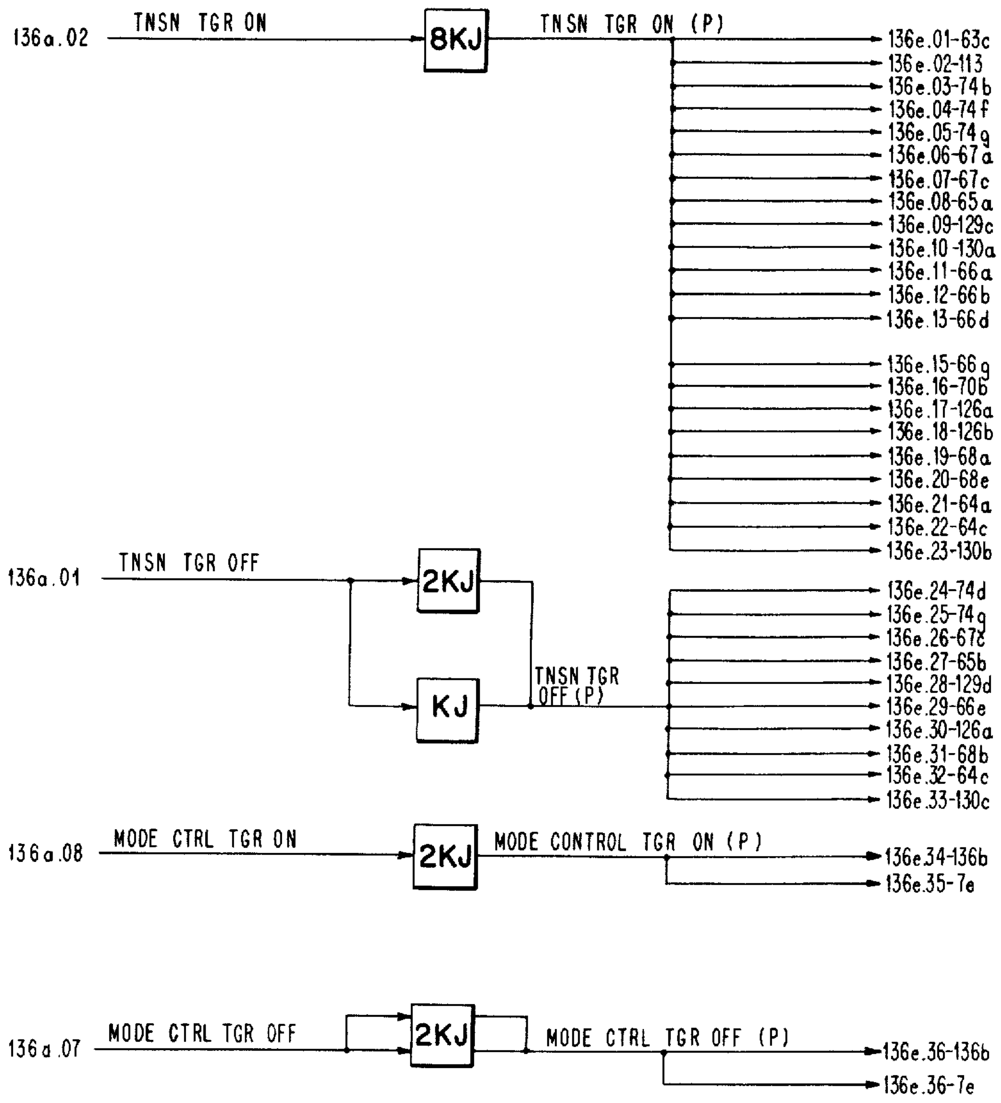

FIG. 136*e* illustrates the Tnsn. Tgr. Mode Ctrl. Tgr. Powering.

Figure 136F:
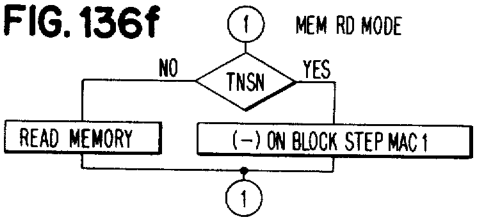

FIG. 136*f* is a Memory Read Mode Flow Diagram.

Figure 136G:
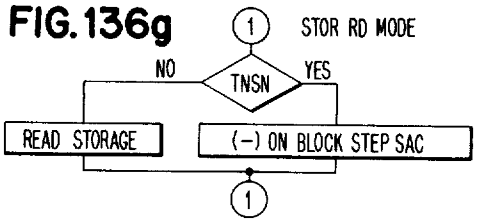

FIG. 136*g* is a Storage Read Mode Flow Diagram.

Figure 136H:
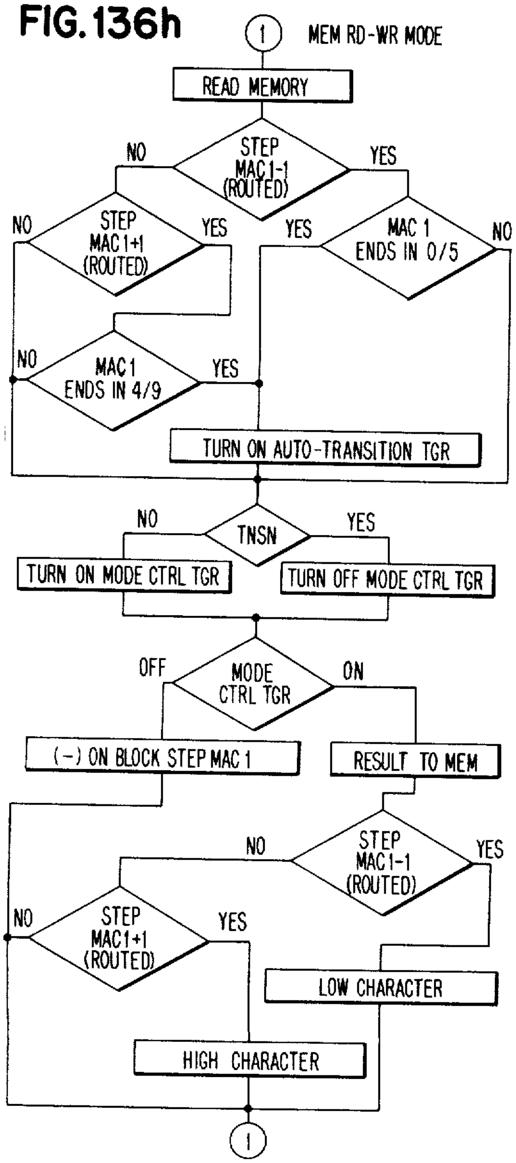

FIG. 136*h* is a Memory Read/Write Mode Flow Diagram.

FIG. 131*i* is a Storage Read/Write Mode Flow Diagram.

Figure 146:
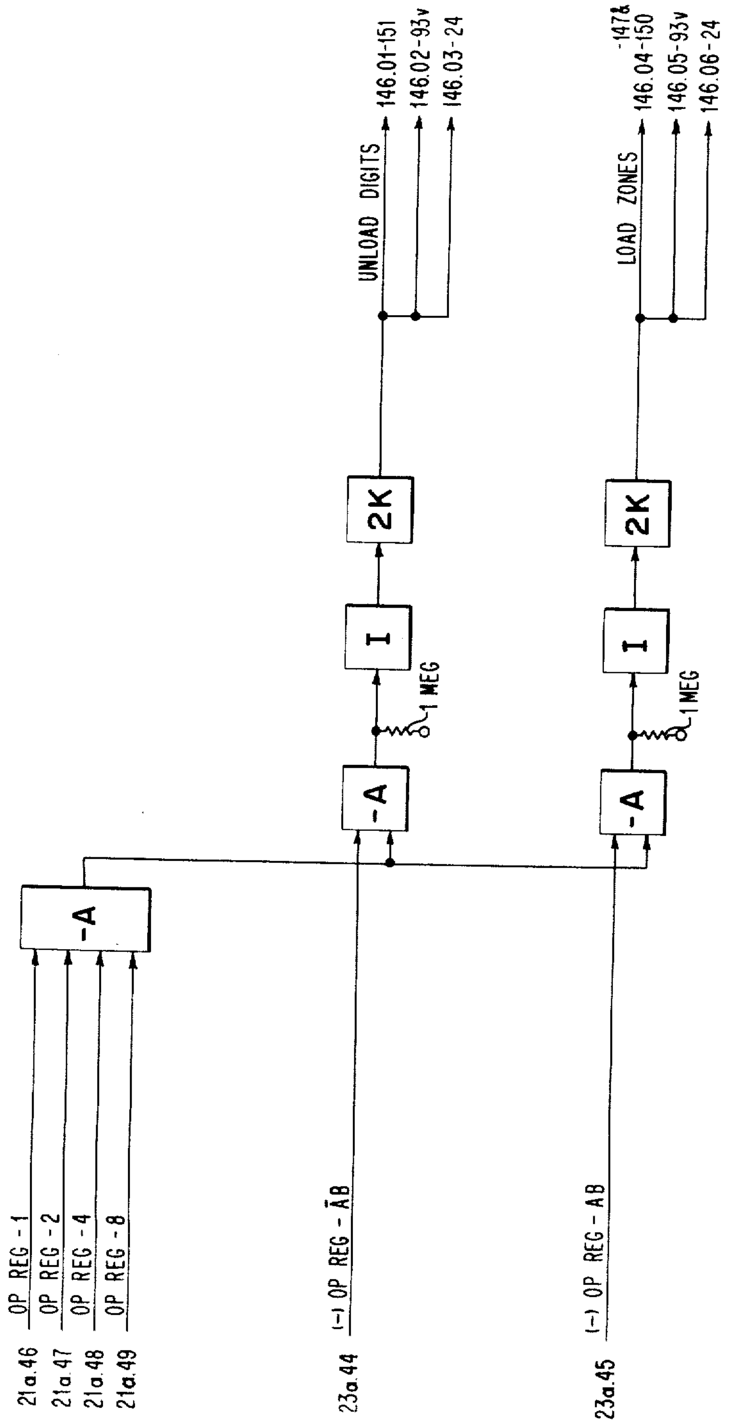

FIG. 146 illustrates circuits of the Operation Decoder LDZ, ULD.

FIGS. 147, 148, 149 and 150 illustrate circuits for Load Zone Routing Controls.

Figure 151:
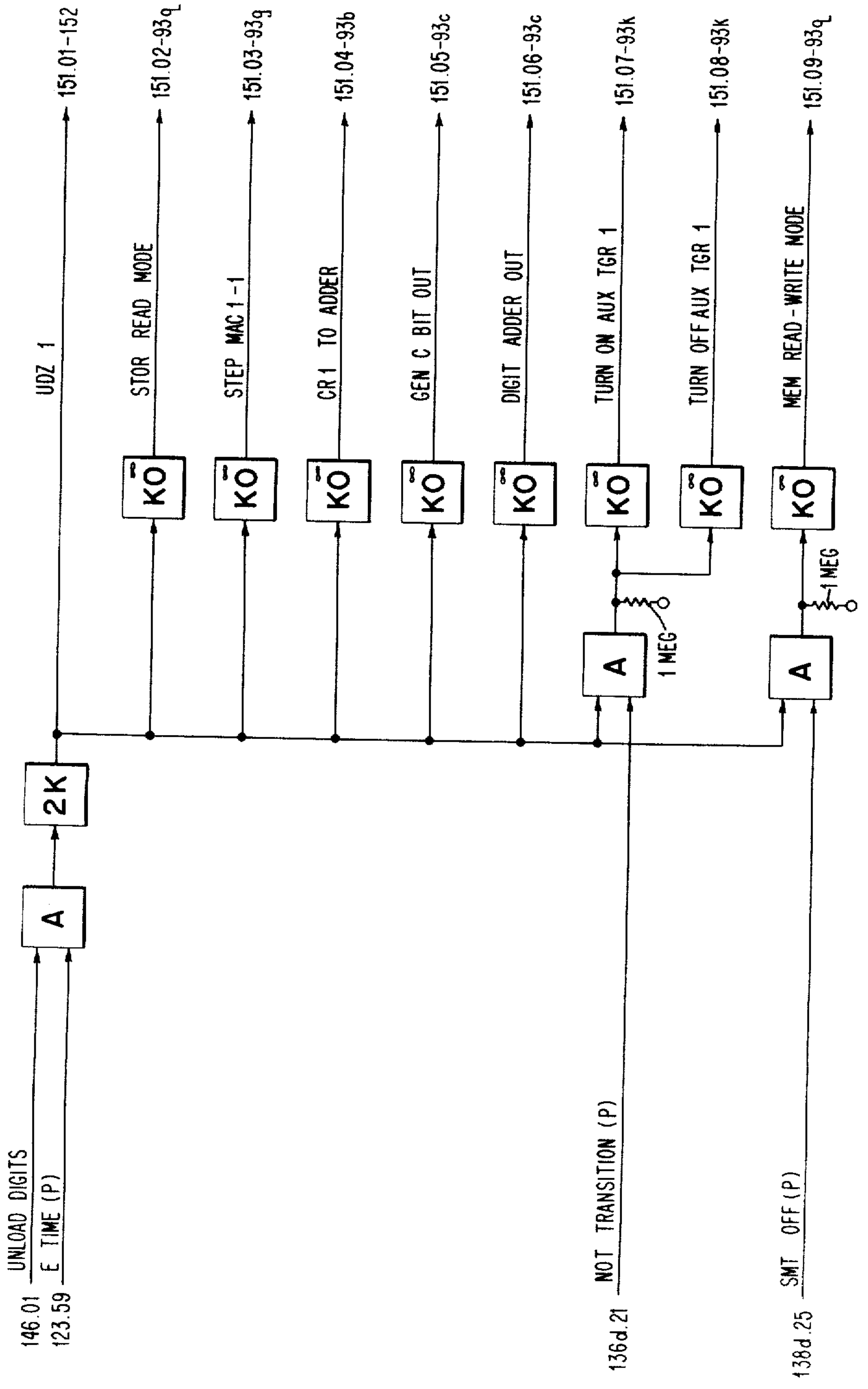
Figure 152:
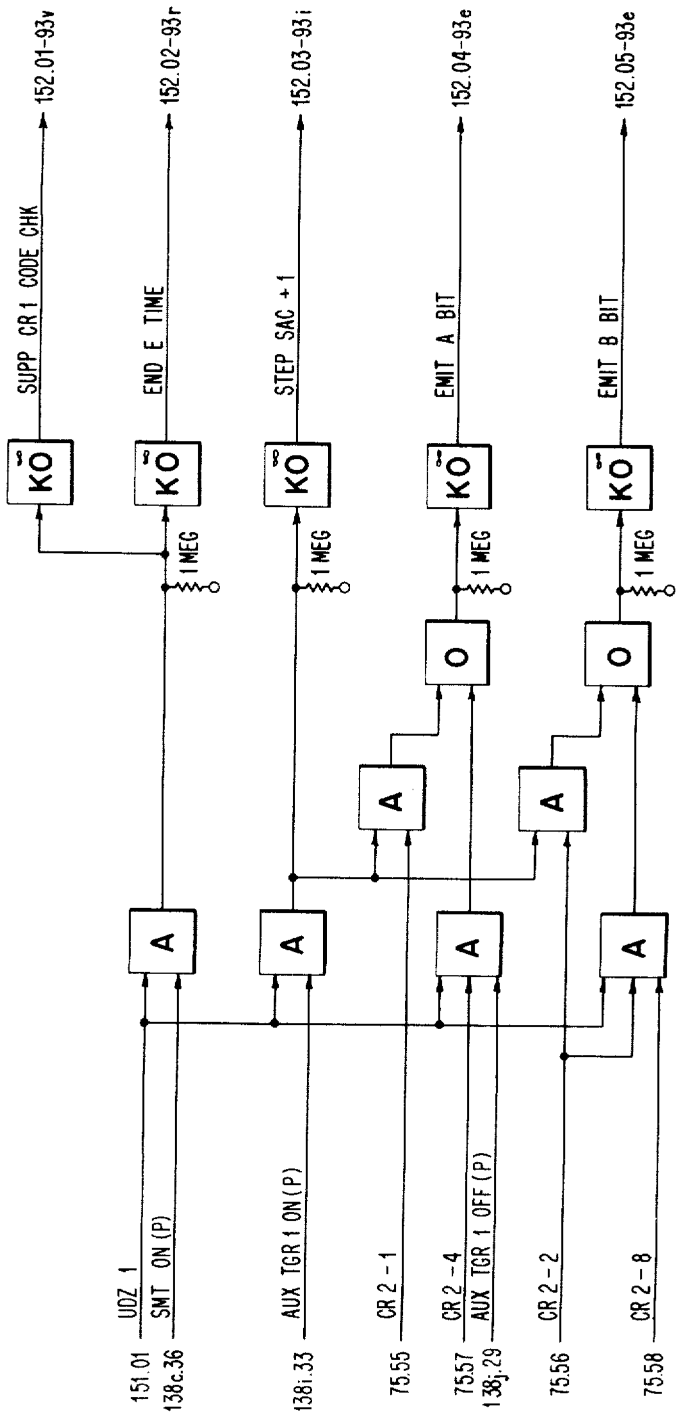

FIGS. 151 and 152 illustrate circuits for Unload Digits Routing Controls.

Figure 153:
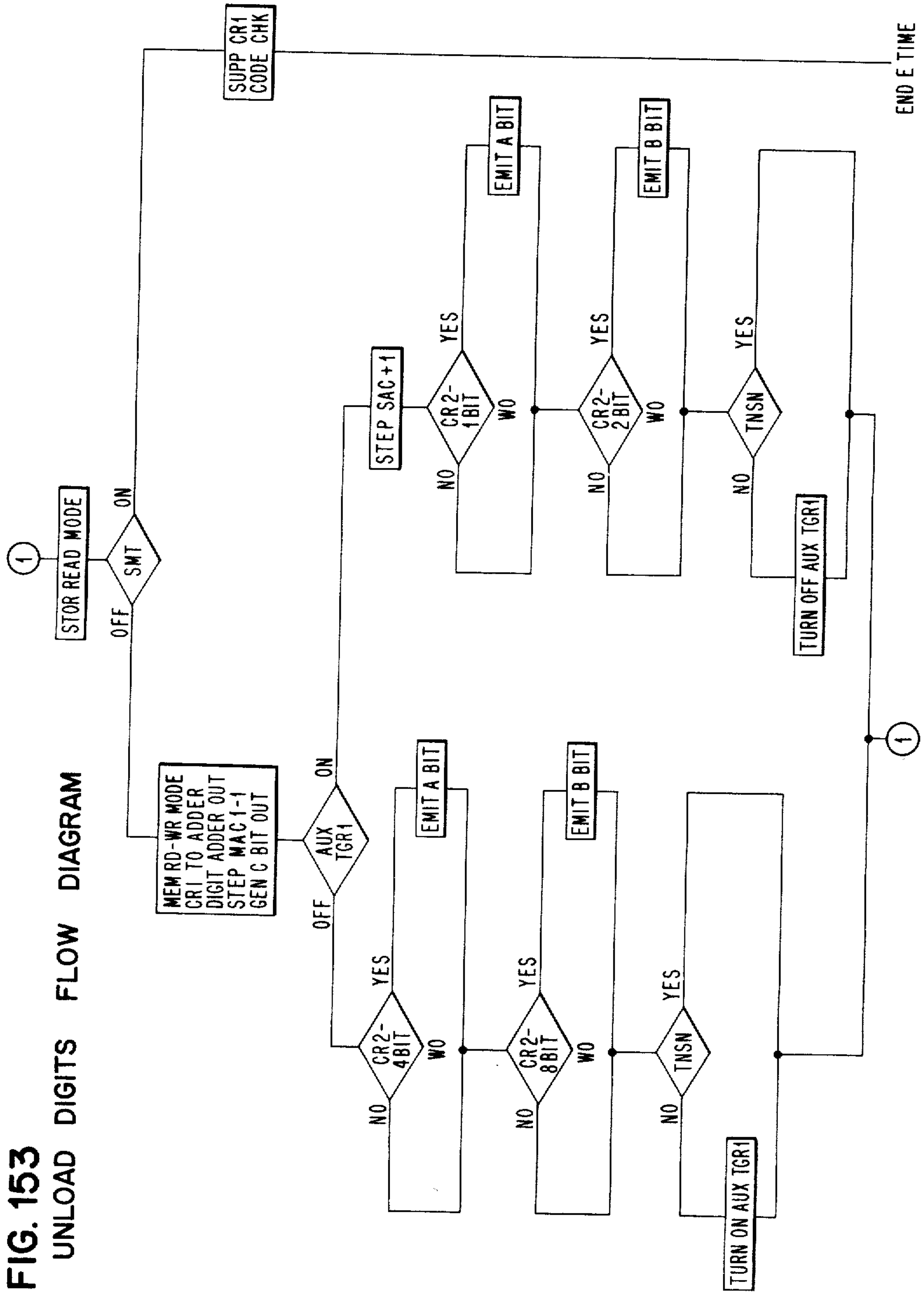

FIG. 153 is an Unload Digits Flow Diagram.

Figure 154:
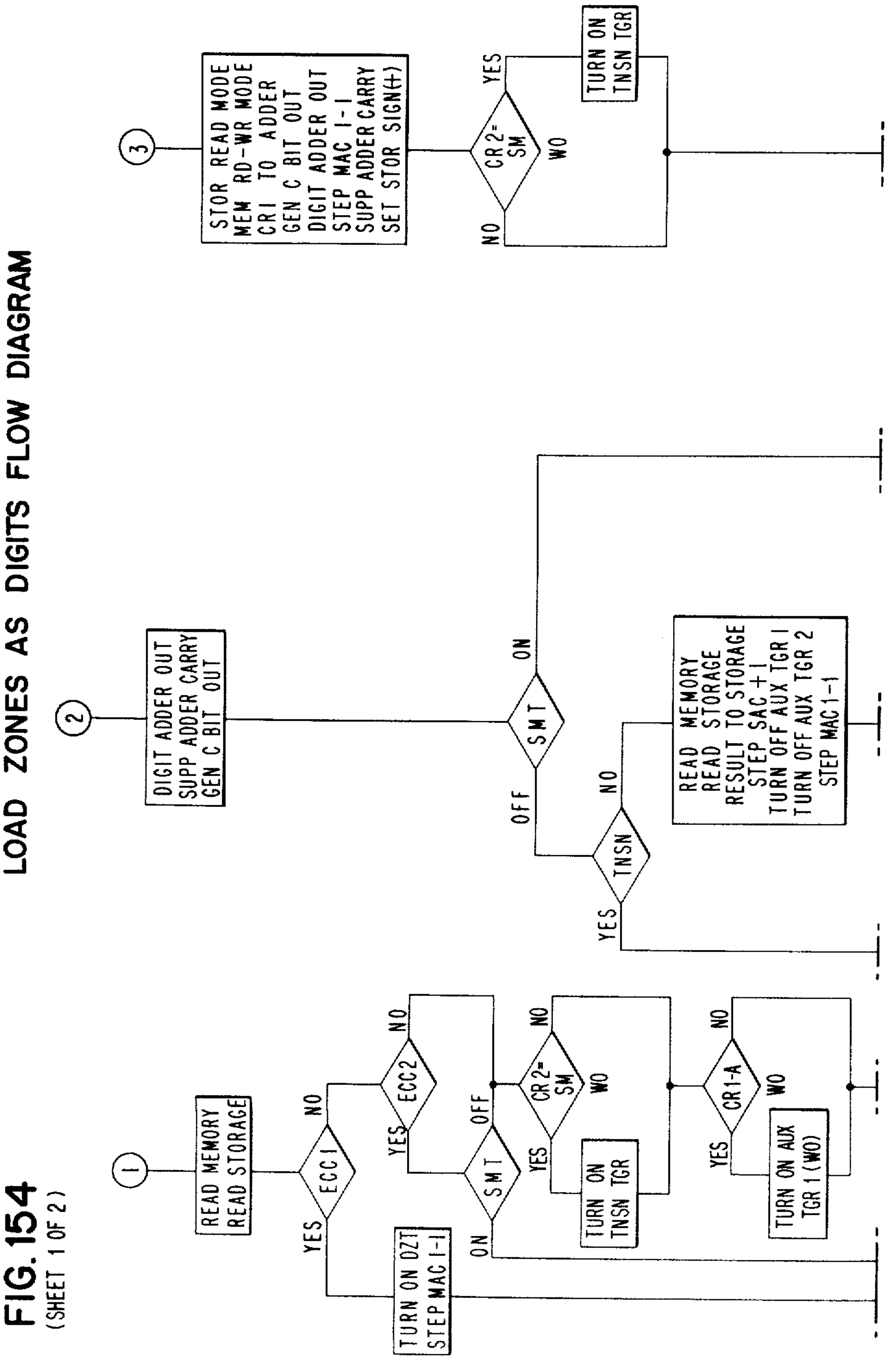
Figure 154:
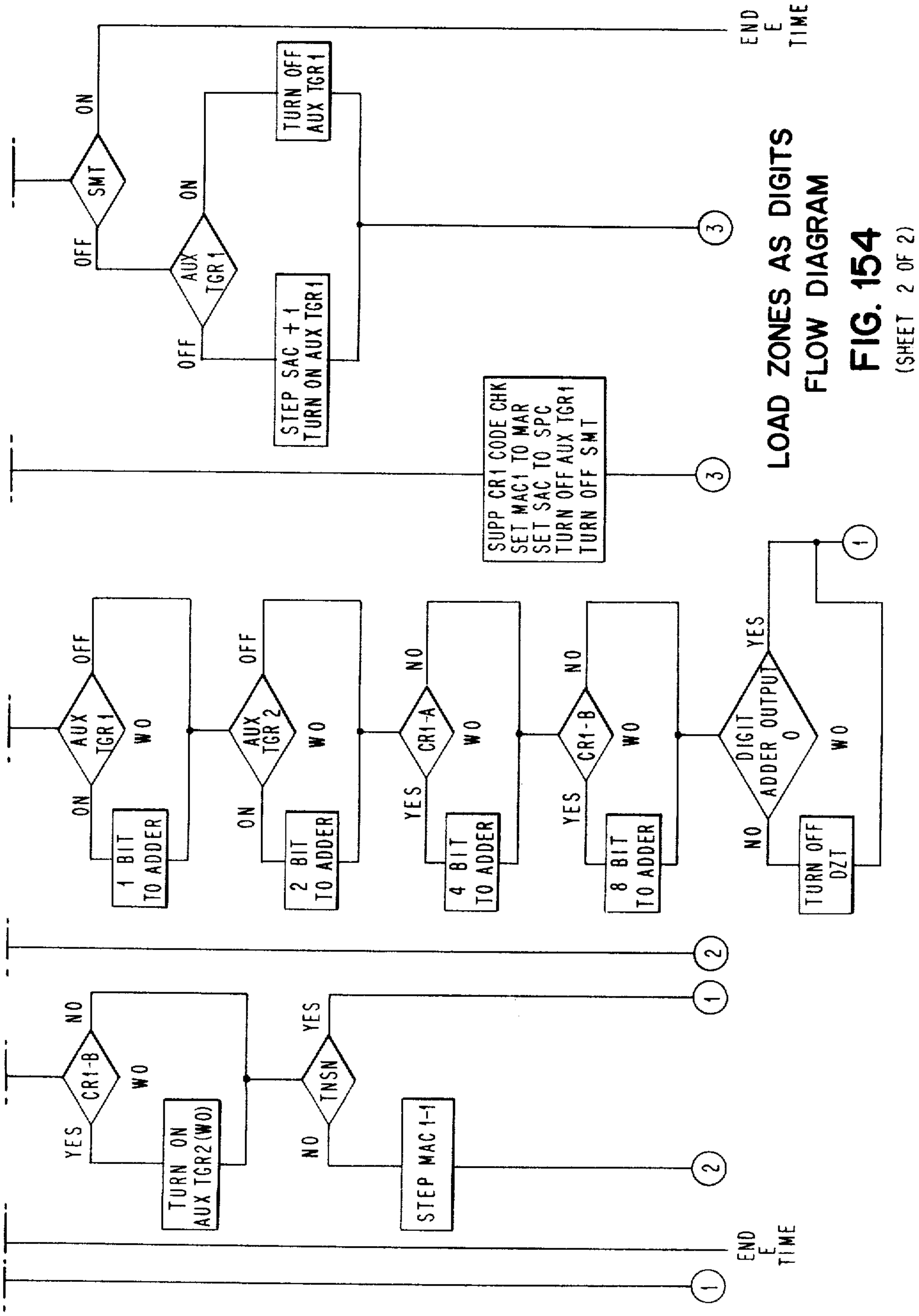

FIG. 154 (2 sheets) is a Load Zones as Digits Flow Diagram.

Figure 155:
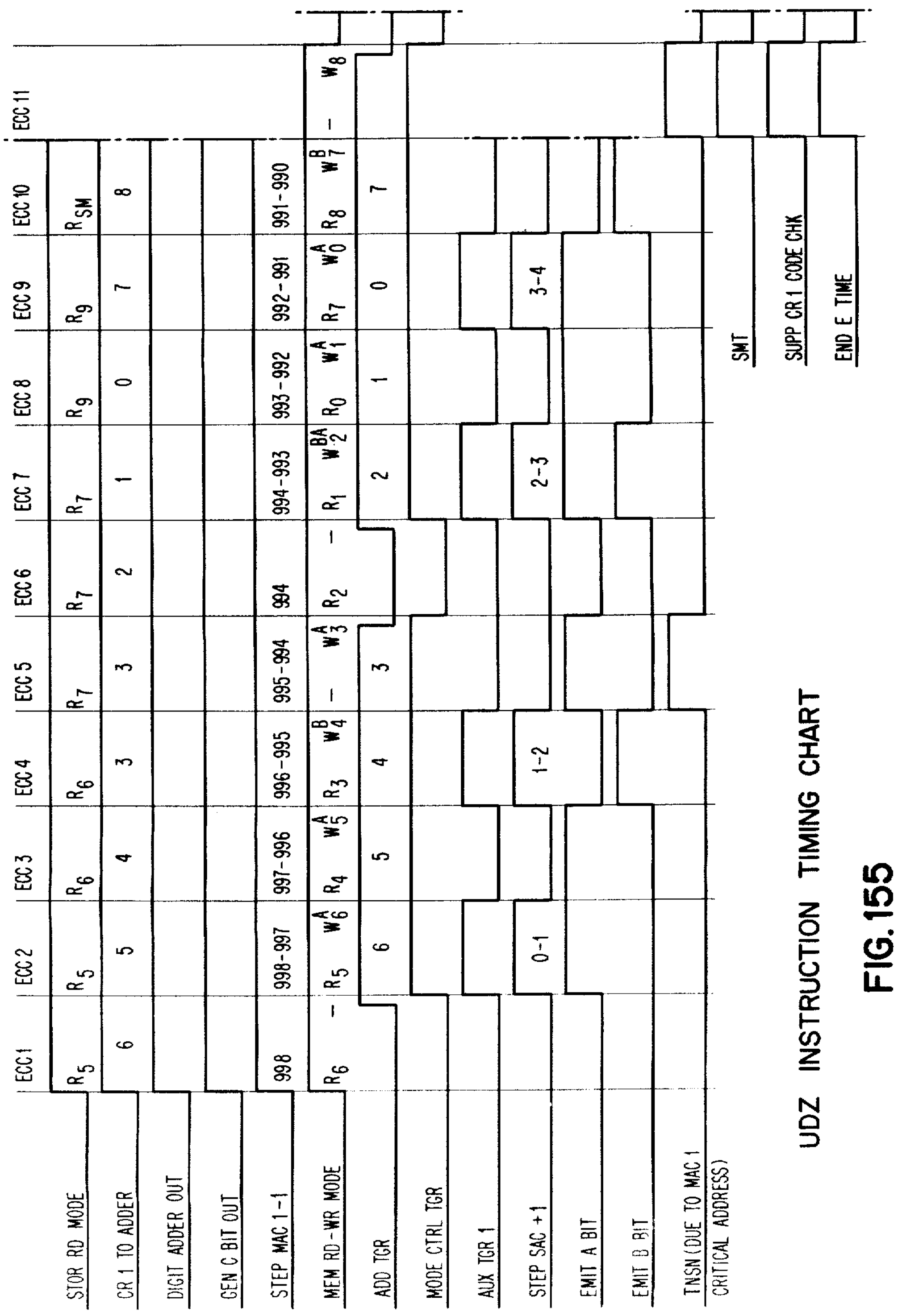

FIG. 155 is an Unload Digits Timing Chart.

Figure 156:
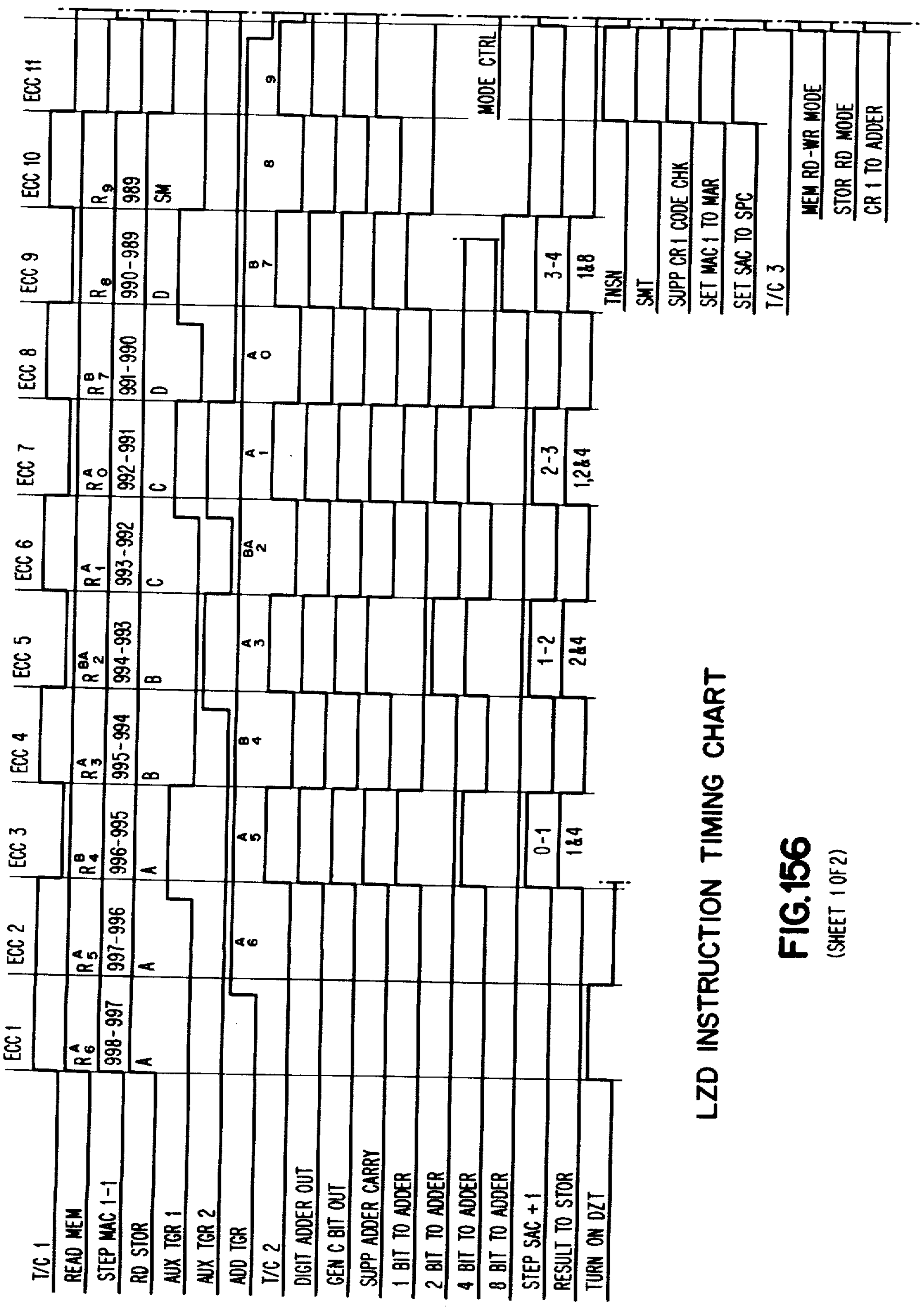
Figure 156:
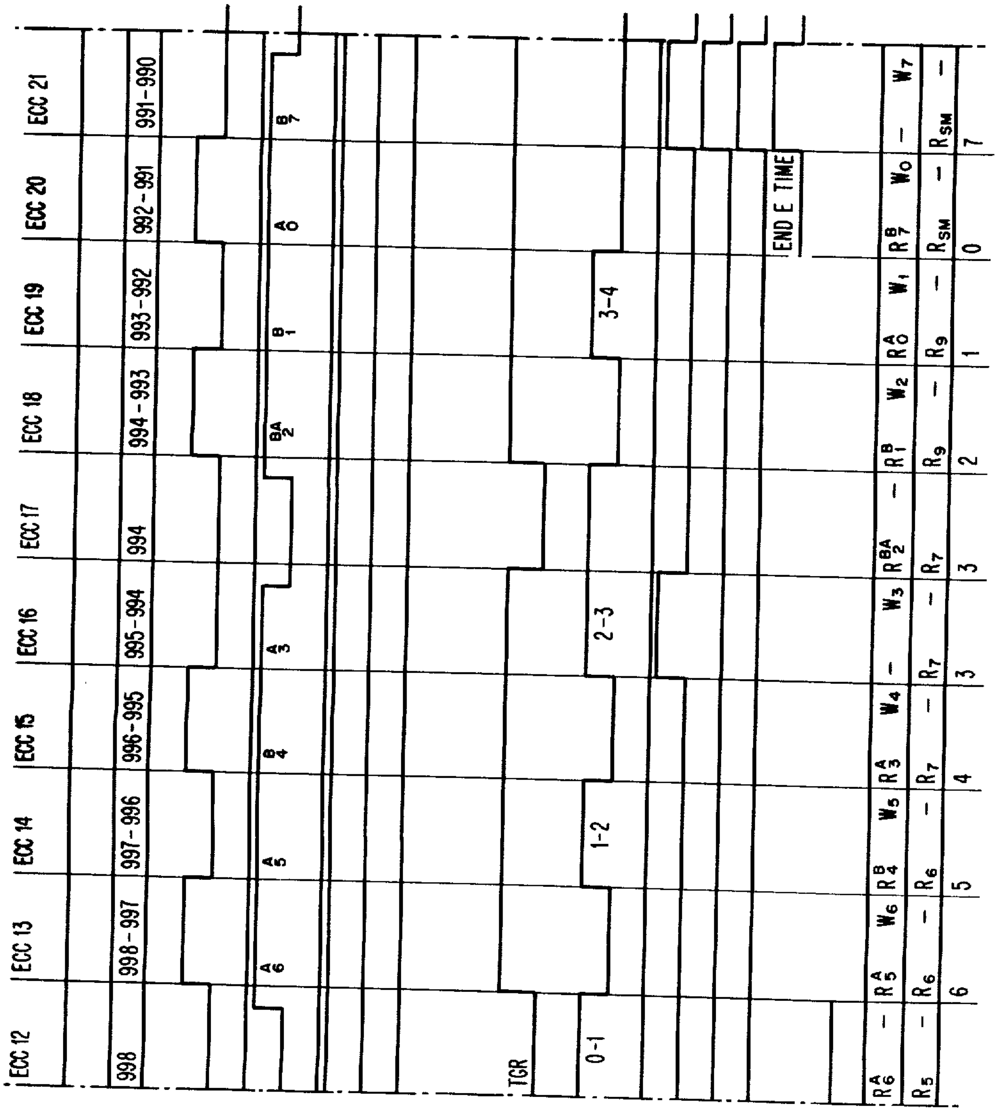

FIG. 156 (2 sheets) is a Load Zones Timing Chart.

Figure 1:
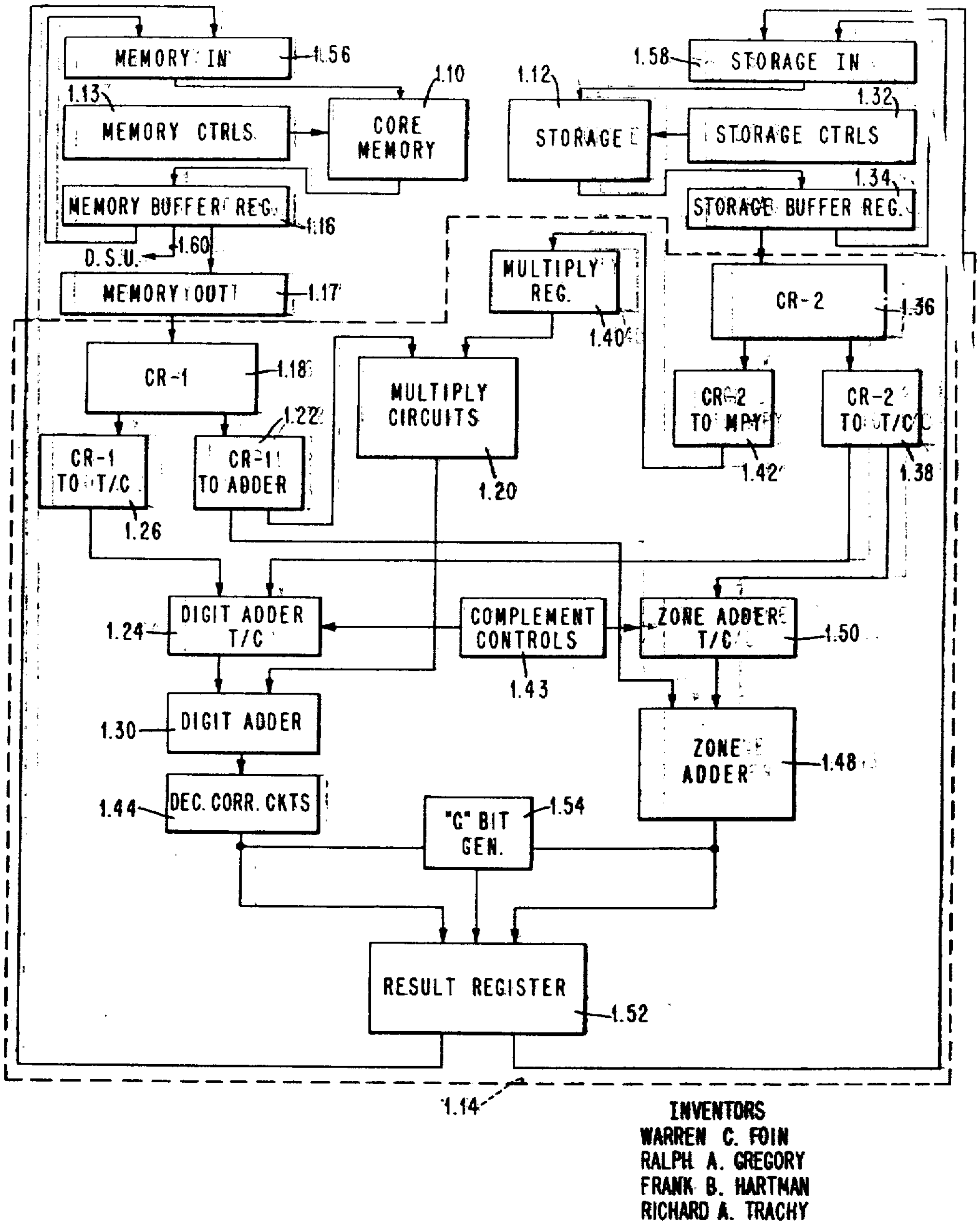

The Data Processing System or Central Processing Unit (CPU) shown in FIG. 1 includes a pair of core storage devices designated as Core Memory 1.10 and Storage 1.12. Memory 1.10 is the principal storage area and is capable of storing and transmitting instructions and data by means of Memory Control 1.13. All data coming into or going out of the Arithmetic and Logical Unit (ALU), shown generally as 1.14, must eventually go through Core Memory. On a Read Memory operation, the contents of a specified location in Memory comprising five characters are placed in a Memory Buffer Register 1.16 and are retained there for further use. From the Memory Buffer Register, the Memory Out switch 1.17 determines which one of the five characters is placed in a Character Register 1 (CR 1) 1.18. The numerical bits of CR 1 (8, 4, 2, 1) are sent to a Digit Adder 1.30 either through Multiply circuits 1.20 by way of CR 1 to Adder controls 1.22, or through the Digit Adder True Complement controls (T/C) 1.24 via CR 1 to True Complement control 1.26. Single characters are read from core Storage 1.12 by means of Storage controls 1.32 and are placed in a Storage Buffer Register 1.34. From the Storage Buffer Register, the information is moved to a Character Register 2 (CR 2) 1.36. Since only one character at a time is read from Storage as opposed to five characters being read from Memory, character selection controls (such as Memory Out circuits 1.17) are not required for CR 2. The numerical bits of CR 2 (8, 4, 2, 1) are sent to the Digit Adder True Complement controls 1.24 by way of CR 2 to True Complement controls 1.38. The numerical bits of the character contained in CR 2 may be placed in a Multiply register 1.40 by way of CR 2 to Multiply (MPY) Register controls 1.42. The numerical portion of the contents of CR 1 and CR 2 are either complemented or passed unmodified to the Digit Adder 1.30 under control of Complement controls 1.43. The numerical portion of the contents of CR 1 (1.18) are multiplied by the contents of the Multiply register 1.40 and passed to the Digit Adder 1.30 under control of CR 1 to Adder Switch 1.22.

In the Digit Adder 1.30, numbers are added in the binary form; however, circuits are arranged so that the numbers are always decimally corrected by Decimal Correction circuits 1.44 unless such correction is intentionally suppressed. The zone portion (B, A) of characters contained in CR 2 are either complemented or passed unmodified to a Zone Adder 1.48 under control of Zone Adder-True Complement controls 1.50. The zone portion (B, A) of characters contained in CR 1 are passed via CR 1 to Adder controls 1.22 to Zone Adder 1.48. Normally, the Zone Adder does not add zone bits but merely passes such information through from either CR 1 or CR 2 (but not both) in unchanged form; however, by the use of certain instructions, zone bits may be added or subtracted.

By the use of certain instructions zone bits in CR 1 may be used to place digits in the Digit Adder 1.30, and digit bits in CR 2 may be used to place zone bits in the Zone Adder 1.48.

The output of the Decimal Correction Circuits 1.44 and the Zone Adder 1.48 may be placed in a Result Register 1.52 with the proper redundancy bit inserted by a C bit Generator 1.54.

The contents of the Result Register 1.52 may be stored in Core Memory 1.10 or the original characters read from Memory into the Memory Buffer Register 1.16 may be returned to Memory under control of a Memory In control 1.56. Likewise, the contents of the Result Register 1.52 may be placed in Storage by way of Storage In controls 1.58. If the contents of the Result Register are not sent to Storage, then the original character in the Storage Buffer Register 1.34 is returned to Storage by way of the Storage In controls 1.58. Communication with Memory may be had with input-output data storage units (D.S.U.) through the use of the Memory Buffer Register and Parallel Character Transfer Busses 1.60.

The system of FIG. 1 may use Overlap Mode Control, wherein data read from Memory and/or Storage during the Read portion of the cycle is used for computation during the Write portion of that cycle and also during the Read portion of the following cycle. The result of this computation is then returned to Memory or Storage during the Write portion of the second cycle.

As a general introduction to operation of the Data Processing System, several examples of operations performed in response to typical instructions will be described with reference to FIG. 1.

EXAMPLE I.—RESET AND ADD

A Reset and Add instruction enters a numerical field obtained from Core Memory 1.10 in core Storage 1.12. The address contained in the instruction specifies the location of the field in Memory and the particular part of Storage to be used. The Memory controls 1.13 cause the characters beginning with the lowest order character in the Memory field to be read from Memory into the Memory Buffer Register 1.16 in five character groups, and cause the characters to be read serially into CR 1 (1.18) via the Memory Out switch 1.17. The characters are transferred serially from CR 1 (1.18) to the Result Register 1.52 by way of CR 1 to Adder controls 1.22, Multiply circuits 1.20, Digit Adder 1.30, and Decimal Correction circuits 1.44. In response to the Storage Address contained in the instruction, the Storage controls 1.32 cause the characters from the Result Register 1.52 to be entered serially in core Storage 1.12 via Storage In controls 1.58. The transfer of characters continues until the upper limit of the Storage field is identified with a Storage Mark (a non-numerical character extracted from Core Memory 1.10 and sensed in CR 1, 1.18). The contents of Core Memory remain unchanged.

EXAMPLE II.—ADD

Considering now that a factor has been entered in Storage as described above, an Add instruction adds a numerical field from Core Memory 1.10 to the factor in core Storage 1.12. The address part of the Add instruction specifies the locations in Memory and the core Storage unit which contain the numerical fields to be added. Starting with the lowest order of each numerical field, the characters are obtained from Memory and Storage and placed in CR 1 (1.18) and CR 2 (1.36), respectively. The numeric bits of the characters in CR 1 and CR 2 are transferred unmodified to the Digit Adder 1.30 and the sum is decimally corrected in Decimal Correction circuits 1.44 and placed in the Result Register 1.52. The contents of the Result Register represent the sum of corresponding orders of the Memory and Storage fields and these contents replace the original factor in Storage (the original contents of Memory remain).

Considering the timing of the operation just described, after the Instruction cycle has been completed, Execution cycles, having Read and Write portions, occur in succession. During the Read portion of the first Execution cycle two characters are obtained, one from Memory and one from Storage respectively, to be added; and during the Write portion of the first cycle no result is returned to Storage since addition of the first two numbers is in progress. The Read portion of the second cycle is used to obtain the next characters to be operated upon. During the Write portion of the second cycle, when addition of the characters obtained during the first cycle has been completed, the result of such addition is written into the same address in Storage read from during the first cycle. Overlapping of addition and Storage operations continues until the limit of the result is identified by a Storage Mark, except under certain conditions described in detail later. The contents of the Memory field remain unchanged.

EXAMPLE III.—STORE

A numerical field in core Storage 1.12 is placed in Core Memory 1.10 by a Store instruction having an address portion specifying the Storage location from which data is obtained and the location in Core Memory at which the field is to be stored. In response to Storage controls 1.32, numeric characters are placed in CR 2 (1.36) successively and transferred to the Result Register 1.52 T/C controls 1.38, Digit Adder T/C controls 1.24, Digit Adder 1.30 and Decimal Correction circuits 1.44. Under control of Memory controls 1.13, the contents of the Result Register 1.52 are placed in Core Memory at successively lower locations via Memory In Controls 1.56. The transfer between core Storage and Core Memory continues until a Storage Mark is detected. The Store Instruction does not affect the contents of the field in core Storage.

The operations discussed in the examples above are described in more detail with reference to FIG. 2, and still more specifically with reference to the figures which follow FIG. 2, in the aforementioned U.S. Patent No. 3,027,081, Overlap Mode Control O. D. Evans et al., between column 15, line 19, and column 74.

The character code system employed for representing information uses a seven bit code for each character. A numeric portion expresses numeric information in the binary coded decimal notation (BCD), as mentioned previously, and a zone portion, in combination with the numeric portion, expresses alphabetic and symbolic information. These seven bits are divided into the following groups:

| Check | Zone | Numeric |
|---|---|---|
| C | B, A | 8, 4, 2, 1 |

The bit structure of a character may be expressed by placing a line over a bit not present in a character, for example, the number five (5) is written $\bar{C}\ \bar{B}\ \bar{A}\ \bar{8}\ 4\ \bar{2}\ 1$. Alternately, the characters may be expressed in binary form using a "1" to denote the presence of a bit and a "0" to denote the absence of a bit, for example, the number five (5) is written 0000101. Often it becomes convenient in the circuits to utilize the absence of a bit or bits within a character and when so doing, the bits of a character are inverted so that a "0" becomes a "1," or, for example, a line labeled $\bar{B}$ has a positive signal thereon when the B bit is "0."

The C bit (check bit) is used when the number of Zone and Numeric bits in a character results in an odd sum so that, in all cases, the sum of all of the bits in the character, including a C bit, is an even amount. During the operations on information throughout the data processing system, the sum of the character bits is checked for an even total.

As shown in the examples, there is an absence of bits in the Zone positions when numeric information is represented and the value of the numeric portion is the sum of 8, 4, 2, 1 bits. When "0" is expressed, as a character, it is represented by an "8" bit and a "2" bit (0001010), but within the arithmetic and addressing units of the system, "0" is represented by the absence of bits. Alphabetic and symbolic characters are represented by combinations of Zone and Numeric bits. The following chart shows representative bit configuration for each character and symbol.

*Chart I*

| Alphabetic | | | | Numerical | | | |
|---|---|---|---|---|---|---|---|
| Char | C | BA | 8421 | Char | C | BA | 8421 |
| A | 1 | 11 | 0001 | 1 | 1 | 00 | 0001 |
| B | 1 | 11 | 0010 | 2 | 1 | 00 | 0010 |
| C | 0 | 11 | 0011 | 3 | 0 | 00 | 0011 |
| D | 1 | 11 | 0100 | 4 | 1 | 00 | 0100 |
| E | 0 | 11 | 0101 | 5 | 0 | 00 | 0101 |
| F | 0 | 11 | 0110 | 6 | 0 | 00 | 0110 |
| G | 1 | 11 | 0111 | 7 | 1 | 00 | 0111 |
| H | 1 | 11 | 1000 | 8 | 1 | 00 | 1000 |
| I | 0 | 11 | 1001 | 9 | 0 | 00 | 1001 |
| J | 0 | 10 | 0001 | Numerical zero | | | |
| K | 0 | 10 | 0010 | 0 | 0 | 00 | 1010 |
| L | 1 | 10 | 0011 | Special char. | | | |
| M | 0 | 10 | 0100 | . | 1 | 11 | 1011 |
| N | 1 | 10 | 0101 | □ | 0 | 11 | 1100 |
| O | 1 | 10 | 0110 | $ | 0 | 10 | 1011 |
| P | 0 | 10 | 0111 | * | 1 | 10 | 1100 |
| Q | 0 | 10 | 1000 | , | 0 | 01 | 1011 |
| R | 1 | 10 | 1001 | % | 1 | 01 | 1100 |
| S | 0 | 01 | 0010 | # | 1 | 00 | 1011 |
| T | 1 | 01 | 0011 | @ | 0 | 00 | 1100 |
| U | 0 | 01 | 0100 | & | 0 | 11 | 0000 |
| V | 1 | 01 | 0101 | - | 1 | 10 | 0000 |
| W | 1 | 01 | 0110 | Blank | 1 | 01 | 0000 |
| X | 0 | 01 | 0111 | / | 0 | 01 | 0001 |
| Y | 0 | 01 | 1000 | | | | |
| Z | 1 | 01 | 1001 | | | | |

| | Char | C | BA | 8421 |
|---|---|---|---|---|
| Storage Mark (SM) | 0 | 0 | 00 | 0000 |
| Plus Zero | 0 | 0 | 11 | 1010 |
| Minus Zero | 0 | 1 | 10 | 1010 |
| Record Mark | | 1 | 01 | 1010 |
| Group Mark | | 0 | 11 | 1111 |
| Tape Mark | | 0 | 00 | 1111 |

CYCLES

An operation period is defined as the period of time during which the Data Processing System reads, interprets and performs instructions. Character cycles are classified according to the time in which they occur during an operation. The first Character cycle, of each operation, is the Instruction Character Cycle, ICC, and it is during this cycle that the five characters of an Instruction are obtained from Core Memory, the Operation code is recognized, various registers and controls are set, and the five characters comprising the Instruction are written back in the Core Memory. Following the Instruction cycle is a period defined as Execute time having a number of Execution Character Cycles which depend, in part, upon the type of Instruction. For some Instructions, the number of Execution Character Cycles varies according to the length of the fields involved, although at least one Execution Character Cycle (ECC 1) is always required. The first Execute Cycle, namely, Execution Character Cycle 1 (ECC 1), is characterized by certain special functions to prepare for succeeding operations. For example, in arithmetic instructions, the Sign must be removed from a character addressed in Memory. In the Store for Print Instruction, the first character placed in Core Memary is either a Blank or a Hyphen depending on the setting of the Sign trigger of the Storage unit. In some instances, an Execution Character Cycle 2 (ECC 2) follows an ECC 1 cycle for the primary purpose of identifying a second Execute cycle when the need arises for certain operations. Following ECC 1 or ECC 2 are as many Execute cycles as are necessary to complete the operation called for by the Instruction.

More complex instructions generate their routing lines in groups under control of "Type Cycle Triggers," during Execute time. As will be explained with reference to the Load Zones as Digits Instruction, one Type cycle may continue for more than one Execute Character Cycle.

OVERLAP MODE FLOW DIAGRAMS

Referring to FIG. 136*f*, the Memory Read Mode Flow Diagram is shown. As long as there is no transition, the line Read Memory is UP. If there is a transition, the stepping of MAC 1 is blocked. The line (—) on Block Step MAC 1 is routed in the execution of all instructions using the Memory Read Mode, though the line is not necessarily shown in the flow diagrams of the instructions. Memory Read Mode is used to take characters from Memory to modify or control other information and return the characters to Memory unaltered. Examples of the type of operation are: Load Zones as Digits, Load, Compare, and certain parts of Add, Multiply and Divide.

Referring to FIG. 136*g*, the Storage Read Mode Flow Diagram is shown. If there is no transition, Storage is read. If there is transition, stepping of SAC is blocked. The line (—) on Block Step SAC is routed in all instructions using the Storage Read Mode, though the flow diagrams of the instructions do not indicate the use of this line. Storage Read Mode is usually used in the execution of the instructions using Memory Read Mode. The instructions Load Zones as Digits and Unload Digits as Zones, both use the Storage Read Mode.

FIG. 136*h* shows the Memory Read/Write Mode flow diagram. Memory is read and if the line MAC 1—1 is routed and a Critical Address (one ending in zero or five) is indicated in MAC 1, the Auto-Transition Trigger comes ON. This trigger comes ON also if the address in MAC 1 ends in four or nine, if the line MAC 1+1 was routed. If the turn ON of the Auto Transition Trigger results in a transition, the Mode Control Trigger is routed OFF, and stepping of MAC 1 will be blocked when the Mode Control Trigger goes OFF. If a transition does not occur, the Mode Control Trigger is routed ON and the line result to Memory is routed. The line Low Character or the line High Character will be routed depending upon whether MAC is stepped minus 1 or plus 1, in that order. Memory Read/Write mode is used when executing instructions that take characters from Memory and return new characters in their place. The Load Zones as Digits and Unload Digits as Zones are examples of instructions using this mode of overlapped operation.

Figure 136I:
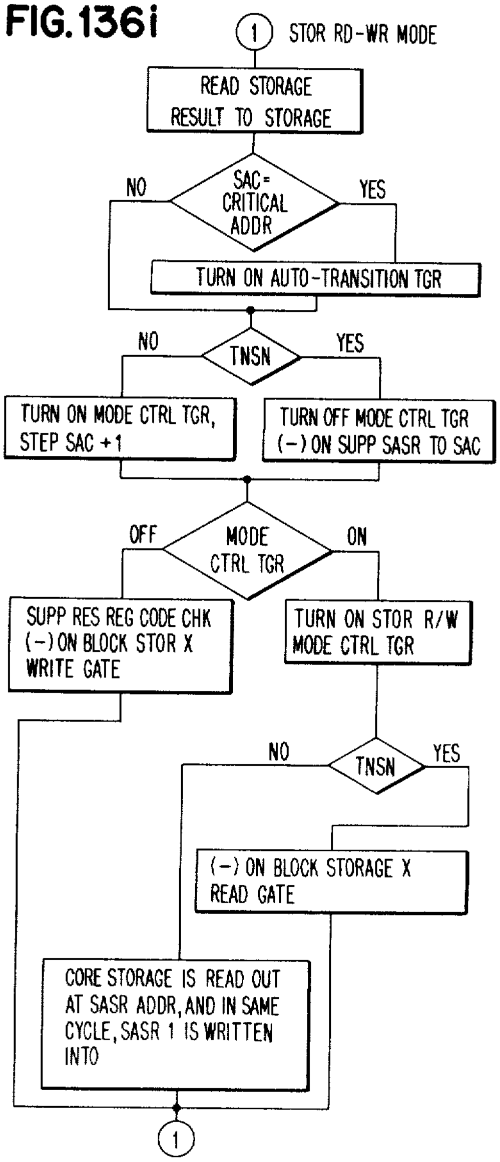

Referring to FIG. 136*i*, the Storage Read/Write mode flow diagram is shown. The lines Read Storage and Result to Storage are brought UP, and if SAC is set to a Critical Address the Auto Transition Trigger is turned On. If the turn ON of the Auto Transition Trigger results in a transition, the Mode Control Trigger is routed OFF, the line (—) on Suppress SASR to SAC is activated. Lines Suppress Result Register Code Check and (—) on Block Storage X Write Gate will be routed when the Mode Control Trigger comes ON. If the address in SAC is not critical and there is no transition, then the lines Turn ON Mode Control Trigger and Step SAC +1 are routed when the Mode Control Trigger comes ON, the line Turn ON Storage Read/Write Mode Control Trigger is brought UP. Then, if there is no transition, Storage is read out at SASR address and the SASR—1 address is written into. If there is a transition, the line (—) on Block Storage X Read Gate is made positive. The Storage Read/Write Mode is used to read a character from Storage and replace the character with a new or altered one.

GENERAL DISCUSSION OF UDZ AND LZD INSTRUCTIONS

The Unload Digits as Zones (UDZ) and Load Zones as Digits (LZD) instructions are intended for use together to reduce the length of the field to be put into storage devices of limited capacity. The UDZ instruction serves to compress the field to be written by one-third, utilizing the zone portions of pairs of characters for additional numeric data. The LZD instruction serves to expand compressed data and return it to its original form.

(*1*) *Unload digits as zones*

The UDZ instruction causes zone bits to be placed into Memory in accordance with the numeric portions of characters in Storage. Since the bits comprising a character are seven (C B A 8 4 2 1), it is necessary to load the four numeric bits 8, 4, 2 and 1 of one Storage character into the zones B and A of two Memory characters. The four numeric bits of each one of the characters in Storage are placed into Memory as the A and B bits of a pair of characters, by means of circuitry associated with the Zone adder.

A first character in Storage is placed into CR 2. A first character in Memory is placed into CR 1. A and B bits are emitted from the Zone Adder output in accordance with the 1 and 2 bits of the first Storage character in CR 2, and the numeric bits of the first Memory character in CR 1 are routed through the Digit Adder. The character appearing in the Result Register thus comprises the original 8, 4, 2 and 1 bits of the first Memory character, the 1 and 2 bits of first Storage character and a C bit generated by the C Bit Generator. This character is stored in Memory at the address of the first Memory character and a second Memory character is brought into CR 1.

A and B bits are emitted from the Zone Adder Output in accordance with the 4 and 8 bits of the first Storage character in CR 2, and the numeric bits of the second Memory character in CR 1 are routed through the Digit Adder. The character appearing in the Result Register thus comprises the original 8, 4, 2 and 1 bits of the second Memory character, the 4 and 8 bits of the first Storage character and a C bit generated by the C Bit Generator. This character is stored in Memory at the address of the second Memory character. A pair of Memory characters now contains the numeric portions of three characters; the original two numeric portions of the first and second Memory characters and the numeric portion of the first Storage character. The latter numeric portion appears in Memory as the zone portions of the first and second Memory characters.

These operations are repeated, to move the numeric portions of Storage characters into the zone portions of pairs of Memory characters until the Storage Mark Trigger is operated by a Storage Mark in CR 2, indicating the end of a field, which terminates execution of the UDZ instruction.

A flow diagram of the Unload Digits as Zone instruction is shown in FIG. 153. This diagram does not include lines activated during the overlap modes of operation shown in FIGS. 136*f* to 136*i*. With the output of the Operation Decoder being UDZ and the machine in Execution Time and Storage Read Mode, and with the Storage Mark Trigger OFF the following lines are made positive: Memory Read/Write Mode, CR 1 to adder, Digit Adder, Step MAC 1-1 and Generate C Bit out. Auxiliary Trigger AT 1 is alternately turned ON and OFF to define the cycles in which zones are added to the Memory field due to either the 1 and 2 bits or the 4 and 8 bits of the Storage character.

If AT is ON, line Step SAC+1 is made positive, and Emit A Bit and Emit B Bit are made positive if corresponding lines CR 2-1 Bit and CR 2-2 Bit respectively are positive. If either of lines CR 2-1 Bit or CR 2-2 Bit is not positive then the corresponding line Emit A Bit or Emit B Bit is not made positive either. Thus A and B bits are generated in accordance with the 1 and 2 bits in CR 2. If the machine is not in transition, as indicated by line Transition not being positive, then line Turn OFF Auxiliary Trigger 1 is made positive, and the operation repeats.

With the machine again in Storage Read Mode and the Storage Mark Trigger OFF, the following lines are again made positive: Memory Read/Write Mode, CR 1 to Adder, Digit Adder Out, Step MAC 1–1 and Generate C Bit Out. Since AT 1 is now OFF lines Emit A Bit and Emit B Bit will be made positive if corresponding ones of lines CR 2–4 Bit and CR 2–8 Bit are positive. If the machine is not in transition, line Turn ON Auxiliary Trigger 1 will become positive and the first of the above operations (controlling lines CR 2–2 Bit and CR 2–2 Bit) will be repeated.

In summary, assuming that the Storage Mark Trigger remains OFF and the Transition lines does not become positive, AT 1 is alternately turned ON and OFF. Line Step SAC +1 is made positive only when AT 1 is ON whereas Line Step MAC 1–1 is made positive when AT 1 is either ON or OFF. CR 2 bits 1 and 2 are interrogated when AT 1 is ON, and CR 2 bits 4 and 8 are interrogated when AT 1 is OFF.

If the Transition line is positive AT 1 will remain either ON or OFF and will not be switched. The Lines Storage Read Mode, Memory Read/Write Mode, CR 1 to Adder, Digit Adder Out, Step MAC 1–1 and Generate C Bit Out are made positive whether the machine is in transition or not. As explained previously with reference to FIGS. 136*g* and 136*h*, line (−) on Block Step MAC 1 and (−) on Block Step SAC may be actuated during a Transition Cycle.

Once the Storage Mark Trigger comes ON, none of the above operations occur thereafter. Then only lines Suppress CR 1 Code Check and End E Time are made positive, the UDZ instruction execution being ended.

(2) *Load zones as digits*

The LZD instruction causes numeric bits to be placed in Storage in accordance with the zone portions of pairs of characters in Memory. It is necessary to use the four zone bits of two Memory characters to supply the four numeric bits of one Storage character. The four zone bits of a pair of Memory characters are placed into Storage as the numeric bits of a Storage character by means of circuitry associated with the Digit Adder.

Since CR 1 only holds one character at a time it is necessary to utilize apparatus for storing the zone bits of a first Memory character after this first character has been replaced in CR 1 by a second character. The Auxiliary Triggers AT 1 and AT 2 accomplish this purpose.

A first Memory character is placed into CR 1. AT 1 is turned ON if there is an A bit in CR 1 and AT 2 is turned ON if there is a B bit in CR 1. The first Memory character in CR 1 is then replaced by a second Memory character. 1 and 2 bits are emitted to the Digit Adder if AT 1 and AT 2 respectively are ON, and 4 and 8 bits are emitted to the Digit Adder if there are A and B bits respectively in CR 1.

The character appearing in the Result Register thus comprises numeric bits in accordance with the A and B bits from two Memory characters and a C bit generated by the C Bit Generator. Assuming that these Memory characters originated during a UDZ instruction, then the numeric bits in the Result Register represent the numeric portion of a Storage character. The character in the Result Register is placed into Storage at a first Storage address.

These operations are repeated to move the zone bits of pairs of Memory characters into the numeric bits of individual Storage characters until the Storage Mark Trigger is operated by a Storage Mark in CR 2, indicating the end of a field. When the end of a field is indicated the zones are removed from Memory characters by routing the numeric portion of each character from CR 1 into the Digit and Zone Adders but, not using the Zone Adder output. The character appearing in the Result Register, stripped of its zone portions, is transferred to its location in Memory with a C bit generated by the C Bit Generator. The order of processing was kept the same as the order used for the first parts of the LZD instruction by having transferred the SPC and MAR contents to SAC and MAC respectively. Thus the execution of the LZD instruction is finally terminated by a second operation of the Storage Mark Trigger by a Storage Mark in CR 2.

A flow diagram of the LZD instruction is shown in FIG. 154, Sheets 1 and 2. Lines activated during the Overlap Modes of operation as shown in FIGS. 136*f* to 136*i*, are omitted. Three LZD Type Cycles are used. LZD Type Cycle 1 reads one Memory position and LZD Type Cycle 2 reads the next Memory position, alternately. LZD Type Cycle 3 terminates the instruction. The machine is not in Overlap Mode during LZD Type Cycle 1 and LZD Type Cycle 2.

With the Operation Decoder output being LZD and the machine in Execute time and LZD Type Cycle 1, the lines Read Memory and Read Storage are made positive. If the Line ECC 1 is positive then lines Turn ON DZT and Step MAC 1–1, Read Memory and Read Storage are made postive. If the line ECC 1 is no longer positive and the line ECC 2 is positive the Storage Mark Trigger is OFF and the line CR 2=SM is not positive, then lines Turn ON Auxiliary Trigger 1 (W0) and Turn ON Auxiliary Trigger 2 (W0) becomes positive if corresponding ones of Lines CR 1–A and CR 1–B are positive. Thus the A and B Zone Bits in CR 1 are stored in AT 1 and AT 2 respectively. If the Storage Mark Trigger was ON, Line End E Time Goes UP ending Execution of the instruction. If the machine is not in transition (i.e., a transition due to a Code Check) line Step MAC 1–1 again becomes positive and LZD Type Cycle 2 is entered.

In LZD Type Cycle 2, lines Digit Adder Out, Suppress Adder Carry and Generate C Bit Out become positive. If the Storage Mark Trigger is OFF and the line Transition is not positive (i.e., transition due to a Code Check), the following lines become positive: Read Memory, Read Storage, Result to Storage, Step SAC +1, Step MAC 1–1, Turn OFF Auxiliary Trigger 1 and Turn OFF Auxiliary Trigger 2. If AT 1 or AT 2 were ON, corresponding ones of lines 1 Bit to Adder and 2 Bit to Adder will become positive. If lines CR 1–A and CR 1–B are positive, corresponding ones of lines 4 Bit to Adder and 8 Bit to Adder are made positive. Thus numeric bits 1, 2, 4 and 8 are sent to the Adder according to the A and B Bits of two Memory words, one that was in CR 1 during LZD Type Cycle 1, its zone bits being stored at AT 1 and AT 2, and the other being in CR 1 during LZD Type Cycle 2. If the line Digit Adder Output 0 is not positive, the Line Turn OFF Digit Zero Trigger is made positive. LZD Type Cycle 1 is re-entered, whether or not the line Digit Adder Output 0 is positive.

The lines Read Memory and Read Storage are made positive in LZD Type Cycle 1. If lines ECC 1 and ECC 2 are no longer positive, and line CR 2=SM is not positive, the zone bits A and B in CR 1 are stored in AT 1 and AT 2 as before. If the machine is not in transition, MAC 1–1 is stepped and LZD Type Cycle 2 is re-entered. As long as no Storage Mark is encountered and the machine is not in transition, LZD Type Cycles 1 and 2 will alternate.

In summary, assuming that no Storage Marks occur and there is no transition, the zone bits A and B of one Memory Character in CR 1 will make the lines Turn ON Auxiliary Trigger 1 (W0) and Turn ON Auxiliary Trigger 2 (W0) positive if the lines CR 1–A and CR 1–B respectively are positive during each LZD Type Cycle 1. The zone bits of a second Memory character replacing the first Memory character in CR 1, and the zone bits stored in AT 1 and AT 2 will cause corresponding ones of lines 1 Bit to Adder, 2 Bit to Adder, 4 Bit to Adder and 8 Bit to Adder to go positive during each LZD Type Cycle 2. The lines Read Memory, Read Storage and Step MAC 1–1 are made positive during each of LZD Type Cycles 1 and 2. The following lines are made positive only during LZD Type Cycle 2: Digit Adder Out, Suppress Carry, Generate C Bit Out, Result to Storage, Step SAC +1, Turn OFF Auxiliary Trigger 1, Turn OFF Auxiliary Trigger 2 and Turn OFF Digit Zero Trigger. The line Turn ON Digit Zero Trigger is made positive only once, during the first LZD Type Cycle 1, and not again. The Line MAC 1–1 is made positive twice during the first LZD Type Cycle 1, and then only once during each following LZD Type Cycle 1. Line MAC 1–1 is thereafter made positive twice for each once that line SAC 1+1 is made positive.

If the Transition Trigger comes ON during LZD Type Cycle due to a positive line CR 2=SM during Type Cycle 1, and the line Storage Mark Trigger is positive during Type Cycle 2, the following lines become positive: Suppress CR 1 Code Check, Set MAC 1 to MAR, Set SAC to SPC, Turn OFF Auxiliary Trigger 1, and Turn OFF Storage Mark Trigger. The machine then enters LZD Type Cycle 3.

In LZD Type Cycle 3 (overlapped operation) the following lines are made positive: Storage Read Mode, Memory Read/Write Mode, CR 1 to Adder, Generate C Bit, Digit Adder Out, Step MAC 1–1, Suppress Adder Carry and Set Storage Sign (+). These lines route the Memory characters in the same order used during LZD Type Cycles 1 and 2 through the Adder, stripping the zone bits A and B from the characters by using only the Digit Adder Output. If the line CR 2=Storage Mark is not positive, the Storage Mark Trigger is OFF, and the Auxiliary Trigger 1 is OFF: the line Step SAC +1 is made positive and the Auxiliary Trigger 1 is turned ON. LZD Type Cycle 3 is then repeated, with the exception that since AT 1 is ON, it will next be turned OFF.

In summary, assuming that no Storage Mark occurs LZD Type Cycle 3 is repeated with AT 1 alternating ON and OFF. The line Step SAC +1 is made positive only when AT 1 is off. The line Step MAC 1–1, as well as all other lines above (except Step SAC +1) become positive whether AT 1 is ON or OFF.

If the line CR 2=SM becomes positive during LZD Type Cycle 3, line Turn ON Transition Trigger goes positive in the next cycle and if the Storage Mark Trigger is OFF, Type Cycle 3 is repeated. If the Storage Mark Trigger is ON during this last repeat of Type Cycle 3, Line End E Time is made positive terminating execution of the LZD instruction.

EXAMPLES OF UDZ AND LZD INSTRUCTIONS

(1) *Example: Unload digits as zones*

Referring to the UDZ Instruction Timing Chart, FIG. 155, an example of the execution of the Unload Digits as Zones Instruction will be given.

The contents of Storage and Memory at the addresses indicated, are as follows:

| Storage Address | C B A 8 4 2 1 | Character |
|---|---|---|
| 0 | 0 0 0 0 1 0 1 | 5 |
| 1 | 0 0 0 0 1 1 0 | 6 |
| 2 | 1 0 0 0 1 1 1 | 7 |
| 3 | 0 0 0 1 0 0 1 | 9 |
| 4 | 0 0 0 0 0 0 0 | SM |
| Memory Address | | |
| 998 | 0 0 0 0 1 1 0 | 6 |
| 997 | 0 0 0 0 1 0 1 | 5 |
| 996 | 1 0 0 0 1 0 0 | 4 |
| 995 | 0 0 0 0 0 1 1 | 3 |
| 994 | 1 0 0 0 0 1 0 | 2 |
| 993 | 1 0 0 0 0 0 1 | 1 |
| 992 | 0 0 0 1 0 1 0 | 0 |
| 991 | 1 0 0 0 1 1 1 | 7 |
| 990 | 1 0 0 1 0 0 0 | 8 |

The instruction Unload Zones as Digits is in the Operations Register. At start cycle ECC 1 with AUX Trigger 1 OFF in the Storage Read and Memory Read/Write Modes of overlapped operation, a block of five Memory characters, including the four at addresses 998 to 995, are read from Memory into MBR, and the digit bits 2 and 4 of the Memory character 6 at Memory address 998 are read from MBR into CR 1. The digit bits 1 and 4 of the Storage character 5 at Storage address 0 are read from Storage into CR 2. The 4 and 8 bit positions of CR 2 are not interrogated in ECC 1 because the Add Trigger is not ON. The digit bits of the Memory character 6 are routed to the Result Register. There is no character previously in the Result Register so that nothing is written into Memory from the Result Register during ECC 1. MAC 1 is not stepped during ECC 1 because the Mode Control trigger is OFF. AUX Trigger 1 is routed ON. The contents of Storage and Memory are the same as before.

Note that in the Memory Read/Write Mode, with the Mode Control Trigger ON, the address contained in MAC 1 is the address of the place in Memory into which a character is to be written. The address in Memory read from is one address lower (in this instruction). Thus, when the Mode Control Trigger comes ON in ECC 2 MAC 1 will read from Memory at an address lower than the one read in ECC 1, without having been stepped. This makes it possible in ECC 2 to write into the Memory address read from in ECC 1.

At ECC 2 with AUX Trigger 1 ON and the Add and Mode Control Triggers ON, in the Storage Read and Memory Read/Write Modes of overlapped operation, the digit bits 1 and 4 of the Memory character 5 at Memory address 997 are read from MBR into CR 1. The digit bits 1 and 4 of the Storage character 5 are in CR 2. The 1 and 2 bit positions of CR 2 are interrogated resulting in the emission of an A bit from the Zone Adder Output to the Result Register, while the digit bits of the Memory character 5 are routed to the Result Register. A C bit is generated to validate the new character formed by the Memory character digit bits 2 and 4 previously routed to the Result Register during ECC 1 and the newly emitted A zone bit. This character is written into Memory at Memory address 998, MAC 1 is stepped minus one to address 997. SAC is stepped plus one to address 1 and AUX Trigger 1 is routed OFF.

At ECC 3 with AUX Trigger 1 OFF in the Storage Read and Memory Read/Write Modes of overlapped operation, the digit bit 4 of the Memory character 4 at Memory address 996 are read from MBR into CR 1; and, the digit bits 2 and 4 of the Storage character 6 at Storage address 1 are read from Storage into CR 2. The 4 and 8 bit positions of CR 2 (which still contains the Storage character digit bits 1 and 4) are interrogated resulting in the emission of an A bit from the Zone Adder output to the Result Register, while the digit bit 4 of the Memory character is routed to the Result Register. A C bit is generated to validate the new character formed by the Memory character digits bits 1 and 4 previously routed to the Result Register during ECC 2 and the newly emitted A zone bit. This character is written into Memory at Memory address 997. MAC 1 is stepped minus one to address 996 and AUX Trigger 1 is routed ON. The contents of Storage and Memory are:

| Storage Address | C B A 8 4 2 1 | Character |
|---|---|---|
| 0 | 0 0 0 0 1 0 1 | 5 |
| 1 | 0 0 0 0 1 1 0 | 6 |
| 2 | 1 0 0 0 1 1 1 | 7 |
| 3 | 0 0 0 1 0 0 1 | 9 |
| 4 | 0 0 0 0 0 0 0 | SM |
| Memory Storage | | |
| 998 | 1 0 1 0 1 1 0 | 6} 5 |
| 997 | 1 0 1 0 1 0 1 | 5} 5 |
| 996 | 1 0 0 0 1 0 0 | 4 |
| 995 | 0 0 0 0 0 1 1 | 3 |
| 994 | 1 0 0 0 0 1 0 | 2 |
| 993 | 1 0 0 0 0 0 1 | 1 |
| 992 | 0 0 0 1 0 1 0 | 0 |
| 991 | 1 0 0 0 1 1 1 | 7 |
| 990 | 1 0 0 1 0 0 0 | 8 |

At ECC 4 with AUX Trigger 1 ON in the Storage Read and Memory Read/Write Modes of overlapped operation, the digit bits 1 and 2 of the Memory character 3 at Memory address 995 are read from MBR into CR 1 and the digit bits 2 and 4 of the Storage character 6 are in CR 2. The 1 and 2 bit positions of CR 2 are interrogated resulting in the emission of a B bit from the Zone Adder Output to the Result Register, while the digit bits 1 and 2 of the Memory character 3 are routed to the Result Register. No C bit is necessary to validate the new character formed by the Memory character digit bit 4 previously routed to the Result Register during ECC 3 and the newly emitted B zone bit. This character is written into Memory at Memory address 996. MAC 1 is stepped minus one to address 995. SAC is stepped plus one to address 2, and AUX Trigger 1 is routed OFF.

At ECC 5 Transition cycle with AUX Trigger 1 OFF and the Transition Trigger ON, in the Storage Read and Memory Read/Write Modes of overlapped operation, the Memory character is read from MBR and is blocked from entering CR 1, for reasons that will be explained below. The digit bits 1, 2 and 4 of the Storage character 7 at Storage address 2 are read from Storage into CR 2. The 4 and 8 bit positions of CR 2 (which still contains the 2 and 4 digit bits of Storage character 6) are interrogated resulting in the emission of an A bit from the Zone Adder output to the Result Register. A C bit is generated to validate the new character formed by the Memory character digit bits 1 and 2 previously routed to the Result Register during ECC 4 and the newly emitted A zone bit, this character being written into Memory at Memory address 995. MAC 1 is stepped minus one to address 994. The Transition Trigger keeping AUX Trigger 1 OFF is routed OFF. The contents of Storage and Memory are:

| Storage Address | C B A 8 4 2 1 | Character |
|---|---|---|
| 0 | 0 0 0 0 1 0 1 | 5 |
| 1 | 0 0 0 0 1 1 0 | 6 |
| 2 | 1 0 0 0 1 1 1 | 7 |
| 3 | 0 0 0 1 0 0 1 | 9 |
| 4 | 0 0 0 0 0 0 0 | SM |
| Memory Address | | |
| 998 | 1 0 1 0 1 1 0 | 6 } 5 |
| 997 | 1 0 1 0 1 0 1 | 5 } |
| 996 | 0 1 0 0 1 0 0 | 4 } 6 |
| 995 | 1 0 1 0 0 1 1 | 3 } |
| 994 | 1 0 0 0 0 1 0 | 2 |
| 993 | 1 0 0 0 0 0 1 | 1 |
| 992 | 0 0 0 1 0 1 0 | 0 |
| 991 | 1 0 0 0 1 1 1 | 7 |
| 990 | 1 0 0 1 0 0 0 | 8 |

At the end of the fourth cycle ECC 4, MAC 1 came to a Critical Address (995). A Critical Address occurs during the Memory Read/Write Mode in this instruction whenever MAC 1 is set to an address ending in 5 to 0. This indicates the last (fifth) character in the block of five characters in MBR. In this example, the starting address in Memory was 998; recognition of a Critical Address occurring after four characters had been addressed. Thus, the choice of 988 as a starting address has resulted in the use of only four characters of the block of five transferred from Memory to the MBR. Since MAC 1 was set to 995, it would normally route the character at the next lower address (994) into CR 1 during ECC 5. This was not allowed to occur, because until the character in the highest Memory address (999) position of MBR (a character which was not specified in this example) would be read into CR 1 through the MEM OUT switches. A new block of five characters is not placed into MBR until MAC 1 is stepped to 994 (ECC 5) and the character at 994 is read (ECC 6). Therefore, it was necessary to prevent the character in the highest address position of MBR from reaching CR 1, until MAC 1 can be stepped to 994.

The Transition Trigger was turned ON during the cycle ECC 5 following recognition of the Critical Address, blocking transfer of any characters from MBR to CR 1 for one cycle. However, the fourth Memory Character (3), which was the last character of the MBR block, and the A zone bit in the Result Register were read into Memory at address 995 as previously stated. In ECC 5, with the Transition Trigger ON, the Add Trigger will fall at a W0 time and the Mode Control Trigger will fall at the next W2 time.

At Start Cycle ECC 6 with AUX Trigger 1 still OFF and the Add, Transition and Mode Control Triggers OFF in the Storage Read and Memory Read/Write Modes of overlapped operation, a block of five Memory characters having addresses from 994 to 990 are read from Memory into MBR and the digit bit 2 of the Memory character 2 at Memory address 994 is read from MBR into CR 1. The digit bits 1, 2 and 4 of the Storage character 7 are in CR 2. The 4 and 8 bit positions of CR 2 are not interrogated in ECC 6 because the Added Trigger is not ON. The digits bit 2 of the Memory character 2 is routed to the Result Register. These was no character previously routed to Result Register during ECC 5, so that nothing is written into Memory from the Result Register during ECC 6. MAC 1 is not stepped during ECC 6 because the Mode Control Trigger is OFF. The Mode Control Trigger and AUX Trigger 1 are routed ON. The contents of Storage and Memory are the same as before.

Note, as explained with reference to Start Cycle ECC 1, that the Memory character read in the next cycle will be from an address one less than the one read from in this cycle, without MAC 1 having been stepped in this cycle.

At ECC 7 with AUX Trigger 1 ON and the Add and Mode Control Triggers ON, in the Storage Read and Memory Read/Write Modes of overlapped operation, the digit bit 1 of the Memory character 1 at Memory address 993 is read from MBR into CR 1 and the digit bits 1, 2 and 4 of the Storage character 7 are still in CR 2. The 1 and 2 bit positions of CR 2 are interrogated resulting in the emission of A and B bits from the Zone Adder Output to the Result Register, while the digit bit 1 of the Memory character 1 is routed to the Result Register. A C bit is generated to validate the new character formed by the digit bit 2 of the Memory character 2 previously routed to the Result Register during ECC 6 and the newly emitted A and B zone bits. This character is written into Memory at Memory address 994. MAC 1 is stepped minus one to address 993. SAC is stepped plus one to address 3 and AUX Trigger is routed OFF.

At ECC 8 with AUX Trigger 1 OFF in the Storage Read and Memory Read/Write Modes of overlapped operation, the digit bits 2 and 8 of the Memory character 0 at Memory address 992 are read from MBR into CR 1; and, the digit bits 1 and 8 of the Storage character 9 at Storage address 3 is read from Storage into CR 2. The 4 and 8 bit positions of CR 2 (which still contains the 1, 2 and 4 digit bits of Storage character 7), are interrogated resulting in the emission of an A bit from the Zone Adder output to the Result Register, while the digit bits 2 and 8 of the Memory character 0 are routed to the Result Register. No C bit is necessary to validate the new character formed by the Memory character 1 digit bit previously routed to the Result Register during ECC 7 and the newly emitted A zone bit. This character is written into Memory at Memory address 993. MAC 1 is stepped minus one to address 992 and AUX Trigger 1 is routed ON. The contents of Storage and Memory are:

| Storage Address | C BA 8 4 2 1 | Character |
|---|---|---|
| 0 | 0 00 0 1 0 1 | 5 |
| 1 | 0 00 0 1 1 0 | 6 |
| 2 | 1 00 0 1 1 1 | 7 |
| 3 | 0 00 1 0 0 1 | 9 |
| 4 | 0 00 0 0 0 0 | SM |
| Memory address | | |
| 998 | 1 01 0 1 1 0 | 6 }5 |
| 997 | 1 01 0 1 0 1 | 5 } |
| 996 | 0 10 0 1 0 0 | 4 }6 |
| 995 | 1 01 0 0 1 1 | 3 } |
| 994 | 1 11 0 0 1 0 | 2 }7 |
| 993 | 0 01 0 0 0 1 | 1 } |
| 992 | 0 00 1 0 1 0 | 0 |
| 991 | 1 00 0 1 1 1 | 7 |
| 990 | 1 00 1 0 0 0 | 8 |

At ECC 9, with AUX Trigger 1 ON, in the Storage Read and Memory Read/Write Modes of overlapped operation, the digit bits 1, 2 and 4 of the Memory character 7 at Memory address 991 are read from MBR into CR 1 and the digit bits 1 and 8 of the Storage character 9 are in CR 2. The 1 and 2 bit positions of CR 2 are interrogated resulting in the emission of an A bit from the Zone Adder Output to the Result Register; while the digit bits 1, 2 and 4 of the Memory character 7 are routed to the Result Register. A C bit is generated to validate the new character formed by the Memory character digit bits 2 and 8 previously routed during ECC 8 to the Result Register and the newly emitted A zone bit. This character being written into Memory at Memory address 992. MAC 1 is stepped minus one to address 991. SAC is stepped plus one to address 4 and AUX Trigger 1 is routed OFF.

At ECC 10 with AUX Trigger 1 OFF in the Storage Read and Memory Read/Write Modes of overlapped operation, the digit bit 8 of the Memory character 8 at Memory address 990 is read from MBR into CR 1, and, the Storage character SM at Storage address 4 is read from Storage into CR 2. The 4 and 8 bit positions of CR 2 (which still contains the digit bits 1 and 8 of Storage character 9), are interrogated resulting in the emission of a B bit from the Zone Adder output to the Result Register, while the digit bit 8 of the Memory character 8 is routed to the Result Register. No C bit is necessary to validate the new character formed by the Memory character digit bits 1, 2 and 4 previously routed to the Result Register during ECC 9 and the newly emitted B zone bit. This character is written into Memory at Memory address 991. MAC 1 is stepped minus one to Memory address 990. The Storage Mark Trigger and Transition Trigger are routed ON. The Storage Mark Trigger is routed ON due to recognition of SM in CR 2. The Transition Trigger is routed ON due to recognition of an address in MAC 1 ending in 0. The contents of Storage and Memory are:

| Storage Address | C BA 8 4 2 1 | Character |
|---|---|---|
| 0 | 0 00 0 1 0 1 | 5 |
| 1 | 0 00 0 1 1 0 | 6 |
| 2 | 1 00 0 1 1 1 | 7 |
| 3 | 0 00 1 0 0 1 | 9 |
| 4 | 0 00 0 0 0 0 | SM |
| Memory Address | | |
| 998 | 1 01 0 1 1 0 | 6 }5 |
| 997 | 1 01 0 1 0 1 | 5 } |
| 996 | 0 10 0 1 0 0 | 4 }6 |
| 995 | 1 01 0 0 1 1 | 3 } |
| 994 | 1 11 0 0 1 0 | 2 }7 |
| 993 | 0 01 0 0 0 1 | 1 } |
| 992 | 1 01 1 0 1 0 | 0 }9 |
| 991 | 0 10 0 1 1 1 | 7 } |
| 990 | 1 00 1 0 0 0 | 8 |

At final cycle ECC 11, with the Storage Mark Trigger ON the Memory Read/Write Mode is ended and no further characters will be read out. However, Memory character (8) read into CR 1 during ECC 10, will be written into Memory address 990 during ECC 11. Normally a Code Check is made on the character in CR 1, but since the character in CR 1 during ECC 11 is not to be used at present, the Code Check is suppressed. Line End E time is brought UP, ending execution of the UDZ instruction.

More particularly, during the Instruction cycle of the UDZ Instruction the Instruction Counter contains the Memory address of the UDZ Instruction. This address should end in a 4 or a 9. Located in Memory address 01239 is the UDZ Instruction which has an Operations part—an ASU Coding of 0 and a Memory Coding of 998. The format of the UDZ Instruction follows:

| Memory Address | MBR Character | C B A 8 4 2 1 |
|---|---|---|
| 01239 | 0 | 1 1 0 0 0 0 0 |
| 01238 | 1 | 0 0 0 1 0 1 0 |
| 01237 | 2 | 0 0 0 1 0 0 1 |
| 01236 | 3 | 0 0 0 1 0 0 1 |
| 01235 | 4 | 1 0 0 1 0 0 0 |

IC contains address 01239 which refers to the UDZ Instruction above. The zone-bits of MBR characters 2 and 3 indicate the starting address (0) of the Storage field to be unloaded. The numerical bits of MBR characters 1 to 4 and the A and B zone bits of MBR character 1 and the B bit of MBR character 4 indicate the Starting address (998) of the Memory field to be repacked. At the start of the Instruction cycle the Instruction Counter contains 1239. In FIG. 32*a*, the units order trigger is set to make the IC–9 lines **32*a*.03, 32*a*.04 and 32*a*.05** positive. In the second order of the Instruction Counter of FIG. 32*b*, the 20 and 10 triggers are ON making the IC–20 lines **32*b*.06 and 32*b*.07 and the IC–10 lines 32*b*.08 and 32*b*.09** positive to indicate 30. The 80 and 40 triggers are OFF. In the third order of the Instruction Counter of FIG. 32*c*, the 200 trigger is ON making the IC–200 lines **32*c*.06 and 32*c*.07 positive. The 800, 400 and 100 triggers are OFF. In the fourth order of the Instruction Counter of 32*d*, the 1000 trigger is ON making the IC–1000 lines 32*d*.08 and 32*d*.09** positive. The 8000, 4000, and 2000 triggers are OFF. In the fifth order of the Instruction Counter of FIG. 32*e*, all of the triggers are OFF indicating "zero." At $R_0$ of the Instruction cycle the contents of the Instruction Counter are placed in the Memory Address Select Register. In FIG. 49*b*, the IC–9 line **32*a*.03 is positive and the Set MASR to IC line 93*s*.01 is positive to bring up the 1 line 49*b*.08 and the 8 line 49*b*.02**. The $\overline{2}$ and $\overline{4}$ lines are positive via the Inverters. In FIG. 49*a*, the 8, $\overline{4}$, $\overline{2}$ and 1 lines are positive and the pulse on the $R_0$ line 101.01 turns ON the MASR 4 trigger making the MASR–1 lines **49*a*.16 and 49*a*.17 and the MASR–8 lines 49*a*.03 and 49*a*.04** positive. The remaining triggers of the first order of MASR are turned OFF if ON previously, to make the MASR–2 and the MASR–4 lines positive. In the second order of MASR of FIG. 49*d*, the IC–20 line **32*b*.06 and the IC–10 line 32*b*.08 are positive and the set MASR to IC line 93*a*.01 makes the 20 line 49*b*.06 and the 10 line 49*b*.08** positive. The $\overline{80}$ and $\overline{40}$ lines are positive via the Inverters. In FIG. 49*c*, the $\overline{80}$, $\overline{40}$, 20 and 10 lines are positive to condition gates for the pulse on the $R_0$ ($D0.^4$) line 101.02 which turns ON the 20 and 10 triggers and turns OFF the 80 and 40 triggers, if ON. Therefore, the MASR–$\overline{80}$, the MASR–$\overline{40}$, the MASR–20 and MASR–10 lines are positive. In FIG. 49*f*, the IC–200 line **32*c*.06 is positive and the Set MASR to IC line 93*s*.01** is positive to bring up the 200 line 49*f*.06. The $\overline{800}$, $\overline{400}$, and $\overline{100}$ lines are positive via the Inverters. In FIG. 49*e* the $\overline{800}$, $\overline{400}$, 200 and $\overline{100}$ lines are positive to condition gates for the $R_0$ pulse on the line 101.03 to turn ON the 2 trigger and turn OFF the 8, 4 and 1 triggers, if ON. Therefore, the MASR–$\overline{800}$, MASR–$\overline{400}$, MASR–$\overline{100}$ lines are positive and the MASR–200 line **49*e*.08** is positive. In FIG. 49*h*, the IC–1000 line **32*d*.08 is positive and the Set MASR to IC line 93*s*.01 is positive to make positive the 1000 line 49*h*.08**, the $\overline{8000}$, $\overline{4000}$ and $\overline{2000}$ lines are positive. In FIG. 49*g*, the $\overline{8000}$, $\overline{4000}$, $\overline{2000}$ and 1000 lines condition gates for the $R_0$ pulse on the line 101.04 to turn ON the 1000 trigger and turn OFF the 8000, 4000 and 2000 triggers, if ON. In FIG. 49*j*, none of the input lines from the Instruction Counter are positive. Accordingly, the $\overline{40,000}$, $\overline{20,000}$ and $\overline{10,000}$ lines are positive via the Inverters. In FIG. 49*i*, the $\overline{10,000}$, $\overline{20,000}$, $\overline{40,000}$ lines condition diode gates for the $R_0$ pulse on the line 101.05 to turn OFF the fifth order triggers, if ON.

Figure 3A:
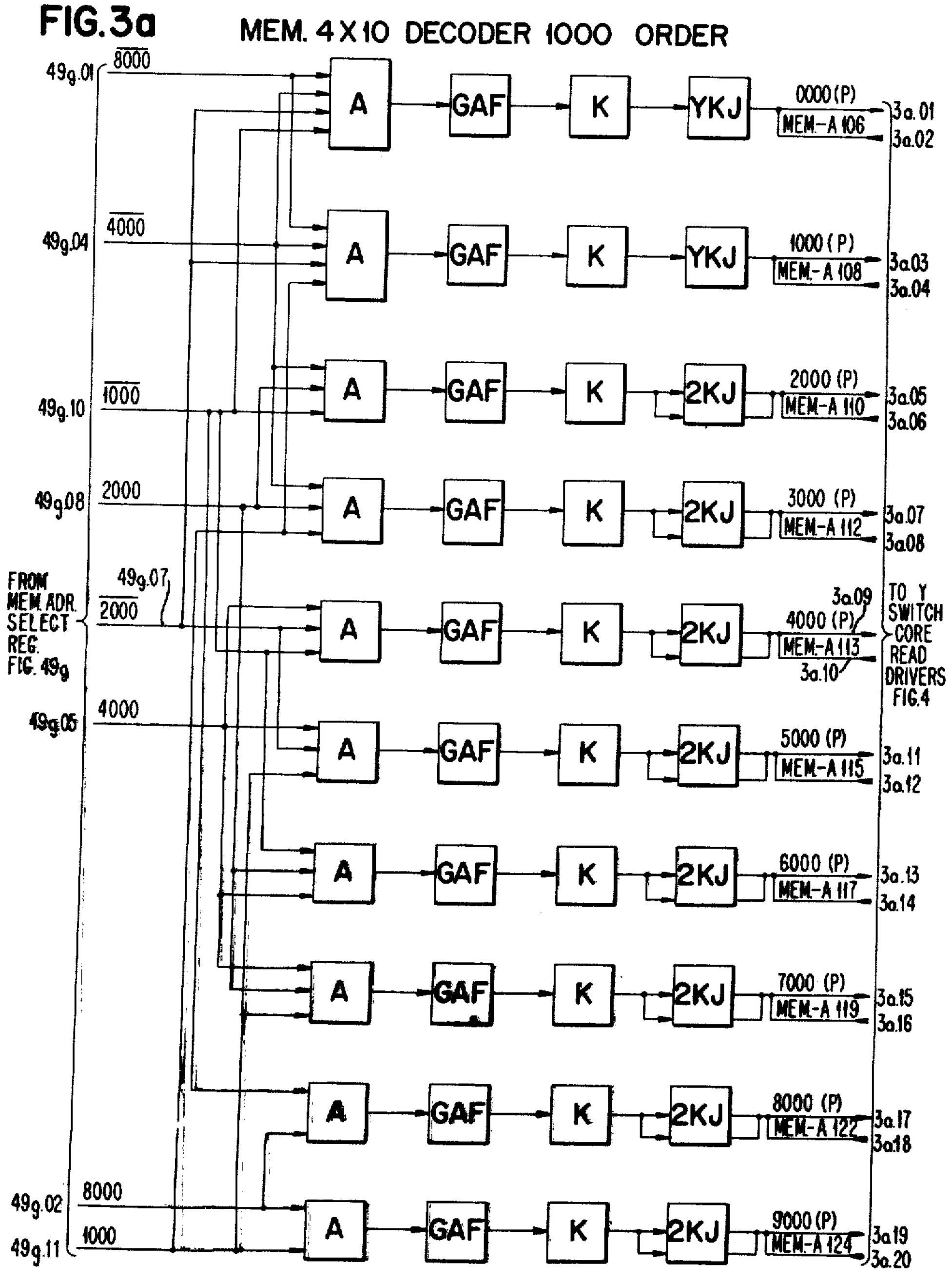
Figure 3B:
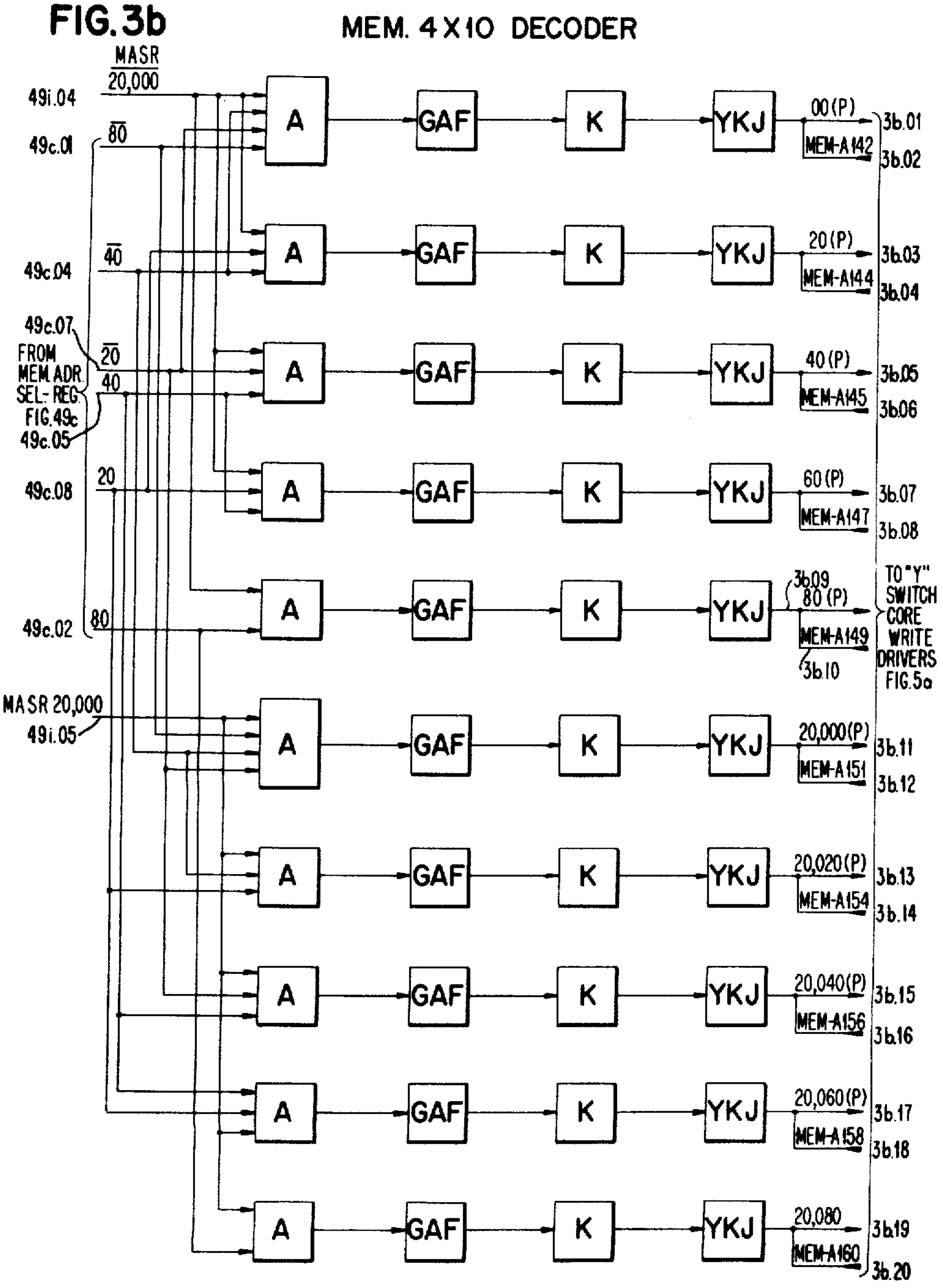
Figure 3C:
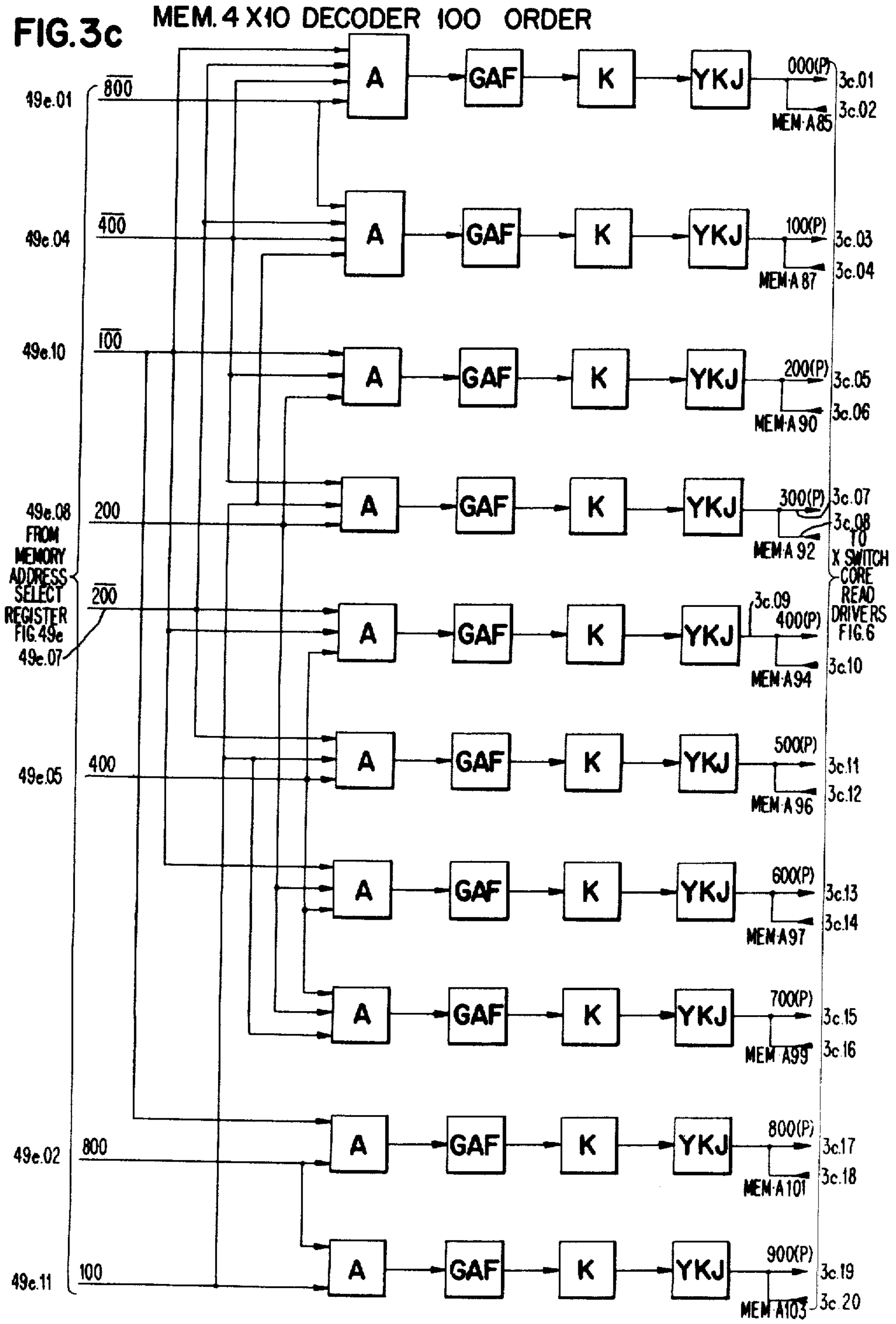
Figure 3D:
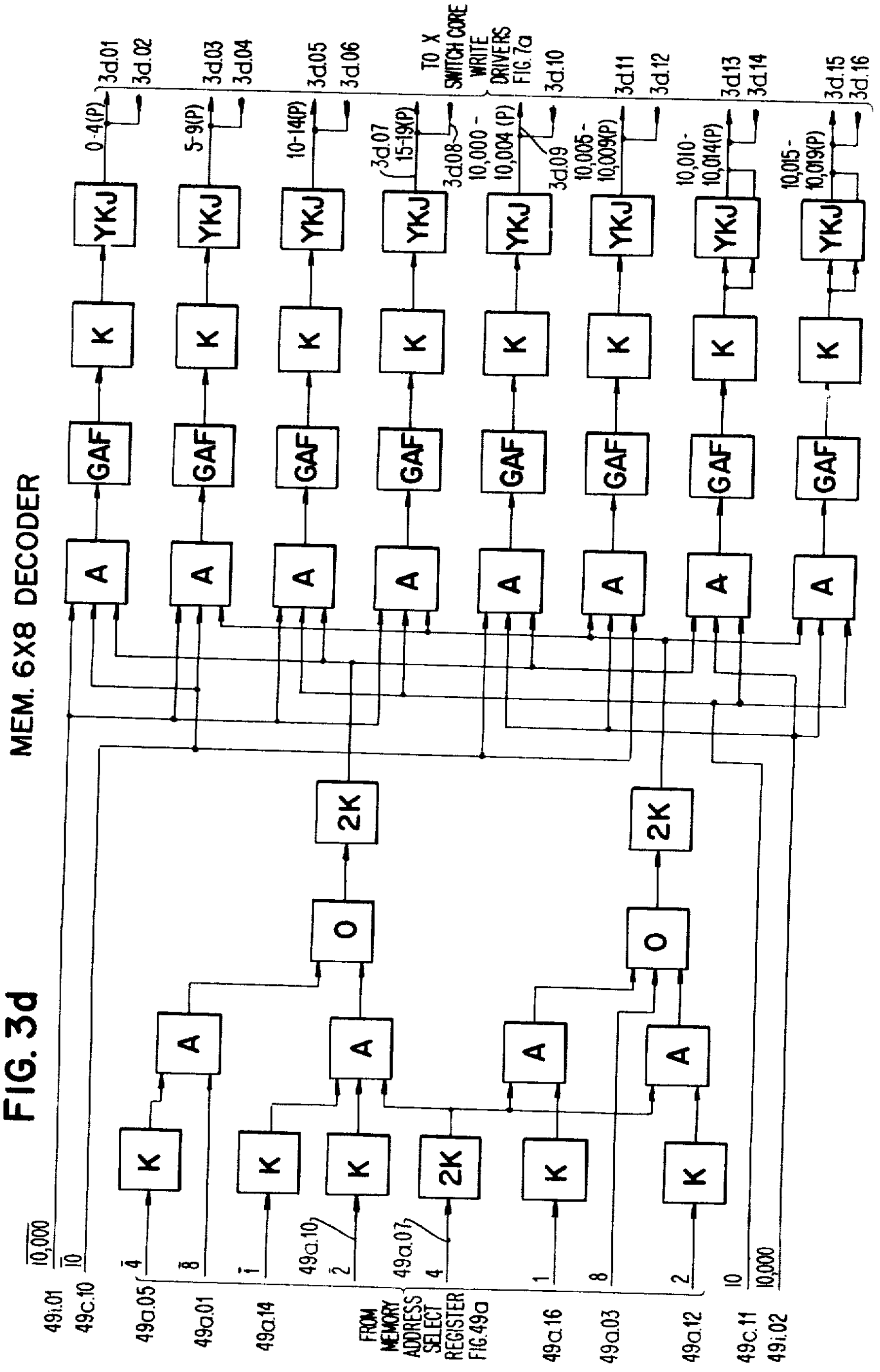
Figure 3E:
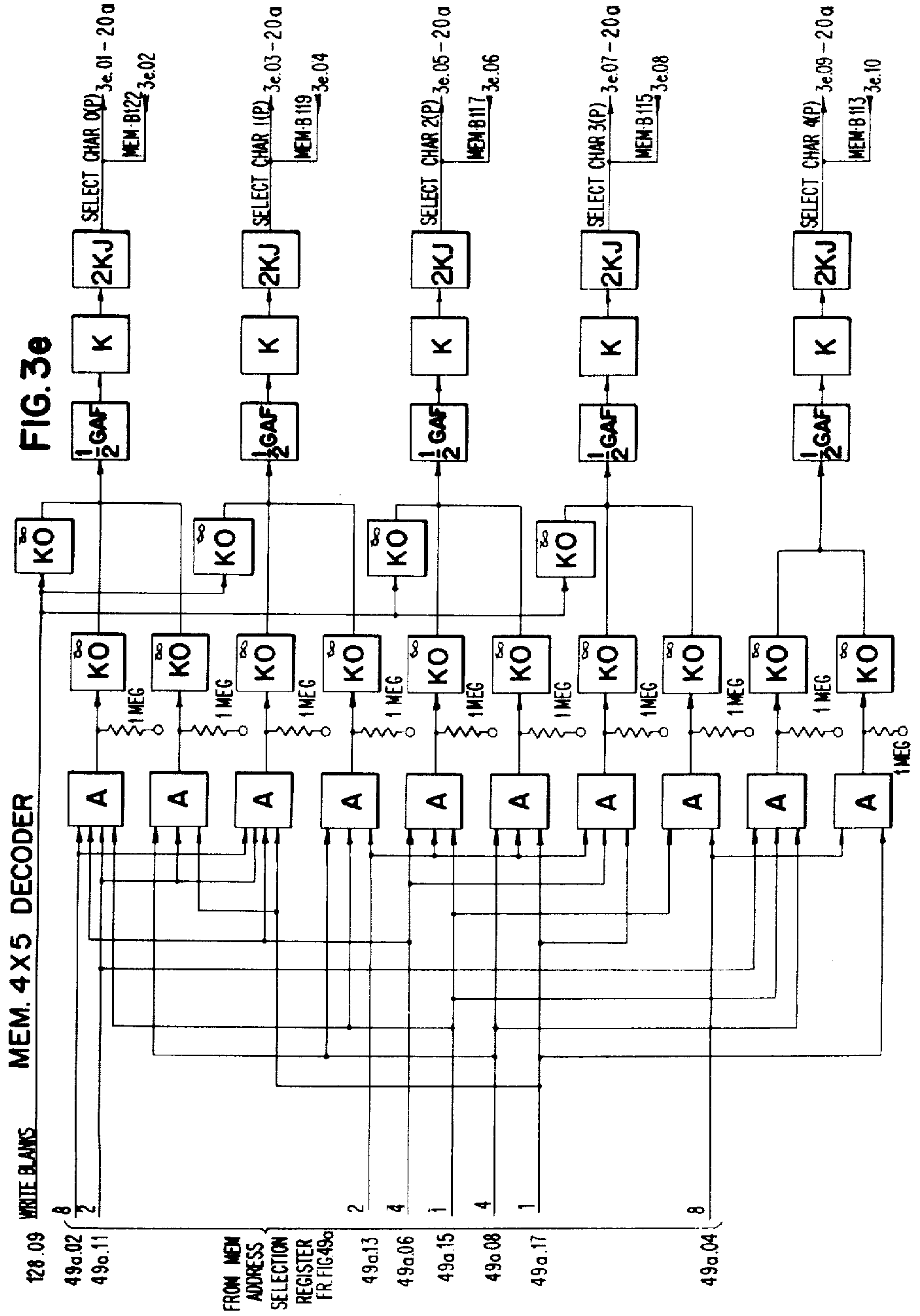
Figure 4:
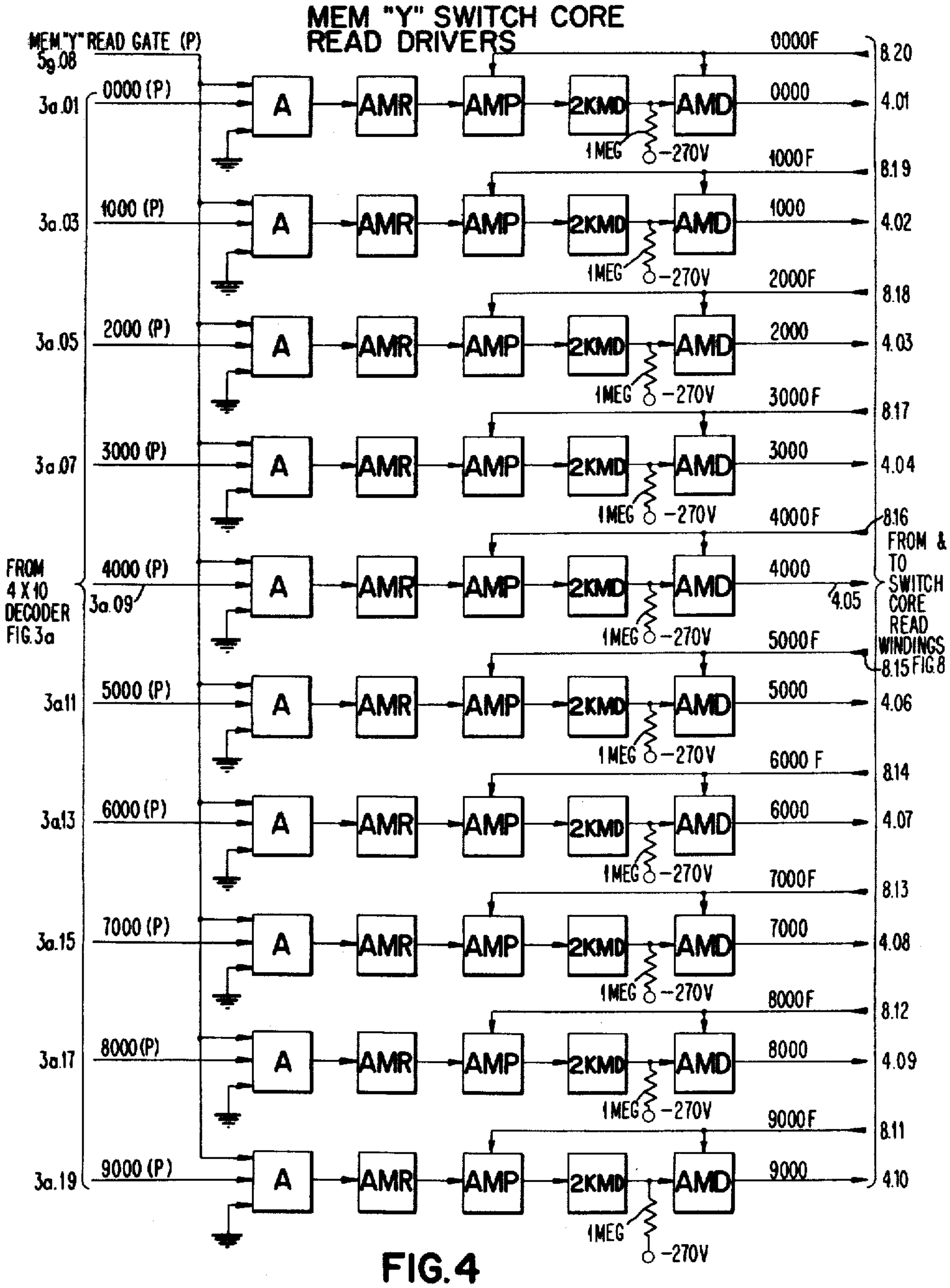
Figure 5A:
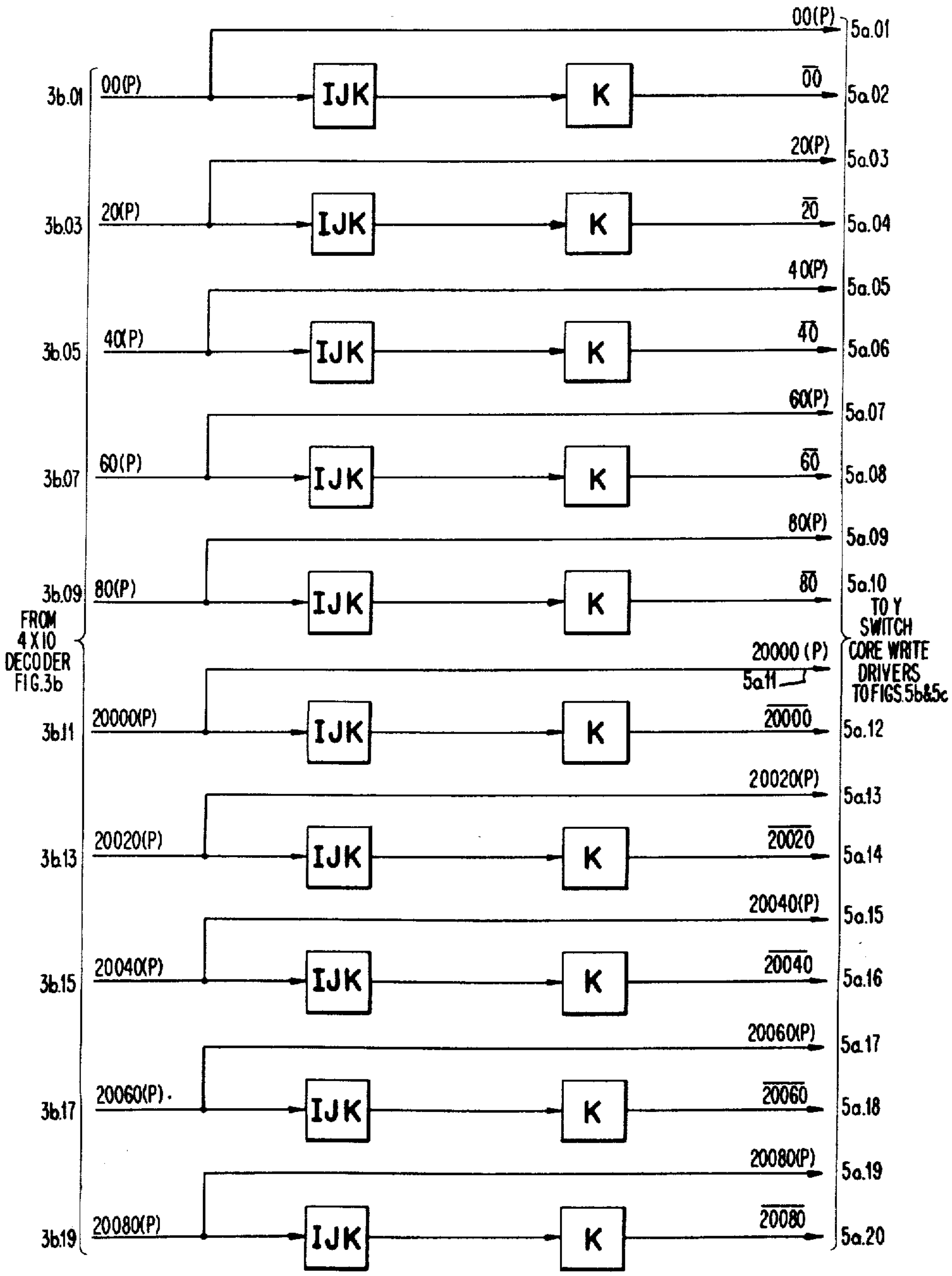
Figure 5B:
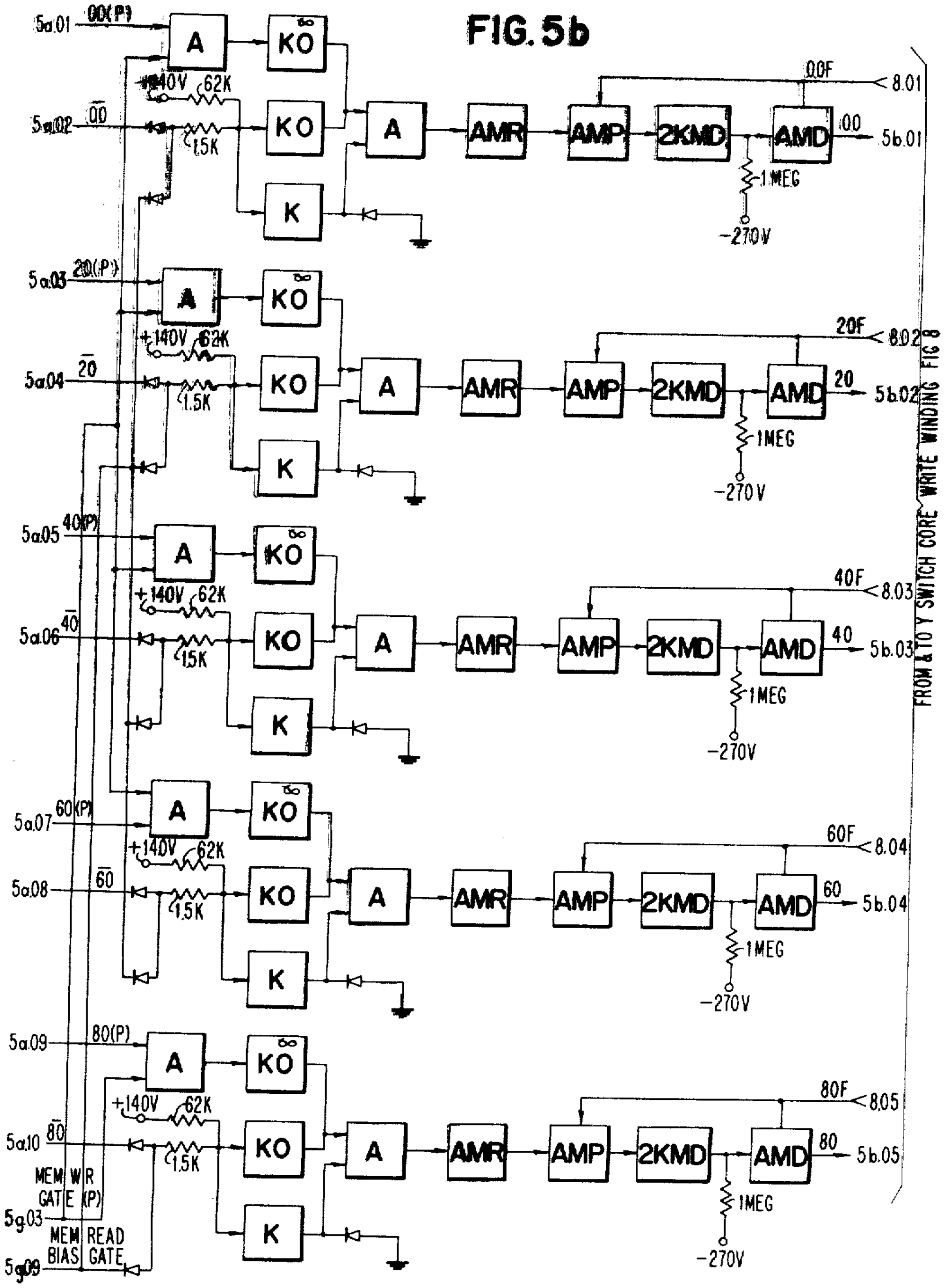
Figure 5C:
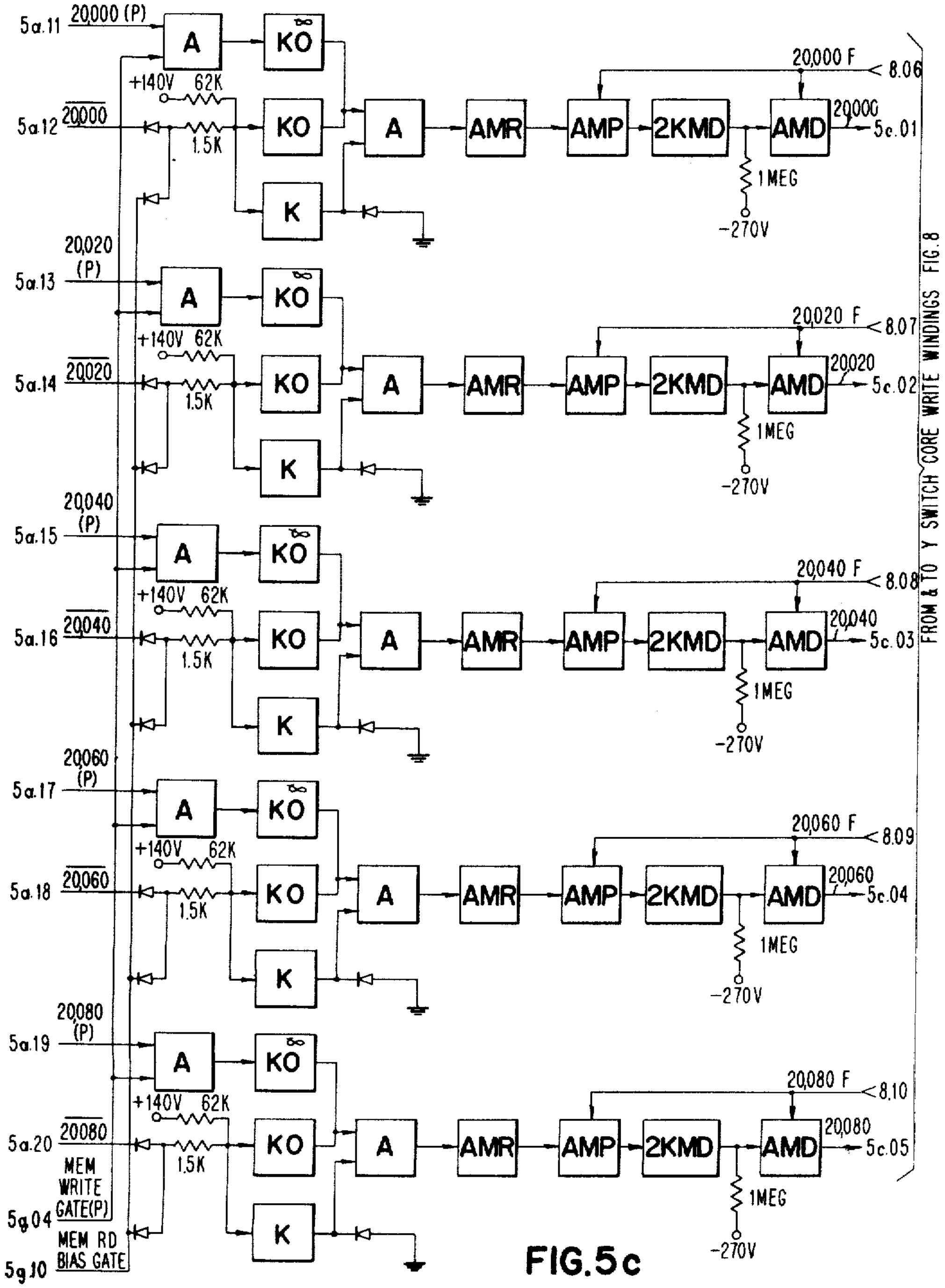
Figure 5D:
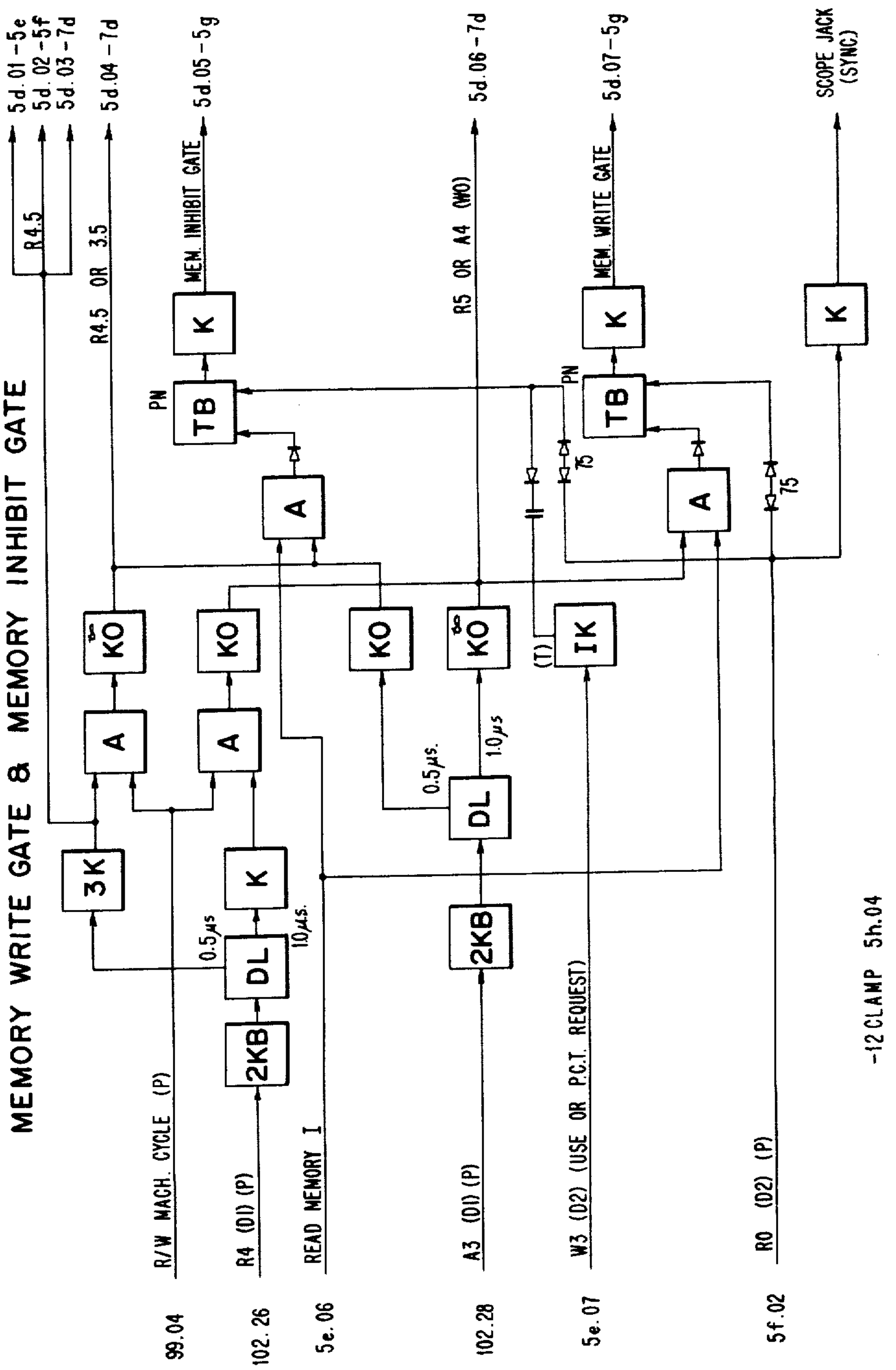
Figure 5F:
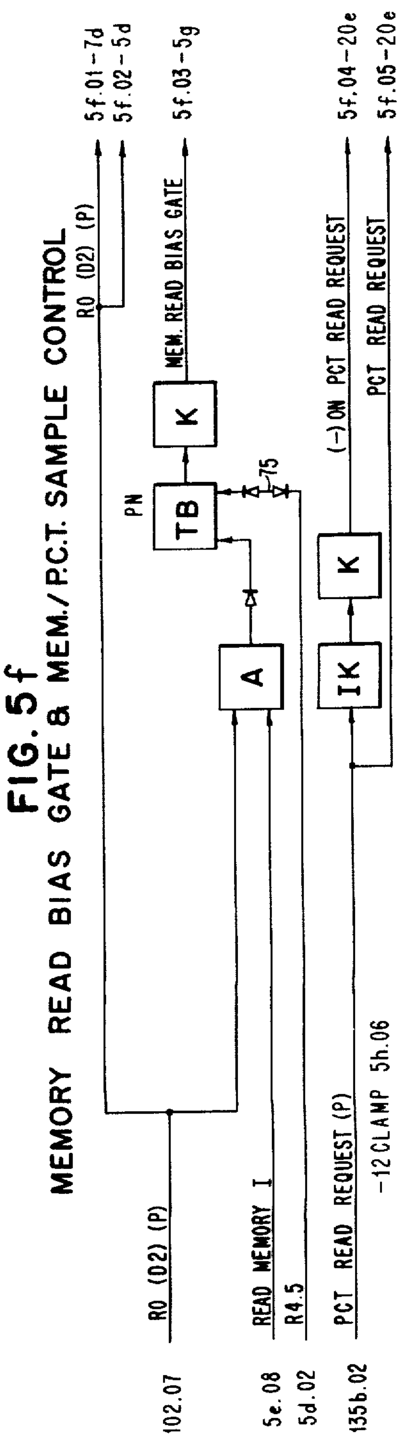
Figure 5E:
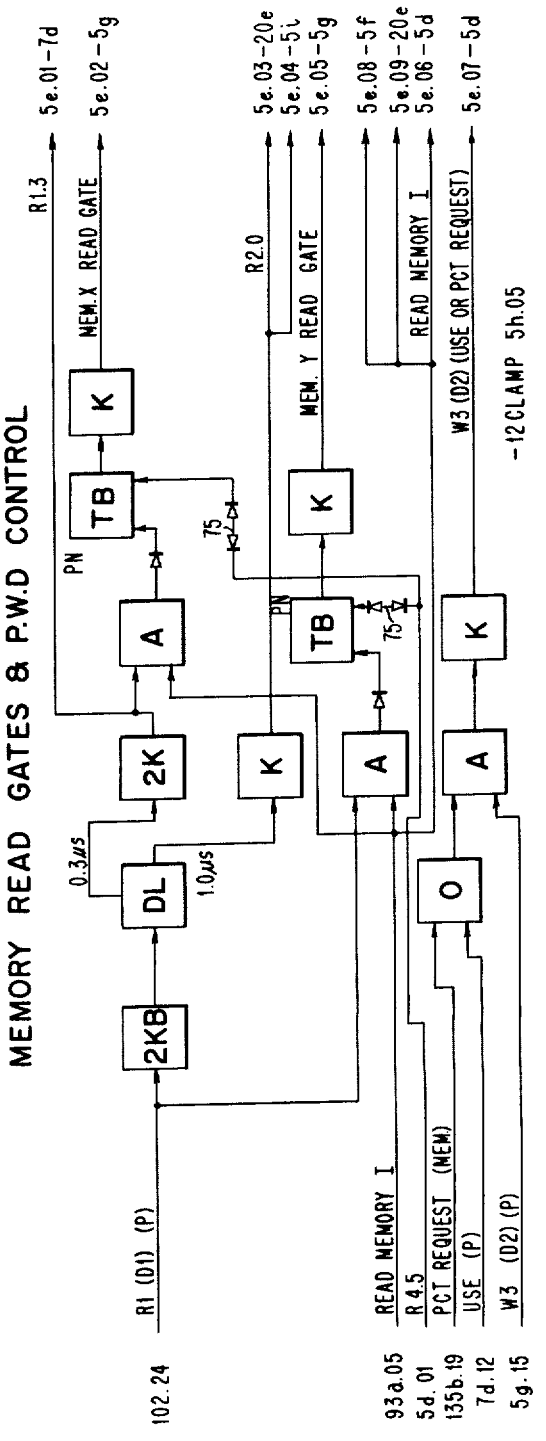
Figure 5G:
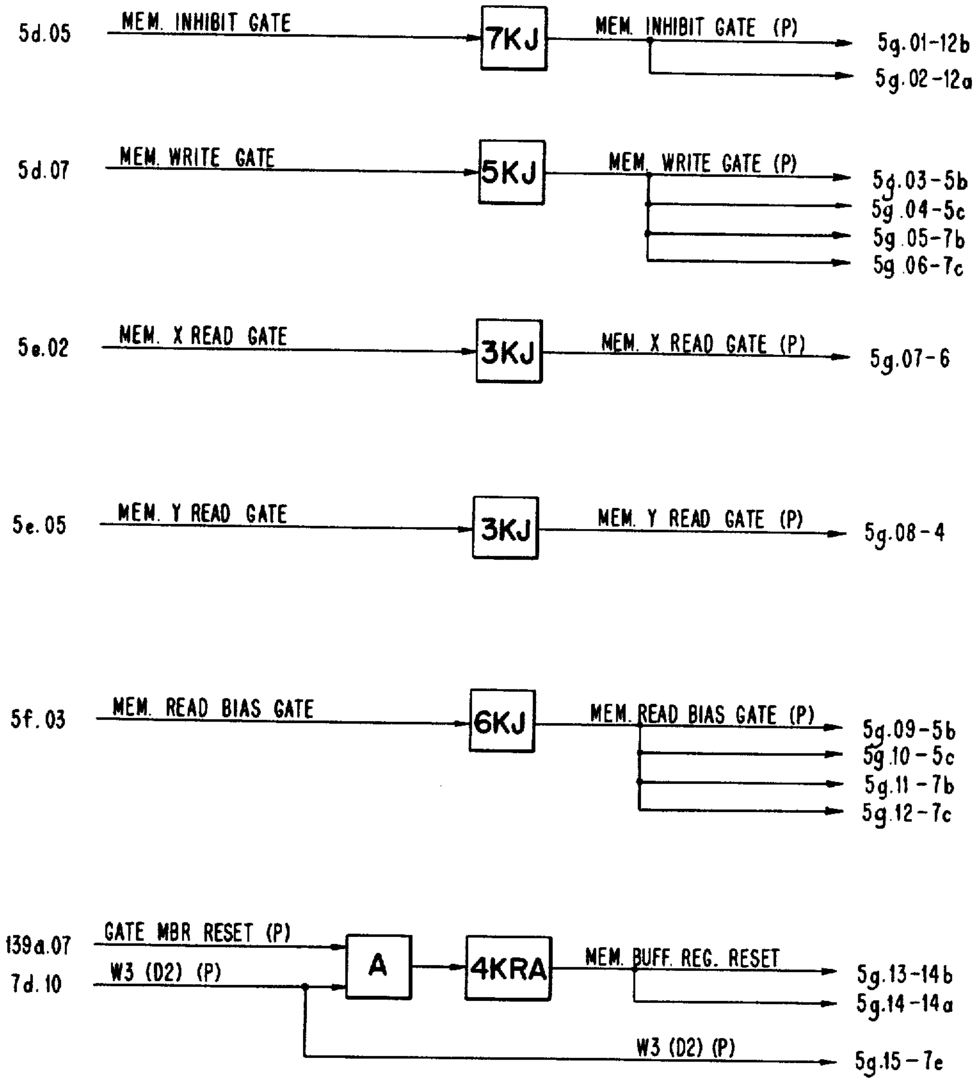
Figure 5H:
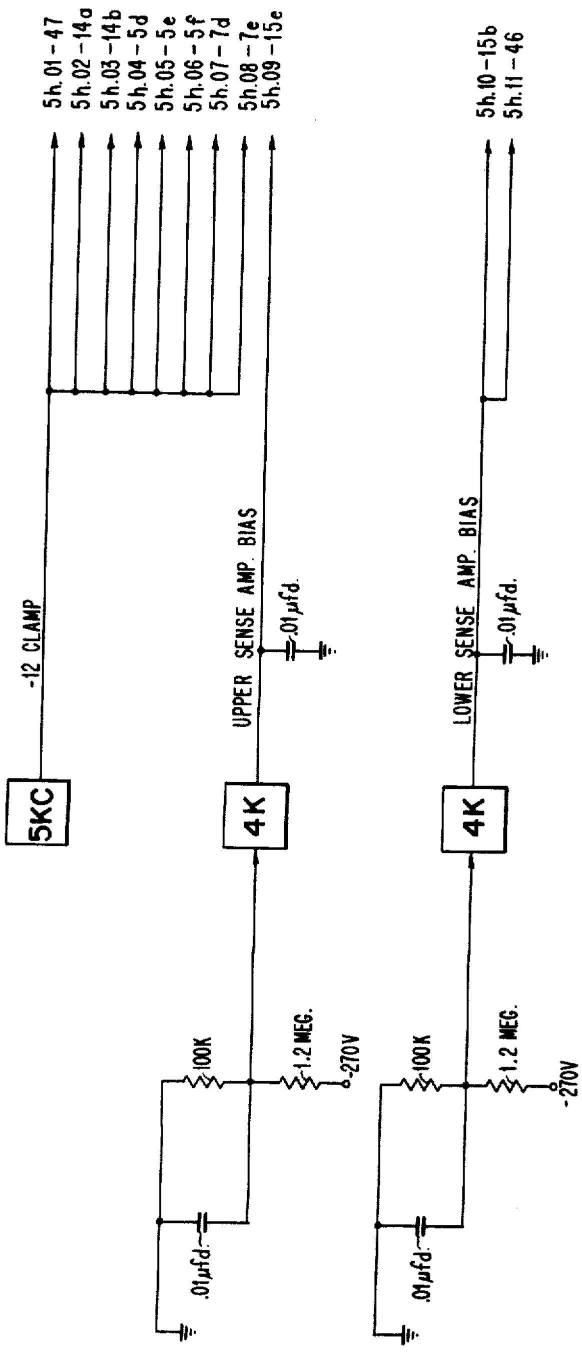
Figure 5I:
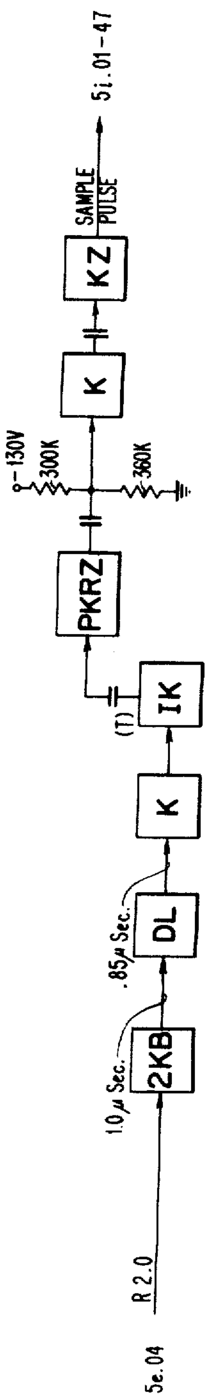
Figure 6:
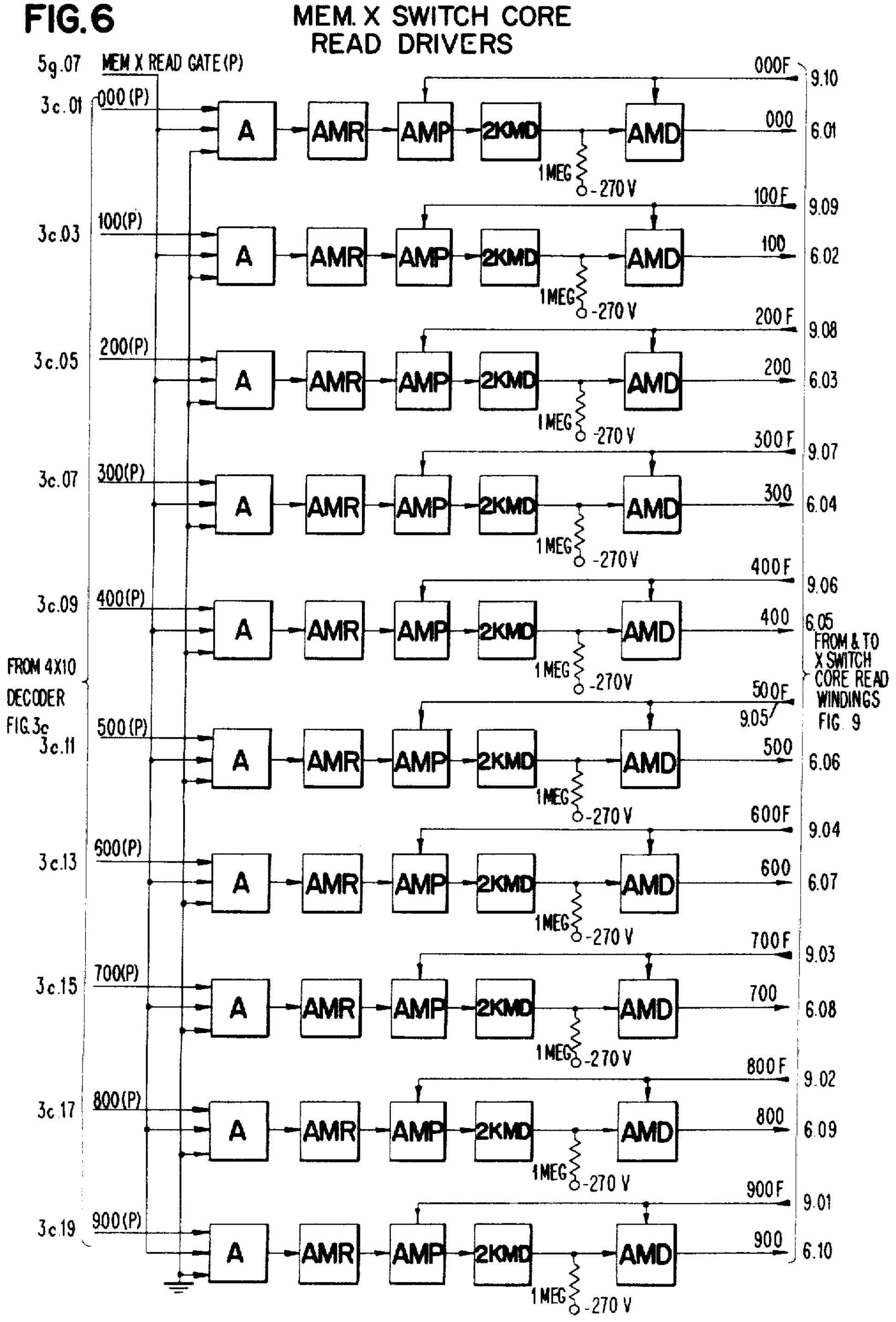
Figure 7A:
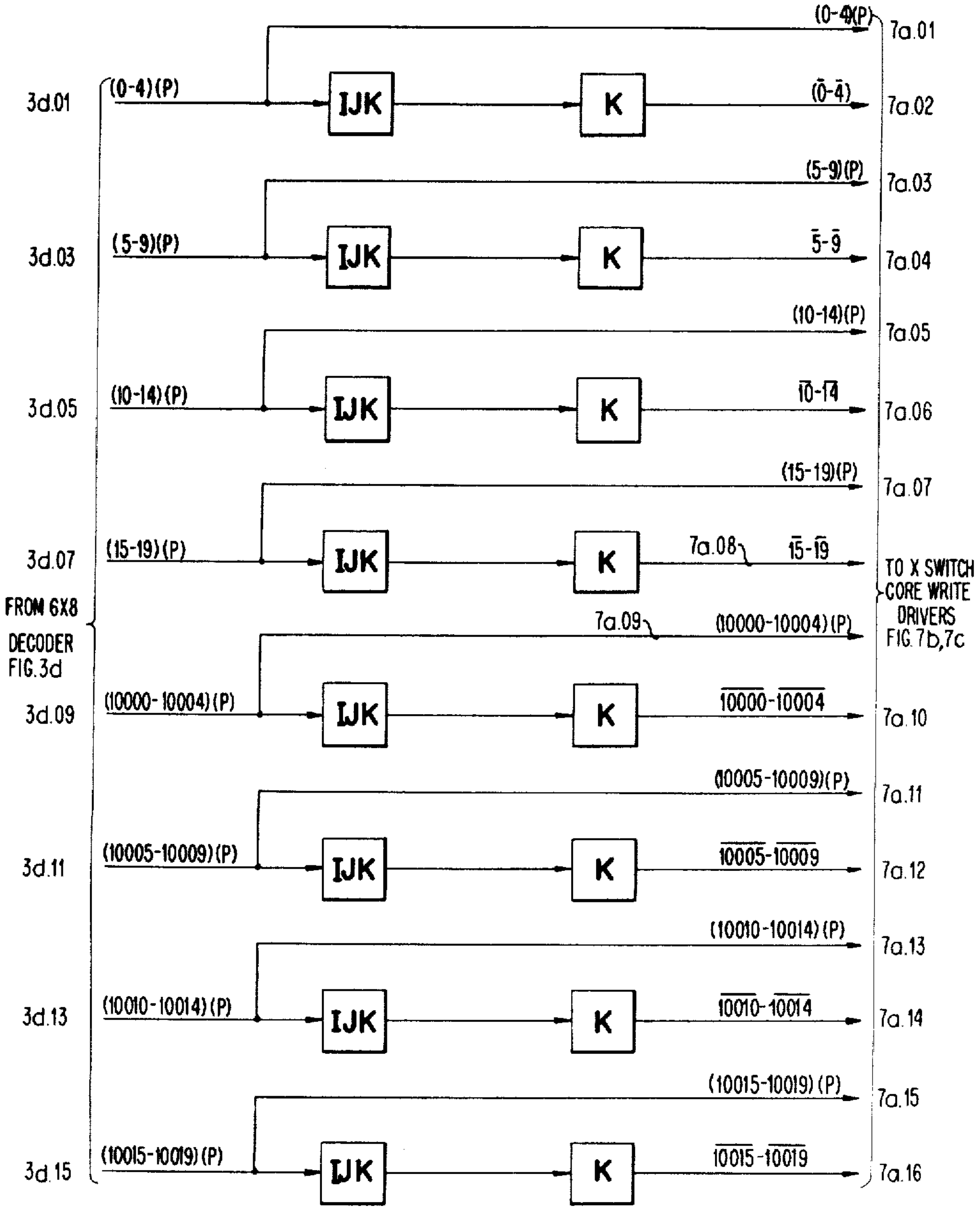
Figure 7B:
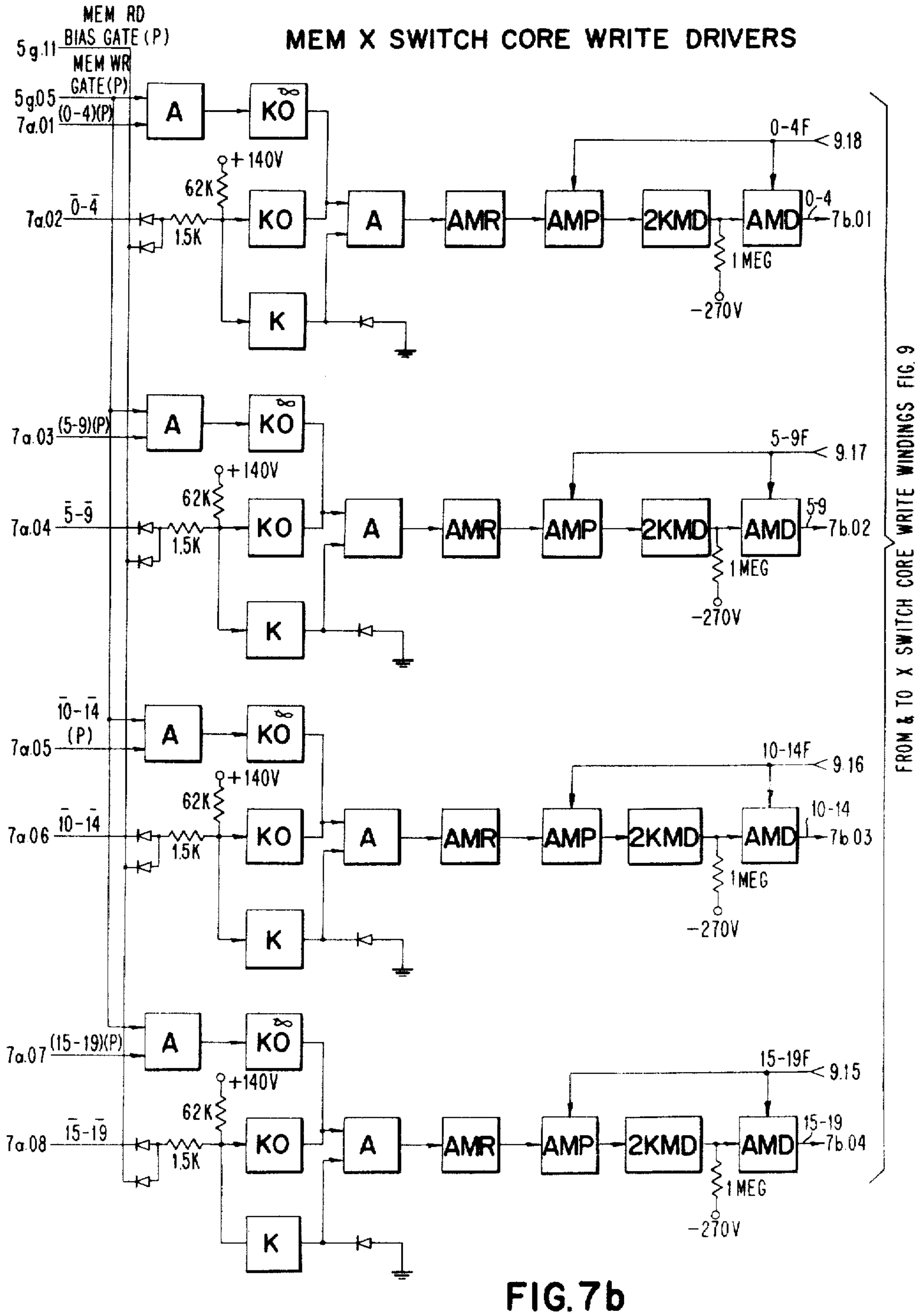
Figure 7C:
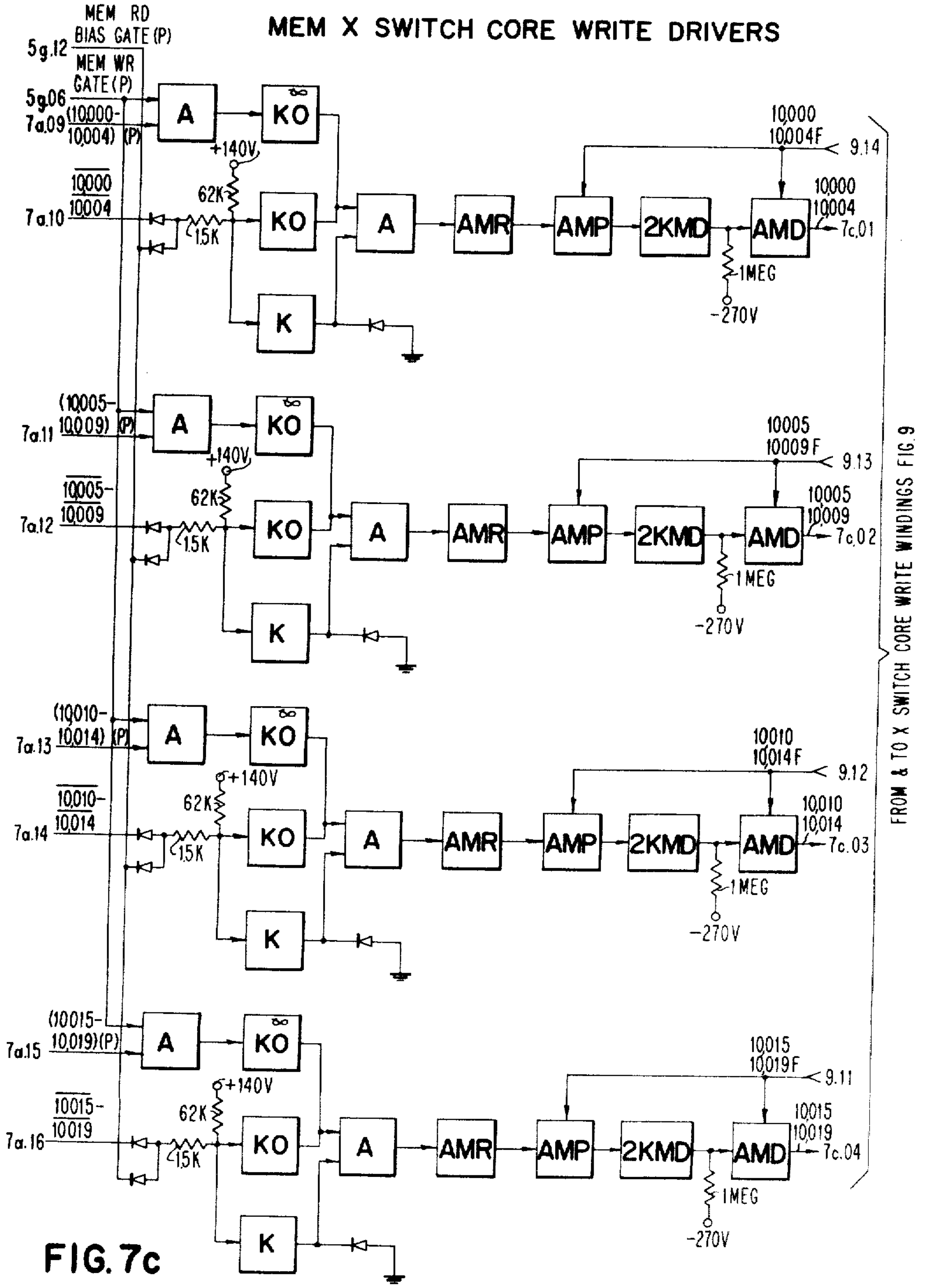
Figure 7D:
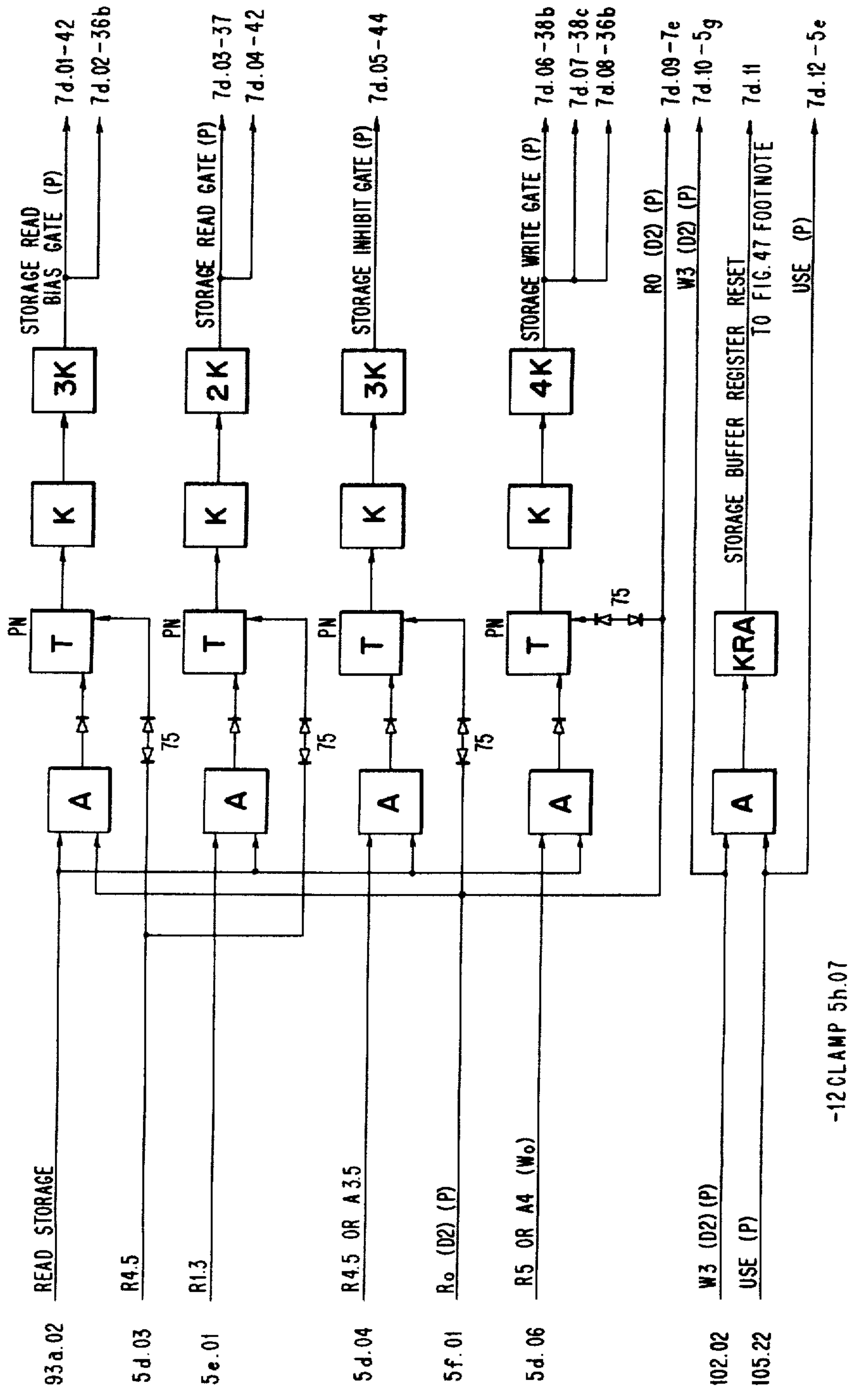
Figure 7E:
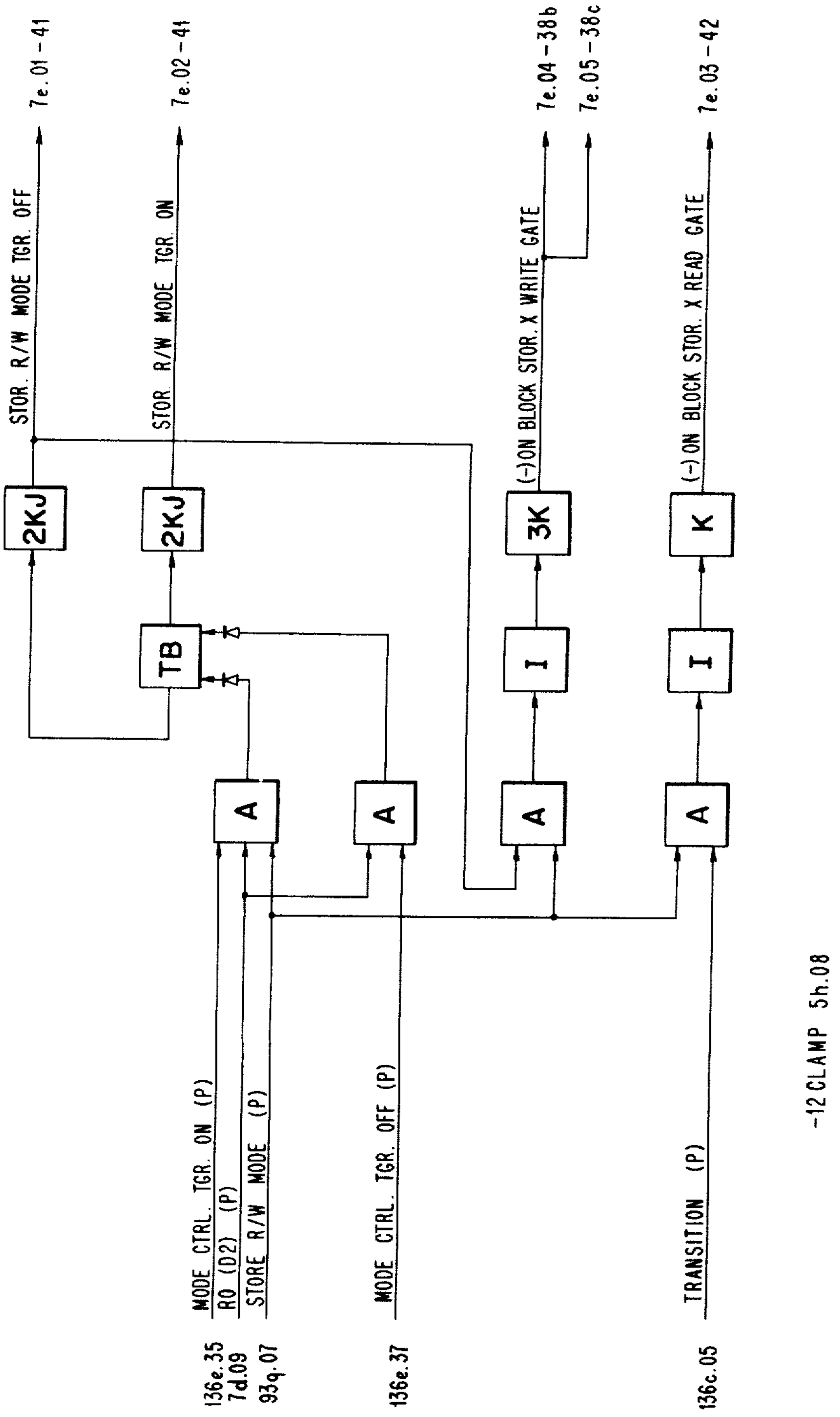
Figure 8:
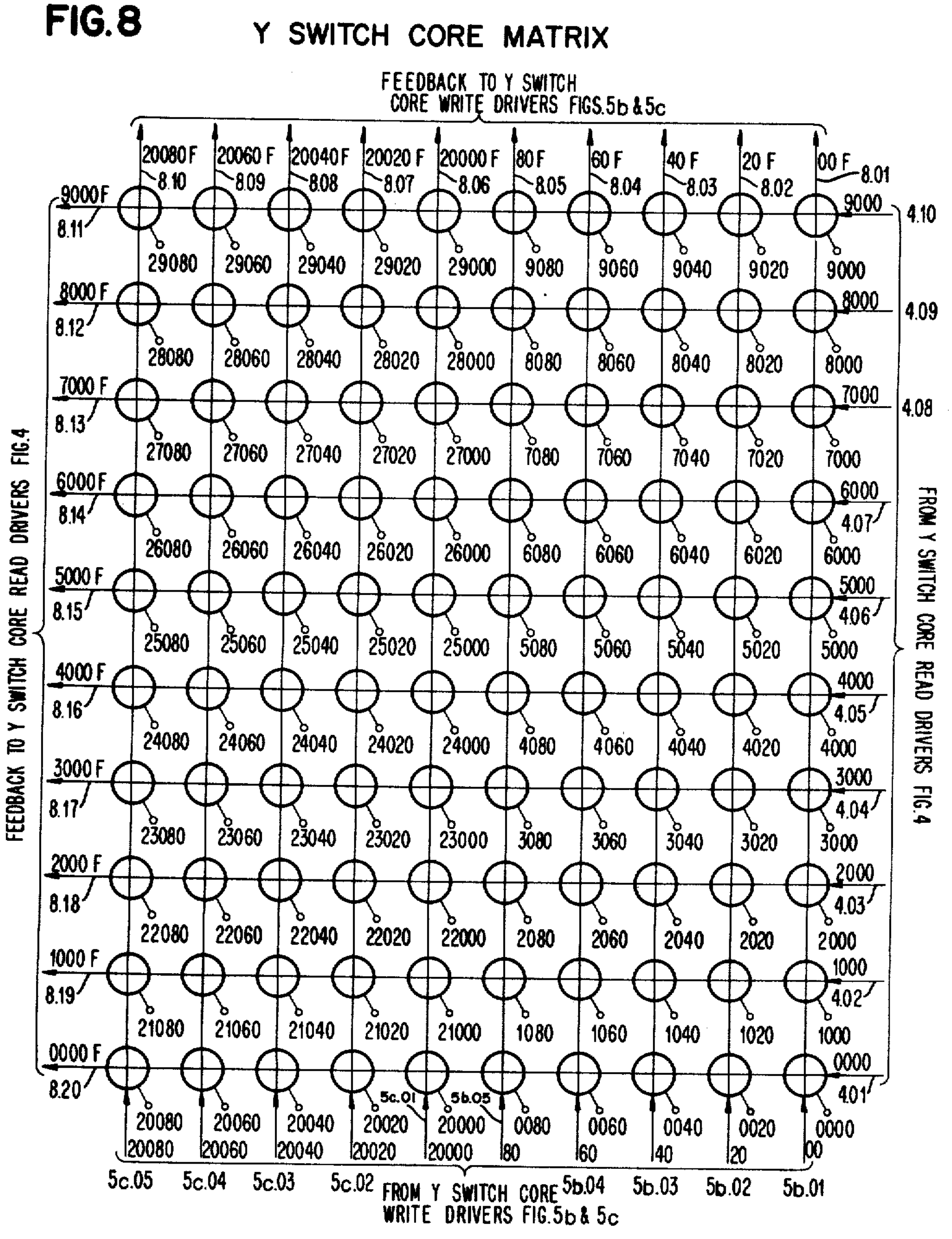
FIG. 8 illustrates the Y Switch Core Matrix.

Beginning with Reading from Memory during the Read portion of the Instruction cycle, in FIG. 3*b*, the $\overline{20,000}$, $\overline{40}$ and 20 lines are positive to bring up the 20 line **3*b*.03**. In FIG. 5*a*, the 20 line **3*b*.03 brings down the $\overline{20}$ line 5*a*.04 and makes positive the 20 line 5*a*.03**. All of the remaining NOT lines are up because of the Inverters. In FIGS. 5*b* and 5*c* all of the output lines except the 20 line **5*b*.02 are driven when the Memory Read Bias Gate on the lines 5*g*.09 and 5*g*.10 go positive at $R_0$. In FIG. 8 all of the columns of cores are driven with reset current except the lines linked by the 20 line 5*b*.02**. In FIG. 3*d*, the $\overline{10,000}$, 10, 4 and 1 lines are positive to make positive the 15–19 line **3*d*.07**. In FIG. 7*a*, the 15–19 line **3*d*.07 brings down the $\overline{15\text{–}19}$ line 7*a*.08 and makes positive the 15–19 line 7*a*.07**. All of the remaining NOT lines are up because their inputs are down. In FIGS. 7*b* and 7*c*, all of the outputs are driven except the 15–19 line **7*b*.04 when the Memory Read Bias Gate on the lines 5*g*.11 and 5*g*.12 become positive at $R_{0.5}$. In FIG. 9, all of the columns of cores are driven with reset current except for the one linked by the 15–19 line 7*b*.04**. In FIG. 3*a*, the $\overline{8000}$, $\overline{4000}$, $\overline{2000}$ and 1000 lines are positive. Therefore, the 1000 line **3*a*.03 is positive. In FIG. 4, the 1000 line 3*a*.03 is positive and the Memory Y Read Bias Gate on the line 5*g*.08 becomes positive at $R_1$ to drive the 1000 line 4.02. In FIG. 8, all of the columns of cores except the one linked by the 20 line 5*b*.02 are driven with reset current and the 1000 line 4.02** is driven with set current which sets the 1020 core to the "one" state and provides half-select reset current on its secondary. In FIG. 3*c* the $\overline{400}$, 200 and $\overline{100}$ are positive to make positive the 200 line **3*c*.05. In FIG. 6, the 200 line 3*c*.05 is positive and the Memory X Read Gate on the line 5*g*.07 comes up at $R_{1.3}$ to drive the 200 line 6.03. In FIG. 9, all of the columns of cores except the 15–19 line 7*b*.04 are driven with reset current. The 200 line 6.03** is driven with set current and, therefore, the 215–219 core is set to the "one" state and provides half-select reset current on its secondary to the switch Core Array of FIG. 13. In the Core Array the 1020 line and the 200 line provide reset current to the thirty-five cores of Memory addresses 1235 through 1239, thereby providing indications of binary "ones" on the sense windings. At $R_{3.5}$ the sense windings are sampled and the triggers of the Memory Buffer Register are set according to bit configuration of Memory addresses 1235 through 1239. The Memory Buffer Register now contains the Instruction as previously described.

At $A_0$ the Storage Select Register is set to the ASU Coding of the Memory Buffer Register, CR 1 receives the contents of character 4 position of MBR and at $A_1$ the Memory address contained in MBR is set into the Memory Address Register. At $A_0$ the character 0 position of MBR is set into the Operation Register. In FIG. 21*a*, the MBR character 0–1 line the MBR character 0–2 line, MBR character 0–4 line and the MBR character 0–8 lines are DOWN. In FIG. 21*b*, the MBR character 0–A line is DOWN and the MBR character 0–B line is UP. The MBR character 0–C line is UP, and positive signals on the $A_0$ I Time Use lines 101.25 turns ON the B and C triggers to specify the operation code of the UDZ Instructions. In FIG. 23*a*, $\overline{A}$ line **21*b*.01 and B line 21*b*.04 are UP, activating (—) Op. Reg. $\overline{A}$B line 23*a*.44. In FIG. 146 Unload Digits lines 151.01, 151.02 and 151.03** are brought up.

In FIG. 121 the End I time Use line 61.03 is positive to condition the diode gate for the fall of the $A_3/R_4–W_2$ (Blocked) line 104.10 which switches the I/E trigger from I to E and brings up the E time line 121.02 and brings down the I time line 121.01.

In FIG. 122 the End I time Use line 61.04 is positive to condition the diode gate for the fall of the $A_3/R_4–W_2$ (Blocked) line 121.03 which turns on the ECC 1 triggger and brings up the ECC 1 line 122.03 and the ECC 1/2 line 122.05. These signals are distributed via the IE Timer outputs of FIGS. 123 and 124. Thus, at $W_2$ of the Instruction cycle, the I/E trigger specifies E time and the ECC 1 trigger specifies that the first Execute cycle shall be ECC 1. During the Write portion of the Instruction cycle the contents of the Memory Buffer Register are returned to Memory addresses 1239 through 1235 and at $W_3$ the MBR is reset.

At ECC 1, in FIG. 151, the lines: Unload Digits 146.01, E Time (P) 123.59, NOT Transition (P) **136*d*.21, and SMT OFF (P) 138*d*.25 are UP, bringing UP the lines: Unload Digits as Zones line 151.01, Storage Read Mode line 151.02, Step MAC 1–1 line 151.03, CR 1 to Adder line 151.04, Gen C Bit Out line 151.05, Digit Adder Out line 151.06, Turn ON AUX Trigger line 151.07, Turn OFF AUX Trigger line 151.08 and Memory Read-Write Mode line 151.09. In FIG. 152, UDZ line 151.01 and AUX Trigger OFF (P) line 138*j*.29** are UP. Since no other inputs are UP, all outputs in FIG. 152 remain as before.

At ECC 2, in FIG. 151, the lines: Unload Digits line 146.01, E Time (P) line 123.59, NOT Transition (P) line **136*d*.21 and Storage Mark Trigger OFF (P) line 138*d*.25 are UP, bringing UP the lines: UDZ line 151.01, Storage Read Mode line 151.02, Step MAC 1–1 line 151.03. CR 1 to Adder line 151.04, Gen C Bit Out line 151.05, Digit Adder Out line 151.06, Turn ON AUX Trigger line 151.07, Turn OFF AUX Trigger line 151.08 and Memory Read-Write Mode line 151.09. In FIG. 152, UDZ line 151.01 and AUX Trigger ON (P) line 138*i*.33 are UP bringing UP the Step SAC+1 line 152.03, CR 2–1 line 75.55 is UP bringing UP the Emit A Bit line 152.04**.

At ECC 3, in FIG. 151, the lines: Unload Digits line 146.01, E Time (P) line 123.59, NOT Transition (P) line **136*d*.21 and Storage Mark Trigger OFF (P) line 138*d*.25 are UP. These bring UP the lines UDZ line 151.01, Storage Read Mode line 151.02, Step MAC 1–1 line 151.03, CR 1 to Adder line 151.04, Gen C Bit Out line 151.05, Digit Adder Out line 151.06, Turn ON AUX Trigger line 151.07, Turn OFF AUX Trigger line 151.08 and Memory Read-Write Mode line 151.09. In FIG. 152, UDZ line 151.01, CR 2–4 line 75.57, AUX Trigger OFF (P) line 138*j*.29 are UP bringing UP the Emit A Bit line 152.04**.

At ECC 4, in FIG. 151, the lines: Unload Digits line 146.01, E Time (P) line 123.59, NOT Transition (P) line **136*d*.21 and Storage Mark Trigger OFF (P) line 138*d*.25 are UP bringing UP the lines: UDZ line 151.01, Storage Read Mode line 151.02, Step MAC 1–1 line 151.03, CR 1 to Adder line 151.04, Gen C Bit Out line 151.05, Digit Adder Out line 151.06, Turn ON AUX Trigger line 151.07, Turn OFF AUX Trigger line 151.08 and Memory Read-Write Mode line 151.09. In FIG. 152, the UDX line 151.01, the AUX trigger (P) ON line 138*i*.33, and CR 2–2 line 75.56** are UP, which bring UP the Step SAC+1 line 152.03 and the Emit B Bit line 152.05.

At ECC 5, in FIG. 151, the lines: Unload Digits 146.01 and E Time 123.59 (P) are UP, NOT Transition (P) line **136*d*.21 is DOWN and the Storage Mark Trigger OFF (P) line 138*d*.25 is UP bringing UP the UDZ line 151.01, Storage Read Mode line 151.02, Step MAC 1–1 line 151.03, CR 1 to Adder line 151.04, Gen C Bit Out line 151.05, Digit Adder Out line 151.06, and the line Memory Read-Write Mode 151.09. In FIG. 152 UDZ line 151.01, AUX Trigger OFF (P) line 138*j*.29 and CR 2–4 line 75.57 being UP the line Emit A Bit 152.04** is brought UP.

At ACC 6, in FIG. 151, the Unload Digits line 146.01, the E Time (P) line 123.59, the NOT Transition (P) line **136*d*.21 and the Storage Mark Trigger OFF (P) line 138*d*.25 are UP bringing UP and UDZ line 151.01, Storage Read Mode line 151.02, Step MAC 1–1 line 151.03, CR 1 to Adder line 151.04, Gen C Bit Out line 151.05, Digit Adder Out line 151.06 Turn ON AUX Trigger line 151.07, Turn OFF AUX Trigger line 151.08 and Memory Read/Write Mode line 151.09. In FIG. 152, UDZ line 151.01 the AUX Trigger OFF (P) line 138*j*.29 and the line CR 2–4 line 75.57 are UP bringing UP the Emit A Bit line 152.04**, (which does not result in the emission of an A Bit, the Add Trigger being OFF).

At ECC 7, in FIG. 151, the line Unload Digits 146.01, the E Time (P) line 123.59, the NOT Transition (P) line **136*d*.21 and the line Storage Mark Trigger OFF (P) 138*d*.25 are UP bringing UP and UDZ line 151.01, Storage Read Mode line 151.02, Step MAC 1–1 line 151.03, CR 1 to Adder line 151.04, Gen C Bit Out line 151.05, Digit Adder Out line 151.06, Turn ON AUX Trigger line 151.07, Turn OFF AUX Trigger line 151.08 and Memory Read/Write Mode line 151.09. In FIG. 152, the line UDZ 151.01, the line AUX Trigger ON (P) 138*i*.33 are UP bringing UP the Step SAC+1 line 152.03. The CR 2–1 line 75.55 brings UP the Emit A Bit line 152.04 and the CR 2–2 line 75.56 brings UP the Emit B line 152.05**.

At ECC 8, in FIG. 151, the Unload Digits line 146.01, the E Time (P) line 123.59, the NOT Transition (P) line **136*d*.21 and the Storage Mark Trigger OFF (P) line 138*d*.25 bring UP the UDZ line 151.01, Storage Read Mode line 151.02, Step MAC 1–1 line 151.03, CR 1 to Adder line 151.04, Gen C Bit Out line 151.05, Digit Adder Out line 151.06, Turn ON AUX Trigger line 151.07, Turn OFF AUX Trigger line 151.08 and Memory Read/Write Mode line 151.09. In FIG. 152, the UDZ line 151.01, the AUX Trigger 1 OFF (P) line 138j.29 and the CR 2–4 line 75.57 bring UP the Emit A Bit 152.04**.

At ECC 9, in FIG. 151, the lines: Unload Digits 146.01, E Time (P) 123.59, NOT Transition (P) **136*d*.21 and Storage Mark Trigger OFF (P) 138*d*.25 bring up UDZ line 151.01, Storage Read Mode line 151.02, Step MAC 1–1 line 151.03, CR 1 to Adder line 151.04, Gen C Bit Out line 151.05, Digit Adder Out line 151.06, Turn ON AUX Trigger line 151.07, Turn OFF AUX Trigger line 151.08 and Memory Read-Write Mode line 151.09. In FIG. 152 the UDZ line 151.01, the AUX Trigger ON (P) line 138*i*.33 and the CR 2–1 line 75.55 bring UP the Emit A Bit line 152.04 and the Step SAC+1 line 152.03**.

At ECC 10, in FIG. 151, the Unload Digits line 146.01, the E Time (P) line 123.59, the NOT Transition (P) line **136*d*.21 and the Storage Mark Trigger OFF (P) line 138*d*.25 bring UP UDZ line 151.01, Storage Read Mode line 151.02, Step MAC 1–1 line 151.03, CR 1 to Adder line 151.04, Gen C Bit Out line 151.05, Digit Adder Out line 151.06, turn ON AUX Trigger line 151.07, Turn OFF AUX Trigger line 151.08 and Memory Read-Write Mode line 151.09. In FIG. 152, UDZ line 151.01, AUX Trigger OFF (P) line 138*j*.29 and CR 2–8 line 75.58 bring UP the Emit B Bit line 152.05**.

At ECC 11, in FIG. 151, the Unload Digits line 146.01, the E Time (P) line 123.59 is UP and the NOT Transition (P) line **138*d*.21 is DOWN, bringing UP the UDZ line 151.01, Storage Read Mode 151.02, Step MAC 1–1 line 151.03, CR 1 to Adder line 151.04, Gen C Bit Out line 151.05 and the Digit Adder Out line 151.06. In FIG. 152, the UDZ line 151.01 and the Storage Mark Trigger ON (P) line are UP 138*c*.36 bringing UP the Suppress CR 1 Code Check line 152.01 and End E Time line 152.02**.

The End E Time line **50*e*.10** goes to FIG. 93*r* where it makes positive the End E Time lines **93*r*.06. In FIG. 121, the End E Time line 93*r*.06 conditions a diode gate for the fall of the $A_3/R_4$–$W_2$ line which switches the I/E trigger from E to I and brings up the I Time line 121.01**.

(2) *Example: Load zones as digits*

Referring to the LZD Instruction Timing Chart, FIG. 156 (Sheets 1 and 2), an example of the execution of this instruction will now be given. The contents of Storage and Memory are as follows:

| Storage Address | C B A 8 4 2 1 | Character | |
|---|---|---|---|
| 0 | 1 1 1 0 0 0 1 | A | |
| 1 | 1 1 1 0 0 1 0 | B | |
| 2 | 0 1 1 0 0 1 1 | C | |
| 3 | 1 1 1 0 1 0 0 | D | |
| 4 | 0 0 0 0 0 0 0 | SM | |
| Memory Address | | | |
| 998 | 1 0 0 0 1 1 0 | 6 | 5 |
| 997 | 1 0 1 0 1 0 1 | 5 | |
| 996 | 0 1 0 0 1 0 0 | 4 | 6 |
| 995 | 1 0 1 0 0 1 1 | 3 | |
| 994 | 1 1 1 0 0 1 0 | 2 | 7 |
| 993 | 0 0 1 0 0 0 1 | 1 | |
| 992 | 1 0 1 1 0 1 0 | 0 | 9 |
| 991 | 0 1 0 0 1 1 1 | 7 | |
| 990 | 1 0 0 1 0 0 0 | | 8 |
| 989 | 0 0 9 1 0 0 1 | | 9 |

This example shows the movement of the zone bits of eight Memory characters to the numerical bit positions of four characters in Storage. When Result to Storage is routed the contents of Storage at the address resulted to are destroyed. Therefore, Storage may initially contain any characters. However, the Storage Mark must be placed at the proper address before proceeding. If this information is put into the computer from some other source the Storage Mark must first be placed in the proper position.

At Start Cycle ECC 1 in LZD Type Cycle 1 a block of five Memory characters including the four at Memory addresses 998 to 995 are transferred into MBR, and the 2 and 4 digit bits and the A zone bit of the Memory character 6 at Memory address 998 are routed from MBR into CR 1. The Storage character "A" at Storage address 0 is read from Storage into CR 2. The Digit Zero Trigger is set ON. The Memory character 2 and 4 digit bits and the A zone bit are regenerated into Memory address 998. MAC 1 is stepped minus one to Memory address 997, and LZD Type Cycle 1 is continued. Note that if at some time during the execution of this instruction one of the characters resulted back to the Storage is something other than a zero, DZT is turned OFF. If a decision as to whether Storage has zeroes in it or not is to be made, it is only necessary to interrogate the DZT rather than the whole field. Note further that overlapped operation is not used in LZD Type Cycles 1 and 2. The routing of lines Read Storage and Read Memory should not be confused with the Overlap Storage Read and Memory Read Modes. The setting of MAC 1 determines the actual Memory address read from.

At ECC 2 in LZD Type Cycle 1 the 4 and 1 digit bits and the A zone bit of the Memory character 5 at Memory address 997 are routed from MBR into CR 1. The Storage character "A" remains in CR 2. The AUX Trigger 1 is set ON by the A zone bit previously routed into CR 1 during ECC 1. The Memory character 1 and 4 digit bits and the A zone bit are regenerated into Memory address 997. MAC 1 is stepped minus one to Memory address 996, and LZD Type Cycle 2 is entered.

Note that the turn ON lines for the AUX Triggers, in this instruction are routed at W0 time of a cycle to insure that the routed AUX Trigger will be ON all during the following cycle.

At ECC 3 in LZD Type Cycle 2 the 4 digit bit and B zone bit of the Memory character 4 at Memory address 996 are routed from MBR into CR 1. The Storage character "A" remains in CR 2. The AUX Trigger 1 and the A zone bit previously routed into CR 1 during ECC 2, cause 1 and 4 bit to be emitted to the Digit Adder, which are then routed to the Result Register. The Adder Carry is suppressed to prevent decimal correction from changing the new character. The Memory character 4 digit bit and B zone bit are regenerated into Memory address 996. The new character 5 comprising 4 and 1 digit bits in the Result Register is read into Storage at Storage address 0. MAC 1 is stepped minus one to Memory address 995, and SAC is stepped plus one to Storage Address 1. The AUX Triggers are routed OFF and LZD Type Cycle 1 is re-entered. The contents of Storage and Memory are:

| Storage Address | C B A 8 4 2 1 | Character |
|---|---|---|
| 0 | 0 0 0 0 1 0 1 | 5 |
| 1 | 1 1 1 0 0 1 0 | B |
| 2 | 0 1 1 0 0 1 1 | C |
| 3 | 1 1 1 0 1 0 0 | D |
| 4 | 0 0 0 0 0 0 0 | SM |
| Memory Address | | |
| 998 | 1 0 1 0 1 1 0 | 6 }5 |
| 997 | 1 0 1 0 1 0 1 | 5 |
| 996 | 0 1 0 0 1 0 0 | 4 }6 |
| 995 | 1 0 1 0 0 1 1 | 3 |
| 994 | 1 1 1 0 0 1 0 | 2 }7 |
| 993 | 0 0 1 0 0 0 1 | 1 |
| 992 | 1 0 1 1 0 1 0 | 0 }9 |
| 991 | 0 1 0 0 1 1 1 | 7 |
| 990 | 1 0 0 1 0 0 0 | 8 |
| 989 | 0 0 0 1 0 0 1 | 9 |

At ECC 4 in LZD Type Cycle 1 the 1 and 2 digit bits and the A zone bit of the Memory character 3 at Memory address 995 are routed from MBR into CR 1, and, the Storage character "B" at Storage address 1 is read from Storage into CR 2. The AUX Trigger 2 is set ON by the B zone bit previously routed into CR 1 during ECC 3. The Memory character 2 and 1 digit bits and the A zone bit are regenerated into Memory address 995. MAC 1 is stepped minus one to Memory address 994, and LZD Type Cycle 2 is entered.

At ECC 5 in LZD Type Cycle 2 a new block of five Memory characters having addresses 994 to 990 are transferred into MBR, and the 2 digit bit and B and A zone bits of the Memory character 2 at Memory address 994 are routed from MBR into CR 1. The Storage character "A" remains in CR 2. The AUX Trigger 2 and the A zone bit previously routed into CR 1 during ECC 4 cause 2 and 4 bits to be emitted to the Digit Adder which are then routed to the Result Register. The Adder Carry is suppressed to prevent decimal correction from changing the new character. The Memory character 2 digit bit and B and A zone bits are regenerated into Memory address 994, and the new character 6 comprising 2 and 4 digit bits in the Result Register is read into Storage at Storage Address 1. MAC 1 is stepped minus one to Memory address 993, and SAC is stepped plus one to Storage address 2. The AUX Triggers are routed OFF and LZD Type Cycle 1 is re-entered. The contents of Storage and Memory are:

| Storage Address | C B A 8 4 2 1 | Character |
|---|---|---|
| 0 | 0 0 0 0 1 0 1 | 5 |
| 1 | 0 0 0 0 1 1 0 | 6 |
| 2 | 0 1 1 0 0 1 1 | C |
| 3 | 1 1 1 0 1 0 0 | D |
| 4 | 0 0 0 0 0 0 0 | SM |
| Memory Address | | |
| 998 | 1 0 1 0 1 1 0 | 6 }5 |
| 997 | 1 0 1 0 1 0 1 | 5 |
| 996 | 0 1 0 0 1 0 0 | 4 }6 |
| 995 | 1 0 1 0 0 1 1 | 3 |
| 994 | 1 1 1 0 0 1 0 | 2 }7 |
| 993 | 0 0 1 0 0 0 1 | 1 |
| 992 | 1 0 1 1 0 1 0 | 0 }9 |
| 991 | 0 1 0 0 1 1 1 | 7 |
| 990 | 1 0 0 1 0 0 0 | 8 |
| 989 | 0 0 0 1 0 0 1 | 9 |

At ECC 6 in LZD Type Cycle 1 the 1 digit bit and the A zone bit of the Memory character 1 at Memory address 993 are routed from MBR into CR 1; and, the Storage character "C" at Storage address 2 is read from Storage into CR 2. The AUX Trigger 1 is set ON by the A zone bit previously routed into CR 1 during ECC 5, and the AUX Trigger 2 is set ON by the B zone bit previously routed into CR 1 during ECC 5. The Memory character 1 digit bit and the B zone bit are regenerated into Memory address 993. MAC 1 is stepped minus one to Memory address 992, and Type Cycle 2 is entered.

At ECC 7 in Type Cycle 2 the 8 and 2 digit bit and the A zone bit of the Memory character 0 at Memory address 992 are routed from MBR into CR 1; and, the Storage character "C" remains in CR 2. The AUX Triggers 1 and 2 and the A zone bit previously routed into CR 1 during ECC 6 cause 1, 2 and 4 bits to be emitted to the Digit Adder which are then routed to the Result Register where a C bit is generated. The Adder Carry is suppressed to prevent decimal correction from changing the new character. The Memory character 8 and 2 digit bits and the A zone bit are regenerated into Memory address 992, and the new character 7 comprising 1, 2 and 4 digit bits, and a C bit, in the Result Register is read into Storage at Storage address 2. MAC 1 is stepped minus one to Memory address 991, and SAC is stepped plus one to Storage address 3. The AUX Triggers are routed OFF and LZD Type Cycle 1 is re-entered. The contents of Storage and Memory are:

| Storage Address | C B A 8 4 2 1 | Character |
|---|---|---|
| 0 | 0 0 0 0 1 0 1 | 5 |
| 1 | 0 0 0 0 1 1 0 | 6 |
| 2 | 1 0 0 0 1 1 1 | 7 |
| 3 | 1 1 1 0 1 0 0 | D |
| 4 | 0 0 0 0 0 0 0 | SM |
| Memory Address | | |
| 998 | 1 0 1 0 1 1 0 | 6 }5 |
| 997 | 1 0 1 0 1 0 1 | 5 |
| 996 | 0 1 0 0 1 0 0 | 4 }6 |
| 995 | 1 0 1 0 0 1 1 | 3 |
| 994 | 1 1 1 0 0 1 0 | 2 }7 |
| 993 | 0 0 1 0 0 0 1 | 1 |
| 992 | 1 0 1 1 0 1 0 | 0 }9 |
| 991 | 0 1 0 0 1 1 1 | 7 |
| 990 | 1 0 0 1 0 0 0 | 8 |
| 989 | 0 0 0 1 0 0 1 | 9 |

At ECC 8 in LZD Type Cycle 1 the 4, 2 and 1 digit bits and B zone bit of the Memory character 7 at Memory address 991 are routed from MBR into CR 1; and the Storage character "D" at Storage address 3 is read from Storage into CR 2. The AUX Trigger 1 is set ON by the A zone bit previously routed into CR 1 during ECC 7 and, the Memory character 4, 2 and 1 digit bits and B zone bit are regenerated into Memory address 991. MAC 1 is stepped minus one to Memory address 990, and LZD Type Cycle 2 is entered.

At ECC 9 in LZD Type Cycle 2 the 8 digit bit of the Memory character 8 at Memory address 990 is routed from MBR into CR 1; and, the Storage character "D" remains in CR 2. The AUX Trigger 1 and the B zone bit previously routed into CR 1 during ECC 8 cause 1 and 8 bits to be emitted to the Digit Adder which are then routed to the Result Register. The Adder Carry is suppressed to prevent decimal correction from changing the new character. The Memory character 8 digit bit is regenerated into Memory address 990, and the new character 9 comprising 1 and 8 digit bits in the Result Register is read into Storage at Storage address 3. MAC 1 is stepped minus one to Memory address 989, and SAC is stepped plus one to Storage address 4. The AUX Triggers are routed OFF and LZD Type Cycle 1 is reentered. The contents of Storage and Memory are:

| Storage Address | C B A 8 4 2 1 | Character | |
|---|---|---|---|
| 0 | 0 0 0 0 1 0 1 | 5 | |
| 1 | 0 0 0 0 1 1 0 | 6 | |
| 2 | 1 0 0 0 1 1 1 | 7 | |
| 3 | 0 0 0 1 0 0 1 | 9 | |
| 4 | 0 0 0 0 0 0 0 | SM | |
| Memory Address | | | |
| 998 | 1 0 1 0 1 1 0 | 6 | 5 |
| 997 | 1 0 1 0 1 0 1 | 5 | |
| 996 | 0 1 0 0 1 0 0 | 4 | 6 |
| 995 | 1 0 1 0 0 1 1 | 3 | |
| 994 | 1 1 1 0 0 1 0 | 2 | 7 |
| 993 | 0 0 1 0 0 0 1 | 1 | |
| 992 | 1 0 1 1 0 1 0 | 0 | 9 |
| 991 | 0 1 0 0 1 1 1 | 7 | |
| 990 | 1 0 0 1 0 0 0 | 8 | |
| 989 | 0 0 0 1 0 0 1 | 9 | |

At ECC 10 in LZD Type Cycle 1 a new block of five Memory characters including the character having address 989, is transferred into MBR, and the 8 and 1 digit bits of the Memory character 9 at Memory address 989 are routed from MBR into CR 1; and, the Storage character SM at Storage address 4 is read from Storage into CR 2. The AUX Triggers are not set ON by the character previously routed into CR 1 during ECC 9 because it included no zone bits. The Memory character 8 and 1 digit bits are regenerated into Memory address 989. MAC 1 is stepped minus one, and the Transition and Storage Mark Triggers are routed ON due to recognition of the character SM in CR 2. LZD Type Cycle 2 is entered.

At ECC 11 in LZD Type Cycle 2 with the Transition and Storage Mark Triggers ON, the Storage character SM remains in CR 2. CR 1 Code Check is suppressed because the Memory character 9 into CR 1 during ECC 10 is not to be used at present. MAC 1 is set to the Memory address 998 in MAR. SAC is set to the Storage address 0 in SPC. AUX Trigger 1, the Storage Mark Trigger and the Transition Trigger come OFF and LZD Type Cycle 3 is entered. The contents of Storage and Memory are:

| Storage Address | C B A 8 4 2 1 | Character | |
|---|---|---|---|
| 0 | 0 0 0 0 1 0 1 | 5 | |
| 1 | 0 0 0 0 1 1 0 | 6 | |
| 2 | 1 0 0 0 1 1 1 | 7 | |
| 3 | 0 0 0 1 0 0 1 | 9 | |
| 4 | 0 0 0 0 0 0 0 | SM | |
| Memory Address | | | |
| 998 | 1 0 1 0 1 1 0 | 6 | 5 |
| 997 | 1 0 1 0 1 0 1 | 5 | |
| 996 | 0 1 0 0 1 0 0 | 4 | 6 |
| 995 | 1 0 1 0 0 1 1 | 3 | |
| 994 | 1 1 1 0 0 1 0 | 2 | 7 |
| 993 | 0 0 1 0 0 0 1 | 1 | |
| 992 | 1 0 1 1 0 1 0 | 0 | 9 |
| 991 | 0 1 0 0 1 1 1 | 7 | |
| 990 | 1 0 0 1 0 0 0 | 8 | |
| 989 | 0 0 0 1 0 0 1 | 9 | |

Referring to FIG. 156 (Sheet 2), the Storage field is read through only to locate the Storage Mark, which will indicate the length of the field. Overlapped operation in the Memory Read/Write Mode and the Storage Read Mode is used mainly because Memory characters are to be changed. AUX Trigger 1 alternately turns ON and OFF during LZD Type Cycle 3, SAC being stepped plus one each time it is OFF. A character at a time is read from Memory, routed through the Digit and Zone Adders, without routing the Zone Adder Out, to strip the characters of their zones. This is done until CR 2 contains a Storage Mark. When line CR2=SM is UP, Turn ON Transition Trigger is routed allowing completion of the cycle.

At Start Cycle ECC 12 in LZD Type Cycle 3 with the AUX Trigger 1, Add Trigger and Mode Control Trigger OFF in the Storage Read and Memory Read/Write Modes of overlapped operation, a block of five Memory characters including the four at Memory Addresses 998 to 995, are transferring from Memory into MBR, and the 4 and 2 digit bits and A zone bit of the Memory character 6 at Memory address 998 are routed from MBR into CR 1 and into the Digit and Zone Adders. Adder Carry is suppressed to prevent decimal correction. The Storage character 5 at Storage address 0 is routed into CR 2. No Memory character was previously routed to the Digit Adder so that nothing is written into Memory from the Result Register during ECC 12. The present Storage character 5 in CR 2 is regenerated into Storage address 0, with a positive sign. MAC 1 is not stepped because the Mode Control Trigger is OFF. SAC is stepped plus one to Storage address 1. AUX Trigger 1 is routed ON.

Note that when the Mode Control Trigger comes ON, the character read will be at a Memory address one lower than that contained in MAC 1.

At ECC 13 in LZD Type Cycle 3 with AUX Trigger 1 ON, Add Trigger and Mode Control Trigger ON in the Storage Read and Memory Read/Write Modes of overlapped operation the 4 and 1 digit bits and A zone bit of the Memory character 5 at Memory address 997 are routed from MBR into CR 1 and into the Digit and Zone Adders. Adder Carry is suppressed to prevent decimal correction. The Storage character 6 at Storage address 1 is routed into CR 2. The 4 and 2 digit bits previously routed to the Digit Adder in ECC 12 are written into Memory from the Result Register at Memory address 998. The present Storage character 6 in CR 2 is regenerated into Storage address 1 with a positive sign. MAC 1 is stepped minus one to Memory address 997. SAC is not stepped. AUX Trigger 1 is routed OFF.

At ECC 14 in LZD Type Cycle 3 with AUX Trigger 1 OFF in the Storage Read and Memory Read/Write Modes of overlapped operation the 4 digit bit and B zone bit of the Memory character 4 at Memory address 996 are routed from MBR into CR 1 and into the Digit and Zone Adders. Adder Carry is suppressed to prevent decimal correction. The Storage character 6 at address 1 is again routed into CR 2. The 4 and 1 digit bits previously routed to the Digit Adder in ECC 13 are written into Memory from the Result Register at Memory address 997. The present Storage character 6 in CR 2 is regenerated into Storage address 1 with a positive sign. MAC 1 is stepped minus one to Memory address 996 and SAC is stepped plus one to Storage address 2. AUX Trigger 1 is routed ON.

The contents of Storage and Memory follows:

| Storage Address | C B A 8 4 2 1 | Character |
|---|---|---|
| 0 | 0 0 0 0 1 0 1 | 5 |
| 1 | 0 0 0 0 1 1 0 | 6 |
| 2 | 1 0 0 0 1 1 1 | 7 |
| 3 | 0 0 0 1 0 0 1 | 9 |
| 4 | 0 0 0 0 0 0 0 | SM |
| Memory Address | | |
| 998 | 0 0 0 0 1 1 0 | 6 |
| 997 | 0 0 0 0 1 0 1 | 5 |
| 996 | 0 1 0 0 1 0 0 | 4 } 6 |
| 995 | 1 0 1 0 0 1 1 | 3 } 6 |
| 994 | 1 1 1 0 0 1 0 | 2 } 7 |
| 993 | 0 0 1 0 0 0 1 | 1 } 7 |
| 992 | 1 0 1 1 0 1 0 | 0 } 9 |
| 991 | 0 1 0 0 1 1 1 | 7 } 9 |
| 990 | 1 0 0 1 0 0 0 | 8 |
| 989 | 0 0 0 1 0 0 1 | 9 |

At ECC 15 in LZD Type Cycle 3 with AUX Trigger 1 ON in the Storage Read and Memory Read/Write Modes of overlapped operation the 2 and 1 digit bits and A zone bit of the Memory character 3 at Memory address 995 are routed from MBR into CR 1 and into the Digit and Zone Adders. Adder Carry is suppressed to prevent decimal correction. The Storage character 7 at Storage address 2 is routed into CR 2. The 4 digit bit previously routed to the Digit Adder in ECC 14 is written into Memory from the Result Register (with a C bit) at Memory address 996. The present Storage character 7 in CR 2 is regenerated into Storage address 2, with a positive sign. MAC 1 is stepped minus one to Memory address 995. SAC is not stepped. AUX Trigger 1 is routed OFF. Due to recognition of a Critical Address in MAC 1, the Transition Trigger is routed ON, and the Add Trigger is routed OFF.

At Transition cycle ECC 16 in LZD Type Cycle 3 with AUX Trigger 1 OFF in the Storage Read :nd Memory Read/Write Modes of overlapped operation, the Memory character routed from MBR into CR 1 is blocked from entering CR 1 because the Transition Trigger is ON. The 2 and 1 bits routed into CR 1 in ECC 15 remain. The Storage character 7 from Storage address 2 is again routed into CR 2. The 2 and 1 digit bits previously routed to the Digit Adder in ECC 15 are written into Memory from the Result Register at Memory address 995. The present Storage character 7 in CR 2 is regenerated into Storage address 2, with a positive sign. MAC 1 is stepped minus one to Memory address 994. SAC is not stepped, because the Transition Trigger is ON. AUX Trigger 1 is not routed ON because the Transition Trigger is ON. The Mode Control Trigger and Transition Trigger are routed OFF. When the Mode Control Trigger comes OFF in ECC 17, MAC 1 will not "Read Low."

The contents of Storage and Memory are:

| Storage Address | C B A 8 4 2 1 | Character |
|---|---|---|
| 0 | 0 0 0 0 1 0 1 | 5 |
| 1 | 0 0 0 0 1 1 0 | 6 |
| 2 | 1 0 0 0 1 1 1 | 7 |
| 3 | 0 0 0 1 0 0 1 | 9 |
| 4 | 0 0 0 0 0 0 0 | SM |
| Memory Address | | |
| 997 | 0 0 0 0 1 0 1 | 5 |
| 996 | 1 0 0 0 1 0 0 | 4 |
| 995 | 0 0 0 0 0 1 1 | 3 |
| 994 | 1 1 1 0 0 1 0 | 2 } 7 |
| 993 | 0 0 1 0 0 0 1 | 1 } 7 |
| 992 | 1 0 1 1 0 1 0 | 0 } 9 |
| 991 | 0 1 0 0 1 1 1 | 7 } 9 |
| 990 | 1 0 0 1 0 0 0 | 8 |
| 989 | 0 0 0 1 0 0 1 | 9 |

At Start cycle ECC 17 in LZD Type Cycle 3 with AUX Trigger 1 OFF, and the Transition Add and Mode Control Triggers OFF, in the Storage Read and Memory Read/Write Modes of overlapped operation a new block of five Memory characters at addresses 994 to 990 are transferred from Memory to MBR, and the 2 digit bit and B and A zone bits of the Memory character at Memory address 994 are routed from MBR into CR 1 and into the Digit and Zone Adders. Adder Carry is suppressed to prevent decimal correction. The Storage character 7 from Storage Address 2 is again routed into CR 2. No Memory character was previously routed to the Digit Adder in ECC 16 so that none will be written into Memory from the Result Register. The present Storage character 7 in CR 2 is regenerated into Storage address 2 with a positive sign. MAC 1 is not stepped because the Mode Control Trigger is ON. SAC is stepped plus one to Storage address 3. The Add Trigger is turned ON. AUX Trigger 1 is routed ON. The Mode Control Trigger is routed OFF; when it comes OFF in ECC 18, MAC 1 will again "Read Low."

At ECC 18 in LZD Type Cycle 3 with AUX Trigger 1 ON and the Mode Control Trigger OFF in the Storage Read and Memory Read/Write Modes of overlapped operation the 1 digit bit and B zone bit of the Memory character 1 at Memory address 993 are routed from MBR into CR 1 and into the Digit and Zone Adders. Adder Carry is suppressed to prevent decimal correction. The Storage character 9 at Storage address 3 is routed into CR 2. The 2 digit bit previously routed to the Digit Adder in ECC 17 is written into Memory from the Result Register (with a C bit) at Memory address 994. The present Storage character 9 in CR 2 is regenerated into Storage address 3, with a positive sign. MAC 1 is stepped minus one to Memory address 993. SAC is not stepped. AUX Trigger 1 is routed OFF.

At ECC 19 in LZD Type Cycle 3 with AUX Trigger 1 OFF in the Storage Read and Memory Read/Write Modes of overlapped operation the 8 and 2 digit bits and A zone bit of the Memory character 0 at Memory address 992 are routed from MBR into CR 1 and into the Digit and Zone Adders. Adder Carry is suppressed to prevent decimal correction. The Storage character 9 at Storage address 3 is again routed into CR 2. The 1 digit bit previously routed to the Digit Adder in ECC 18 is written into Memory from the Result Register (with a C bit) at Memory address 993. The present Storage character 9 in CR 2 is regenerated into Storage address 3 with a positive sign. MAC 1 is stepped minus one to Memory address 992. SAC is stepped plus one to Storage address 4. AUX Trigger 1 is routed ON. The contents of Storage and Memory are:

| Storage Address | C B A 8 4 2 1 | Character |
|---|---|---|
| 0 | 0 0 0 0 1 0 1 | 5 |
| 1 | 0 0 0 0 1 1 0 | 6 |
| 2 | 1 0 0 0 1 1 1 | 7 |
| 3 | 0 0 0 1 0 0 1 | 9 |
| 4 | 0 0 0 0 0 0 0 | SM |
| Memory Address | | |
| 998 | 0 0 0 0 1 1 0 | 6 |
| 997 | 0 0 0 0 1 0 1 | 5 |
| 996 | 1 0 0 0 1 0 0 | 4 |
| 995 | 0 0 0 0 0 1 1 | 3 |
| 994 | 1 0 0 0 0 1 0 | 2 |
| 993 | 1 0 0 0 0 0 1 | 1 |
| 992 | 1 0 1 1 0 1 0 | 0 } 9 |
| 991 | 0 1 0 0 1 1 1 | 7 } 9 |
| 990 | 1 0 0 1 0 0 0 | 8 |
| 989 | 0 0 0 1 0 0 1 | 9 |

At ECC 20 in LZD Type Cycle 3 with AUX Trigger 1 ON, in the Storage Read and Memory Read/Write Modes of overlapped operation the 4, 2 and 1 digit bits and B zone bit of the Memory character 7 at Memory address 991 are routed from MBR into CR 1 and into the Digit and Zone Adders. Adder Carry is suppressed to prevent decimal correction. The Storage character SM at Storage address 4 is routed into CR 2. The 8 and 2 digit bits previously routed to the Digit Adder in ECC 19 are written into Memory from the Result Register at Memory address 992. The present Storage character SM in CR 2 is regenerated into Storage address 4, with a positive sign. MAC 1 is stepped minus one to Memory address 991. SAC is not stepped. AUX Trigger 1 is routed OFF. The lines Turn ON Transition and Storage Mark Triggers and End E Time are routed.

At ECC 21 in LZD Type Cycle 3 with AUX Trigger 1 OFF, in the Storage Read and Memory Read/Write Modes of overlapped operation the Storage Mark and Transition Triggers are ON. No Memory character is read from MBR into CR 1 because the Transition Trigger is ON. Adder Carry is suppressed to prevent decimal correction. The Storage character SM at Storage address 4 is again routed into CR 2. The 4, 2 and 1 digit bits previously routed to the Digit Adder in ECC 20 are written into Memory from the Result Register (with a C bit) at Memory address 991. Since the line End E Time is UP, execution of the LZD Instruction is ended. The contents of Storage and Memory are:

| Storage Address | C B A 8 4 2 1 | Character |
|---|---|---|
| 0 | 0 0 0 0 1 0 1 | 5 |
| 1 | 0 0 0 0 1 1 0 | 6 |
| 2 | 1 0 0 0 1 1 1 | 7 |
| 3 | 0 0 0 1 0 0 1 | 9 |
| 4 | 0 0 0 0 0 0 0 | SM |
| Memory Address | | |
| 998 | 0 0 0 0 1 1 0 | 6 |
| 997 | 0 0 0 0 1 0 1 | 5 |
| 996 | 1 0 0 0 1 0 0 | 4 |
| 995 | 0 0 0 0 0 1 1 | 3 |
| 994 | 1 0 0 0 0 1 0 | 2 |
| 993 | 1 0 0 0 0 0 1 | 1 |
| 992 | 0 0 0 1 0 1 0 | 0 |
| 991 | 1 0 0 0 1 1 1 | 7 |
| 990 | 1 0 0 1 0 0 0 | 8 |
| 989 | 0 0 0 1 0 0 1 | 9 |

More particularly, during the Instruction cycle of the LZD Instruction the Instruction Counter contains the Memory Address of the Instruction. This address should end in a 4 or a 9.

Located in Memory Address 0, 1, 2, 3, 4 is the LZD Instruction which has an Operations part of &, an ASU Coding of 0 and a Memory Coding of 998.

The format of the LZD Instruction follows:

| Memory Address | MBR Character | C B A 8 4 2 1 |
|---|---|---|
| 01234 | 0 | 0 1 1 0 0 0 0 |
| 01233 | 1 | 0 0 0 1 0 1 0 |
| 01232 | 2 | 0 0 0 1 0 0 1 |
| 01231 | 3 | 0 0 0 1 0 0 1 |
| 01230 | 4 | 1 0 0 1 0 0 0 |

IC contains address 01234 which refers to the LZD Instruction above. The zone-bits of MBR characters 2 and 3 indicate the starting address (0) of the Storage field to be unloaded. The numeral bits of MBR characters 1 to 4 and the A and B zone bits of MBR character 1 and the B bit of MBR character 4 indicate the starting address (998) of the Memory field to be repacked.

At the start of the Instruction cycle the Instruction Counter contains 1234. In FIG. 32*a*, the units order trigger is set to make the IC–4 lines **32*a*.01 and 32*a*.02** positive. In the second order of the Instruction Counter of FIG. 32*a*, the 20 and 10 triggers are ON making the IC–20 lines **32*a*.06 and 32*b*.07 and the IC–10 lines 32*b*.08 and 32*b*.09** positive to indicate 30. The 80 and 40 triggers are OFF. In the third order of the Instruction Counter of FIG. 32*c*, the 200 trigger is ON making the IC–200 lines **32*c*.06 and 32*c*.07 positive. The 800, 400 and 100 triggers are OFF. The fourth order of the Instruction Counter, the 1000 trigger is ON making the IC–1000 lines 32*d*.08 and 32*d*.09** positive. The 8000, 4000 and 2000 triggers are OFF. In the fifth order of the Instruction Counter of FIG. 32*e*, all of the triggers are OFF indicating "zero." At $R_0$ of the Instruction cycle the contents of the Instruction Counter are placed in the Memory Address Select Register and in FIG. 49*b*, the IC–4 line **32*a*.01 is positive and the Set MASR to IC line 93*s*.01 is positive to bring up the 4 line 49*b*.04**. The $\overline{8}$, $\overline{2}$ and $\overline{1}$ lines are positive via the Inverters. In FIG. 49*a*, the $\overline{8}$, 4, $\overline{2}$ and $\overline{1}$ lines are positive and the pulse on the $R_0$ line 101.01 turns ON the MASR–4 trigger making the MASR–4 lines **49*a*.07 and 49*a*.08** positive. The remaining triggers of the first order of MASR are turned OFF if ON previously, to make positive the MASR–$\overline{8}$, the MASR–$\overline{2}$ and the MASR–$\overline{1}$ positive. In the second order of MASR of FIG. 49*d*, the IC–20 line **32*b*.06 and the IC–10 line 32*b*.08 are positive and the set MASR to IC line 93*s*.01 makes the 20 line 49*b*.06 and the 10 line 49*b*.08** positive. The $\overline{80}$ and $\overline{40}$ lines are positive via the Inverters. In FIG. 49*c*, the $\overline{80}$, $\overline{40}$, 20 and 10 lines are positive to condition diode gates for the pulse on the $R_0$ (D0.4) line 101.02 which turns ON the 20 and 10 triggers and turns OFF the 80 and 40 triggers, if ON. Therefore, the MASR–$\overline{80}$, the MASR–$\overline{40}$, the MASR–20 and MASR–10 lines are positive. In FIG. 49*f*, the IC–200 line **32*c*.06 is positive and the Set MASR to IC line 93*s*.01 is positive to bring up the 200 line 49*f*.06**. The $\overline{800}$, $\overline{400}$ and $\overline{100}$ lines are positive via the Inverters. In FIG. 49*e*, the $\overline{800}$, $\overline{400}$,200 and $\overline{100}$ lines are positive to condition gates for the $R_0$ pulse on the line 101.03 to turn ON the 2 trigger and turn OFF the 8, 4 and 1 triggers, if ON. Therefore, the MASR–$\overline{800}$, MASR–$\overline{400}$, MASR–$\overline{100}$ lines are positive and the MASR–200 line **49*e*.08** is positive. In FIG. 49*j*, the IC–1000 line **32*d*.08 is positive and the Set MASR to IC line 93*s*.01 is positive to make positive the 1000 line 49*h*.08**, the $\overline{8000}$, $\overline{4000}$ and $\overline{2000}$ are positive. In FIG. 49*g*, the $\overline{8000}$, $\overline{4000}$, $\overline{2000}$ and 1000 lines condition diode gates for the $R_0$ pulse on the line 101.04 to turn ON the 1000 trigger and turn OFF the 8000, 4000 and 2000 triggers, if ON. In FIG. 49*l*, none of the input lines from the Instruction Counter are positive. Accordingly, the $\overline{40,000}$, $\overline{20,000}$ and $\overline{10,000}$ lines are positive via the Inverters. In FIG. 49*i*, the $\overline{10,000}$, $\overline{20,000}$ and $\overline{40,000}$ lines condition diode gates for the $R_0$ pulse on the line 101.05 to turn OFF the fifth order triggers if ON.

Beginning with Reading from Memory during the Read portion of the Instruction cycle, in FIG. 3*b*, the $\overline{20,000}$, $\overline{80}$, $\overline{40}$ and 20 lines are positive to bring up the 20 line **3*b*.03**. In FIG. 5*a*, the 20 line **3*b*.03 brings down the $\overline{20}$ line 5*a*.04 and makes positive the 20 line 5*a*.03**. All of the remaining NOT lines are up because of the Inverters. In FIGS. 5*b* and 5*c* all of the output lines except the 20 line **5*b*.02 are driven when the Memory Read Bias Gate on the line 5*g*.09 goes positive at $R_0$. In FIG. 8, all of the columns of cores are driven with reset current except the lines linked by the 20 line 5*b*.02**. In FIG. 3*d*, the $\overline{10,000}$, $\overline{8}$, $\overline{1}$ and $\overline{2}$ lines are positive to make positive the 10–14 line **3*d*.05**. In FIG. 7*a*, the 10–14 line **3*d*.05 brings down the $\overline{10–14}$ line 7*a*.06 and makes positive the 10–14 line 7*a*.05**. All of the remaining NOT lines are up because their inputs are down. In FIGS. 7*b* and 7*c*, all of the outputs are driven except the 10–14 line **7*b*.03 when the Memory Read Bias Gate on the line 5*g*.11 becomes positive at $R_{0.5}$. In FIG. 9, all of the columns of cores are driven with reset current except for the one linked by the 10–14 line 7*b*.03**. In FIG. 3*a*, the $\overline{8000}$, $\overline{4000}$, $\overline{2000}$ and 1000 lines are positive. Therefore, the 1000 line **3*a*.03 is positive. In FIG. 4, the 1000 line 3*a*.03 is positive and the Memory Y Read Bias Gate on the line 5*g*.08 becomes positive at $R_1$ to drive the 1000 line 4.02. In FIG. 8 all of the columns of cores except the one linked by the 20 line 5*b*.02 are driven with reset current and the 1000 line 4.02** is driven with set current which sets the 1020 core to the "one" state and provides half-select reset current on its secondary. In FIG. 3*c* the $\overline{800}$, $\overline{400}$, 200 and $\overline{100}$ lines are positive to make positive the 200 line **3*c*.05. In FIG. 6, the 200 line 3*c*.05 is positive and the Memory X Read Gate on the line 5*g*.07 comes up at $R_{1.3}$ to drive the 200 line 6.03. In FIG. 9, all of the columns of cores except the one linked by the 10–14 line 7*b*.03 are driven with reset current. The 200 line 6.03** is driven with set current, and, therefore, the 210–214 core is set to the "one" state and provides half-select reset current on its secondary to the Switch Core Array of FIG. 13. In the Core Array the 1020 line and the 200 line provide reset current to the thirty-five cores of Memory addresses 1230 through 1234, thereby providing indications of binary "ones" on the sense windings. At $R_{3.5}$ the sense windings are sampled and the triggers of the Memory Buffer Register are set according to bit configuration of Memory Addresses 1230 through 1234. The Memory Buffer Register now contains the LZD Instruction as previously described.

At $A_0$ the Storage Select Register is set to the ASU Coding of the Memory Buffer Register, CR 1 receives the contents of character 4 position of MBR and at $A_1$ the Memory Address contained in MBR is set into the Memory Address Register. At $A_0$ the character 0 position of MBR is set into the Operation Register. In FIG. 21*a*, the MBR character 0–1 line, the MBR character 0–2 line, MBR character 0–4 line and the MBR character 0–8 line are DOWN. In FIG. 21*b*, the MBR character 0–A line and the MBR character 0–B line are UP. The MBR character 0–C line is DOWN, and positive signals on the $A_0$ I Time Use lines 101.26 and 101.25 turn ON the A and B triggers to specify the operation code of the LZD Instruction. Lines **21*a*.46, 21*a*.47, 21*a*.48, 21*a*.49 and 21*b*.05 are DOWN, and lines 21*b*.01 and 21*b*.03** are UP. In FIG. 23*a*, line **23*a*.44 is UP and line 23*a*.45, the Minus OP Register AB line is DOWN bringing UP the Load Zones lines 146.04, 146.05 and 146.06**, in FIG. 146.

In FIG. 121 the End I Time Use line 61.03 is positive to condition the diode gate for the fall of the $A_3/R_4–W_2$ (Blocked) line 104.10 which switches the I/E trigger from I to E and brings up the E time line 21.02 and brings down the I time line 121.01. In FIG. 122 the End I Time Use line 61.04 is positive to condition the diode gate for the fall of the $A_3/R_4–W_2$ (Blocked) line 121.03 which turns on the ECC 1 trigger and brings up the ECC 1 line 121.03 and the ECC 1/2 line 122.05. These signals are distributed via the I/E Timer outputs of FIGS. 123 and 124, thus, at $W_2$ of the Instruction cycle, the I/E trigger specifies E time and the ECC 1 trigger specifies that the first Execute cycle shall be ECC 1. During the Write portion of the Instruction cycle the contents of the Memory Buffer Register are returned to Memory addresses 1230 through 1234 and at $W_3$ the MBR is reset.

Figure 147:
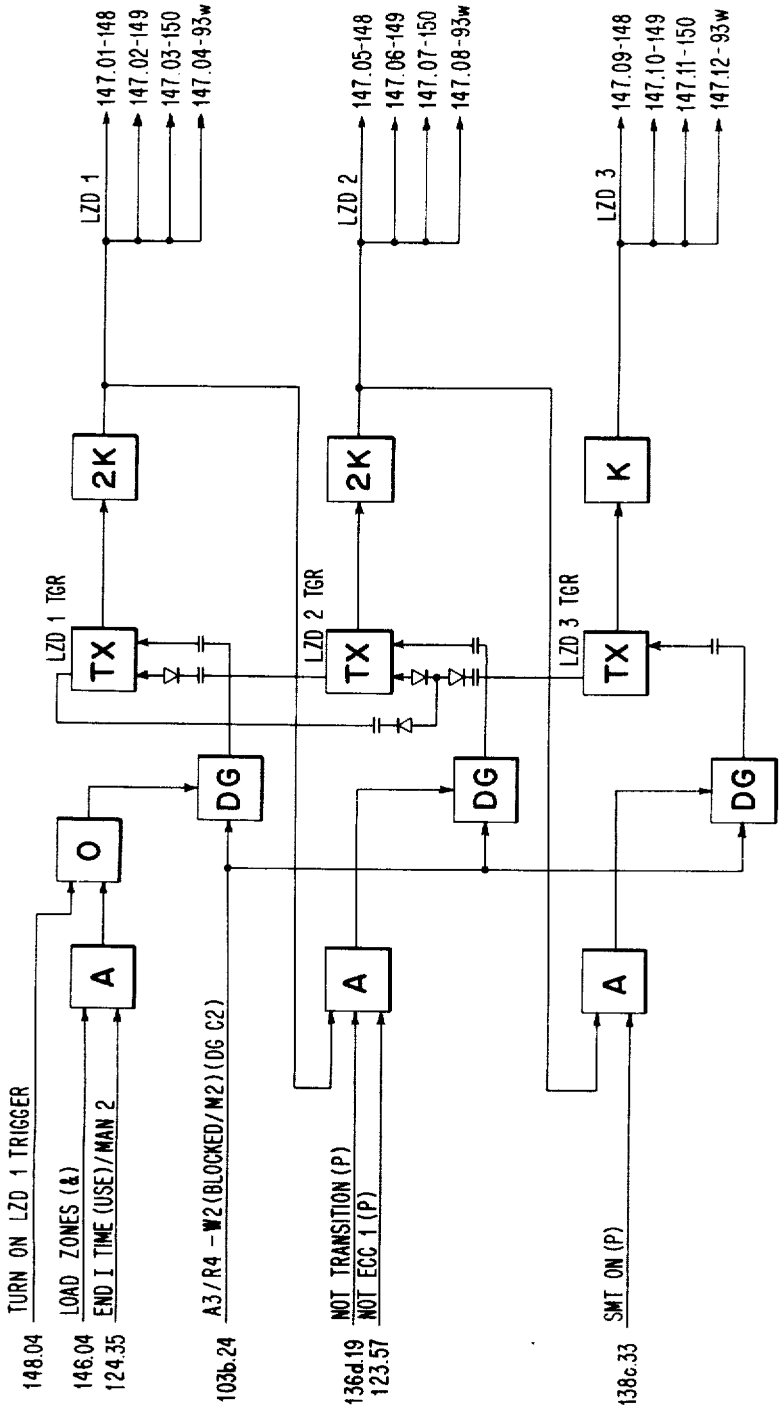
Figure 148:
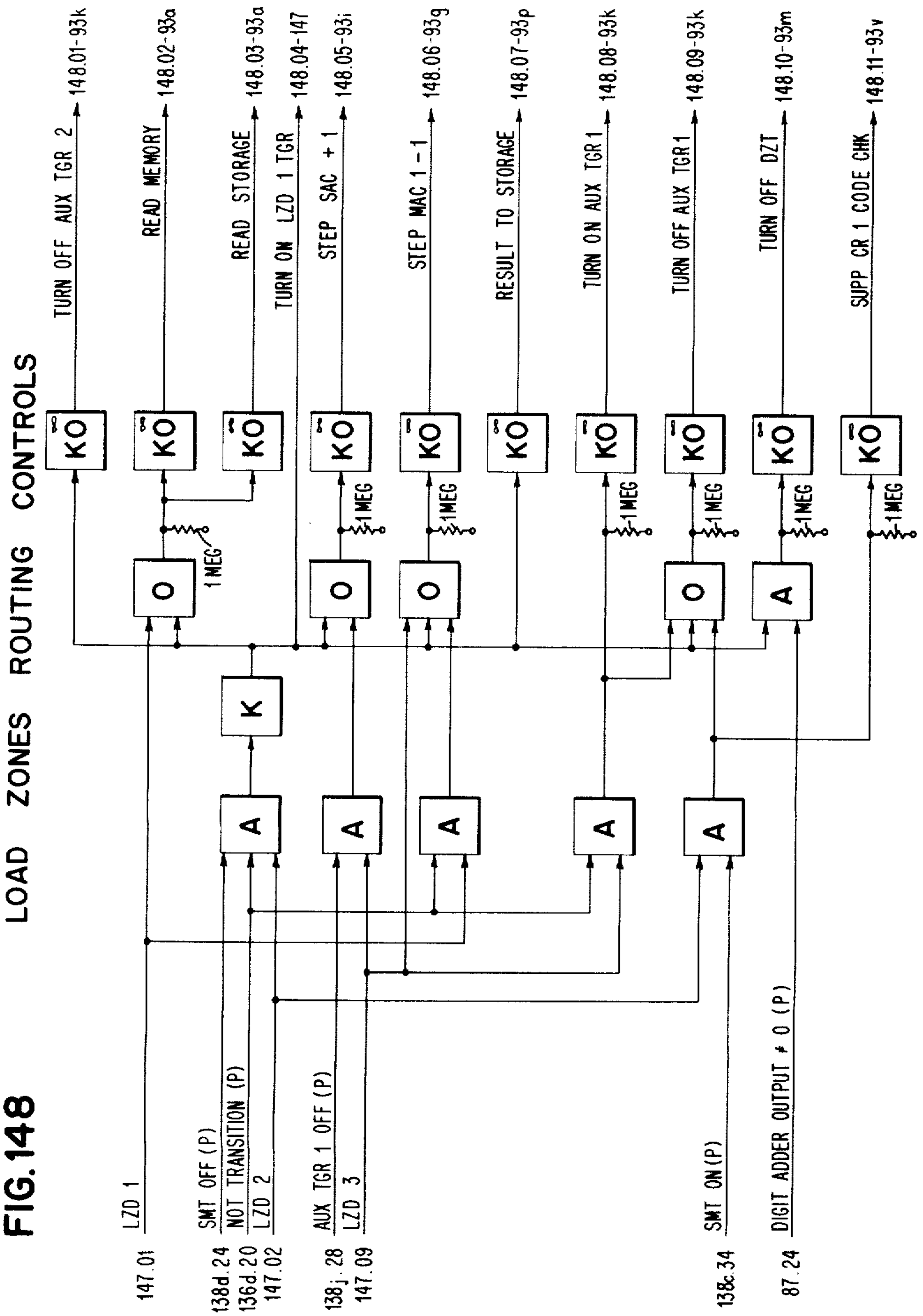
Figure 149:
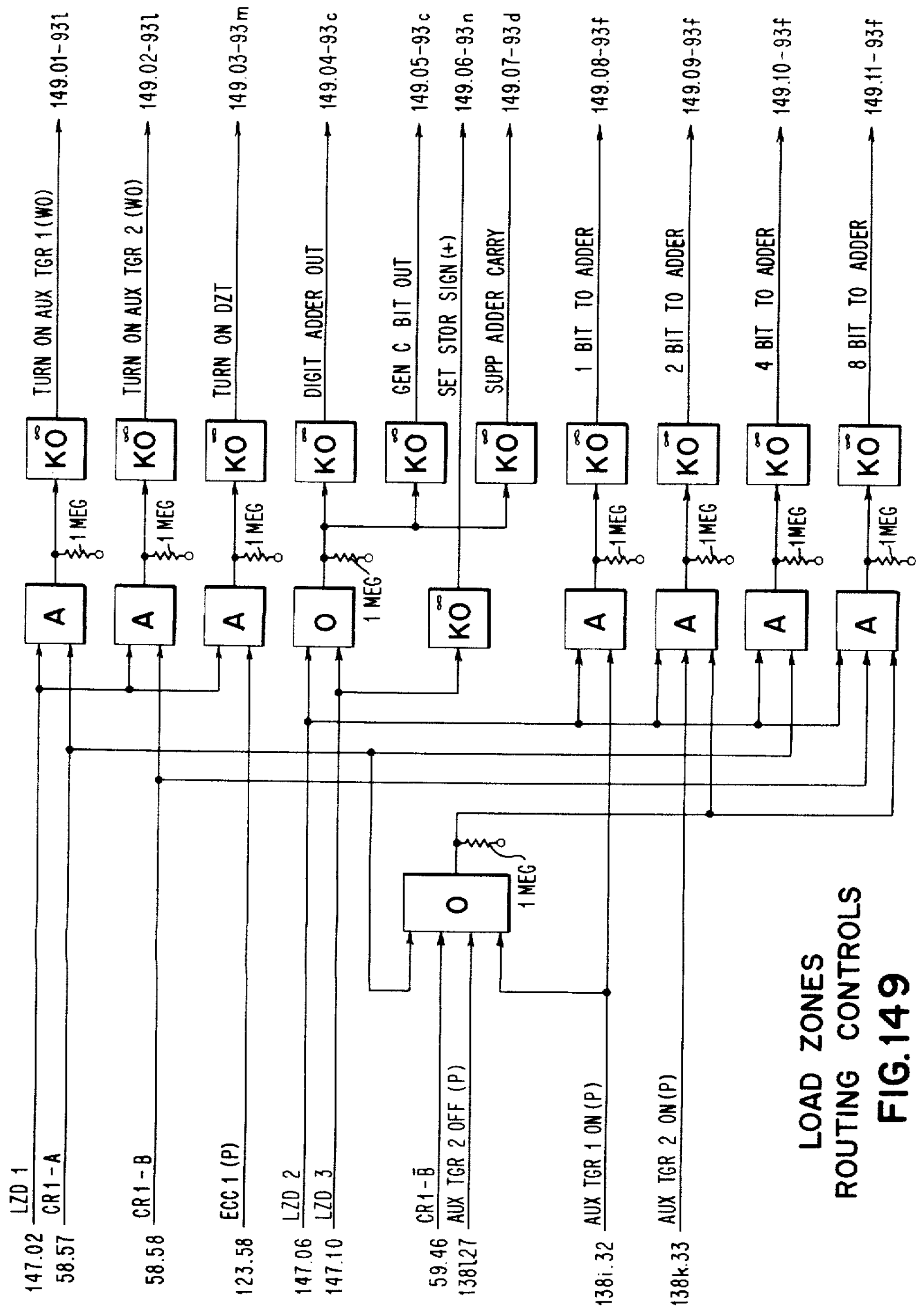
Figure 150:
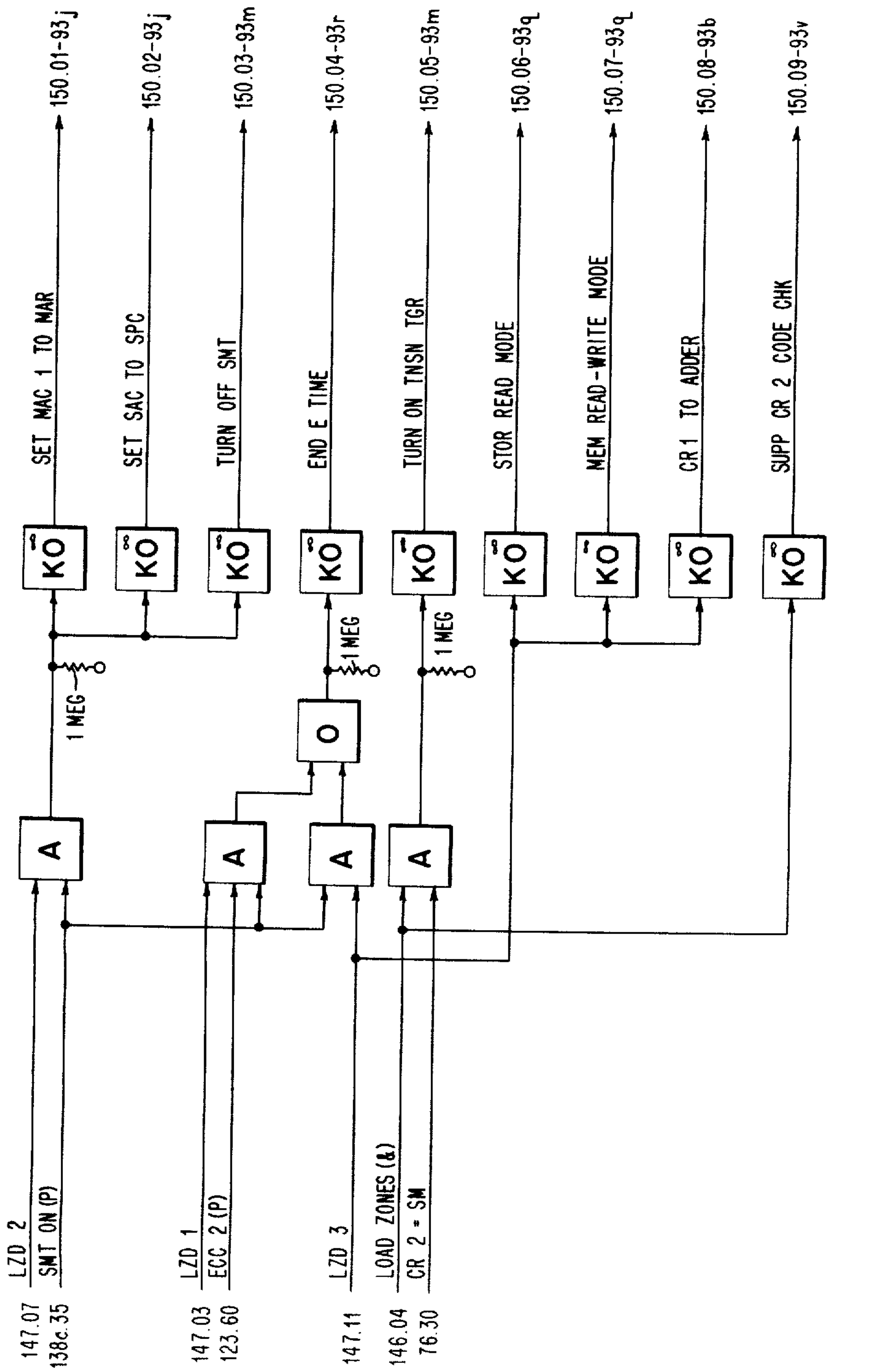

At ECC 1, in FIG. 147, with Load Zones line 146.04 UP and End I Time (Use)/Manual 2 line 124.35 UP conditioning a gate so that the next $A_3/R_4–W_2$ (Blocked M2) pulse turns ON the LZD–1 (Type Cycle 1) Trigger bringing UP LZD–1 (Type Cycle 1) lines 147.01 to 147.04. In FIG. 148, LZD 1 line 147.01 is UP bringing UP Read Memory line 148.02, Read Storage line 148.03 and going into an AND circuit which along with the Not Transition line **136*d*.20 brings UP the Step MAC 1–1 line 148.06. In FIG. 149, LZD 1 line 147.02 is UP. This conditions an AND circuit, the other input of which is ECC 1 (P) line 123.58, bringing UP the line Turn ON DZT 149.03. The AND circuit having an input from LZD 1 line 147.02 and CR 1–A bit, line 58.57 brings UP Turn ON AUX Trigger 1 at $W_0$ line 149.01. In FIG. 150, Load Zones (&) line 146.04** brings UP line Suppress CR 2 Code Check. This line remains UP during the entire LZD instruction and will therefore not be referred to again.

At ECC 2, in FIG. 147, the LZD 1 line 147.01 will condition an AND circuit along with Not Transition (P) line **136*d*.19 and Not ECC 1 (P) line 123.57, so that the LZD 2 (Type Cycle 2) Trigger will come ON, during the next $W_2$ time, bringing up the LZD 2 lines 147.05 to 147.08 and turning OFF the LZD 1 Trigger. In FIG. 148, LZD 1 line 147.01 is UP, bringing UP the line Read Memory 148.02 and Read Storage line 148.03. LZD 1 line 147.01 being UP along with Not Transition line 136.20 will bring up Step MAC 1–1 line 148.06. In FIG. 149, LZD 1 line 147.02 and CR 1–A line 58.57 being UP bring UP the Turn ON AUX Trigger 1 at $W_0$ line 149.01**.

At ECC 3, in FIG. 147, the LZD 2 Trigger is ON holding lines 147.05 to 147.08 UP. In FIG. 148, the LZD 2 line 147.02, the Not Transition Trigger (P) line **136*d*.20 and the Storage Mark Trigger OFF (P) line 138*d*.24 are UP bringing UP the Turn OFF Aux Trigger 2 line 148.01, Read Memory line 148.02, Read Storage line 148.03, Turn ON LZD 1 Trigger line 148.04, Step SAC+1 line 148.05, Step MAC 1–1 line 148.06, Result to Storage line 148.07 and Turn OFF AUX Trigger 1 line 148.09. The Digit Adder Out Not Equal to Zero line 87.24 being UP, the line Turn OFF DZT 148.10 will be brought UP. In FIG. 149, LZD 2 line 147.06 is UP bringing Up the Digit Adder Out line 149.04, Generate C Bit Out line 149.05, and Suppress Adder Carry line 149.07, LZD 2 line 147.06 being UP along with AUX Trigger 1 ON line 138*i*.32, the 1 Bit to Adder line 149.08 is brought UP. With LZD 2 line 147.06 UP along with CR 1–A line 58.57 the 4 bit to Adder line 149.10** is brought UP.

At ECC 4, in FIG. 147, the Turn ON LZD 1 Trigger line 148.04 is UP, so that the next $A_3/R_4–W_2$ pulse on line **103*b*.24 will condition the gate to turn ON the LZD 1 Trigger which brings up LZD 1 lines 147.01 through 147.04. In FIG. 148, the LZD 1 line 147.01 is UP bringing UP the Read Memory line 148.02, the Read Storage line 148.03, and is ANDed with the Not Transition (P) line 136*d*.20 to bring UP the Step MAC 1–1 line 148.06. In FIG. 149 with the LZD 1 line 147.02 UP and CR 1–B line 58.58 being UP the Turn ON AUX Trigger 2 at $W_0$ line 149.02** is brought UP.

At ECC 5 in FIG. 147 the LZD 1 Trigger being ON and the Not Transition (P) line **136*d*.19 and the Not ECC 1 (P) line 123.57 both being UP the gate is conditioned so that at the $W_2$ pulse when the $A_3/R_4-W_2$ line 103*b*.24 comes UP the LZD 2 Trigger is turned ON to bring UP LZD 2 lines 147.05 to 147.08. In FIG. 148 with the LZD 2 line 147.02 UP the Not Transition (P) line 136.20 being UP and the Storage Mark Trigger OFF (P) line 138*d*.24 UP, the Turn OFF AUX Trigger 2 line 148.01 is brought UP as are the lines: Read Memory line 148.02, Read Storage line 148.03, Turn ON LZD 1 Trigger line 148.04, Step SAC+1 line 148.05, Step MAC 1–1 line 148.06, Result to Storage line 148.07 and Turn OFF AUX Trigger 1 line 148.09. If the Digit Adder Output Not Equal to Zero line 87.24 is UP the Turn OFF DZT line 148.10 is brought UP. In FIG. 149 LZD 2 line 147.06 is UP bringing UP the Digit Adder Out line 149.04, the Generate C Bit Out line 149.05 and the Suppress Adder Carry line 149.07. With LZD 2 line 147.06 UP, the AUX Trigger 2 ON (P) line 138*k*.33 being UP and the CR 1–A line 58.57 being UP the 2 Bit to Adder line 149.09 comes UP. The LZD 2 line 147.06 and the CR 1–A line 58.57 being UP the 4 Bit to Adder line 149.10** is brought UP.

At ECC 6, in FIG. 147, the Turn ON LZD 1 Trigger line 148.04 is UP which conditions the diode gate so that the next $A_3/R_4-W_2$ pulse on line **103*b*.24 turns ON the LZD 1 Trigger which brings UP LZD 1 lines 147.01 through 147.04 and turns OFF the LZD 2 Trigger. In FIG. 148 the LZD 1 line 147.01 is UP which brings UP Read Memory line 148.02, and Read Storage line 148.03, LZD 1 line 147.01 is UP along with Not Transition (P) line 136*b*.20 bringing UP the Step MAC 1–1 line 148.06. In FIG. 149 the LZD 1 line 147.02 and the CR 1–A line 58.57 being UP the Turn ON AUX Trigger 1 ($W_0$) line 149.01 is brought UP. Also CR 1–B Bit line 58.58 is UP bringing UP the Turn ON AUX Trigger 2 ($W_0$) line 149.02**.

At ECC 7, in FIG. 147, with the LZD 1 Trigger ON, Not Transition (P) line **136*d*.19 UP and the Not ECC 1 (P) line 123.57 UP the gate is conditioned so that the next $A_3/R_4-W_2$ pulse on the line 103*b*.24 turns ON the LZD 2 Trigger which brings UP the LZD 2 lines 147.05 through 147.08 and turns OFF the LZD 1 Trigger. In FIG. 148, LZD 1 line 147.01 is UP, Not Transition (P) line 136*d*.02 is UP and Storage Mark Trigger (P) line 138*d*.34 is UP bringing UP Turn OFF AUX Trigger 2 line 148.01, Read Memory line 148.02, Read Storage line 148.03, Turn ON LZD 1 Trigger line 148.04, Step SAC +1 line 148.05, Step MAC 1–1 line 148.06, Result to Storage line 148.07, and Turn OFF Aux Trigger 1 line 148.09. Digit Adder Out Not Equal to Zero line 87.24 is UP bringing UP the Turn OFF DZT line 148.10. In FIG. 149 LZD 2 line 147.06 is UP bringing UP the Digit Adder Out line 149.04, Generate C Bit Out line 149.05 and Suppress Adder Carry line 149.07. LZD 2 line 147.06 being UP and AUX Trigger 1 ON (P) line 138*i*.32 UP, the One Bit to Adder line 149.08 is brought UP. The LZD 2 line 147.06 being UP the AUX Trigger The LZD 2 line 147.06 and the CR 1–A Bit line 58.57 being UP, the 2 Bit to Adder line 149.09 is brought UP. The LZD 2 line 147.06 and and the CR 1–A Bit line 58.57 being UP, the 4 Bit to Adder line 149.10** is brought UP.

At ECC 8, in FIG. 147 the Turn ON LZD 1 Trigger line 148.04 is UP conditioning the diode gate so that the next $A_3/R_4-W_2$ pulse on line **103*b*.24 turns ON the LZD 1 Trigger which brings up the LZD 1 lines 147.01 through 147.04 and turns OFF the LZD 2 Trigger. In FIG. 148, the LZD 1 line 147.01 is UP bringing UP the Read Memory line 148.02, and the Read Storage line 148.03. The Not Transition (P) line 136*d*.20 is UP also, bringing UP the Step MAC 1–1 line 148.06. In FIG. 149, the LZD 1 line 147.02 and the CR 1–A bit line 58.57 are UP bringing UP the Turn ON AUX Trigger 1 ($W_0$) line 149.01**.

At ECC 9, in FIG. 147, with the LZD 1 Trigger ON the Not Transition (P) line **136*d*.19 UP, and the Not ECC 1 (P) line 123.57 UP, the diode gate is conditioned so that the next $A_3/R_4-W_2$ pulse on line 103*b*.24 turns ON the LZD 2 Trigger which brings UP the LZD 2 lines 147.05 through 147.08 and turns OFF the LZD 1 Trigger. In FIG. 148, the LZD 2 line 147.02, the Not Transition (P) line 136*d*.20, the Storage Mark Trigger OFF (P) line 138*d*.24 are all UP bringing UP Turn OFF AUX Trigger 2 line 148.01, Read Memory line 148.02, Read Storage line 148.03, Turn ON LZD 1 Trigger line 148.04, Step SAC +1 line 148.05, Step MAC 1–1 line 148.06, Result to Storage line 148.07, and the Turn OFF AUX Trigger 1 line 148.09. Digit Adder Output Not Equal to Zero line 87.24 being UP, the Turn OFF DZT line 148.10 is brought UP. In FIG. 149, with LZD 2 line 147.06 UP the Digit Adder Out line 149.04 is brought UP, as are the Generate C Bit Out line 149.05 and the Suppress Adder Carry line 149.07. With the LZD 2 line 147.06 UP and AUX Trigger 1 ON (P) line 138*i*.32 UP the 1 Bit to Adder line 149.08 is brought UP. The LZD 2 line 147.06, CR 1–B bit line 58.58 and AUX Trigger 1 ON (P) line 138*i*.32 all being UP, the 8 Bit to Adder line 149.11** is brought UP.

At ECC 10, in FIG. 147, the Turn ON LZD 1 Trigger line 148.04 conditions the diode gate so that when the $A_3/R_4-W_2$ line **103*b*.24 is UP the LZD 1 Trigger is set ON, which brings UP the LZD 1 lines 147.01 to 147.04 and turns the LZD 2 Trigger OFF. In FIG. 148 the LZD 1 line 147.01 is UP bringing UP the Read Memory line 148.02 and Read Storage line 148.03. The LZD 1 line 147.01 and Not Transition (P) line 136*d*.20 are UP bringing the Step MAC 1–1 line 148.06** UP.

At ECC 11, in FIG. 147, the LZD 1 Trigger line 148.04 being ON, the Not Transition (P) line **136*d*.19 and the Not ECC 1 (P) line 123.57 being UP, condition the gate through the AND, the next $A_3/R_4-W_2$ pulse on line 103*b*.24 turning ON the LZD 2 Trigger which brings up the LZD 2 lines 147.05 to 147.08 turning OFF the LZD 1 Trigger. In FIG. 148 the LZD 2 line 147.02 and the Storage Mark Trigger ON (P) line 138*c*.34 being UP the Turn OFF AUX Trigger 1 line 148.09 and the Suppress CR 1 Code Check line 148.11 are brought UP. In FIG. 149, the LZD 2 line 147.06 brings UP the Digit Adder Out line 149.04, the Generate C Bit Out line 148.05, and the Suppress Adder Carry line 149.07. In FIG. 150, the LZD 2 line 147.07 and the Storage Mark Trigger ON (P) line 138*c*.35 will bring UP the Set MAC 1 to MAR line 150.01, Set SAC to SPC line 150.02 and Turn OFF Storage Mark Trigger line 150.03. The Load Zones (&) line 146.04 and the line CR 2 Storage Mark 76.03 being UP, the Turn ON Transition Trigger line 150.05 is brought up. With Load Zones (&) line 146.04 being UP the Suppress CR 2 Code Check line 150.09** is brought UP, as usual.

At ECC 12, in FIG. 147, the LZD 2 Trigger being ON and the Storage Mark Trigger ON (P) line **138*c*.33 UP, the diode gate is conditioned so that $A_3/R_4-W_2$ pulse on line 103*b*.24 turns ON the LZD 3 Trigger which brings UP the LZD 3 lines 147.09 to 147.12 and turns OFF the LZD 2 Trigger. In FIG. 148, the LZD 3 line 147.09 and the AUX Trigger 1 OFF (P) line 138*j*.28 are UP bringing UP the Step SAC +1 line 148.05. The LZD 3 line 147.09 being UP the Step MAC 1–1 line 148.06 is brought UP. The LZD 3 line 147.09 and the Not Transition (P) line 136*d*.20 are UP, bringing UP the Turn ON AUX Trigger 1 line 148.08 and the Turn OFF AUX Trigger 1 line 148.09. In FIG. 149, the LZD 3 line 147.10 brings UP the Digit Adder Out line 149.04, Generate C Bit Out line 149.05, the Set Storage Sign (+) line 149.06 and the Suppress Adder Carry line 149.07. In FIG. 150, the LZD 3 line 147.11 brings UP the Storage Read Mode line 150.07 and CR 1 to Adder line 150.08. The Load Zones (&) line 146.04 is UP all during the instruction bringing UP the Suppress CR2 Code Check line 150.09**, as above.

At ECC 13, in FIG. 148, LZD 3 line 147.09 brings UP the Step MAC 1–1 line 148.06. LZD 3 line 147.09 and Not Transition (P) line **136*d*.20 bring UP the Turn ON AUX Trigger 1 line 148.08 and Turn OFF AUX Trigger 1 line 148.09. In FIG. 149, the LZD 3 line 147.10 brings UP the Digit Adder Out line 149.04, the Generate C Bit Out line 149.05, the Set Storage Sign (+) line 149.06, and the Suppress Adder Carry line 149.07. In FIG. 150 LZD 3 line 147.11 brings UP the Storage Read Mode line 150.06, the Memory Read/Write Mode line 150.07, the CR 1 to Adder line 150.08**.

At ECC 14, in FIG. 148, LZD 3 line 147.09 and the AUX Trigger 1 OFF (P) line **138*j*.28 bring UP the Step SAC +1 line 148.05. The LZD 3 line 147.09 brings UP the Step MAC 1–1 line 148.06. The LZD 3 line 147.09 and the Not Transition (P) line 136*d*.20 bring UP the Turn ON AUX Trigger 1 line 148.08 and Turn OFF AUX Trigger 1 line 148.09. In FIG. 149, LZD 3 line 147.10 brings UP the Digit Adder Out line 149.04, Generate C Bit Out line 149.05, Set Storage Sign (+) line 149.06 and Suppress Adder Carry line 149.07. In FIG. 150, LZD 3 line 147.11 brings UP the Storage Read Mode line 150.06, the Memory Read/Write Mode line 150.07 and the CR 1 to Adder line 150.08**.

At ECC 15, in FIG. 148, LZD 3 line 147.09 brings UP the Step MAC 1–1 line 148.06. LZD 3 line 147.09 and the Not Transition (P) line **136*d*.20 bring UP the Turn on AUX Trigger 1 line 148.08 and the Turn OFF AUX Trigger 1 line 148.09. In FIG. 149, LZD 3 line 147.10 brings UP the Digit Adder Out line 149.04, the Generate C Bit Out line 149.05, the Set Storage Sign (+) line 149.06, and the Suppress Adder Carry line 149.07. In FIG. 150, LZD 3 line 147.11 brings UP the Storage Read Mode line 150.06, the Memory Read/Write Mode line 150.07 and the CR 1 to Adder line 150.08**.

At ECC 16, in FIG. 148, LZD 3 line 147.09 and the AUX Trigger 1 OFF (P) line **138*j*.28 bring UP the Step SAC 1+1 line 148.05. The LZD 3 line 147.09 brings UP the Step MAC 1–1 line 148.06. In FIG. 149, LZD 3 line 147.10 brings UP the Digit Adder Out line 149.04, the Generate C Bit Out line 149.05, the Set Storage Sign (+) line 149.06 and the Suppress Adder Carry line 148.07. In FIG. 150 LZD 3 line 147.11 brings UP the Storage Read Mode line 150.06, Memory Read/Write Mode line 150.07 and CR 1 to Adder line 150.08**.

At ECC 17, in FIG. 148, LZD 3 line 147.09 brings UP the Step MAC 1–1 line 148.06. The LZD 3 line 147.09 and the AUX Trigger 1 OFF (P) line **138*j*.28 bring UP the Step SAC +1 line 148.05. The LZD 3 line 147.09 and the Not Transition (P) line 136*d*.20 bring UP the Turn ON AUX Trigger 1 line 148.08, and the Turn OFF AUX Trigger 1 line 148.09. In FIG. 149, LZD 3 line 147.10 brings UP the Digit Adder Out line 149.04, Generate C Bit Out line 149.05, Set Storage Sign (+) line 149.06, and Suppress Adder Carry line 149.07. In FIG. 150, LZD 3 line 147.11 brings UP the Storage Read Mode line 150.06, the Memory Read/Write Mode line 150.07 and the CR 1 to Adder line 150.08**.

At ECC 18, in FIG. 148, the LZD 3 line 147.09 and the Not Transition (P) line **136*d*.20 bring UP the Turn ON AUX Trigger 1 line 148.08 and Turn OFF AUX Trigger 1 line 148.09. In FIG. 149 LZD 3 line 147.10 brings UP the Digit Adder Out line 149.04, Generate C Bit Out line 149.05, Set Storage Sign (+) line 149.06 and Suppress Adder Carry line 149.07. In FIG. 150, LZD 3 line 147.11 brings UP the Storage Read Mode line 150.06, Memory Read/Write Mode line 150.07, and CR 1 to Adder line 150.08**.

At ECC 19, in FIG. 148, LZD 3 line 147.09 brings UP the Step MAC 1–1 line 148.06. The LZD 3 line 147.09 and the AUX Trigger 1 OFF (P) line **138*j*.28 bring UP the Step SAC +1 line 148.05. The LZD 3 line 147.09 and the Not Transition (P) line 136*d*.20 bring UP the Turn ON AUX Trigger 1 line 148.08 and Turn OFF AUX Trigger 1 line 148.09. In FIG. 149, LZD 3 line 147.10 brings UP the Digit Adder Out line 149.04, Generate C Bit Out line 149.05, Set Storage Sign (+) line 149.06 and Suppress Adder Carry line 147.07. In FIG. 150, Load Zones 3 line 147.11 brings UP the Storage Read Mode line 150.06, the Memory Read/Write Mode line 150.07, and the CR 1 to Adder line 150.08**.

At ECC 20 in FIG. 148, LZD 3 line 147.09 brings UP the Step MAC 1–1 line 148.06. The LZD 3 line 147.09 and the Not Transition (P) line **136*d*.20 bring UP the Turn ON AUX Trigger 1 line 148.08 and the Turn OFF AUX Trigger 1 line 148.09. In FIG. 149, LZD 3 line 147.10 brings UP the Digit Adder Out line 149.04, Generate C Bit Out line 149.05, Set Storage Sign (+) line 149.06 and Suppress Adder Carry line 149.07. In FIG. 150, LZD 3 line 147.11 brings UP the Storage Read Mode line 150.06, Memory Read/Write Mode line 150.07 and CR 1 to Adder line 150.08**.

At ECC 21, in FIG. 148, LZD 3 line 147.09 brings UP the Step MAC 1–1 line 148.06. In FIG. 149 LZD 3 line 147.10 brings UP the Digit Adder Out line 149.04, Generate C Bit Out line 149.05, Set Storage Sign (+) line 149.06, and Suppress Adder Carry line 149.07. In FIG. 150, LZD 3 line 147.11 brings UP the Storage Read Mode line 150.06, Memory Read/Write Mode line 150.07, CR 1 to Adder line 150.08. Load Zones line 146.04 brings UP the Suppress CR2 Code Check line 150.09 as usual. The LZD 3 line 147.11 and the Storage Mark Trigger ON (P) line **138*c*.35 bring UP the End E Time line 150.04. The Load Zones line 146.04 and the line CR 2=Storage Mark 76.30 bring UP the Turn ON Transition Trigger line 150.05**.

The End E Time line **50*e*.10** goes to FIG. 93*r* where it makes positive the End E Time lines **93*r*.01 through 93*r*.06. In FIG. 121, the End E Time line 93*r*.06 conditions a diode gate for the fall of the $A_3/R_4$–$W_2$ line which switches the I/E trigger from E to I and brings up the I Time line 121.01**. Therefore, the next cycle will be an Instruction cycle.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a data processing system of the type wherein data is processed in accordance with instructions, each instruction comprising a plurality of character manifestations including an operations part, a first address part, and a second address part; and wherein said data comprises character manifestations, each character including adjacent zone and numeric portions; a data expansion device comprising:

a memory means for storing a plurality of character manifestations in a plurality of addressable memory locations, each location including a zone part and a numeric part, the numeric portions of said character manifestations expressing a number of orders of a first value stored in said numeric parts, the zone portions of said charatcer manifestations expressing a plurality of orders of a second value stored in said zone parts;

a storage means for storing numeric portions of character manifestations in a plurality of addressable storage locations, each location having at least a numeric part;

memory address means responsive to the first address part of said instructions and operable upon said memory means for gaining access to the character manifestations stored in said addressable memory locations;

storage address means responsive to the second address part of said instructions and operable upon said storage means for gaining access to addressable storage locations for storing character manifestations therein;

retrieval means responsive to the operation part of said instruction for concurrently removing from said memory means zone and numeric portions of character manifestations stored in the addressable memory locations excessed by said memory address means and said storage address means, respectively;

numeric transfer means responsive to said retrieval means for returning said numeric portions to said numeric parts of said memory means, each numeric portion being returned to the same addressable memory location from which it was removed;

and zone transfer means responsive to said retrieval means for directing said zone portions to numeric parts of addressable storage locations in said storage means, so as to leave said memory means with said first value stored therein and transfer said second value from said zone parts of said memory means into numeric parts of said storage means.

2. In a data processing system of the type wherein data is processed in accordance with instructions, each instruction comprising a plurality of character manifestations including an operations part, a first address part, and a second address part; and wherein said data comprises character manifestations, each character including adjacent zone and numeric portions; a data compression device comprising:

a memory means for storing a plurality of character manifestations in a plurality of addressable memory locations, each location including a zone part and a numeric part, the numeric portions of said character manifestations expressing a number of orders of a first value stored in said numeric parts;

a storage means for storing numeric portions of character manifestations in a plurality of addressable storage locations, each location having at least a numeric part;

memory address means responsive to the first address part of said instructions and operable upon said memory means for gaining access to the character manifestations stored in said addressable memory locations;

storage address means responsive to the second address part of said instructions and operable upon said storage means for gaining access to addressable storage locations for retrieving character manifestations stored therein;

memory retrieval means and storage retrieval means each responsive to the operation part of said instructions for concurrently removing from said memory means and from said storage means, respectively, numeric portions of character manifestations stored in the addressable memory and storage locations accessed by said memory address means and said storage address means, respectively;

numeric transfer means responsive to said memory retrieval means for returning numeric portions removed from said memory means to numeric parts of the same addressable memory locations from which they are removed;

and zone transferal means responsive to said storage retrieval means for directing said numeric portions from said storage means to zone parts of addressable memory locations adjacent to said numeric parts in said memory means, so as to leave said memory means with said first value stored in numeric parts thereof and to transfer said second value from said numeric parts of said storage means into zone parts of said memory means.

References Cited in the file of this patent

UNITED STATES PATENTS

| | | |
|---|---|---|
| 2,960,683 | Gregory et al. | Nov. 15, 1960 |
| 2,975,405 | Hammer | Mar. 14, 1961 |
| 3,058,659 | Demmer et al. | Oct. 16, 1962 |